United States Patent
Yoshida

(10) Patent No.: US 7,570,402 B2
(45) Date of Patent: Aug. 4, 2009

(54) PRINTING METHOD AND PRINTING SYSTEM

(75) Inventor: Masahiko Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 514 days.

(21) Appl. No.: 10/576,295

(22) PCT Filed: Oct. 28, 2004

(86) PCT No.: PCT/JP2004/016006

§ 371 (c)(1),
(2), (4) Date: Apr. 19, 2006

(87) PCT Pub. No.: WO2005/042256

PCT Pub. Date: May 12, 2005

(65) Prior Publication Data

US 2007/0121130 A1    May 31, 2007

(30) Foreign Application Priority Data

Oct. 31, 2003  (JP) ............................. 2003-373774
Feb. 13, 2004  (JP) ............................. 2004-037136

(51) Int. Cl.
*G03F 3/08* (2006.01)
*G06F 15/00* (2006.01)

(52) U.S. Cl. .................. 358/521; 358/1.9; 358/518; 358/504

(58) Field of Classification Search .............. 358/1.1, 358/1.2, 1.4, 1.8, 1.9, 3.01, 3.02, 3.03, 3.13, 358/518, 521, 504; 347/1, 5, 6, 9, 14, 19, 347/20, 40, 43
See application file for complete search history.

(56) References Cited

U.S. PATENT DOCUMENTS

| | | | | |
|---|---|---|---|---|
| 4,941,746 A | * | 7/1990 | Hull et al. | 356/444 |
| 5,285,220 A | * | 2/1994 | Suzuki et al. | 358/518 |
| 5,512,986 A | | 4/1996 | Toyomura et al. | |
| 5,528,270 A | * | 6/1996 | Tajika et al. | 347/19 |
| 5,625,755 A | * | 4/1997 | Shu | 358/1.9 |
| 5,640,190 A | * | 6/1997 | Bollansee et al. | 347/240 |
| 5,752,126 A | * | 5/1998 | Muramatsu | 399/44 |

(Continued)

FOREIGN PATENT DOCUMENTS

EP    0 955 768 A2    11/1999

(Continued)

OTHER PUBLICATIONS

Extended European Search Report, dated Feb. 25, 2009 for EP 04 793 114.2.

*Primary Examiner*—Kimberly A Williams
(74) *Attorney, Agent, or Firm*—Sughrue Mion, PLLC

(57) ABSTRACT

A printing method for printing an image on a medium according to the present invention includes the following steps: printing a correction pattern based on a first gradation value by ejecting ink from a plurality of nozzles moving in a predetermined movement direction and forming a plurality of dot lines in an intersecting direction that intersects the movement direction; obtaining, for each dot line, first information corresponding to the first gradation value by measuring a darkness of the correction pattern dot line by dot line; and printing an image constituted by a plurality of corrected dot lines on the medium by correcting each dot line in accordance with the first information and second information corresponding to a second gradation value that is different from the first gradation value.

30 Claims, 67 Drawing Sheets

U.S. PATENT DOCUMENTS

| | | | |
|---|---|---|---|
| 5,797,690 A * | 8/1998 | Iwamura et al. | 347/19 |
| 5,838,342 A * | 11/1998 | Takahashi et al. | 347/19 |
| 5,946,006 A * | 8/1999 | Tajika et al. | 347/19 |
| 6,297,888 B1 * | 10/2001 | Noyes et al. | 358/1.9 |
| 6,354,688 B1 * | 3/2002 | Inoue et al. | 347/15 |
| 6,386,673 B1 * | 5/2002 | Takahashi et al. | 347/19 |
| 6,732,645 B2 * | 5/2004 | Yamamoto et al. | 101/365 |
| 6,908,176 B2 * | 6/2005 | Koitabashi et al. | 347/43 |
| 7,201,462 B2 * | 4/2007 | Shibata et al. | 347/19 |
| 7,347,524 B2 * | 3/2008 | Yoshida | 347/19 |
| 7,410,235 B2 * | 8/2008 | Yoshida | 347/19 |
| 7,419,238 B2 * | 9/2008 | Yoshida | 347/19 |
| 2003/0066447 A1 * | 4/2003 | Yamamoto et al. | 101/365 |
| 2004/0104951 A1 * | 6/2004 | Shibata et al. | 347/14 |
| 2005/0135822 A1 * | 6/2005 | Nakagawa | 399/49 |
| 2005/0206668 A1 * | 9/2005 | Yoshida | 347/12 |
| 2005/0206919 A1 * | 9/2005 | Yoshida | 358/1.8 |
| 2005/0212832 A1 * | 9/2005 | Hoshiyama et al. | 347/5 |
| 2005/0212833 A1 * | 9/2005 | Yoshida | 347/5 |
| 2006/0221125 A1 * | 10/2006 | Konno | 347/40 |
| 2007/0070424 A1 * | 3/2007 | Chiwata | 358/3.03 |
| 2007/0132804 A1 * | 6/2007 | Chiwata | 347/19 |
| 2007/0146740 A1 * | 6/2007 | Yoshida | 358/1.8 |
| 2008/0100855 A1 * | 5/2008 | Yoshida et al. | 358/1.8 |

FOREIGN PATENT DOCUMENTS

| | | |
|---|---|---|
| EP | 1 078 770 A1 | 2/2001 |
| EP | 1 190 864 A1 | 3/2002 |
| JP | 4-18363 A | 1/1992 |
| JP | 6-166247 A | 6/1994 |
| JP | 2004-174751 A | 6/2004 |

* cited by examiner

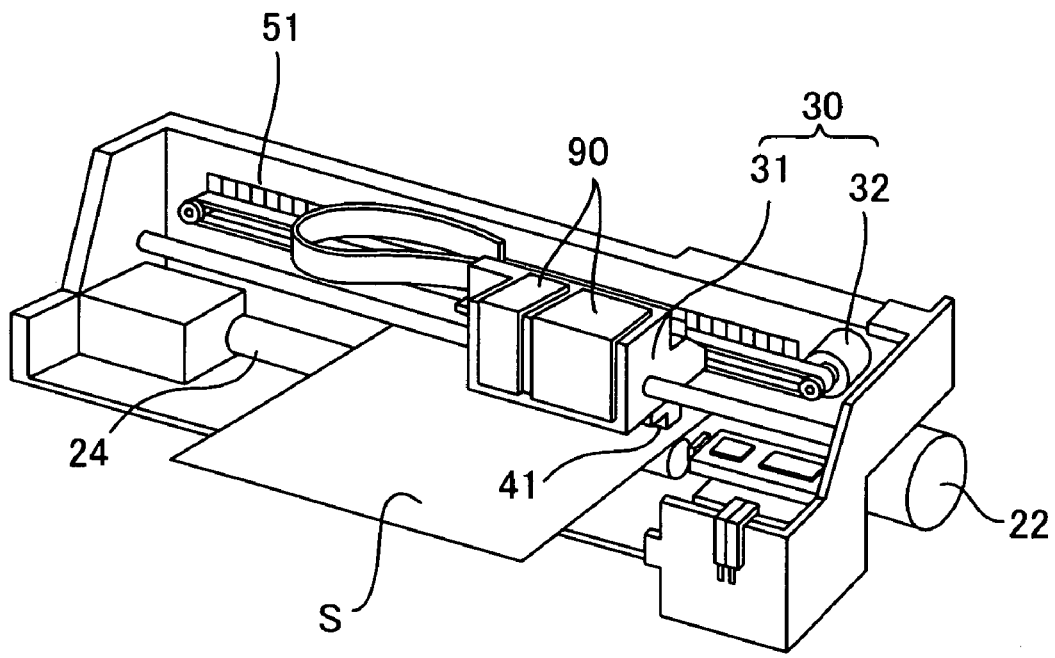
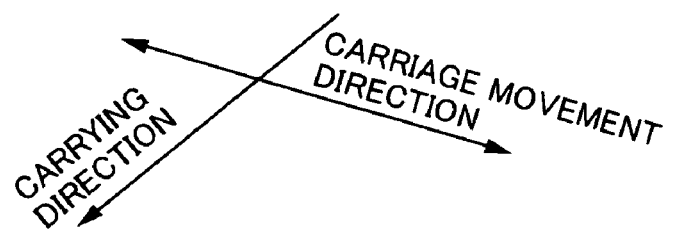
Fig.9

| MARGIN FORMAT MODE | IMAGE QUALITY MODE | PRINT MODE |
|---|---|---|
| BORDERLESS | HIGH | FIRST PRINT MODE |
|  | NORMAL | THIRD PRINT MODE |
| BORDERED | HIGH | SECOND PRINT MODE |
|  | NORMAL | FOURTH PRINT MODE |

Fig.19

| PRINT MODE | PROCESSING MODE |
|---|---|
| FIRST PRINT MODE | FIRST UPPER EDGE PROCESSING MODE, FIRST INTERMEDIATE PROCESSING MODE, FIRST LOWER EDGE PROCESSING MODE |
| SECOND PRINT MODE | FIRST INTERMEDIATE PROCESSING MODE |
| THIRD PRINT MODE | SECOND LOWER EDGE PROCESSING MODE, SECOND INTERMEDIATE PROCESSING MODE, SECOND LOWER EDGE PROCESSING MODE |
| FOURTH PRINT MODE | SECOND INTERMEDIATE PROCESSING MODE |

FOR YELLOW INK

FOR MAGENTA INK

FOR CYAN INK

FOR BLACK INK

| RECORDING TABLE FOR FIRST UPPER EDGE PROCESSING MODE | | RECORDING TABLE FOR FIRST INTERMEDIATE PROCESSING MODE | | RECORDING TABLE FOR FIRST LOWER EDGE PROCESSING MODE | | RECORDING TABLE FOR SECOND UPPER EDGE PROCESSING MODE | | RECORDING TABLE FOR SECOND INTERMEDIATE PROCESSING MODE | | RECORDING TABLE FOR SECOND LOWER EDGE PROCESSING MODE | |
|---|---|---|---|---|---|---|---|---|---|---|---|
| RECORD NUMBER | MEASURE-MENT VALUE | RECORD NUMBER | MEASURE-MENT VALUE | RECORD NUMBER | MEASURE-MENT VALUE | RECORD NUMBER | MEASURE-MENT VALUE | RECORD NUMBER | MEASURE-MENT VALUE | RECORD NUMBER | MEASURE-MENT VALUE |
| 1 | | 1 | | 1 | | 1 | | 1 | | 1 | |
| 2 | | 2 | | 2 | | 2 | | 2 | | 2 | |
| 3 | | 3 | | 3 | | 3 | | 3 | | 3 | |
| 4 | | 4 | | 4 | | 4 | | 4 | | 4 | |
| 5 | | 5 | | 5 | | 5 | | 5 | | 5 | |
| 6 | | 6 | | 6 | | 6 | | 6 | | 6 | |
| 7 | | 7 | | 7 | | 7 | | 7 | | 7 | |
| 8 | | 8 | | 8 | | 8 | | 8 | | 8 | |
| 9 | | 9 | | 9 | | 9 | | 9 | | 9 | |
| 10 | | 10 | | 10 | | 10 | | 10 | | 10 | |
| 11 | | 11 | | 11 | | 11 | | 11 | | 11 | |
| 12 | | 12 | | 12 | | 12 | | 12 | | 12 | |
| .... | | .... | | .... | | .... | | .... | | .... | |

RECORDING TABLE FOR FIRST UPPER EDGE PROCESSING MODE

| RECORD NUMBER | MEASUREMENT VALUE |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.33A

RECORDING TABLE FOR FIRST INTERMEDIATE PROCESSING MODE

| RECORD NUMBER | MEASUREMENT VALUE |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | * * * |
| 38 | * * * |
| 39 | * * * |
| 40 | * * * |
| 41 | * * * |
| 42 | * * * |
| 43 | * * * |
| 44 | * * * |
| 45 | * * * |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

Fig.33B

RECORDING TABLE FOR FIRST LOWER EDGE PROCESSING MODE

| RECORD NUMBER | MEASUREMENT VALUE |
|---|---|
| 1 | * * * |
| 2 | * * * |
| 3 | * * * |
| 4 | * * * |
| 5 | * * * |
| 6 | * * * |
| 7 | * * * |
| 8 | * * * |
| 9 | * * * |
| 10 | * * * |
| 11 | * * * |
| 12 | * * * |
| 13 | * * * |
| 14 | * * * |
| 15 | * * * |
| 16 | * * * |
| 17 | * * * |
| 18 | * * * |
| 19 | * * * |
| 20 | * * * |
| 21 | * * * |
| 22 | * * * |
| 23 | * * * |
| 24 | * * * |
| 25 | * * * |
| 26 | * * * |
| 27 | * * * |
| 28 | * * * |
| 29 | * * * |
| 30 | * * * |
| 31 | * * * |
| 32 | * * * |
| 33 | * * * |
| 34 | * * * |
| 35 | * * * |
| 36 | * * * |
| 37 | |
| 38 | |
| 39 | |
| 40 | |
| 41 | |
| 42 | |
| 43 | |
| 44 | |
| 45 | |
| 46 | |
| ⋮ | ⋮ |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |
| 81 | |
| 82 | |
| 83 | |
| 84 | |
| 85 | |
| 86 | |
| 87 | |
| 88 | |
| 89 | |
| 90 | |

| CORRECTION VALUE TABLE FOR FIRST UPPER EDGE PROCESSING MODE | | CORRECTION VALUE TABLE FOR FIRST INTERMEDIATE PROCESSING MODE | | CORRECTION VALUE TABLE FOR FIRST LOWER EDGE PROCESSING MODE | |
|---|---|---|---|---|---|
| RECORD NUMBER | MEASUREMENT VALUE | RECORD NUMBER | MEASUREMENT VALUE | RECORD NUMBER | MEASUREMENT VALUE |
| 1 | * * * | 1 | * * * | 1 | * * * |
| 2 | * * * | 2 | * * * | 2 | * * * |
| 3 | * * * | 3 | * * * | 3 | * * * |
| 4 | * * * | 4 | * * * | 4 | * * * |
| 5 | * * * | 5 | * * * | 5 | * * * |
| 6 | * * * | 6 | * * * | 6 | * * * |
| 7 | * * * | 7 | * * * | 7 | * * * |
| 8 | * * * | 8 | * * * | 8 | * * * |
| 9 | * * * | 9 | * * * | 9 | * * * |
| 10 | * * * | 10 | * * * | 10 | * * * |
| 11 | * * * | 11 | * * * | 11 | * * * |
| 12 | * * * | 12 | * * * | 12 | * * * |
| 13 | * * * | 13 | * * * | 13 | * * * |
| 14 | * * * | 14 | * * * | 14 | * * * |
| 15 | * * * | 15 | * * * | 15 | * * * |
| 16 | * * * | 16 | * * * | 16 | * * * |
| 17 | * * * | 17 | * * * | 17 | * * * |
| 18 | * * * | 18 | * * * | 18 | * * * |
| 19 | * * * | 19 | * * * | 19 | * * * |
| 20 | * * * | 20 | * * * | 20 | * * * |
| 21 | * * * | 21 | * * * | 21 | * * * |
| 22 | * * * | 22 | * * * | 22 | * * * |
| 23 | * * * | 23 | * * * | 23 | * * * |
| 24 | * * * | 24 | * * * | 24 | * * * |
| 25 | * * * | 25 | * * * | 25 | * * * |
| 26 | * * * | 26 | * * * | 26 | * * * |
| 27 | * * * | 27 | * * * | 27 | * * * |
| 28 | * * * | 28 | * * * | 28 | * * * |
| 29 | * * * | 29 | * * * | 29 | * * * |
| 30 | * * * | 30 | * * * | 30 | * * * |
| 31 | * * * | 31 | * * * | 31 | * * * |
| 32 | * * * | 32 | * * * | 32 | * * * |
| 33 | * * * | 33 | * * * | 33 | * * * |
| 34 | * * * | 34 | * * * | 34 | * * * |
| 35 | * * * | 35 | * * * | 35 | * * * |
| 36 | * * * | 36 | * * * | 36 | * * * |
| 37 | * * * | 37 | * * * | 37 | |
| 38 | * * * | 38 | * * * | 38 | |
| 39 | * * * | 39 | * * * | 39 | |
| 40 | * * * | 40 | * * * | 40 | |
| 41 | | 41 | * * * | 41 | |
| 42 | | 42 | * * * | 42 | |
| 43 | | 43 | * * * | 43 | |
| 44 | | 44 | * * * | 44 | |
| 45 | | 45 | * * * | 45 | |
| 46 | | 46 | | 46 | |
| ⋮ | ⋮ | ⋮ | ⋮ | ⋮ | ⋮ |
| 56 | | 56 | | 56 | |
| 57 | | 57 | | 57 | |
| 58 | | 58 | | 58 | |
| 59 | | 59 | | 59 | |
| 60 | | 60 | | 60 | |
| 61 | | 61 | | 61 | |
| 62 | | 62 | | 62 | |
| 63 | | 63 | | 63 | |
| 64 | | 64 | | 64 | |
| 65 | | 65 | | 65 | |
| 66 | | 66 | | 66 | |
| 67 | | 67 | | 67 | |
| 68 | | 68 | | 68 | |
| 69 | | 69 | | 69 | |
| 70 | | 70 | | 70 | |
| 71 | | 71 | | 71 | |
| 72 | | 72 | | 72 | |
| 73 | | 73 | | 73 | |
| 74 | | 74 | | 74 | |
| 75 | | 75 | | 75 | |
| 76 | | 76 | | 76 | |
| 77 | | 77 | | 77 | |
| 78 | | 78 | | 78 | |
| 79 | | 79 | | 79 | |
| 80 | | 80 | | 80 | |
| 81 | | 81 | | 81 | |
| 82 | | 82 | | 82 | |
| 83 | | 83 | | 83 | |
| 84 | | 84 | | 84 | |
| 85 | | 85 | | 85 | |
| 86 | | 86 | | 86 | |
| 87 | | 87 | | 87 | |
| 88 | | 88 | | 88 | |
| 89 | | 89 | | 89 | |
| 90 | | 90 | | 90 | |

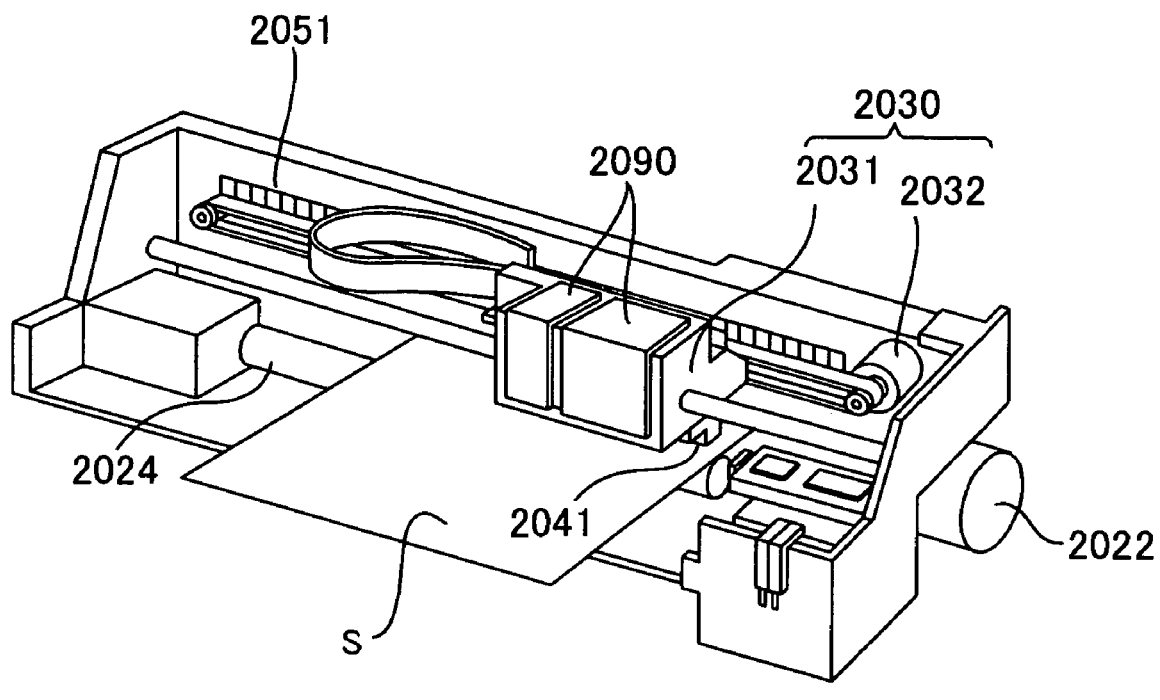
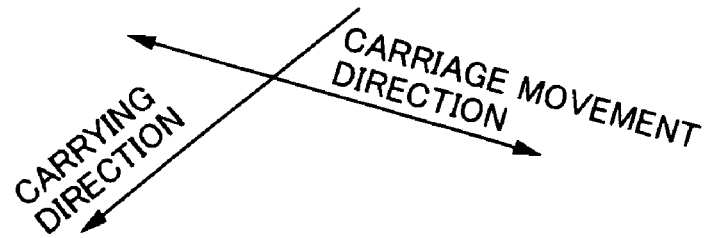
Fig.47

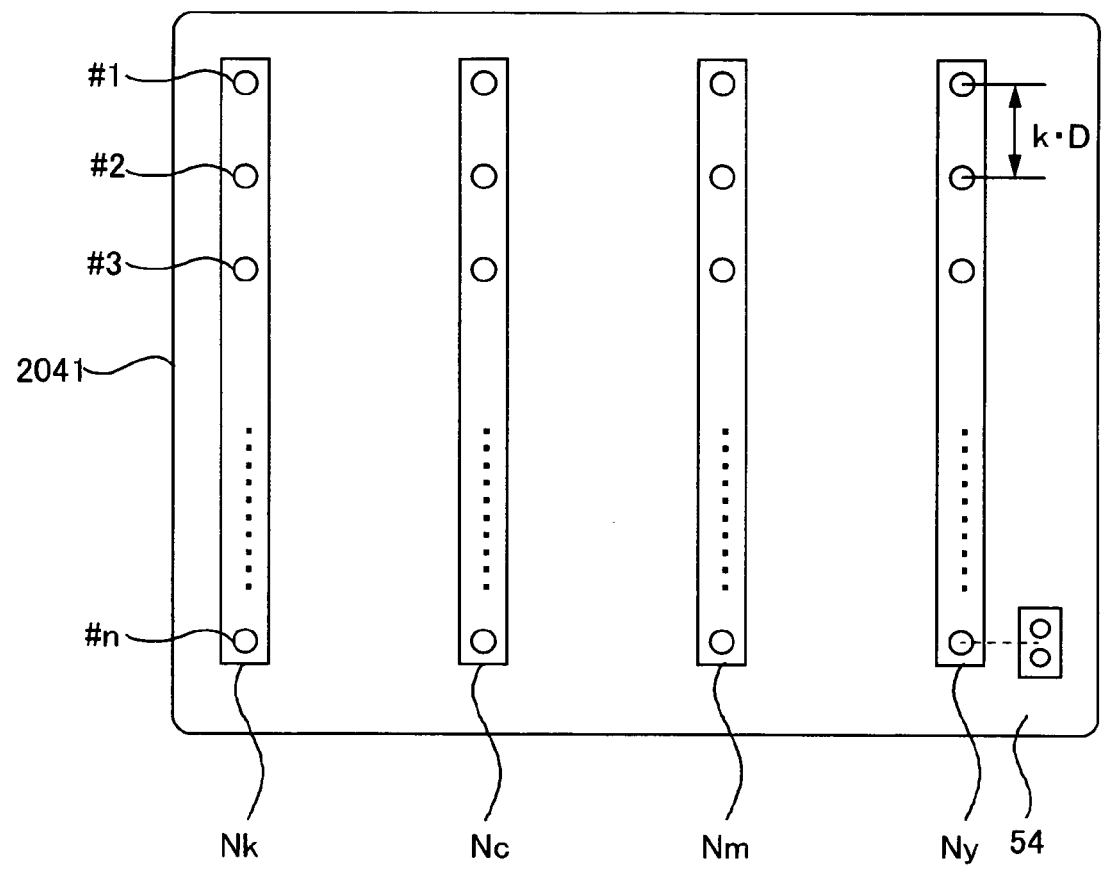
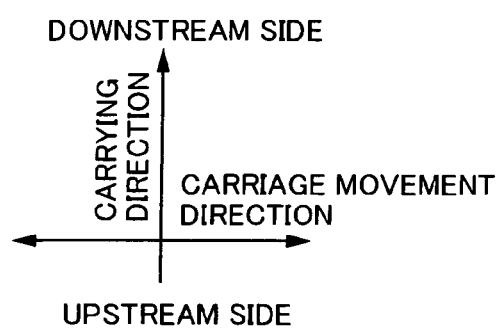
Fig.49

RECORDING TABLE FOR YELLOW INK

RECORDING TABLE FOR MAGENTA INK

RECORDING TABLE FOR CYAN INK

RECORDING TABLE FOR BLACK INK

| RECORD NUMBER | MEASUREMENT VALUE | | | | | | | | COMMAND VALUE | | | | | | | |
|---|---|---|---|---|---|---|---|---|---|---|---|---|---|---|---|---|
| | Ca | Cb | Cc | Cd | Ce | Cf | Cg | Ch | Sa | Sb | Sc | Sd | Se | Sf | Sg | Sh |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |

Fig.61

PRINTING METHOD AND PRINTING SYSTEM

TECHNICAL FIELD

The present invention relates to printing methods and printing systems.

The present application claims priority upon Japanese Patent Application No. 2003-373774 filed on Oct. 31, 2003, and Japanese Patent Application No. 2004-037136 filed on Feb. 13, 2004, which are herein incorporated by reference.

BACKGROUND ART

Inkjet printers (referred in the following as "printers") are known as printing apparatuses for forming images by ejecting ink onto a paper serving as a medium. These printers repeat in alternation a dot formation operation of forming dots on a paper by ejecting ink from a plurality of nozzles, which move in the movement direction of a carriage, and a carrying operation of carrying the paper in an intersecting direction that intersects the movement direction (hereinafter, referred to as the "carrying direction") by a carry unit. Thus, a plurality of raster lines made of a plurality of dots in the movement direction are formed in the intersecting direction, to print an image.

Now, with such a printer, darkness non-uniformities extending parallel to the movement direction of the carriage can be occasionally observed in images made of a multitude of raster lines. The reason for such darkness non-uniformities lies mainly in the machining precision of the nozzles. More specifically, there are two cases: the case of variations in the ink ejection amount among the nozzles, and the case that the positions at which dots are formed on paper by ejecting ink from the nozzles (referred to as "dot formation positions" in the following) deviate in the carrying direction from the target positions.

Accordingly, in the printing method described in JP H06-166247A, a correction pattern with a specified single darkness is first printed on the paper. Next, the darkness of the printed correction pattern is read in, and printing is performed while performing a darkness correction based on the read data.

DISCLOSURE OF INVENTION

Problems to be Solved by the Invention

With this printing method, the correction of all darkness values that can be printed is performed based on the correction pattern that is printed with the specified single darkness. On the other hand, the darkness values that can be printed are set such that a wide range of darkness values of for example 256 gradations can be reproduced. Therefore, when printing a darkness that differs greatly from the darkness of the correction pattern, a suitable darkness correction cannot be carried out, and there is a risk that darkness non-uniformities cannot be inhibited.

Means for Solving the Problems

In accordance with one aspect of the present invention, a printing method for printing an image on a medium includes the following steps:

printing a correction pattern based on a first gradation value by ejecting ink from a plurality of nozzles moving in a predetermined movement direction and forming a plurality of dot lines in an intersecting direction that intersects the movement direction;

obtaining first information corresponding to the first gradation value for each of the dot lines by measuring a darkness of the correction pattern at each of the dot lines; and printing an image constituted by a plurality of corrected dot lines on the medium by correcting each of the dot lines in accordance with the first information and second information corresponding to a second gradation value that is different from the first gradation value.

It should be noted that the present invention can be taken from various angles or aspects. Also, further features of the present invention shall become clear from the following description taken in conjunction with the accompanying drawings.

BRIEF DESCRIPTION OF DRAWINGS

FIGS. 1 to 44 illustrate a first embodiment.
FIGS. 45 to 70 illustrate a second embodiment.
FIG. 1 is an explanatory diagram of the overall configuration of the printing system.
FIG. 2 is an explanatory diagram of processes carried out by a printer driver.
FIG. 3 is a flowchart of halftone processing through dithering.
FIG. 4 is a diagram showing a dot creation ratio table.
FIG. 5 is a diagram that shows how dots are to be judged on or off according to dithering.
FIG. 7 is an explanatory diagram of a user interface of the printer driver.
FIG. 8 is a block diagram of the overall configuration of the printer.
FIG. 9 is a schematic view of the overall configuration of the printer.
FIG. 10 is a transverse sectional view of the overall configuration of the printer.
FIG. 11 is a flowchart of the processing during the printing operation.
FIG. 12 is an explanatory diagram showing the arrangement of the nozzles.
FIG. 13 is an explanatory diagram of the drive circuit of the head unit.
FIG. 14 is a timing chart for explaining the various signals.
FIG. 16 is a diagram showing the size relationship between the print region and the paper during bordered printing.
FIG. 17 is a diagram showing the size relationship between the print region and the paper during borderless printing.
FIG. 19 is a first reference table showing the print modes corresponding to the various combinations between the margin format mode and the image quality mode.
FIG. 20 is a second reference table showing the processing modes corresponding to the various print modes.

FIG. 25 is a diagram illustrating the darkness non-uniformities that occur in a monochrome printed image.

FIG. 26 is a flowchart showing the overall procedure of the method for printing an image in which the darkness non-uniformities have been inhibited, according to this second reference example.

FIG. 27 is a flowchart of Step S120 in FIG. 26.

FIG. 28 is a diagram illustrating an example of the correction pattern that is printed on paper.

FIG. 31 is a diagram illustrating an example of darkness correction values of a correction pattern.

FIG. 32 is a schematic diagram of a recording table.

FIGS. 33A to 33C show recording tables for the first upper edge processing mode, the first intermediate processing mode and the first lower edge processing mode, respectively.

FIG. 34 is a schematic diagram of a correction value table.

FIGS. 35A to 35C show correction value tables for the first upper edge processing mode, the first intermediate processing mode and the first lower edge processing mode, respectively.

FIG. 36 is a flowchart of Step S140 in FIG. 26.

FIG. 37 is a diagrammatic view showing an array of pixel data according to RGB image data.

FIG. 38 is a diagrammatic view showing an array of pixel data according to RGB image data.

FIG. 39 is a diagram illustrating a correction pattern according to the first example.

FIG. 40 is a diagram illustrating a recording table according to the first example.

FIG. 41 is a graph for illustrating the linear interpolation that is carried out in the first example.

FIG. 42 is a diagram illustrating a correction pattern according to the second example.

FIG. 43 is a diagram illustrating a recording table according to the second example.

FIG. 44 is a graph for illustrating the linear interpolation that is carried out in the second example.

FIG. 45 is an explanatory diagram showing the external structure of the printing system.

FIG. 46 is a block diagram of the overall configuration of the printer 2001 of this embodiment.

FIG. 47 is a schematic diagram of the overall configuration of the printer 2001 of this embodiment.

FIG. 48 is a lateral sectional view of the overall configuration of the printer 2001 of this embodiment.

FIG. 49 is an explanatory diagram showing the arrangement of the nozzles in the lower surface of the head.

FIG. 50 is an explanatory diagram of the drive circuit of the head.

FIG. 51 is a timing chart illustrating the various signals.

FIG. 52 is a schematic explanatory diagram of basic processes carried out by the printer driver.

FIG. 53 is a flowchart of halftone processing through dithering.

FIG. 54 is a diagram showing a creation ratio table that is used for setting the level data for large, medium, and small dots.

FIG. 55 is a diagram illustrating how dots are determined to be on or off through dithering.

FIG. 57 is a flowchart of the operation during printing.

FIG. 58 is a diagram illustrating darkness non-uniformities that occur in an image that is printed in a single color, these darkness non-uniformities occurring in the carrying direction of the paper.

FIG. 59 is a flowchart showing for example the flow of the processes related to the method for printing an image in accordance with the present embodiment.

FIG. 60 is a block diagram illustrating the device used for setting the correction table.

FIG. 61 is a schematic diagram of a recording table that is provided in the memory of the computer.

FIG. 62 is a flowchart showing the procedure of Step S1120 in FIG. 59.

FIG. 63 is a diagram illustrating an example of the correction pattern CP that is printed.

FIG. 65 is a diagram illustrating an example of darkness measurement gradation values of a correction pattern CPk.

FIG. 66 is a schematic diagram of image data correction tables stored in the correction table storage portion provided in the memory of the printer.

FIG. 67 is a graph illustrating linear interpolation, which is performed using three pairs of correction information.

FIG. 68 is a graph illustrating the image data correction table associating the data gradation values given to the supplied image data with the corrected gradation values.

FIG. 69 is a schematic diagram of creation ratio tables stored in the correction table storage portion provided in the memory of the printer.

FIG. 70 is a graph illustrating the creation ratio table associating the data gradation values given to the supplied image data with the corrected level data.

LIST OF REFERENCE NUMERALS

First Embodiment

Figure 1:
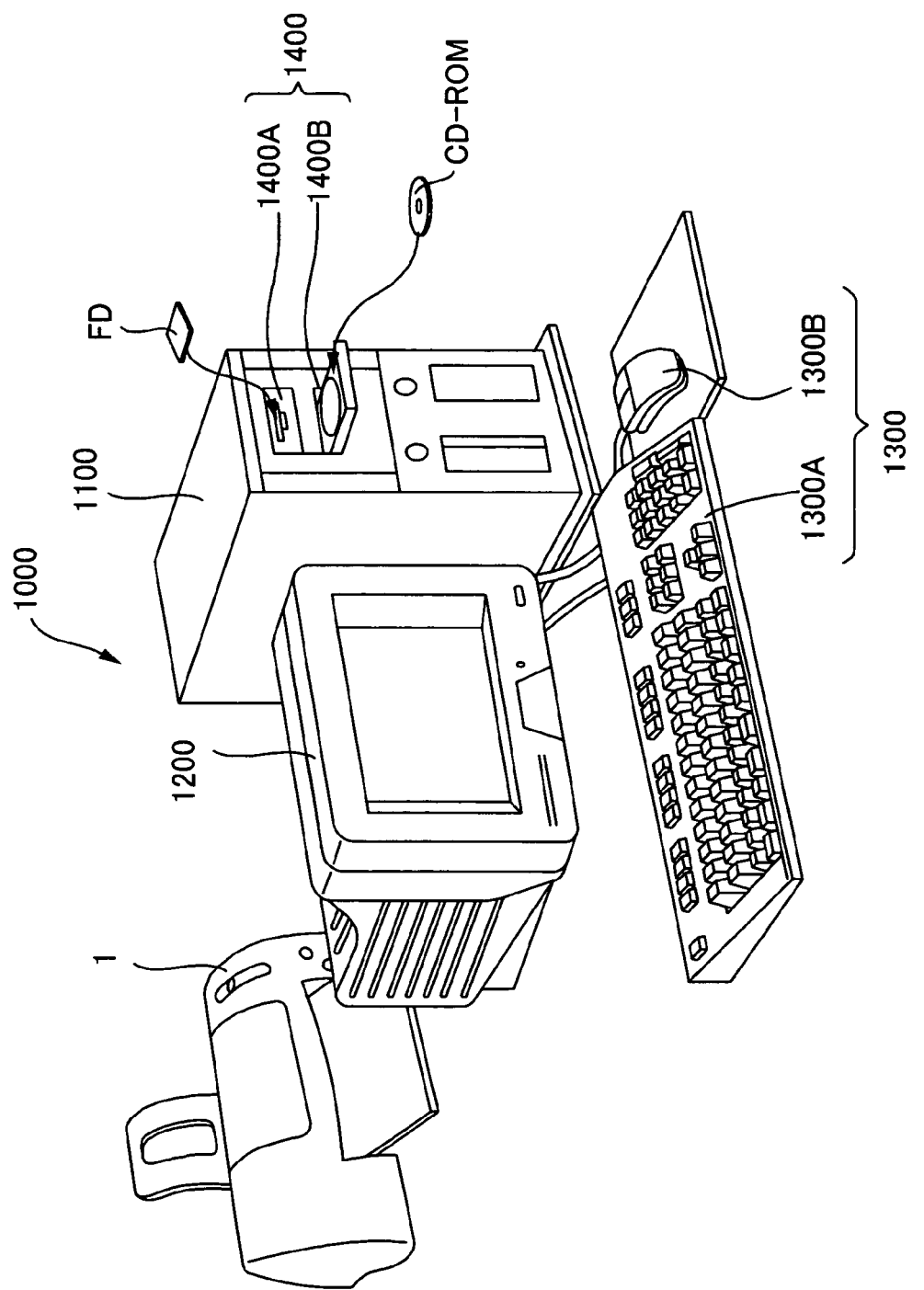

1 . . . printer,
20 . . . carry unit, 21 . . . paper supply roller, 22 . . . carry motor (PF motor),
23 . . . carry roller,
24 . . . platen, 24a, 24b . . . grooves, 24c, 24d . . . absorbing material,
25 . . . paper discharge roller,
30 . . . carriage unit, 31 . . . carriage,
32 . . . carriage motor (CR motor),
40 . . . head unit, 41 . . . head,
50 . . . sensor, 51 . . . linear encoder, 52 . . . rotary encoder,
53 . . . paper detection sensor, 54 . . . paper width sensor,
60 . . . controller, 61 . . . interface section, 62 . . . CPU,
63 . . . memory
64 . . . unit control circuit 644A . . . original drive signal generation section, 644B . . . drive signal shaping section,
100 . . . scanner, 101 . . . document, 102 . . . document glass,
104 . . . reading carriage, 106 . . . exposure lamp, 108 . . . linear sensor,
1100 . . . computer, 1200 . . . display device,
1300 . . . input devices, 1300A . . . keyboard, 1300B . . . mouse,
1400 . . . recording/reproducing devices
1400A . . . flexible disk drive
1400B . . . CD-ROM drive,
1000 . . . printing system,
1102 . . . video driver, 1104 . . . application program,
1110 . . . printer driver,
A . . . print region, Aa . . . abandonment region, S . . . paper,
CP, CPc, CPca, CPcb, CPcc . . . correction patterns,
CPm, CPma, CPmb, CPmc . . . correction patterns,
CPy, CPya, CPyb, CPyc . . . correction patterns,
CPk, CPka, CPkb, CPkc . . . correction patterns,
CP1, CP2, CP3 . . . correction patterns,
R, R1 to R137, r1 to r12 . . . raster lines Second Embodiment 2001 . . . printer (inkjet printer)
2020 . . . carry unit, 2021 . . . paper supply roller, 2022 . . . carry motor, 2023 . . . carry roller,
24 . . . platen, 25 . . . paper discharge roller,
2030 . . . carriage unit, 2031 . . . carriage,
2040 . . . head unit, 2041 . . . head,
2050 . . . sensor, 2051 . . . linear encoder, 2052 . . . rotary encoder, 2053 . . . paper detection sensor,
2054 . . . paper width sensor,
2060 . . . controller, 2061 . . . interface section, 2062 . . . CPU,
2063 . . . memory, 2063a . . . correction table storage section,
2064 . . . unit control circuit,
2644A . . . original drive signal generation section,
2644B . . . drive signal shaping section,
2090 . . . ink cartridge, 100 . . . scanner, 101 . . . document, 102 . . . document glass, 104 . . . reading carriage, 106 . . . exposure lamp,
108 . . . linear sensor,
3100 (3100A) . . . computer, 3102 . . . video driver,
3110 . . . printer driver, 3200 . . . display device,
3300 . . . input devices, 3300A . . . keyboard, 3300B . . . mouse,
3400 . . . recording/reproducing devices,
3400A . . . flexible disk drive
3400B . . . CD-ROM drive,
CP . . . correction pattern

BEST MODE FOR CARRYING OUT THE INVENTION

===Overview of the Disclosure===
A printing method for printing an image on a medium includes the following steps:
printing a correction pattern based on a first gradation value by ejecting ink from a plurality of nozzles moving in a predetermined movement direction and forming a plurality of dot lines in an intersecting direction that intersects the movement direction;
obtaining, for each dot line, first information corresponding to the first gradation value by measuring a darkness of the correction pattern dot line by dot line; and
printing an image constituted by a plurality of corrected dot lines on the medium by correcting each dot line in accordance with the first information and second information corresponding to a second gradation value that is different from the first gradation value.

With this printing method, the darkness is corrected for each dot line individually, such that darkness non-uniformities of the dot lines are inhibited, using two sets of information, namely first information, based on a correction pattern, and second information. Therefore, the darkness non-uniformities in an image constituted by a plurality of corrected dot lines are more effectively inhibited than in an image in which they are corrected based on one set of information as conventionally. Thus, with this printing method, it is possible to print more favorable images.

In the foregoing printing method, it is preferable that a correction value is calculated for each dot line based on the first information and the second information; and an image that is constituted by a plurality of the dot lines that have been corrected respectively in accordance with the correction value is printed on the medium.

Thus, it is possible to calculate the correction value easily. Consequently, it is not necessary to use a trial and error approach when calculating this correction value.

In the foregoing printing method, it is preferable that a correction pattern based on the second gradation value is printed; and the second information corresponding to the second gradation value is obtained for each dot line by measuring a darkness of this correction pattern dot line by dot line.

Thus, it is possible to calculate the correction value based on the information obtained from the two correction patterns.

In the foregoing printing method, it is preferable that the darkness of the correction pattern based on the first gradation value and the darkness of the correction pattern based on the second gradation value are measured dot line by dot line, and the correction value is determined from the measurement value of each dot line.

Thus, the respective darkness of the two correction patterns formed in the same dot line is measured, so that the correction value can be calculated, for each dot line individually, based on these two sets of information.

In the foregoing printing method, it is preferable that a plurality of the dot lines are formed in the intersecting direction through alternate repetition of a dot formation operation of forming dots on the medium by ejecting ink from the plurality of nozzles moving in the movement direction and a carrying operation of carrying the medium in the intersecting direction intersecting the movement direction.

Thus, a number of dot lines that is larger than the number of nozzles can be formed continuously in the intersecting direction.

In the foregoing printing method, it is preferable that a plurality of the nozzles are provided for each color of the ink; the correction value is calculated for each color by printing the correction pattern in each color; and the darkness of the image is corrected for each color, in accordance with the correction value of each color.

Thus, the darkness non-uniformities of an image printed by multi-color printing can be advantageously inhibited.

In the foregoing printing method, it is preferable that a gradation value at which the darkness becomes a target value is determined by performing a linear interpolation using two information pairs, the two information pairs being a pair made up of the gradation value and the measurement value of one of the two correction patterns and a pair made up of the gradation value and the measurement value of the other of the two correction patterns; and a value obtained by dividing a deviation between the determined gradation value and a reference gradation value corresponding to the target value by that reference gradation value is taken as the correction value.

Thus, it is possible to calculate the correction value easily. Consequently, it is not necessary to use a trial and error approach when calculating this correction value.

In the foregoing printing method, it is preferable that the gradation value of one of the two information pairs is higher than the reference value and the gradation value of the other is smaller than the reference value.

Thus, the reference value is set between the two gradation values. Consequently, the linear interpolation can be performed through an interpolation and not an extrapolation, so that the precision of the correction values determined by this linear interpolation is increased.

In the foregoing printing method, it is preferable that the gradation value of one of the two information pairs is the same value as the reference value.

Thus, it is possible to obtain a value near the target value as the measurement value of the darkness of the correction pattern. Moreover, the precision of the correction value is increased by performing a linear interpolation using a measurement value near the target value.

In the foregoing printing method, it is preferable that three information pairs are obtained, the three information pairs being a pair made up of the gradation value and a measurement value of one of three correction patterns that are each based on a different gradation value, a pair made up of the gradation value and a measurement value of another one of the three correction patterns, and a pair made up of the gradation value and a measurement value of yet another one of the three correction patterns; if a darkness target value is higher than the second largest measurement value of the three information pairs, then a gradation value at which the darkness becomes the target value is determined by linear interpolation using the information including this second largest measurement value and the information including the measurement value higher than the second largest measurement value; if the darkness target value is smaller than the second largest measurement value of the three information pairs, then the gradation value at which the darkness becomes the target value is determined by linear interpolation using the information including this second largest measurement value and the information including the measurement value smaller than the second largest measurement value; and a value obtained by dividing a deviation between the determined gradation value and a reference gradation value corresponding to the target value by that reference gradation value is taken as the correction value.

Thus, even if the change of the measurement values with respect to the change of the gradation value differs between the range of high darkness and the range of low darkness, it is possible to accurately determine, through this linear interpolation, the command value for which the measurement value matches the target value. Thus, it is possible to determine the correction value with high correction precision.

In the foregoing printing method, it is preferable that the second largest gradation value is the same value as the reference value.

Thus, it is possible to obtain a value that is close to the target value as the measurement value of the darkness of the correction pattern. Moreover, the precision of the correction value is increased by performing a linear interpolation using a measurement value near this target value. In particular, since it is guaranteed that the linear interpolation can, in fact, be implemented as an interpolation and not an extrapolation, the precision of the correction value determined by this linear interpolation can be increased.

In the foregoing printing method, it is preferable that the target value is an average value of darkness measurement values of all dot lines in the correction pattern based on the second gradation value of the three gradation values.

Thus, even if the change of the measurement values with respect to the change of the gradation value differs between the range of high darkness and the range of low darkness, it is possible to accurately determine, through this linear interpolation, the command value for which the measurement value matches the target value. Thus, it is possible to determine the correction value with high correction precision.

In the foregoing printing method, it is preferable that the target value is a darkness measurement value of a darkness sample representing the darkness of the reference value.

Thus, it is possible to correct the gradation of the image such that it matches the darkness sample.

In the foregoing printing method, it is preferable that the reference value is selected from a darkness range of a middle-tone region.

Thus, it is possible to advantageously inhibit the darkness non-uniformities in the middle-tone region, where darkness non-uniformities tend to occur easily.

In the foregoing printing method, it is preferable that the darkness measurement value is a grey-scale measurement value.

Thus, it becomes unnecessary to extract the color component necessary for the calculation of the correction value from the darkness measurement values.

In the foregoing printing method, it is preferable that the image data for printing the image includes a gradation value for each dot formation unit formed on the medium;

if no correction value is associated with these formation units, then:
  based on a creation ratio table associating the gradation values with the dot creation ratios, the creation ratio corresponding to the gradation value of the formation unit is read out; and
  dots are formed in each formation unit on the medium in accordance with the creation ratio that has been read out; and if the correction value is associated with these formation units, then:
  when reading the creation ratio corresponding to a gradation value from the creation ratio table, the creation ratio corresponding to a value obtained by changing the gradation value by the correction value is read out; and
  dots are formed in each formation unit on the medium in accordance with the creation ratio that has been read out.

Thus, it is possible to use the same creation ratio table for the image data associated with correction values and the image data not associated with correction values.

In the foregoing printing method, it is preferable that the dot creation ratio indicates a proportion of a number of dots formed within a region that has a uniform gradation value and that is made of a predetermined number of the formation units, to that predetermined number.

Thus, the darkness of the image can be expressed through the number of dots formed in that region.

In the foregoing printing method, it is preferable that the nozzle can form dots of a plurality of sizes; and in the creation ratio table, a relation between the creation ratios and the gradation values is set for each size of dots.

Thus, the darkness can be expressed through dots of a plurality of sizes, so that it is possible to express even finer images.

In the foregoing printing method, it is preferable that the darkness of the correction pattern is measured using a darkness measuring device that measures darkness optically.

Thus, the darkness can be evaluated quantitatively, and the reliability of the correction values is improved.

In the foregoing printing method, it is preferable that correction patterns are printed based respectively-on specified gradation values including the first gradation value and the second gradation value, for each of the specified gradation values.

Thus, it is possible to obtain a plurality of sets of information from a plurality of correction patterns.

In the foregoing printing method, it is preferable that the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information is obtained by determining a new gradation value for forming a darkness corresponding to the second gradation value by performing a linear interpolation using information in which the second gradation value and a measurement value of the correction pattern based on the second gradation value are associated and information in which a specified gradation value that is different from the second gradation value and a measurement value of the correction pattern based on that specified gradation value are associated, and associating the determined new gradation value and the second gradation value.

Thus, the first information and the second information used for the correction are based on measured information obtained by reading in the darkness of correction patterns that are actually printed, so that they are information adapted to the actual device, and a correction that is suitable for the actual device can be performed by using this information. Moreover, the measurement values for determining the first information and the second information is obtained from correction patterns of at least two specified gradation values, so that the reliability is higher than with correction information obtained from only one measurement value. That is to say, the correction is carried out based on two sets of information with high reliability, so that a more suitable correction is performed, and it is possible to inhibit the darkness non-uniformities more effectively.

It should be noted that, as is well known, in a linear interpolation, a function value between two known values or outside thereof is determined as the point for which all three plotted points are located on the same straight line.

In the foregoing printing method, it is preferable that correction patterns are printed based respectively on specified gradation values including the first gradation value, for each of the specified gradation values;

the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information corresponds to the second gradation value at which the printable gradation value becomes highest.

Thus, it is possible to obtain the second information even when not printing a correction pattern based on the second gradation value and measuring this correction pattern.

In the foregoing printing method, it is preferable that correction patterns are printed based respectively on specified gradation values including the first gradation value, for each of the specified gradation values;

the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information corresponds to the second gradation value at which the printable gradation value becomes lowest.

Thus, it is possible to obtain the second information even when not printing a correction pattern based on the second gradation value and measuring this correction pattern.

In the foregoing printing method, it is preferable that the information in which the first gradation value and the measurement value of the correction pattern based on the first gradation value are associated, information in which a specified gradation value that is higher than the first gradation value and a measurement value of the correction pattern based on this specified gradation value are associated, and information in which a specified gradation value that is lower than the first gradation value and a measurement value of the correction pattern based on this specified gradation value are associated are obtained;

if the darkness corresponding to the first gradation value is higher than the measurement value of the correction pattern based on the first gradation value, then a linear interpolation is performed using the information in which the first gradation value and the measurement value of the correction pattern based on the first gradation value are associated, and the information in which the specified gradation value that is higher than the first gradation value and the measurement value of the correction pattern based on this specified gradation value are associated;

if the darkness corresponding to the first gradation value is smaller than the measurement value of the correction pattern based on the first gradation value, then a linear interpolation is performed using the information in which the first gradation value and the measurement value of the correction pattern based on the first gradation value are associated, and the information in which the specified gradation value that is lower than the first gradation value and the measurement value of the correction pattern based on this specified gradation value are associated; and a new gradation value for forming the darkness corresponding to the first gradation value is determined.

Thus, regardless whether the gradation value representing the darkness of the image to be printed based on the first gradation value is large or small, it is possible to accurately determine a new gradation value. Moreover, regardless wheter the gradation value representing the darkness of the image to be printed based on the second gradation value is large or small, it is possible to accurately determine a new gradation value. Furthermore, since the change of the measurement value with respect to the change of the gradation value is not constant for the entire range of gradation values that can be printed, performing a linear interpolation with two sets of information when determining the new gradation value will lead to the determination of the new gradation value based on a change of the measurement value with respect to the change of the gradation value within a limited range of gradation values. That is to say, the new gradation value for printing an image of the first gradation value and the second gradation value is determined with measurement information of a specified gradation value near the first gradation value and the second gradation value. Therefore, a new gradation value that is suitable for the first gradation value and the second gradation value is determined, and an appropriate correction can be performed with the determined new gradation value.

In the foregoing printing method, it is preferable that an average value of the darkness of each dot line constituting the correction pattern based on the first gradation value is taken as the darkness corresponding to the first gradation value.

Thus, it is possible to inhibit darkness non-uniformities while printing an image with a darkness adapted to the actual device.

In the foregoing printing method, it is preferable that a darkness measurement value of a darkness sample is taken as the darkness corresponding to the first gradation value.

Thus, the darkness of the image is corrected such that it is printed with the darkness that was supposed to be printed.

In the foregoing printing method, it is preferable that the image data for printing the image includes a gradation value for each dot formation unit formed on the medium; and the darkness of each of the dot lines is corrected by correcting the gradation value of each of the formation units.

Thus, the gradation value of the original image data is corrected, so that the correction can be performed easily without a complex algorithm for the image processing.

In the foregoing printing method, it is preferable that a new gradation value for forming a darkness corresponding to a gradation value other than the first gradation value and the second gradation value is determined by linear interpolation of the first information and the second information.

Thus, when printing any gradation value the new gradation value corresponding to that gradation value is a gradation value with high reliability obtained from two sets of correction information, so that for any gradation value, it is possible to perform a suitable correction and to print a favorable image.

In the foregoing printing method, it is preferable that a dot creation ratio for a gradation value is corrected based on the first gradation value and the second gradation value.

Thus, it is possible to perform the correction without affecting the algorithm of the image processing other than the halftone processing, so that it is possible to perform the correction easily without a complicated image processing algorithm.

In the foregoing printing method, it is preferable that a dot creation ratio for a gradation value other than the first gradation value and the second gradation value is determined by linear interpolation of a dot creation ratio of the first gradation value and a dot creation ratio of the second gradation value.

Thus, when printing any gradation value, the dot creation ratio corresponding to that gradation value is a dot creation value with high reliability obtained from two sets of creation information, so that for any gradation value, it is possible to perform a suitable correction and to print a favorable image.

In the foregoing printing method, it is preferable that a plurality of the nozzles are provided for each color of the ink; the first information is obtained for each color by printing the correction pattern based on the first information in each color; and each dot line is corrected, color by color, in accordance with the first information and the second information.

Thus, it is possible to advantageously inhibit darkness non-uniformities of an image printed by multi-color printing.

A printing system for printing an image on a medium includes:

a plurality of nozzles moving in a predetermined movement direction; and a controller, the controller:

printing a correction pattern based on a first gradation value by ejecting ink from the plurality of moving nozzles and forming a plurality of dot lines in an intersecting direction that intersects the movement direction;

obtaining, for each dot line, first information corresponding to the first gradation value by measuring a darkness of the correction pattern dot line by dot line; and printing an image constituted by a plurality of corrected dot lines on the medium by correcting each dot line in accordance with the first information and second information corresponding to a second gradation value that is different from the first gradation value.

With such a printing system, the darkness is corrected for each dot line individually, such that darkness non-uniformities of the dot lines are inhibited, using two sets of information, namely first information, based on a correction pattern, and second information. Therefore, the darkness non-uniformities in an image constituted by a plurality of corrected dot lines are more effectively inhibited than in an image in which they are corrected based on the first information as conventionally. Thus, with this printing method, it is possible to print more favorable images.

1. First Embodiment

===(1) Overview of the Disclosure of the First Embodiment===

A printing apparatus comprising a plurality of nozzles for forming dots by ejecting ink onto a medium, the printing apparatus printing an image by forming a plurality of lines, made of a plurality of the dots, extending in a predetermined direction, the lines being formed in an intersecting direction intersecting the predetermined direction, wherein the printing apparatus prints a correction pattern constituted by the lines, measures the darkness of that correction pattern for each line individually, has, in correspondence with each line, a correction value of a darkness value determined based on that measured darkness value, and when printing the image, corrects a command value of the darkness of that image for each line, based on the correction value corresponding to the respective line of the image, the correction value being determined based on the measured darkness value of at least two correction patterns that are printed with different darkness command values.

With this printing apparatus, it is possible to obtain at least two information pairs, where a pair of information includes a command value and a measurement value, from at least two correction patterns. Moreover, it is easy to determine the command value at which the measurement value becomes the target value through a linear interpolation using these two information pairs. Moreover, it is easy to calculate the correction value based on the deviation between this determined command value and the command value at which the target value should have been attained. Consequently, it is not necessary to use a trial and error approach when calculating this correction value.

In the foregoing printing apparatus, it is preferable that in the two correction patterns, the lines corresponding to each other are formed with command values of different darkness, and the correction value is determined by measuring the darkness of the two correction patterns for each line, and based on the measured darkness value of each line.

With this printing apparatus, the lines corresponding to each other are formed with command values of different darkness. Consequently, it is possible to obtain the two information pairs for each line individually, and thus, it is possible to determine the correction value with higher correction precision by performing a linear interpolation based on the information for that line. As a result, it becomes possible to effectively inhibit darkness non-uniformities.

In the foregoing printing apparatus, it is preferable that the printing apparatus comprises a carry unit for carrying the medium, that the plurality of nozzles constitute a nozzle row lined up along the intersecting direction, and that lines made of a plurality of dots extending in the predetermined direction are formed in the intersecting direction through alternate repetition of a dot formation operation of forming dots on the medium by ejecting ink from the nozzle row moving in the movement direction and a carrying operation of carrying the medium in the intersecting direction with the carry unit.

With this printing apparatus, the plurality of nozzles are lined up along the intersecting direction, so that the range over which dots can be formed in a single dot formation operation becomes larger and the printing time can be shortened.

In the foregoing printing apparatus, it is preferable that a nozzle row is provided for each color of the ink, and that by printing the correction pattern for each color, there is a correction value for each color, and the darkness of the image is corrected for each color individually, based on the correction value for the respective color.

With this printing apparatus, a nozzle row is provided for each color, so that it is possible to perform multi-color printing. Furthermore, the darkness of the image is corrected for each color individually based on the correction value of that color, so that it is possible to effectively inhibit darkness non-uniformities of images printed by multi-color printing.

In the foregoing printing apparatus, it is preferable that the command value for which the measurement value matches the same predetermined target value for all lines is determined through a linear interpolation using two information pairs, where a pair of information includes a command value and a measurement value, determined from the two correction patterns, and that the correction value is taken to be the value obtained by dividing the deviation between the determined command value and a predetermined reference value that is the same for all raster lines by the reference value.

With this printing apparatus, the command value for which the measurement value becomes the target value is determined by a linear interpolation using two information pairs, where a pair of information includes a command value and a measurement value, and the correction value is taken to be the value obtained by multiplying the reference value with the deviation between determined command value and the reference value. Consequently, it is not necessary to use a trial and error approach when calculating this correction value.

Furthermore, the same target value and the same reference value can be used for all lines. Consequently, correction values with which the measured values of all lines match each other are obtained, and thus it is possible to keep the darkness differences small for all lines. As a result, it is possible to keep the darkness non-uniformities small.

It should be noted that, as is well known, in a linear interpolation, a function value between two known values or outside thereof is determined as the point for which all three plotted points are located on the same straight line.

In the foregoing printing apparatus, it is preferable that one command value of the two information pairs is higher than the reference value, and the other command value is smaller than the reference value.

Thus, according to the printing apparatus, the reference value is set between the two information pairs. Consequently, the linear interpolation is performed through an interpolation and not an extrapolation, so that the precision of the correction values determined by this linear interpolation is increased.

In the foregoing printing apparatus, it is preferable that the command value of one of the two information pairs is the same as the reference value.

With this printing apparatus, the command value is taken to be the reference value, so that it is possible to obtain a value near the target value as the measurement value of the darkness of the printed correction pattern. Moreover, since the command value corresponding to the target value is determined by a linear interpolation using a measurement value near this target value, the precision of the linear interpolation increases by the amount that this target value is closer to the measurement value, so that the interpolation precision of the determined command value is increased. As a result, the precision of the correction value determined by this linear interpolation is increased.

In the foregoing printing apparatus, it is preferable that three information pairs are obtained from three correction patterns printed with different darkness command values, where an information pair includes a command value and a measurement value; if a predetermined target value that is the same for all lines is higher than the second largest measurement value of the three information pairs, then the command value at which the measurement value becomes the target value is determined by linear interpolation using the information including this second largest measurement value and the information including the measurement value higher than this; if a predetermined target value is smaller than the second largest measurement value of the three information pairs, then the command value at which the measurement value becomes the target value is determined by linear interpolation using the information including this second largest measurement value and the information including the measurement value smaller than this; and a value obtained by dividing a deviation between the determined command value and the predetermined reference value that is the same for all lines by that reference gradation value is taken as the correction value.

With this printing apparatus, three information pairs are obtained, where a pair of information includes a command value and a measurement value, based on three correction patterns printed with different darkness command values. Moreover, the information used for the linear interpolation is changed, depending on which is higher, the target value or the second largest measurement value of these three information pairs. That is to say, if the target value is higher than the second largest measurement value, then the linear interpolation is performed using the information including this second largest measurement value and the information including the measurement value higher than this, whereas if it is smaller, then the linear interpolation is performed using the information including this second largest measurement value and the information including the measurement value smaller than this.

Consequently, even if the change of the measurement value with respect to the change of the command value differs between the region of large darkness and the region of small darkness, it is possible to accurately determine by linear interpolation the command value at which the measurement value matches the target value, and thus a correction value with high correction precision can be determined.

Moreover, the same target value and the same reference value are respectively used for all lines. Consequently, the correction value at which the measurement values of all lines match one another is obtained for each line, and thus the darkness difference can be made small for all lines. As a result, the darkness non-uniformities can be kept small.

In the foregoing printing apparatus, it is preferable that the second largest command value is the same as the reference value.

In the foregoing printing apparatus, it is preferable that the target value is the average value, over all lines, of the second largest measurement values.

With this printing apparatus, the average value, over all lines, of the measurement values is used in the linear interpolation as the target value used to determine the command value. Thus, with this linear interpolation, it is possible to determine a correction value with even higher correction precision.

In the foregoing printing apparatus, it is preferable that the target value is a measurement value of the darkness of a darkness sample representing the darkness of the reference value.

With this printing apparatus, the target value is a measurement value obtained by measuring the darkness of a darkness sample representing the darkness of the reference value. Consequently, it becomes possible to correct the command value with the correction value determined by this linear interpolation such that the darkness of the image printed with the reference value as the command value becomes the reference value. Thus, with this correction value, it is possible to perform such a correction that the darkness of the printed image becomes as instructed by the command value.

In the foregoing printing apparatus, it is preferable that the reference value is selected from a range of darkness values of a middle-tone region.

With this printing apparatus, it is possible to advantageously inhibit darkness non-uniformities in a middle-tone range, in which darkness non-uniformities tend to occur easily.

In the foregoing printing apparatus, it is preferable that the darkness command value of the correction patterns is the same value for all lines constituting the respective correction pattern.

With this printing apparatus, all lines are formed with the same command value, that is, lines that are adjacent in the intersecting directions are formed with the same command value. Consequently, darkness non-uniformities that are formed with adjacent lines, for example darkness non-uniformities that are conspicuous due to changes in the intervals between lines can be evaluated accurately with this correction pattern.

In the foregoing printing apparatus, it is preferable that the darkness measurement value is a grey-scale measurement value.

With this printing apparatus, it becomes unnecessary to extract the color component necessary for the calculation of the correction value from the darkness measurement values, and the configuration of the apparatus can be simplified.

In the foregoing printing apparatus, it is preferable that image data that is provided for printing an image includes, as the darkness command value, a gradation value for each dot formation unit formed on the medium; if no correction value is associated with these formation units, then, based on a creation ratio table associating the gradation value with dot creation ratio, the creation ratio corresponding to the gradation value of the formation unit is read out, and dots are formed in each formation unit on the medium in accordance with the creation ratio that has been read out; and if a correction value is associated with these formation units, then, when reading the creation ratio corresponding to a gradation value from the creation ratio table, the creation ratio corresponding to a value obtained by changing the gradation value by the correction value is read out; and dots are formed in each formation unit on the medium in accordance with the creation ratio that has been read out.

With this printing apparatus, an image can be printed by forming dots in each formation unit on the medium, based on the image data. Moreover, the same creation ratio table is used for the image data associated with a correction value and the image data not associated with a correction value, so that a simpler configuration is attained.

In the foregoing printing apparatus, it is preferable that when dots are formed in a region made of a predetermined number of the formation units of the same gradation value, then the creation ratio of the dots indicates a proportion of the number of dots formed in that region with respect to the predetermined number.

With this printing apparatus, the darkness of the image can be expressed through the number of dots formed in that region.

In the foregoing printing apparatus, it is preferable that the nozzles can form dots of a plurality of sizes; and in the creation ratio table, a relation between the creation ratios and the gradation values is set for each size of dots.

With this printing apparatus, the darkness can be expressed through dots of a plurality of sizes, so that it is possible to express even finer images.

In the foregoing printing apparatus, it is preferable that a darkness measurement device for optically measuring the darkness of the correction pattern is provided.

With this printing apparatus, a darkness measurement device is provided. Consequently, the darkness can be evaluated quantitatively, and the reliability of the correction values is improved.

It is also possible to realize a printing method for printing an image by ejecting ink from a plurality of nozzles onto a medium and forming a plurality of lines, made of a plurality of dots, extending in a predetermined direction, the lines being formed along an intersecting direction intersecting the predetermined direction, the printing method including a step of printing at least two correction patterns, constituted by such lines, with different darkness command values; a step of measuring the darkness of the correction pattern for each line; a step of generating, for each line, a darkness correction value determined based on the darkness measurement value; and a step of correcting, for each line, the command value of the darkness of the image, based on the correction value corresponding to the respective line of the image when printing the image.

Furthermore, it is also possible to realize a printing system including a printing apparatus communicably connected with a computer, wherein the printing apparatus has a plurality of nozzles forming dots by ejecting ink onto a medium, prints an image by forming a plurality of lines, made of a plurality of dots, extending in a predetermined direction, the lines being formed along an intersecting direction intersecting the predetermined direction, prints a correction pattern made of such lines, measures the darkness of that correction pattern for each line individually, includes, for each line, a darkness correction value determined based on that darkness measurement value, and corrects a darkness command value of the image, for each line, based on the correction value corresponding to that respective line of the image when printing the image, wherein the correction value is determined based on the darkness measurement values of at least two correction patterns printed with different darkness command values.

===(1) Configuration of the Printing System===

An embodiment of a printing system is described next with reference to the drawings.

FIG. 1 is an explanatory diagram showing the external structure of the printing system. A printing system 1000 is provided with a printer 1, a computer 1100, a display device 1200, input devices 1300, and recording/reproducing devices 1400. The printer 1 is a printing apparatus for printing images on a medium such as paper, cloth, or film. The computer 1100 is communicably connected to the printer 1, and outputs print data corresponding to an image to be printed to the printer 1 in order to print the image with the printer 1. The display device 1200 has a display, and displays a user interface such as an application program or a printer driver 1110 (see FIG. 2). The input devices 1300 are for example a keyboard 1300A and a mouse 1300B, and are used to operate the application program or adjust the settings of the printer driver 1110, for example, through the user interface that is displayed on the display device 1200. A flexible disk drive 1400A and a CD-ROM drive 1400B can be employed as the recording/reproducing devices 1400, for example.

The printer driver 1110 is installed on the computer 1100. The printer driver 1110 is a program for achieving the function of displaying the user interface on the display device 1200, and the function of converting image data that has been output from the application program into print data. The printer driver 1110 is recorded on a recording medium (computer-readable recording medium) such as a flexible disk FD or a CD-ROM. The printer driver 1110 can also be downloaded onto the computer 1100 via the Internet. It should be noted that this program is made of code for achieving various functions.

It should be noted that "printing apparatus" in a narrow sense means the printer 1, but in a broader sense it means the system constituted by the printer 1 and the computer 1100.

===(1) Printer Driver===

<Regarding the Printer Driver>

Figure 2:
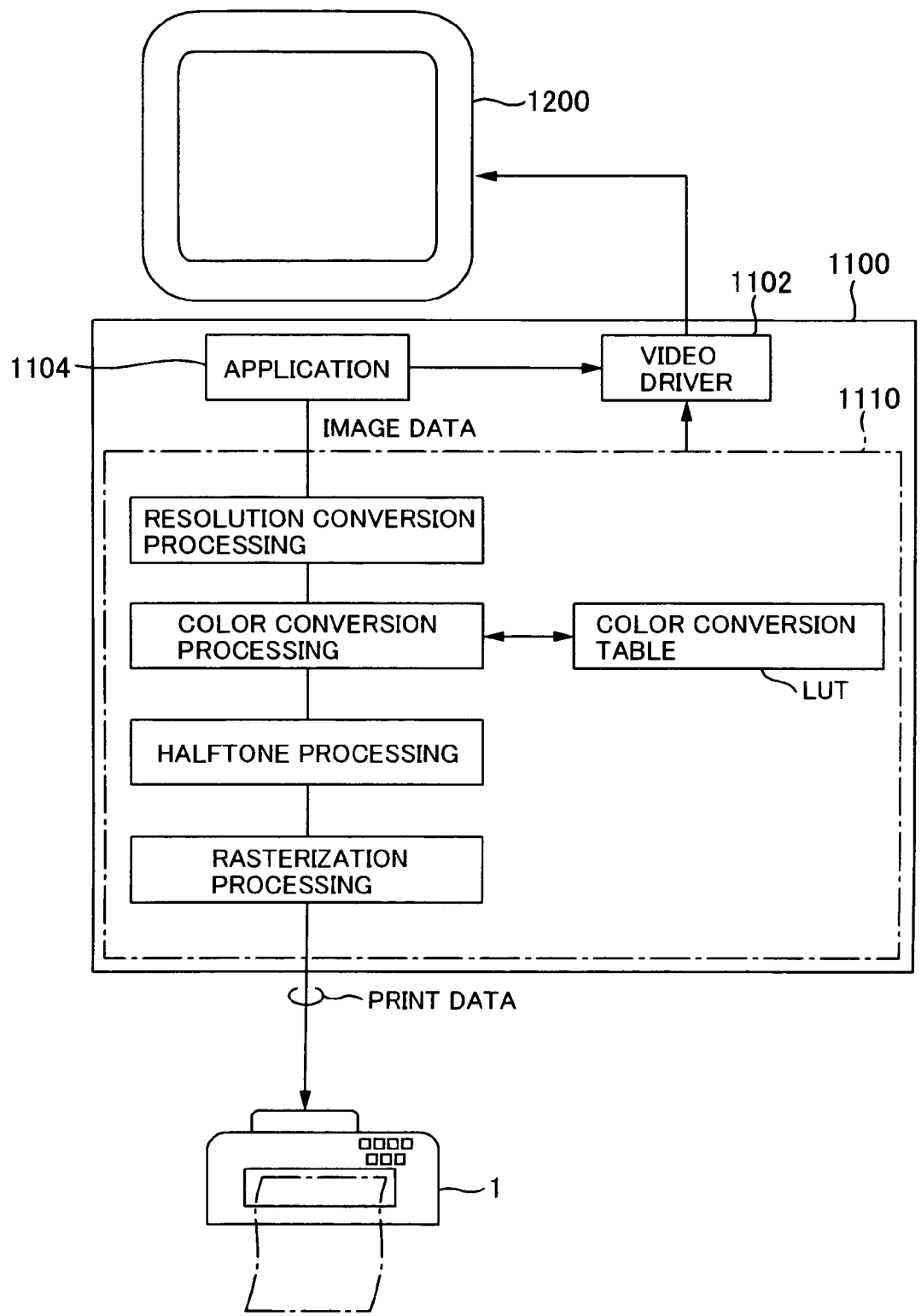

FIG. 2 is a schematic explanatory diagram of the basic processes carried out by the printer driver 1110. Structural elements that have already been described are assigned identical reference numerals and thus their further description is omitted.

On the computer 1100, computer programs such as a video driver 1102, an application program 1104, and a printer driver 1110 operate under an operating system installed on the computer. The video driver 1102 has the function of displaying, for example, the user interface on the display device 1200 in accordance with display commands from the application program 1104 and the printer driver 1110. The application program 1104, for example, has a function for image editing or the like and creates data related to an image (image data). A user can give an instruction to print an image edited in the application program 1104 via the user interface of the application program 1104. Upon receiving the print instruction, the application program 1104 outputs the image data to the printer driver 1110.

The printer driver 1110 receives the image data from the application program 1104, converts the image data into print data, and outputs the print data to the printer 1. The image data has pixel data as the data for the pixels of the image to be printed. The gradation values of the pixel data are then converted in accordance with the later-described processing stages, and are ultimately converted at the print data stage into data for the dots to be formed on the paper (data such as the color and the size of the dots). It should be noted that "pixels" are virtual square boxes on the paper to be printed that define the positions onto which the ink lands to form dots. These pixels correspond to "dot formation units".

Print data is data in a format that can be interpreted by the printer 1, and includes the pixel data and various command data. Here, "command data" refers to data for instructing the printer 1 to carry out a specific operation, and is data indicating the carry amount, for example.

In order to convert the image data that is output from the application program 1104 into print data, the printer driver 1110 carries out such processes as resolution conversion, color conversion, halftoning, and rasterization. The following is a description of the processes carried out by the printer driver 1110.

Resolution conversion is a process for converting image data (text data, image data, etc.) output from the application program 1104 to the resolution for printing an image on paper (the spacing between dots when printing; also referred to as "print resolution"). For example, when the print resolution has been specified as 720×720 dpi, then the image data obtained from the application program 1104 is converted into image data having a resolution of 720×720 dpi.

In this conversion method, for example if the resolution of the image data is lower than the specified print resolution, then new pixel data is generated between adjacent pixel data by linear interpolation, whereas if the resolution is higher than the specified print resolution, then pixel data is culled at a constant ratio, thus adjusting the resolution of the image data to the print resolution.

Also, in this resolution conversion process, the size of the print region, which is the region onto which ink is actually ejected, is adjusted based on the image data. This size adjustment is performed by trimming, for example, the pixel data that corresponds to the edges of the paper in the image data, in accordance with the margin format mode, the image quality mode, and the paper size mode, which are described later.

It should be noted that the pixel data in the image data has gradation values of many levels (for example, 256 levels) expressed in RGB color space. The pixel data having such RGB gradation values is hereinafter referred to as "RGB pixel data," and the image data made of these RGB pixel data is referred to as "RGB image data."

Color conversion processing is processing for converting the RGB pixel data of the RGB image data into data having gradation values of many levels (for example, 256 levels) expressed in CMYK color space. C, M, Y and K are the ink colors of the printer 1. Hereinafter, the pixel data having CMYK gradation values is referred to as CMYK pixel data, and the image data made of this CMYK pixel data is referred to as CMYK image data. Color conversion processing is carried out by the printer driver 1110, with reference to a table that correlates RGB gradation values and CMYK gradation values (color conversion lookup table LUT).

Halftone processing is processing for converting CMYK pixel data having many gradation values into CMYK pixel data having few gradation values, which can be expressed by the printer 1. For example, through halftone processing, CMYK pixel data representing 256 gradation values is converted into 2-bit CMYK pixel data representing four gradation values. The 2-bit data CMYK pixel data indicates, for example, "no dot formation," "small dot formation," "medium dot formation," and "large dot formation" for each color.

Dithering or the like is used for such a halftone processing to create 2-bit CMYK pixel data with which the printer 1 can form dispersed dots. Halftone processing through dithering is described later. It should be noted that the method used for halftone processing is not limited to dithering, and it is also possible to use gamma-correction or error diffusion or the like.

Rasterization is processing for changing the CMYK image data that has been subjected to halftone processing into the data order in which it is to be transferred to the printer 1. Data that has been rasterized is output to the printer 1 as the print data.

<Halftone Processing Through Dithering>

Figure 3:
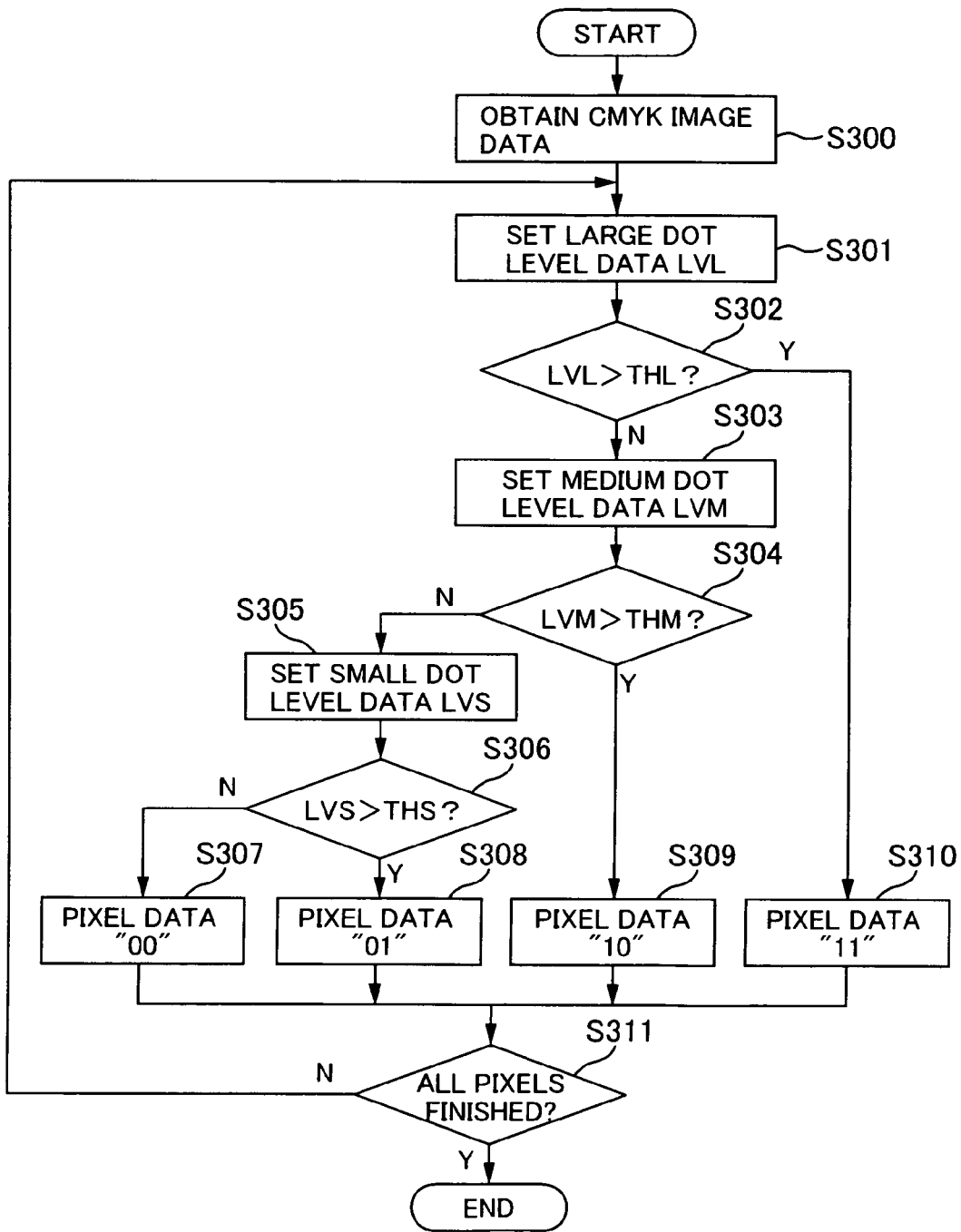

Here, halftone processing through dithering is described in more detail. FIG. 3 is a flowchart of halftone processing through dithering. The following steps are executed in accordance with this flowchart.

First, in Step S300, the printer driver 1110 obtains the CMYK image data. The CMYK image data is made of image data expressed by 256 gradation values for each ink color C, M, Y, and K. In other words, the CMYK image data includes C image data for cyan (C), M image data for magenta (M), Y image data for yellow (Y), and image data for black (K). This C, M, Y, and K image data is respectively made of C, M, Y, and K pixel data indicating the gradation values of that ink color.

It should be noted that the following description can be applied to any of the C, M, Y, and K image data, and thus the K image data is described as a representative example.

The printer driver 1110 performs the processing of the steps S301 to S311 for all of the K pixel data in the K image data while successively changing the K image data to be processed, and converts the K pixel image data into 2-bit data representing one of "no dot formation," "small dot formation," "medium dot formation" and "large dot formation" mentioned above.

Figure 4:
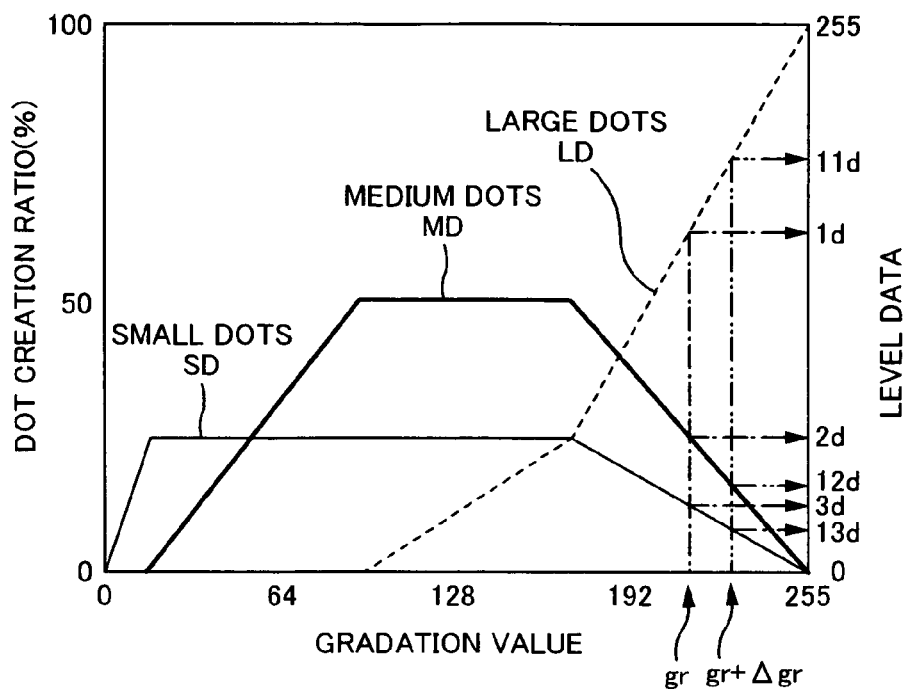

More specifically, first, in Step S301, the large dot level data LVL is set as follows, in accordance with the gradation value of the K pixel data being processed. FIG. 4 is a diagram showing a creation ratio table that is used for setting the level data for large, medium, and small dots. The horizontal axis in this diagram is the gradation value (0-255), the vertical axis on the left is the dot creation ratio (%), and the vertical axis on the right is the level data (0-255). Here, the "dot creation ratio" means the proportion of pixels in which dots are formed among all the pixels in a uniform region reproduced with a constant gradation value. The profile SD shown by the thin solid line in FIG. 4 indicates the creation ratio of small dots, the profile MD shown by the thick solid line indicates the creation ratio of medium dots, and the profile LD shown by the dashed line indicates the creation ratio of large dots. Moreover, "level data" refers to data that is obtained by converting the dot creation ratio into 256 gradation values ranging from 0 to 255.

That is to say, in Step S301, the level data LVL corresponding to the gradation value is read from the profile LD for large dots. For example, as shown in FIG. 4, if the gradation value of the K pixel data to be processed is gr, then the level data LVL is determined to be 1d using the profile LD. In practice, the profile LD is stored in form of a one-dimensional table in a memory (not shown) such as a ROM within the computer 1100, and the printer driver 1110 determines the level data by referencing this table.

In Step S302, it is then determined whether or not the level data LVL that has been set like this is higher than a threshold value THL. Here, determination of whether the dots are on or off is performed using dithering. The threshold value THL is set to a different value for each pixel block of a so-called dither matrix. This embodiment uses a matrix in which the value from 0 to 254 appear in the fields of a 16×16 square pixel block.

Figure 5:
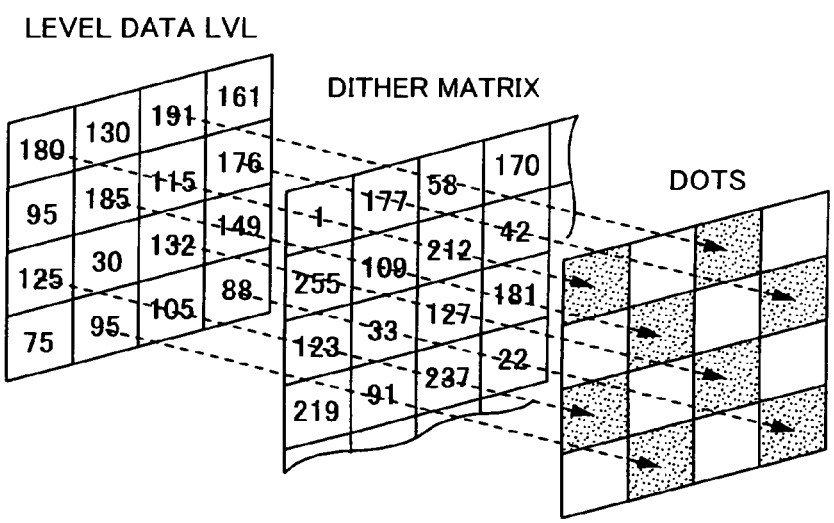

FIG. 5 is a diagram that shows how dots are to be judged on or off according to dithering. For the sake of illustration, FIG. 5 shows only some of the K pixel data. First, as shown in the figure, the level data LVL of the K pixel data is compared with the threshold value THL of the pixel block on the dither matrix that corresponds to that K pixel data.

Then, if the level data LVL is higher than the threshold value THL, the dot is set to on, and if the level data LVL is smaller, the dot is set to off. The hatched pixel data in the figure indicates K pixel data in which the dot is set to on. In other words, in Step S302, if the level data LVL is higher than the threshold value THL, then the procedure advances to Step S310, and otherwise the procedure advances to Step S303. Here, if the procedure advances to Step S310, then the printer driver 1110 assigns the binary value of "11" indicating that the pixel data represents a large dot to the K pixel data being processed and stores this value, and then the procedure advances to Step S311. Then, in Step S311, it is determined whether or not all of the K pixel data has been processed. If the processing is finished, then the halftone processing is ended, and if processing is not finished, then the processing shifts to the K pixel data that has not yet been processed, and the procedure returns to Step S301.

On the other hand, if the procedure advances to Step S303, then the printer driver 1110 sets the level data LVM for medium dots. The level data LVM for medium dots is set by the creation ratio table noted above, based on the gradation value. The setting method is the same as for setting the level data LVL of large dots. That is to say, in the example shown in FIG. 4, the level data LVM is determined to be 2d.

Then, in Step S304, it is judged whether the medium dots are on or off by comparing the level data LVM of the medium dots with the threshold value THM. The method for determining whether the dots are on or off is the same as that for the large dots, however, as shown next, the threshold value THM that is used in the judgment is a value that is different from the threshold value THL used in the case of the large dots. That is, if the dots are determined to be on or off using the same dither matrix for the large dots and the medium dots, then the pixel blocks where the dots are likely to be on will be the same in both cases. That is, there is a high possibility that when a large dot is off, the medium dot will also be off. As a result, there is a risk that the creation ratio of medium dots will be lower than the desired creation ratio. In order to avert this problem, in the present embodiment, different dither matrixes are used for the two. That is, by changing the pixel blocks that tend to be on for the large dots and the medium dots, it is possible to ensure that the large dots and the medium dots are formed appropriately.

Figure 6A:
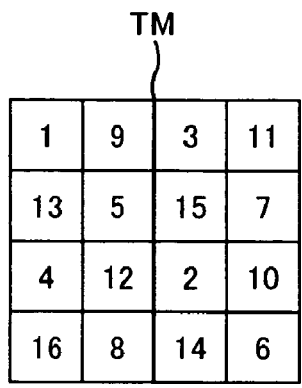
FIG. 6A is a dither matrix used in determining large dots.
Figure 6B:
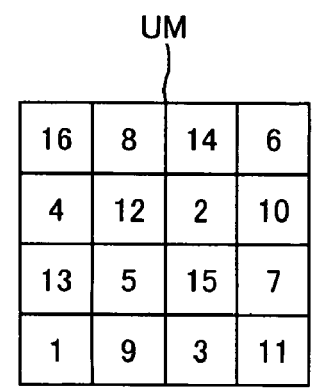
FIG. 6B is a dither matrix used in determining medium dots.

FIG. 6A and FIG. 6B show the relationship between the dither matrix that is used for assessing large dots and the dither matrix that is used for assessing medium dots. In this embodiment, a first dither matrix TM as shown in FIG. 6A is used for the large dots, and a second dither matrix UM as shown in FIG. 6B, which is obtained by mirroring these threshold values symmetrically at the center in the carrying direction, is used for the medium dots. As explained previously, the present embodiment uses a 16×16 matrix, but for convenience of illustration, FIG. 6 shows a 4×4 matrix. It should be noted that it is also possible to use large dot dither matrixes and medium dot dither matrixes that are completely different.

Then, in Step S304, if the medium dot level data LVM is higher than the medium dot threshold value THM, then it is determined that the medium dot should be on, and the procedure advances to Step S309, and otherwise the procedure advances to Step S305. Here, if the procedure advances to Step S309, then the printer driver 1110 assigns the binary value of "10" indicating that the pixel data represents a medium dot to the K pixel data being processed and stores this value, and then the procedure advances to Step S311. Then, in Step S311, it is determined whether or not all of the K pixel data has been processed. If the processing is finished, then the halftone processing is ended, and if processing is not finished, then the processing shifts to the K pixel data that has not yet been processed, and the procedure returns to Step S301.

On the other hand, if the procedure advances to Step S305, then the small dot level data LVS is set in the same way that the level data of the large dots and the medium dots is set. The dither matrix for the small dots is preferably different from those for the medium dots and the large dots, in order to prevent a drop in the creation ratio of small dots as discussed above.

In Step S306, if the level data LVS is higher than the threshold value THS for small dots, then the printer driver 1110 advances to Step S308, and otherwise it advances to Step S307. Here, if the procedure advances to Step S308, then a binary value of "01" for pixel data indicating a small dot is assigned to the K pixel data being processed and this value is stored, and then the procedure advances to Step S311. Then, in Step S311, it is determined whether or not all of the K pixel data has been processed. If processing is not finished, then the processing shifts to the K pixel data that has not yet been processed, and the procedure returns to Step S301. On the other hand, if processing is finished, then halftone processing for the K image data is ended, and halftone processing is performed in the same manner for the image data of the other colors.

If, on the other hand, the procedure has advanced to Step S307, then the printer driver 1110 assigns a binary value of "00" indicating the absence of a dot to the K pixel data being processed and stores this value. Then the procedure advances to Step S311. Then, in Step S311, it is determined whether or not all of the K pixel data has been processed. If processing is not finished, then the processing shifts to the K pixel data that has not yet been processed, and the procedure returns to Step S301. On the other hand, if processing is finished, then halftone processing for the K image data is ended, and halftone processing is performed in the same way for the image data of the other colors.

<Regarding the Settings of the Printer Driver>

Figure 7:
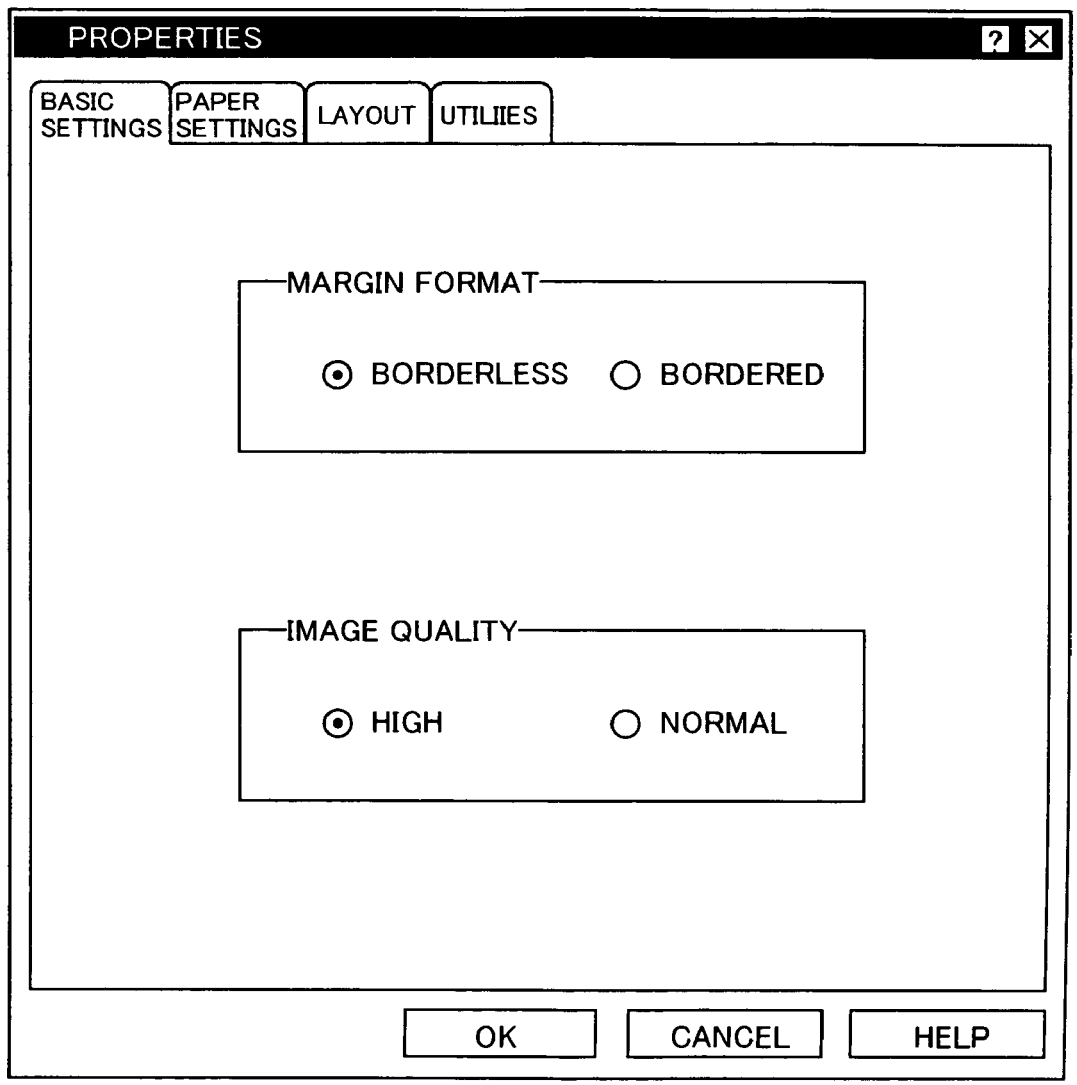

FIG. 7 is an explanatory diagram of the user interface of the printer driver 1110. The user interface of the printer driver 1110 is displayed on a display device via the video driver 1102. The user can use the input device 1300 to change the various settings of the printer driver 1110. The settings for margin format mode and image quality mode are prearranged as the basic settings, and settings such as paper size mode are prearranged as the paper settings. These modes are described later.

===(1) Configuration of the Printer===

<Regarding the Configuration of the Inkjet Printer>

Figure 8:
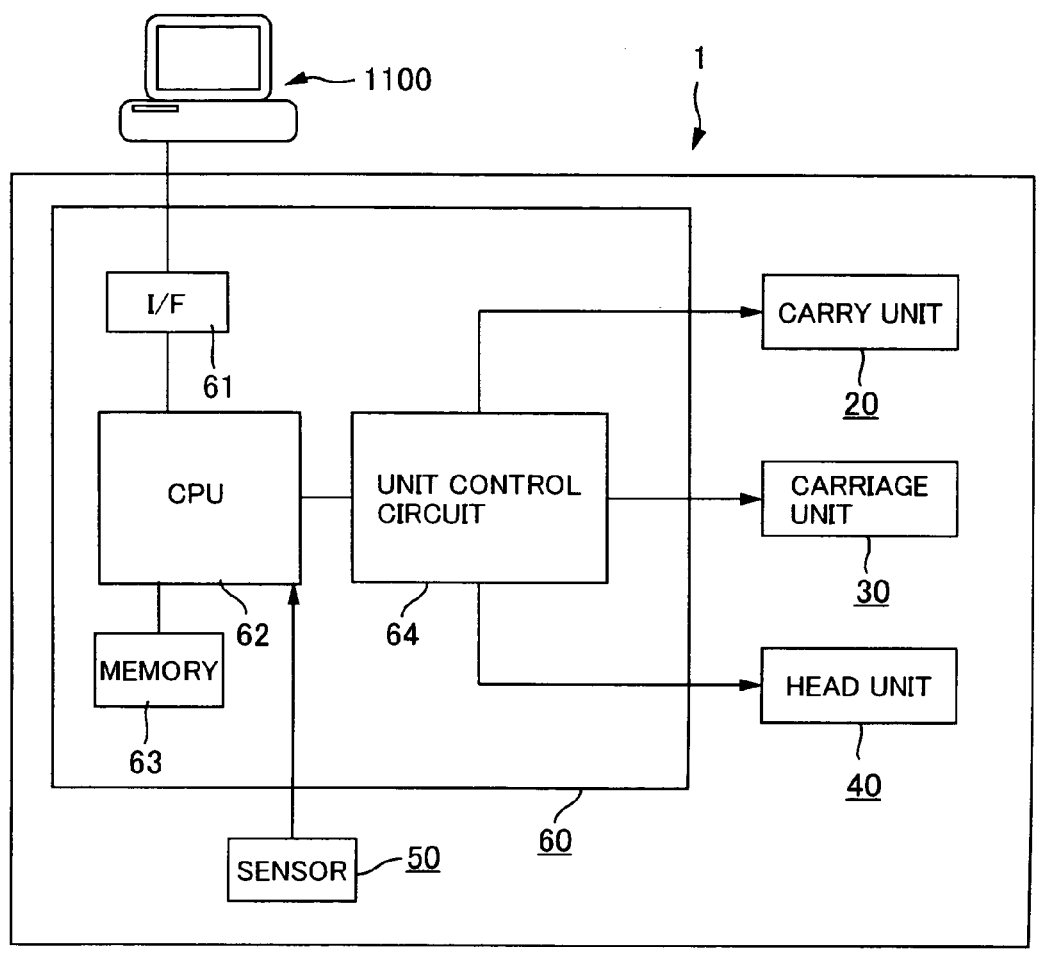
Figure 10:
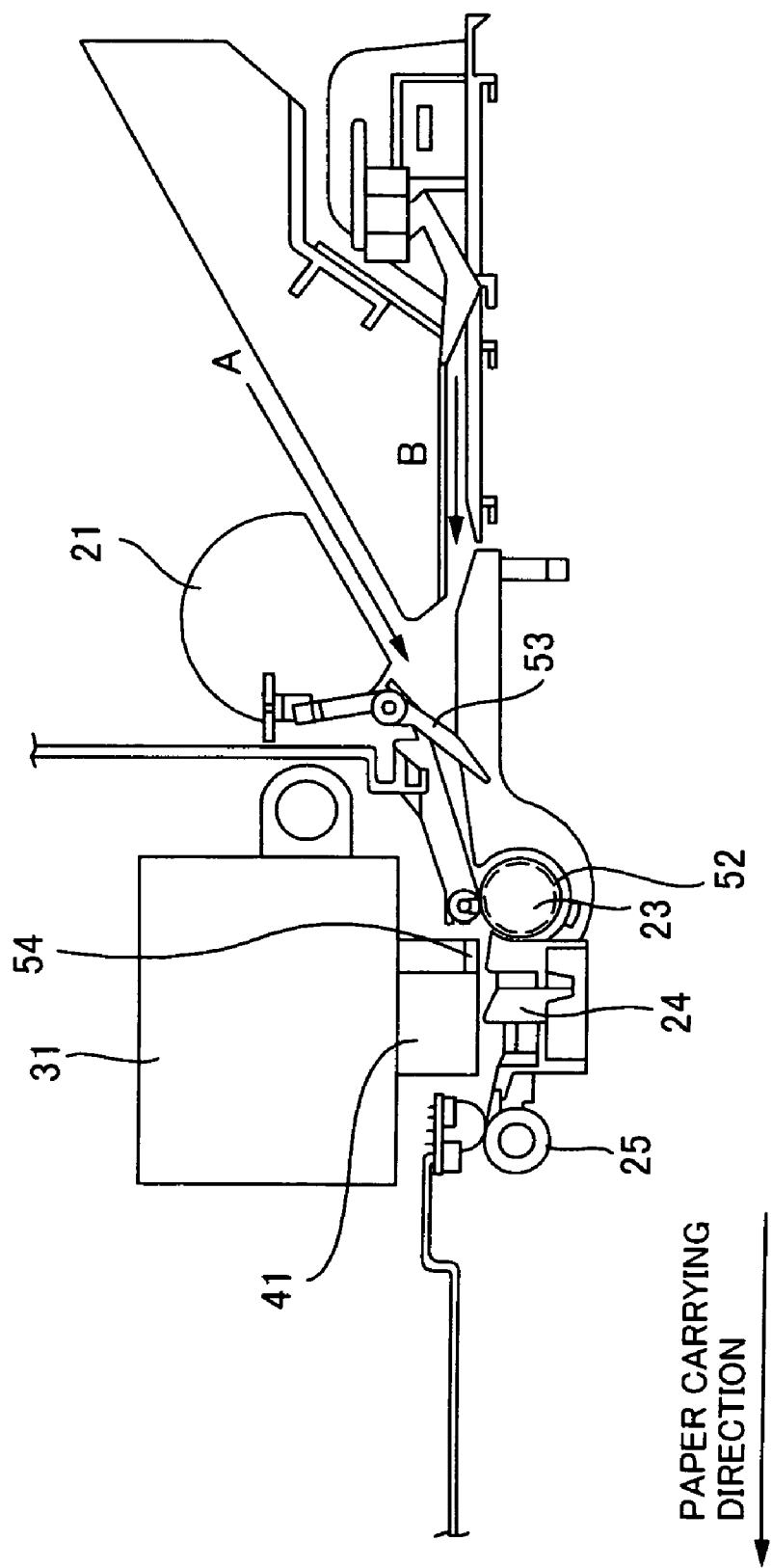

FIG. 8 is a block diagram of the overall configuration of the printer of this embodiment. FIG. 9 is a schematic diagram of the overall configuration of the printer of this embodiment. FIG. 10 is lateral sectional view of the overall configuration of the printer of this embodiment. The basic structure of the printer according to the present embodiment is described below.

The inkjet printer 1 of this embodiment has a carry unit 20, a carriage unit 30, a head unit 40, a sensor 50, and a controller 60. The printer 1, which receives print data from the computer 1100, which is an external device, controls the various units (the carry unit 20, the carriage unit 30, and the head unit 40) using the controller 60. The controller 60 controls the units in accordance with the print data that is received from the computer 1100 to form an image on a paper. The sensor 50 monitors the conditions within the printer 1, and outputs the results of this detection to the controller 60. The controller receives the detection results from the sensor, and controls the units based on these detection results.

The carry unit 20 is for feeding a medium (for example, paper S) into a printable position and carrying the paper in a predetermined direction (hereinafter, referred to as the carrying direction) by a predetermined carry amount during printing. The carry unit 20 has a paper supply roller 21, a carry motor 22 (hereinafter, also referred to as PF motor), a carry roller 23, a platen 24, and a paper discharge roller 25. The paper supply roller 21 is a roller for automatically supplying paper that has been inserted into a paper insert opening into the printer 1. The paper supply roller 21 has a cross-sectional shape in the shape of the letter D, and the length of its circumference section is set longer than the carrying distance to the carry roller 23, so that the paper can be carried up to the carry roller 23 using this circumference section. The carry motor 22 is a motor for carrying paper in the carrying direction, and is constituted by a DC motor. The carry roller 23 is a roller for carrying the paper S that has been supplied by the paper supply roller 21 up to a printable region, and is driven by the carry motor 22. The platen 24 supports the paper S during printing. The paper discharge roller 25 is a roller for discharging the paper S, on which printing has finished, from the printer 1 to the outside. The paper discharge roller 25 is rotated in synchronization with the carry roller 23.

The carriage unit 30 is provided with a carriage 31 and a carriage motor 32 (hereinafter, also referred to as "CR motor"). The carriage motor 32 is a motor for moving the carriage 31 back and forth in a predetermined direction (hereinafter, this is also referred to as the "carriage movement direction"), and is constituted by a DC motor. A later-described head 41 is held by the carriage 31. Thus, also this head 41 can be moved back and forth in the carriage movement direction by moving the carriage 31 back and forth. The carriage 31 detachably retains an ink cartridge containing ink.

The head unit 40 is for ejecting ink onto paper. The head unit 40 has the above-mentioned head 41, which includes a plurality of nozzles, and ejects ink intermittently from these nozzles. When the head 41 is moved in the carriage movement direction by moving the carriage 31, raster lines made of dots extending in the carriage movement direction are formed on the paper by intermittently ejecting ink while moving. It should be noted that the raster lines are made of a plurality of dots that are lined up in the movement direction, so that they are also referred to as "dot lines".

The sensor 50 includes a linear encoder 51, a rotary encoder 52, a paper detection sensor 53, and a paper width sensor 54, for example. The linear encoder 51 is for detecting the position of the carriage 31 in the carriage movement direction. The rotary encoder 52 is for detecting the amount of rotation of the carry roller 23. The paper detection sensor 53 is for detecting the position of the front edge of the paper to be printed. The paper detection sensor 53 is provided in a position where it can detect the position of the front edge of the paper as the paper is being fed toward the carry roller 23 by the paper supply roller 21. It should be noted that the paper detection sensor 53 is a mechanical sensor that detects the front edge of the paper through a mechanical mechanism. More specifically, the paper detection sensor 53 has a lever that can be rotated in the paper carrying direction, and this lever is arranged so that it protrudes into the path over which the paper is carried. In this way, the front edge of the paper comes into contact with the lever and the lever is rotated, and thus the paper detection sensor 53 detects the position of the front edge of the paper by detecting the movement of the lever. The paper width sensor 54 is attached to the carriage 31. The paper width sensor 54 is an optical sensor and detects whether or not paper is present by its light-receiving section detecting reflected light of the light that has been irradiated onto the paper from the light-emitting section. The paper width sensor 54 detects the positions of the edges of the paper while being moved by the carriage 41, so as to detect the width of the paper.

The controller 60 is a control unit for carrying out control of the printer 1. The controller 60 has an interface section 61, a CPU 62, a memory 63, and a unit control circuit 64. The interface section 61 is for exchanging data between the computer 1100, which is an external device, and the printer 1. The CPU 62 is an arithmetic processing device for carrying out overall control of the printer 1. The memory 63 is for ensuring a working region and a region for storing the programs for the CPU 62, for instance, and includes storage means such as a RAM, an EEPROM, or a ROM. The CPU 62 controls the various units via the unit control circuit 64 in accordance with programs stored in the memory 63.

<Regarding the Printing Operation>

Figure 11:
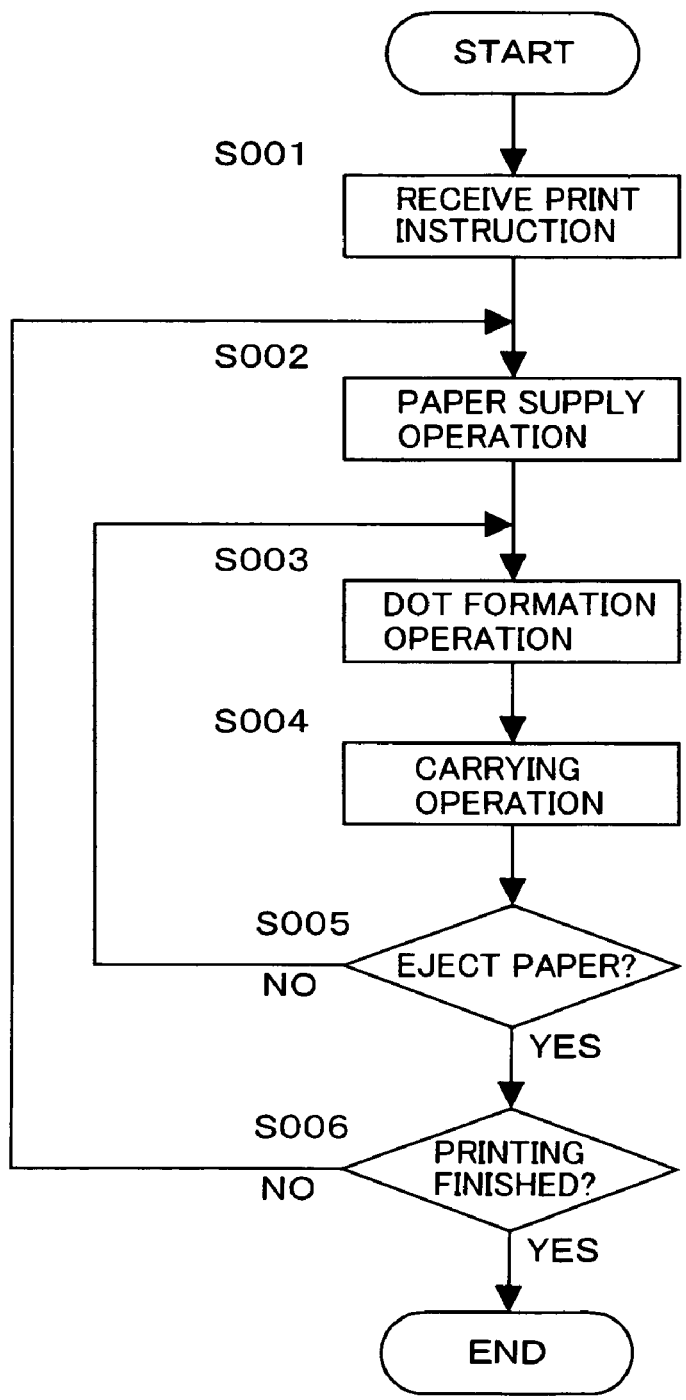

FIG. 11 is a flowchart of the operation during printing. The various operations that are described below are achieved by the controller 60 controlling the various units in accordance with a program stored in the memory 63. This program includes code for executing the various processes.

Receive Print Command (S001): The controller 60 receives a print command via the interface section 61 from the computer 1100. This print command is included in the header of the print data transmitted from the computer 1100. The controller 60 then analyzes the content of the various commands included in the print data that are received and uses the various units to perform the following paper supply operation, carrying operation, and dot formation operation, for example.

Paper Supply Operation (S002): Next, the controller 60 performs the paper supply operation. The paper supply operation is a process for supplying paper to be printed into the printer 1 and positioning the paper at a print start position (also referred to as the "indexing position"). The controller 60 rotates the paper supply roller 21 to feed the paper to be printed up to the carry roller 23. The controller 60 rotates the carry roller 23 to position the paper that has been fed from the paper supply roller 21 at the print start position. When the paper has been positioned at the print start position, at least some of the nozzles of the head 41 are in opposition to the paper.

Dot Formation Operation (S003): Next, the controller 60 performs the dot formation operation. The dot formation operation is an operation of intermittently ejecting ink from the head 41 moving in the carriage movement direction, so as to form dots on the paper. The controller 60 drives the carriage motor 32 to move the carriage 31 in the carriage movement direction. Then, the controller 60 causes ink to be ejected from the head 41 in accordance with the print data while the carriage 31 is moving. Dots are formed on the paper when ink ejected from the head 41 lands on the paper.

Carrying Operation (S004): Next, the controller 60 performs the carrying operation. The carrying operation is a process for moving the paper relative to the head 41 in the carrying direction. The controller 60 drives the carry motor to rotate the carry roller and thereby carry the paper in the carrying direction. Through this carrying operation, the head 41 becomes able to form dots at positions that are different from the positions of the dots formed in the preceding dot formation operation.

Paper Discharge Judgment (S005): Next, the controller 60 determines whether or not to discharge the paper that is being printed. The paper is not discharged if there is still data for printing on the paper that is being printed. In this case, the controller 60 repeats in alternation the dot formation operation and the carrying operation until there is no longer any data for printing, gradually printing an image made of dots on the paper. When there is no longer any data for printing on the paper that is being printed, the controller 60 discharges that paper. The controller 60 discharges the printed paper to the outside by rotating the paper discharge roller. It should be noted that whether or not to discharge the paper can also be determined based on a paper discharge command included in the print data.

Judgment Whether Printing is Finished (S006): Next, the controller 60 determines whether or not to continue printing. If the next sheet of paper is to be printed, then printing is continued and the paper supply operation for the next sheet of paper is started. If the next sheet of paper is not to be printed, then the printing operation is finished.

<Regarding the Configuration of the Head>

Figure 12:
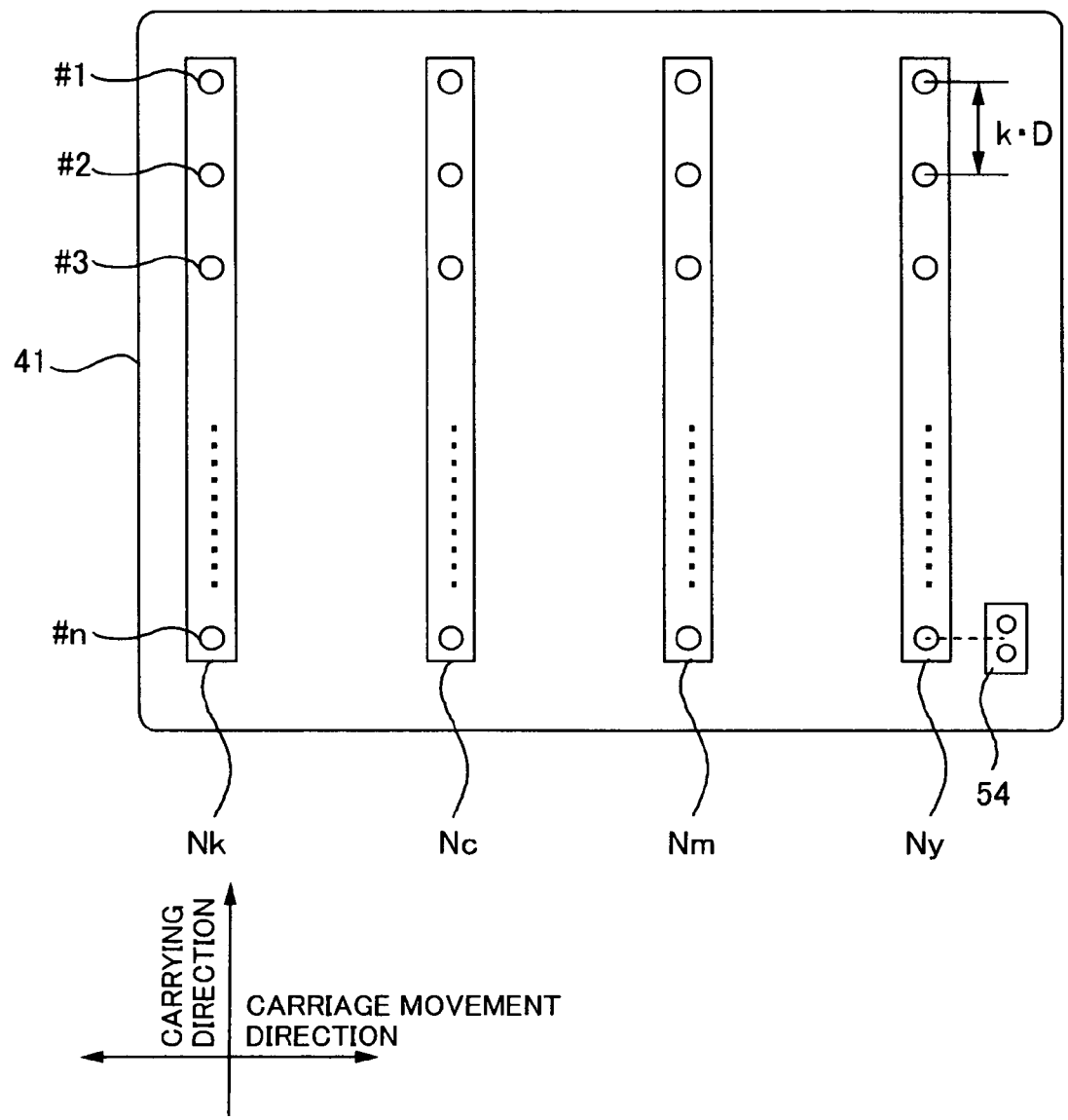

FIG. 12 is an explanatory diagram showing the arrangement of the nozzles in the lower surface of the head 41. A black ink nozzle row Nk, a cyan ink nozzle row Nc, a magenta ink nozzle row Nm, and a yellow ink nozzle row Ny are formed in the lower surface of the head 41. Each nozzle row is provided with n (for example, n=180) nozzles, which are ejection openings for ejecting the inks of various colors.

The plurality of nozzles of the nozzle rows are arranged in a row at a constant spacing (nozzle pitch: k·D) in the carrying direction. Here, D is the minimum dot pitch in the carrying direction (that is, the spacing at the highest resolution of the dots formed on the paper S). Also, k is an integer of 1 or more. For example, if the nozzle pitch is 180 dpi (1/180 inch), and the dot pitch in the carrying direction is 720 dpi (1/720), then k=4.

The nozzles of the nozzle rows are each assigned a number (#1 to #n) that becomes smaller the more downstream the nozzle is located. That is, the nozzle #1 is positioned more downstream in the carrying direction than the nozzle #n. Each nozzle is provided with a piezo element (not shown) as a drive element for driving the nozzle and letting it eject ink droplets.

<Regarding the Driving of the Head>

Figure 13:
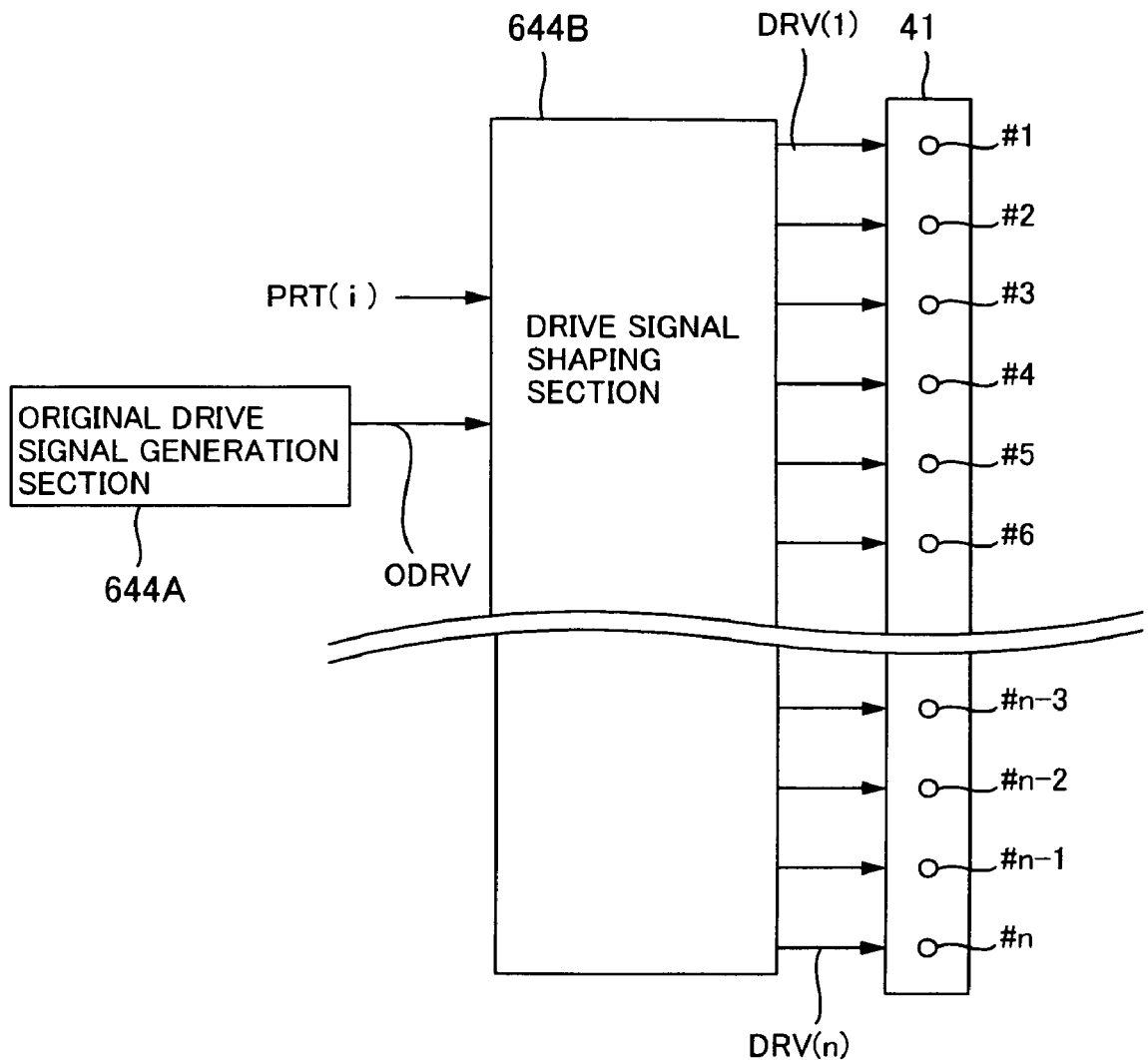

FIG. 13 is an explanatory diagram of the drive circuit of the head unit 40. This drive circuit is provided within the unit control circuit 64 mentioned earlier, and as shown in the drawing, it is provided with an original drive signal generation section 644A and a drive signal shaping section 644B. In this embodiment, a drive circuit for these nozzles #1 to #n is provided for each nozzle row, that is, for each nozzle row of the colors black (K), cyan (C), magenta (M), and yellow (Y), such that the piezo elements are driven individually for each nozzle row. The number in parentheses at the end of the name of each of the signals in the diagram indicates the number of the nozzle to which that signal is supplied.

When a voltage of a predetermined duration is applied between electrodes provided at both ends of the piezo elements, the piezo elements expand in accordance with the duration of voltage application and deform a lateral wall of the ink channel. As a result, the volume of the ink channel shrinks in accordance with the expansion and shrinkage of the piezo elements, and an amount of ink that corresponds to this shrinkage is ejected from the various color nozzles #1 to #n as ink droplets.

The original drive signal generation section 644A generates an original signal ODRV that is shared by the nozzles #1 to #n. The original signal ODRV is a signal that includes a plurality of pulses within the period during which the carriage 31 traverses the length of a single pixel.

The drive signal shaping section 644B receives a print signal PRT(i) together with an original signal ODRV that is output from the original signal generation section 644A. The drive signal shaping section 644B shapes the original signal ODRV in correspondence with the level of the print signal PRT(i) and outputs it toward the piezo elements of the nozzles #1 to #n as a drive signal DRV(i). The piezo elements of the nozzles #1 to #n are driven in accordance with the drive signal DRV from the drive signal shaping section 644B.

<Regarding the Drive Signals of the Head>

Figure 14:
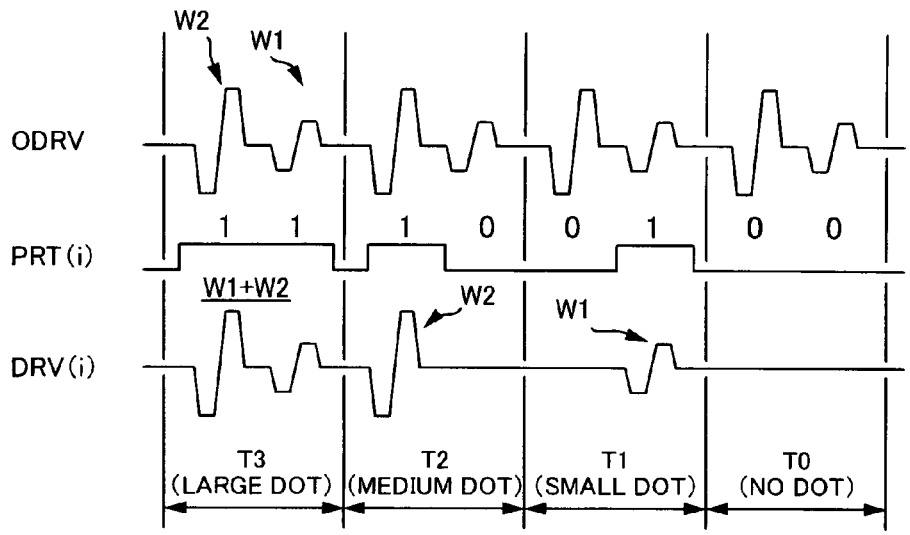

FIG. 14 is a timing chart for explaining the various signals. That is, this figure shows a timing chart for the various signals, namely the original signal ODRV, the print signal PRT(i), and the drive signal DRV(i).

The original signal ODRV is a signal that is supplied from the original signal generation section 644A and shared by the nozzles #1 to #n. In this embodiment, the original signal ODRV includes two pulses, namely a first pulse W1 and a second pulse W2, within the period during which the carriage 31 traverses the length of a single pixel. It should be noted that the original signal ODRV is output from the original signal generation section 644A to the drive signal shaping section 644B.

The print signal PRT is a signal corresponding to the pixel data for a single pixel. That is, the print signal PRT is a signal corresponding to the pixel data included in the print data. In this embodiment, the print signals PRT(i) are signals having two bits of information per pixel. The drive signal shaping section 644B shapes the original signal ODRV in correspondence with the signal level of the print signal PRT and outputs the drive signal DRV.

The drive signal DRV is a signal that is obtained by blocking the original signal ODRV in correspondence with the level of the print signal PRT. That is, when the level of the print signal PRT is "1", then the drive signal shaping section 644B allows the pulse for the original signal ODRV to pass unchanged and sets it as the drive signal DRV. On the other hand, when the level of the print signal PRT is "0", the drive signal shaping section 644B blocks the pulse of the original signal ODRV. It should be noted that the drive signal shaping section 644B outputs the drive signal DRV to the piezo elements that are provided nozzle by nozzle. The piezo elements are then driven in accordance with the drive signal DRV.

When the print signal PRT(i) corresponds to the two bits of data "01", then only the first pulse W1 is output in the first half of a single pixel period. Accordingly, a small ink droplet is ejected from the nozzle, forming a small-sized dot (small dot) on the paper. When the print signal PRT(i) corresponds to the two bits of data "10" then only the second pulse W2 is output in the second half of a single pixel period. Accordingly, a medium-sized ink droplet is ejected from the nozzle, forming a medium-sized dot (medium dot) on the paper. When the print signal PRT(i) corresponds to the two bits of data "11" then both the first pulse W1 and the second pulse W2 are output during a single pixel period. Accordingly, a small ink droplet and a medium droplet are ejected from the nozzle, forming a large-sized dot (large dot) on the paper. When the print signal PRT(i) corresponds to the two bits of data "00" then neither the first pulse W1 or the second pulse W2 are output during a single pixel period. In this case, no ink droplet of any size is ejected from the nozzle, and no dot is formed on the paper.

As described above, the drive signal DRV(i) in a single pixel period is shaped so that it can have four different waveforms corresponding to the four different values of the print signal PRT(i).

===(1) Regarding the Print Modes===

Figure 15A:
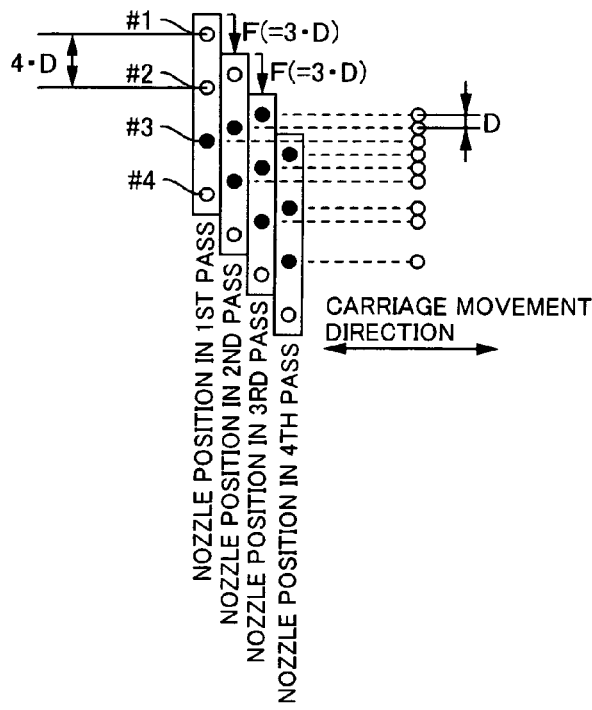
FIGS. 15A and 15B are explanatory diagrams of the interlaced mode.
Figure 15B:
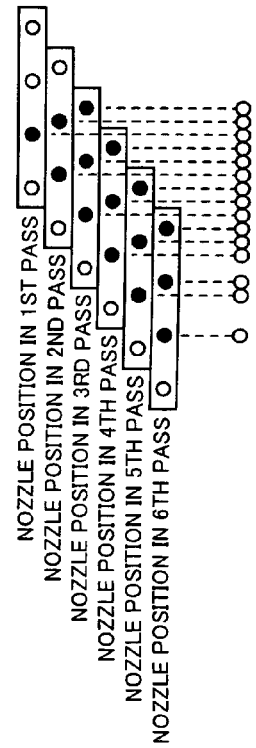

Here, print modes that can be executed by the printer 1 of the present embodiment are described using FIG. 15A and FIG. 15B. The interlaced mode is provided as a print mode that can be executed. By using this print mode, individual differences between the nozzles, such as the nozzle pitch and the ink ejection properties, are lessened by spreading them out over the image to be printed, and thus an improvement in image quality can be attained.

FIGS. 15A and 15B are explanatory diagrams of the interlaced mode. It should be noted that for the sake of simplifying the description, the nozzle rows shown in place of the head 41 are illustrated to be moving with respect to the paper S, but the diagrams show the relative positional relationship between the nozzle rows and the paper S, and in fact it is the paper S that moves in the carrying direction. In the diagrams, the nozzles represented by black circles are the nozzles that actually eject ink, and the nozzles represented by white circles are nozzles that do not eject ink. FIG. 15A shows the nozzle positions in the first through fourth passes and how the dots are formed by those nozzles. FIG. 15B shows the nozzle positions in the first through sixth passes and how the dots are formed.

Here, "interlaced model" refers to a print mode in which k is at least 2 and a raster line that is not recorded is sandwiched between the raster lines that are recorded in a single pass. Also, "pass" refers to a single movement of the nozzle rows in the carriage movement direction. A "raster line" is a row of dots lined up in the carriage movement direction.

With the interlaced mode illustrated in FIG. 15A and FIG. 15B, each time the paper S is carried in the carrying direction by a constant carry amount F, the nozzles record a raster line immediately above the raster line that was recorded in the immediately preceding pass. In order to record the raster lines in this way using a constant carry amount, the number N (which is an integer) of nozzles that actually eject ink is set to be coprime to k, and the carry amount F is set to N·D.

In the figures, the nozzle row has four nozzles arranged in the carrying direction. However, since the nozzle pitch k of the nozzle row is 4, not all the nozzles can be used so that the condition for the interlaced mode, that is, "N and k are coprime", is satisfied. Accordingly, only three of the four nozzles are used in this interlaced mode. Furthermore, because three nozzles are used, the paper S is carried by a carry amount 3·D. As a result, for example a nozzle row with a nozzle pitch of 180 dpi (4·D) is used to form dots on the paper S at a dot pitch of 720 dpi (=D).

The figures show the manner in which continuous raster lines are formed, with the first raster line being formed by the nozzle #1 of the third pass, the second raster line being formed by the nozzle #2 of the second pass, the third raster line being formed by the nozzle #3 of the first pass, and the fourth raster line being formed by the nozzle #1 of the fourth pass. It should be noted that ink is ejected only from nozzle #3 in the first pass, and ink is ejected only from nozzle #2 and nozzle #3 in the second pass. The reason for this is that if ink were ejected from all of the nozzles in the first and second passes, it would not be possible to form consecutive raster lines on the paper S. Also, from the third pass on, three nozzles (#1 to #3) eject ink and the paper S is carried by a constant carry amount F (=3·D), forming continuous raster lines at the dot pitch D.

===(1) Regarding Borderless Printing and Bordered Printing===

With the printer 1 of the present embodiment, it is possible to execute both "borderless printing," in which printing is carried out without forming margins at the edges of the paper, and "bordered printing," in which printing is carried out with margins at the edges of the paper.

<Overview of Borderless Printing and Bordered Printing>

Figure 16:
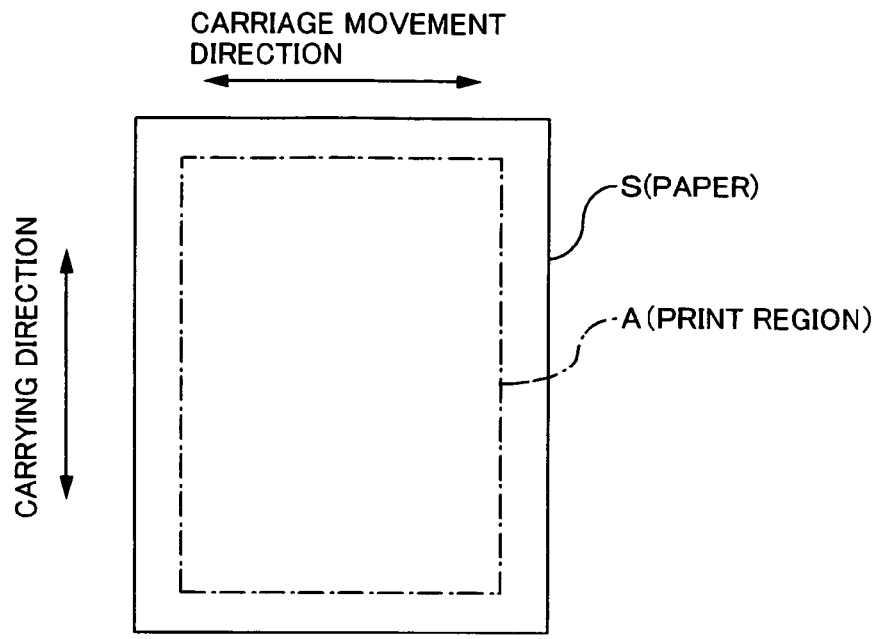

With bordered printing, printing is performed such that the print region A, which is the region to which ink is ejected in accordance with the print data, is contained within the paper S. FIG. 16 shows the relationship between the sizes of the print region A and the paper S during "bordered printing." The print region A is set to be contained within the paper S, and margins are formed at the upper and lower edge as well as the left and right edge of the paper S.

When performing bordered printing, the printer driver 1110 converts the resolution of the image data in the above-noted resolution conversion process to a specified print resolution while processing the image data so that the print region A is located inward from the edges of the paper S by a predetermined width. For example, if the print region A of the image data does not fit within a predetermined width from the edges when printing at that print resolution, then the pixel data corresponding to the edges of the image are removed by trimming for example as appropriate, making the print region A smaller.

Figure 17:
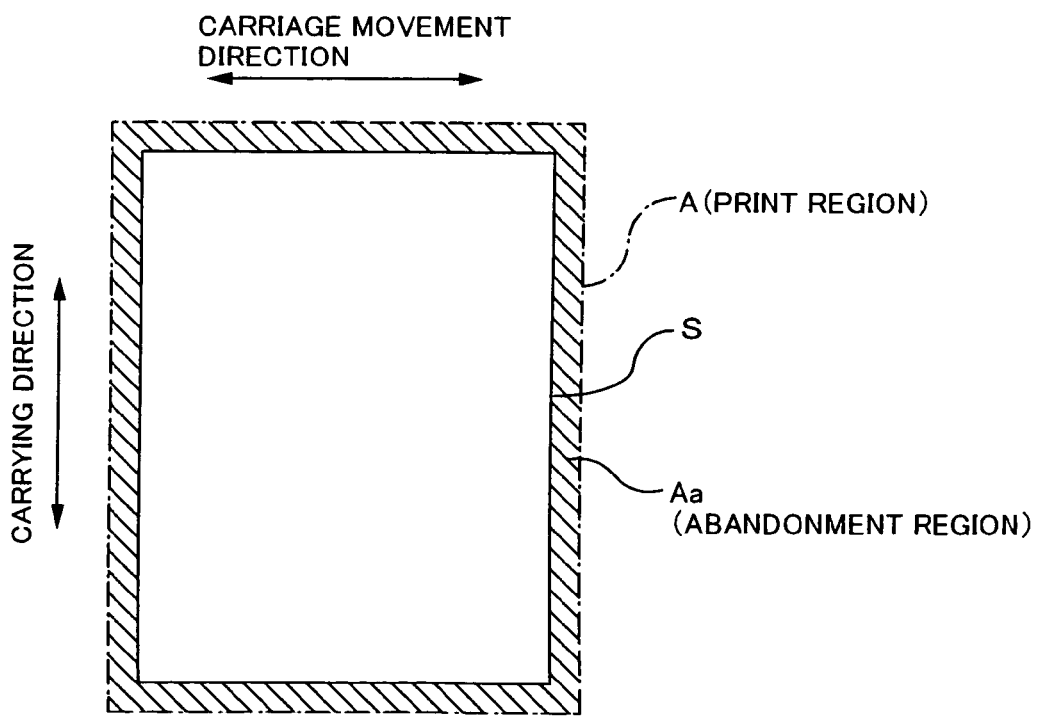

On the other hand, with borderless printing, printing is executed such that the print region A extends beyond the paper S. FIG. 17 shows the relationship between the sizes of the print region A and the paper S during "borderless printing." The print region A is also set for a region that extends beyond the top and bottom edges and the left and right edges of the paper S (hereinafter, referred to as the abandonment region Aa), and ink is ejected onto this region as well. Thus, ink is reliably ejected toward the edges of the paper S, even if there is some shift in the position of the paper S with respect to the head 41 caused by the precision of the carrying operation, for example, thus achieving printing without forming margins at the edges. It should be noted that the region protruding from the upper and lower edges in the abandonment region Aa corresponds to a "region judged to be outside the upstream side from the upstream edge, and the region judged to be outside the downstream side from the downstream edge, in the intersecting direction of the medium".

When performing borderless printing, the printer driver 1110 converts the resolution of the image data in the above-noted resolution conversion process to a specified print resolution while processing the image data so that the print region A extends beyond the edges of the paper S by a predetermined width. For example, if the print region A of the image data extends too far beyond the paper S when printing at that print resolution, then the image data is suitably trimmed, for example, so that the amount by which the print region A extends beyond the paper S becomes a predetermined width.

It should be noted that paper size information regarding the standard dimensions of the paper, such as A4 size, is stored in advance in the memory of the computer 1100. This paper size information indicates for example how many dots (D) there are in the carriage movement direction and in the carrying direction, respectively, and this information is stored in association with the aforementioned paper size modes that are entered through the user interface of the printer driver 1110. Then, when processing the image data, the printer driver 1110 references the paper size information corresponding to that paper size mode to find the size of the paper, and then processing is performed.

<Regarding the Nozzles Used in Borderless Printing and Bordered Printing>

As mentioned above, with "borderless printing", ink is ejected toward the abandoned region as well, which is the region outside of the upper edge and the lower edge of the paper. Thus, there is the risk that the ink that is abandoned will adhere to the platen 24 and cause the platen 24 to become dirty. Accordingly, the platen 24 is provided with grooves for collecting the ink outside the upper and lower edge of the paper S, and when printing the upper edge and the lower edge, use of the nozzles is restricted such that ink is ejected from only the nozzles that are in opposition to those grooves.

Figure 18A:
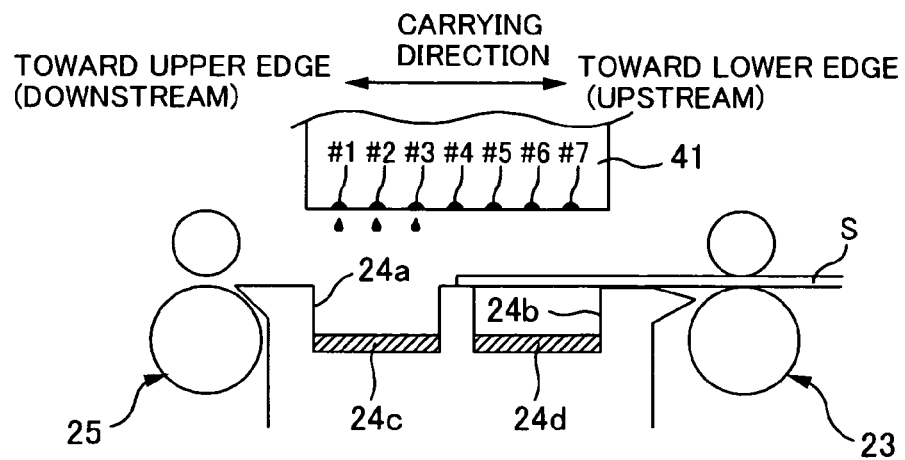
FIGS. 18A to 18C are diagrams showing the positional relationship between the grooves provided in the platen and the nozzles.
Figure 18B:
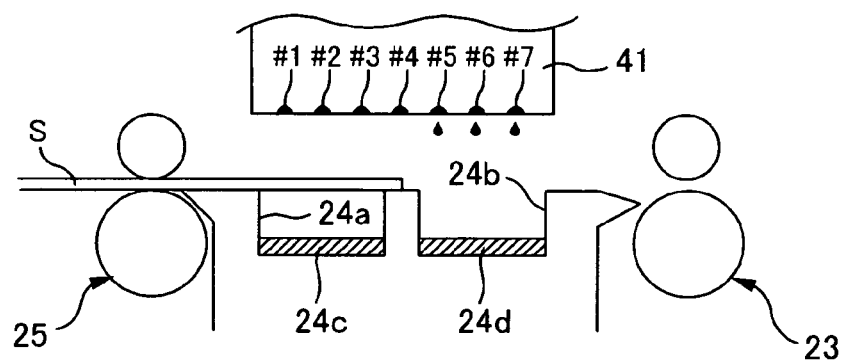
Figure 18C:
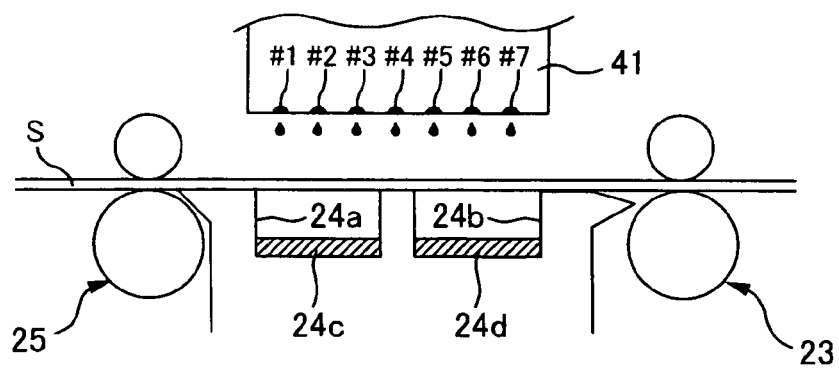

FIGS. 18A to 18C show the positional relationship between the nozzles and the grooves provided in the platen 24. It should be noted that for illustrative reasons, a nozzle row with n=7, that is, a nozzle row provided with nozzles #1 to #7, is used as an example. As shown in FIG. 18A, the upstream side and the downstream side in the carrying direction respectively correspond to the lower edge and the upper edge of the paper S.

As shown in FIG. 18A, the platen 24 is provided with two grooves 24a and 24b, one on the downstream side in the carrying direction and one on the upstream side in the carrying direction. The groove 24a on the downstream side faces the nozzles #1 to #3, whereas the groove 24b on the upstream side faces the nozzles #5 to #7. When printing the upper edge of the paper S, as shown in FIG. 18A, printing is performed using the nozzles #1 to #3 (hereinafter, this is referred to as "upper edge processing"), and when printing the lower edge portion as shown in FIG. 18B, printing is performed using the nozzles #5 to #7 (hereinafter, this is referred to as "lower edge processing"). The intermediate portion between the upper edge and the lower edge is printed using all of the nozzles #1 to #7 as shown in FIG. 18C (hereinafter, this is referred to as "intermediate processing"). When printing the upper edge of the paper S as shown in FIG. 18A, the ejection of ink from the nozzles #1 to #3 is started before the upper edge arrives at the downstream groove 24a. However, at this time, the abandoned ink that does not land on the paper S is absorbed by an absorbing material 24c within the downstream side groove 24a, so that the platen 24 will not become dirty. Also, as shown in FIG. 18B, when printing the lower edge of the paper S, the ejection of ink from the nozzles #5 to #7 is continued even after that lower edge has passed over the upstream groove 24b. However, at this time, the abandoned ink that does not land on the paper S is absorbed by an absorbing material 24d within the upstream side groove 24b, so that the platen 24 will not become dirty.

On the other hand, in "bordered printing", a margin is formed at the edges of the paper S, and thus ink is not ejected toward the abandoned region, which is the region outside of the upper edge and the lower edge of the paper S. Consequently, it is always possible to start or end the ejection of ink in a state where the paper S is in opposition to a nozzle, and thus unlike with "borderless printing", there is no limitation to which nozzles are used, so that printing is performed using all nozzles #1 to #7 over the entire length of the paper S.

===(1) Regarding the Processing Modes===

The user can select "borderless printing" or "bordered printing" through the user interface of the printer driver 1110. That is, as shown in FIG. 7, the two buttons "bordered" and "borderless" are displayed on a screen of the user interface as the input buttons of the margin format mode for specifying the margin format.

It is also possible to select the image quality mode for specifying the image quality of the image from the screen of that user interface, which displays the two buttons "normal" and "high" as the input buttons of the image quality mode. If the user has input "normal," then the printer driver 1110 sets the print resolution to 360×360 dpi, for example, whereas if the user has input "high," then the printer driver 1110 sets the print resolution to 720×720 dpi, for example.

It should be noted that as shown in the first reference table of FIG. 19, print modes are given for each combination of margin mode and image quality mode. Also, processing modes are associated with these print modes as shown in the second reference table in FIG. 20. It should be noted that the first and the second reference tables are stored in the memory of the computer 1100.

These processing modes determine the dot formation operation and the carrying operation, and through the processes from the resolution conversation process to the rasterizing process, the printer driver 1110 converts the image data into print data that matches the format of that processing mode.

It should be noted that if the processing modes are different, then print processing in which at least one of the dot formation operation and the carrying operation is different is performed. Here, print processing in which the dot formation operations are different refers to print processing in which the change patterns of the nozzles that are used in the dot formation operations are different. Also, print processing in which the carrying operations are different refers to print processing in which the change patterns of the carry amounts used in the carrying operations are different. These are described later using specific examples.

Six processing modes, for example, a first upper edge processing mode, a first intermediate processing mode, a first lower edge processing mode, a second upper edge processing mode, a second intermediate processing mode, and a second lower edge processing mode, are provided.

The first upper edge processing mode is a processing mode for executing the upper edge processing mentioned above at a print resolution of 720×720 dpi. In other words, it is a processing mode in which in the first half of the passes, printing is performed in principle in the interlaced mode using only nozzles #1 to #3. In this case, the carry amount F of the paper is 3·D because three nozzles are used (see FIG. 21A).

The first intermediate processing mode is a processing mode for executing the intermediate processing mentioned above at a print resolution of 720×720 dpi. In other words, it is a processing mode in which printing in the interlaced mode using all of the nozzles #1 to #7 of the nozzle row is performed in all passes. It should be noted that the carry amount F of the paper is 7·D because seven nozzles are used (see FIG. 21A and FIG. 21B).

The first lower edge processing mode is a processing mode for executing the lower edge processing mentioned above at a print resolution of 720×720 dpi. In other words, it is a processing mode in which in the latter half of the passes, printing is performed in principle in the interlaced mode using only the nozzles #5 to #7. In this case, the carry amount of the paper is 3·D because three nozzles are used (see FIG. 21B).

The second upper edge processing mode is a processing mode for executing the upper edge processing mentioned above at a print resolution of 360×360 dpi. In other words, it is a processing mode in which in the first half of the passes, printing is performed in principle in the interlaced mode using only nozzles #1 to #3. However, due to the print resolution being only half as fine as that of the first upper edge processing mode, the carry amount F of the paper is 6·D, which is twice that of the first upper edge processing mode (see FIG. 23A).

The second intermediate processing mode is a processing mode for executing the intermediate processing mentioned above at a print resolution of 360×360 dpi. In other words, it is a processing mode in which printing in the interlaced mode using all of the nozzles #1 to #7 of the nozzle row is performed in all passes. However, due to the print resolution being only half as fine as that of the first intermediate processing mode, the carry amount F of the paper is 14·D dots, which is twice that of the first intermediate processing mode (see FIG. 23A and FIG. 23B).

The second lower edge processing mode is a processing mode for executing the upper edge processing mentioned above at a print resolution of 360×360 dpi. In other words, it is a processing mode in which in the latter half of the passes, printing is performed in principle in the interlaced mode using only the nozzles #5 to #7. However, due to the print resolution being only half as fine as that of the first lower edge processing mode, the carry amount F of the paper is 6·D, twice that of the first lower edge processing mode (see FIG. 23B).

Here, the manner in which the image is formed on the print paper S through these processing modes is described with reference to FIG. 21A to FIG. 24B. It should be noted that in all of these figures, the two diagrams A and B represent the manner in which a single image is formed. In other words, FIG. A shows by what nozzle in what pass of what processing mode the raster lines at the upper edge of the image are formed, and FIG. B shows by what nozzle in what pass of what processing mode the raster lines at the lower edge of the image are formed.

The left side of FIG. 21A through FIG. 24B (hereinafter referred to as the "left diagrams") shows the relative position of the nozzle row with respect to the paper in each pass of the processing modes. It should be noted that in the left diagrams, for illustrative reasons, the nozzle row is shown moving downward in increments of the carry amount F for each pass, but in actuality the paper S is moved in the carrying direction. Also, the nozzle row has nozzles #1 to #7, whose nozzle number is shown surrounded by a circle, and their nozzle pitch k·D is 4·D. Further, the dot pitch D is 720 dpi (1/720 inch). It should be noted that in this nozzle row the nozzles shown shaded in black are the nozzles that eject ink.

The diagrams to the right of the left diagrams (hereinafter referred to as the "right diagrams") show how the dots are formed by ejecting ink toward the pixels making up the raster lines. It should be noted that, as mentioned earlier, pixels are virtual square boxes on the paper that define the positions where ink is made to land to form dots, and the squares in the right diagrams respectively represent pixels of 720×720 dpi, that is, pixels of D×D size. The numbers written in each square indicate the numbers of the nozzles that eject ink toward those pixels, and the squares in which no numbers are written indicate pixels in which ink is not ejected. Also, as shown in the right diagrams, the raster line at the uppermost end that can be formed in this processing mode is called the first raster line R1. Thereafter, in the direction toward the lower edge in the diagram, the raster lines are successively referred to as the second raster line R2, the third raster line R3, etc.

Figure 21A:
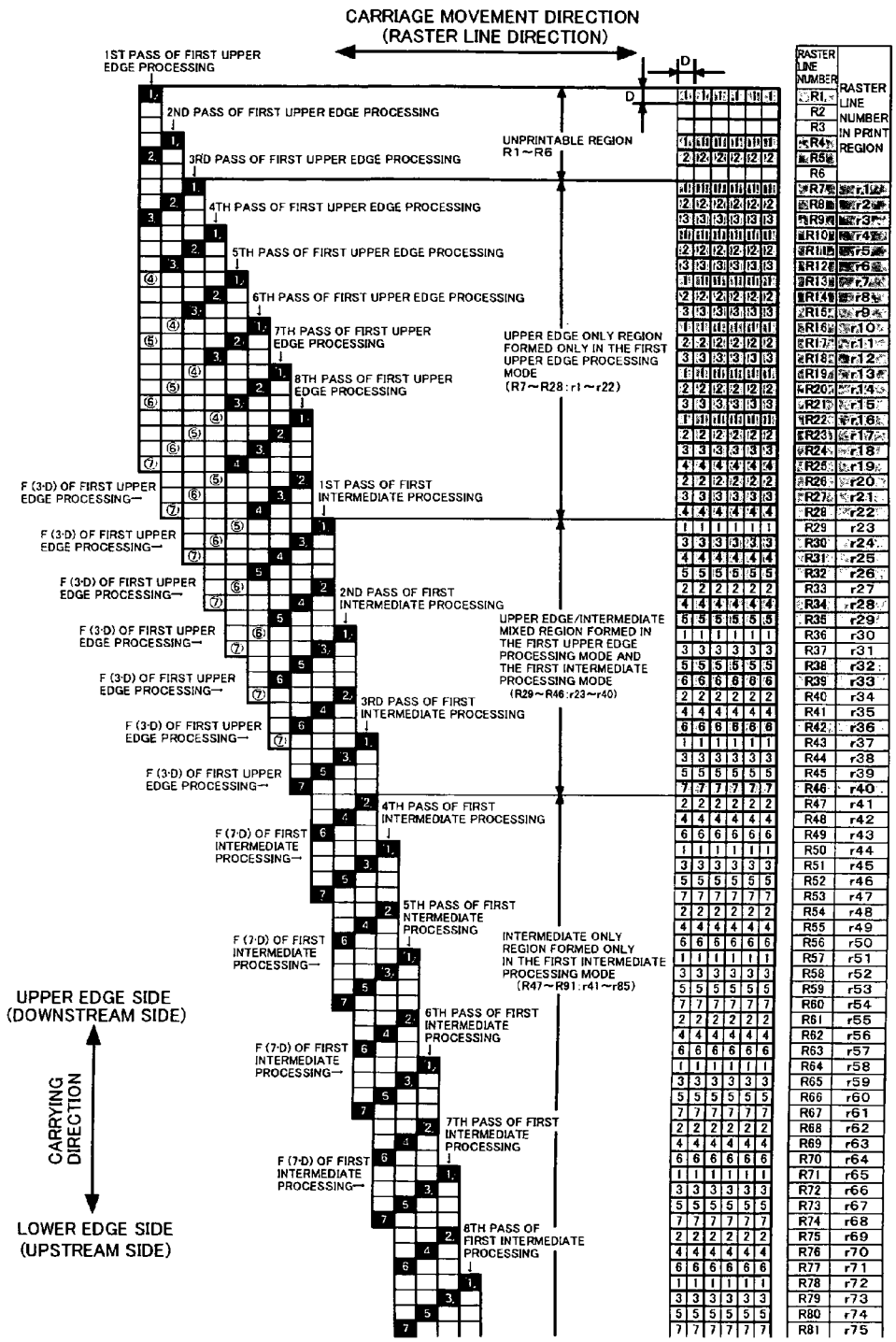
FIG. 21A is a diagram illustrating the various processing modes.
Figure 21B:
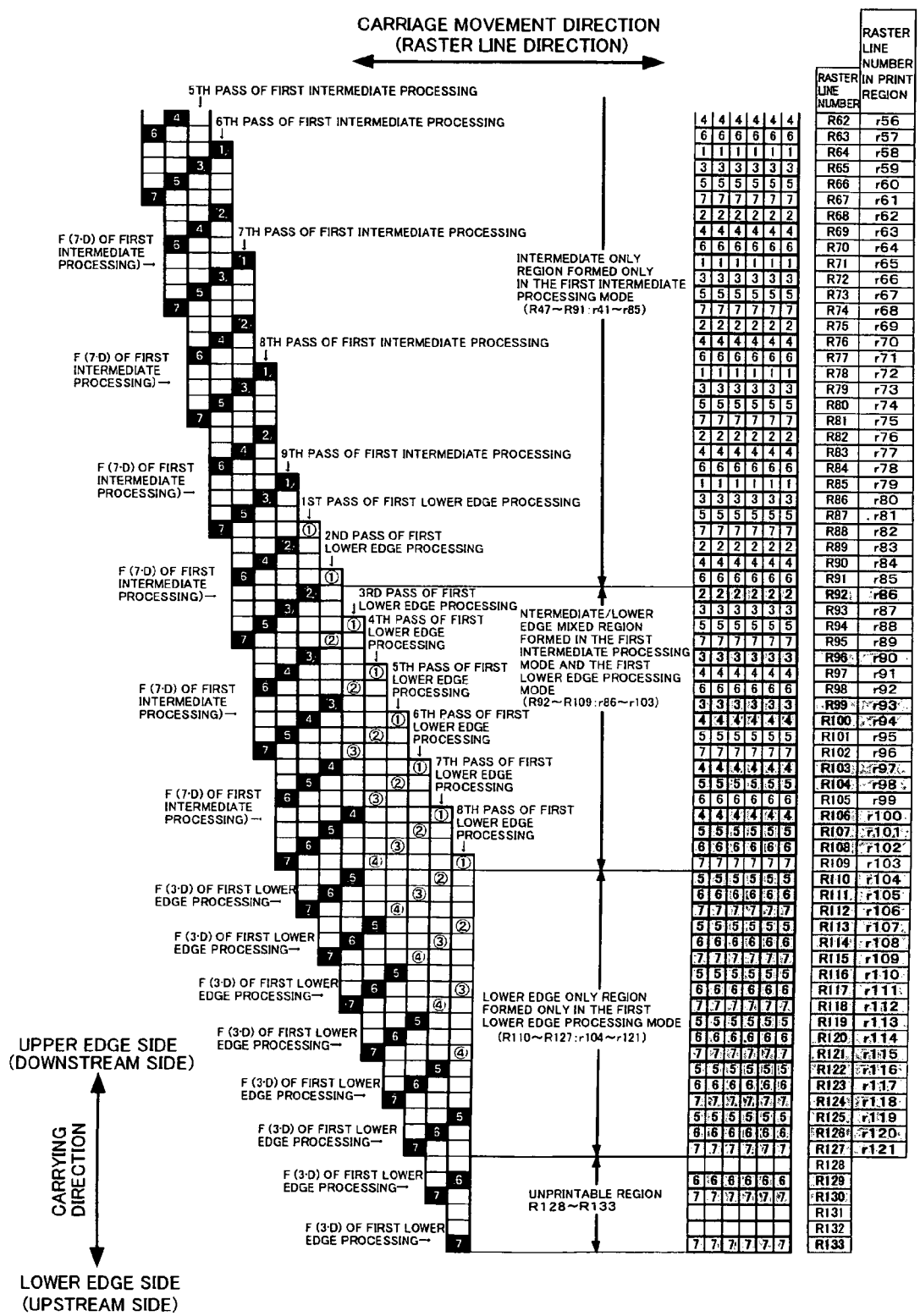
FIG. 21B is a diagram illustrating the various processing modes.

(1) Regarding the case of printing an image using the first upper edge processing mode, the first intermediate processing mode, and the first lower edge processing mode This corresponds to the case that the first print mode shown in FIG. 19 and FIG. 20 has been set, that is, the case that "borderless" has been set as the margin format mode and "high" has been set as the image quality mode. As shown in FIG. 21A and FIG. 21B, the printer 1 performs eight passes in the first upper edge processing mode, then performs nine passes in the first intermediate processing mode, and then performs eight passes in the first lower edge processing mode. As a result, ink is ejected at a print resolution of 720×720 dpi to the region R7 to R127 from the seventh raster line R7 to the 127th raster line R127 serving as a print region, and borderlessly printing on a paper of a later-described "first size", in which the size in the carrying direction is 110·D, is performed.

It should be noted that the pass numbers of the first upper edge processing mode and the first lower edge processing mode are fixed values, and do not change from the, for example, eight passes mentioned above, but the number of passes of the first intermediate processing mode is set to change in correspondence with the paper size mode that has been input through the user interface of the printer driver 1110. This is because in order to perform borderless printing it is necessary for the size of the print region to be larger in the carrying direction than the paper corresponding to the paper size mode, and the size of the print region is adjusted by changing the number of passes in the intermediate processing mode. In the example of the diagrams, "first size," which indicates that the size in the carrying direction is 110·D, has been input as the paper size mode. Then, the number of passes of the first intermediate mode is set to nine passes as mentioned above so that the size in the carrying direction of the print region becomes 121·D. This is explained in detail later.

In the first upper edge processing mode, the dot formation operation of a single pass is in principle executed in the interlaced mode between the carrying operations, each of which carries the paper S by 3·D, as shown in the left diagram of FIG. 21A. In the four passes of the first half of this processing mode, printing is performed using nozzles #1 to #3. In the four passes of the latter half, printing is performed while increasing the nozzle number by one every time the pass number advances, in the order of nozzle #4, #5, #6, and #7. It should be noted that the reason why the number of nozzles used is successively increased in the four passes of the latter half is so that the usage state of the nozzles matches that of the first intermediate processing mode that is executed immediately afterward.

Printing through the first upper edge processing mode results in raster lines formed over the region R1 to R46, from the first raster line R1 to the 46th raster line R46, shown in the right diagram (in the right diagram, the raster lines that are formed by the first upper edge processing mode are shown shaded). However, it should be noted that in the region R1 to R46, the complete region in which all raster lines have been formed is only the region R7 to R28 ranging from raster line R7 to raster line R28, whereas the region R1 to R6 from raster line R1 to raster line R6 and the region R29 to R46 from raster line R29 to raster line R46 are incomplete regions containing portions in which no raster lines are formed.

The former of these incomplete regions, namely the region R1 to R6, is a so-called unprintable region, which means that no nozzles pass over the portion corresponding to the second, third and sixth raster lines R2, R3 and R6 in any of the passes, and thus no dots can be formed in those pixels. Thus, this region R1 to R6 is not used for recording an image, and is excluded from the print region. On the other hand, the yet unformed portions of the raster lines in the latter region R29 to R46 are formed in a complementary manner through the first intermediate processing mode that is executed immediately afterwards, so that this region R29 to R46 is completed at that time. In other words, the region R29 to R46 is a region that is completed through both the first upper edge processing mode and the first intermediate processing mode, and hereinafter this region R29 to R46 is referred to as the "upper edge/intermediate mixed region." Also, the region R7 to R28 that is formed through only the first upper edge processing mode is referred to as the "upper edge only region."

In the first intermediate processing mode, the dot formation operation of a single pass is executed in principle in the interlaced mode between carrying operations, each of which carries the paper S by 7·D, as shown in the left diagrams of FIG. 21A and FIG. 21B. All the nozzles #1 to #7 are used for printing in all of the passes, from the first pass to the ninth pass, and as a result, raster lines are formed over the region R29 to R109 from the 29th raster line R29 to the 109th raster line R109 shown in the right diagram.

More specifically, with regard to the upper edge/intermediate mixed region R29 to R46, the raster lines R29, R33, R36, R37, R40, R41, R43, R44, and R45, which were not formed in the first upper edge processing mode, are each formed in a complementary manner, completing the upper edge/intermediate mixed region R29 to R46. All of the raster lines of the region R47 to R91 are completely formed through only the dot formation operations of the first intermediate processing mode. Hereinafter, the region R47 to R91, which is completed through only the first intermediate processing mode, is referred to as the "intermediate only region." The region R92 to R109 includes some raster lines with unformed portions, and these are formed in a complementary manner through the first lower edge processing mode that is executed next, completing the region R92 to R109. In other words, the region R92 to R109 is a region that is completed through both the first intermediate processing mode and the first lower edge processing mode, and hereinafter this region R92 to R109 is referred to as the "intermediate/lower edge mixed region." It should be noted that in the right diagram, the raster lines that are formed through the first lower edge processing mode are shown shaded.

In the first lower edge processing mode, as shown in FIG. 21B, the dot formation operation of a single pass is in principle executed in the interlaced mode between carrying operations, each of which carries the paper S by 3·D. In the five passes of the latter half of the first lower edge processing mode, printing is executed using nozzles #7 to #9. Also, in the three passes of the first half of the first lower edge processing mode, printing is carried out while decreasing the number of the nozzles that are used by one in the order of nozzle #1, nozzle #2, and nozzle #3, each time the pass number increases. That is, printing is executed in the first pass using nozzles #2 to #7, in the second pass using nozzles #3 to #7, and in the third pass using nozzles #4 to #7. It should be noted that the reason why the number of nozzles used is successively decreased in the three passes of the first half is so that the usage state of the nozzles is matched to that of the five passes of the latter half that are executed immediately afterward.

The result of printing in the first lower edge processing mode is that raster lines are formed over the region R92 to R133, from the 92nd raster line R92 to the 133rd raster line R133 shown in the right diagram.

More specifically, with regard to the intermediate/lower edge mixed region R92 to R109, the raster lines R92, R96, R99, R100, R103, R104, R106, R107, and R108, which were not formed in the first intermediate processing mode, are each formed in a complementary manner, completing the intermediate/lower edge mixed region R92 to R109. All the raster lines of the region R110 to R127 are formed through only the dot formation operations of the first lower edge processing mode, completing this region. Hereinafter, the region R110 to R127 that is formed through only the lower edge processing mode is referred to as the "lower edge only region." Further, the region R128 to R133 is a so-called unprintable region, that is, no nozzles pass over the portion corresponding to the 128th, 131st, and 132nd raster lines R128, R131, and R132 in any pass number, and thus it is not possible to form dots in those pixels. Thus, the region R128 to R133 is not used for recording an image, and is excluded from the print region.

Incidentally, in the case of printing using the first upper edge processing mode, the first intermediate processing mode, and the first lower edge processing mode, the print start position (the target position at the upper edge of the paper S when printing is started) should be set to the fourth raster line from the uppermost edge of the print region toward the lower edge (in FIG. 21A, this is the tenth raster line R10), for example. By doing this, even if due to carry error the paper is carried more than the stipulated carry amount, as long as that error is within 3·D, the upper edge of the paper S will be positioned closer to the lower edge than the uppermost edge of the print region. Consequently, borderless printing can be reliably achieved without a blank region being formed at the upper edge of the paper S. Conversely, if due to carry error the paper S is carried not more than the stipulated carry amount, then as long as that amount is less than 14·D, the upper edge of the paper S is positioned closer to the upper edge than the 24th raster line R24, and thus the upper edge of the paper S will be printed by only the nozzles #1 to #3 above the groove portion, reliably preventing the platen 24 from becoming dirty.

On the other hand, the print end position (the target position at the lower edge of the paper S when printing is finished) should be set to the ninth raster line from the lowermost edge of the print region toward the upper edge (in FIG. 21B, this is the 119th raster line R119), for example. By doing this, even if due to carry error the paper is carried less than the stipulated carry amount, as long as that error is within 8·D, the lower edge of the paper S will still be positioned closer to the upper edge than the raster line R127 at the lowermost edge of the print region. Consequently, borderless printing can be reliably achieved without a blank region being formed at the lower edge of the paper S. Conversely, if due to carry error the paper S is carried more than the stipulated carry amount, then as long as that amount is not more than 12·D, the lower edge of the paper S is positioned closer to the lower edge than the 106th raster line R106, and thus the lower edge of the paper will be printed by only the nozzles #5 to #7 above the groove portion, preventing the platen 24 from becoming dirty.

It should be noted that the print start position and the print end position are related to the number of passes that is set in the first intermediate processing mode mentioned above. In other words, to satisfy the conditions of the print start position and the print end position mentioned above with respect to a paper that corresponds to the paper size mode, first the size of the print region in the carrying direction must be set to a size that extends beyond the upper edge and the lower edge of the paper by 3·D and 8·D, respectively, that is, it needs to be set 11·D larger in the carrying direction than the print paper. Consequently, the number of passes in the first intermediate processing mode is set such that the size is 11·D larger than the size in the carrying direction, which is indicated by the paper size mode that has been input. Incidentally, the size in the carrying direction of the "first size" mentioned above is 110·D. To set the print region larger than this by 11·D to be 121·D, the number of passes of the first intermediate processing mode is set to nine passes.

Figure 22A:
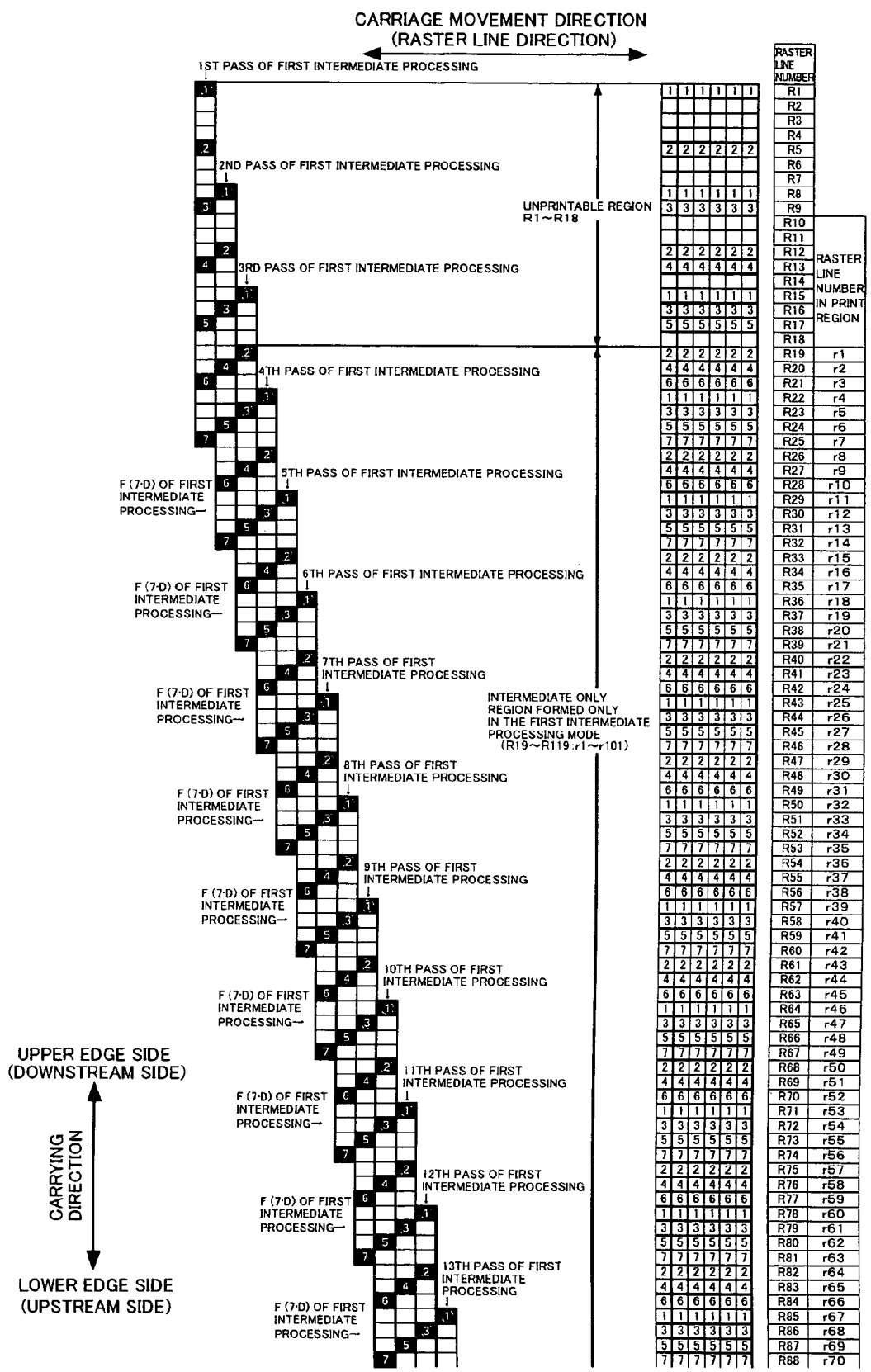
FIG. 22A is a diagram illustrating the various processing modes.
Figure 22B:
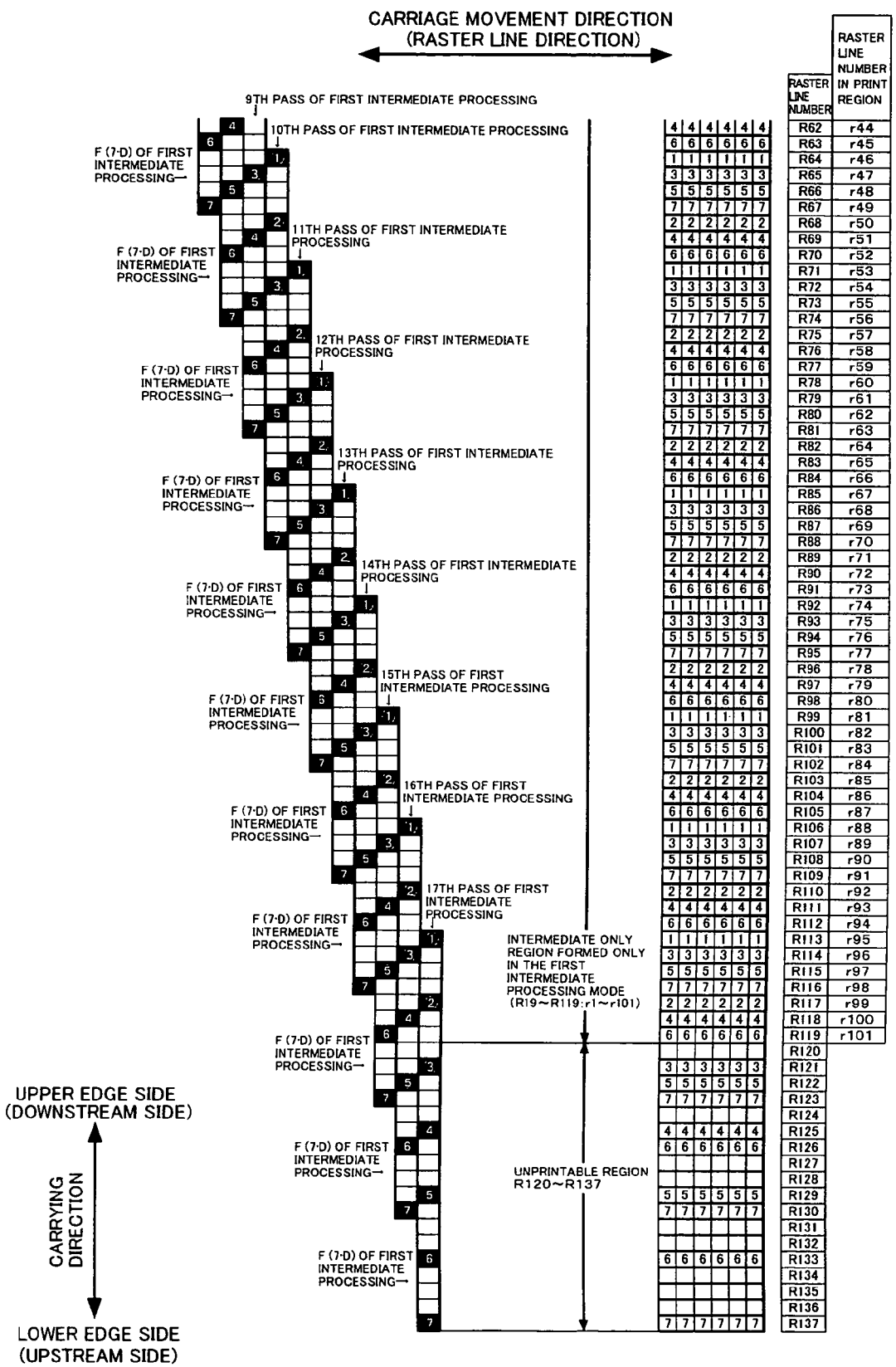
FIG. 22B is a diagram illustrating the various processing modes.

(2) Regarding the Case that an Image is Printed Using Only the First Intermediate Processing Mode This corresponds to the case that the second print mode shown in FIG. 19 and FIG. 20 has been set, that is, a case in which "bordered" has been set as the margin format mode and "high" has been set as the image quality mode. As shown in FIG. 22A and FIG. 22B, the printer 1 performs nine passes in the first intermediate processing mode. As a result, ink is ejected at a print resolution of 720×720 dpi onto the region R19 to R119, which serves as the print region, printing a paper of the "first size," which is 110·D in the carrying direction, while leaving a border.

It should be noted that as in case (1) mentioned above, the number of passes of the first intermediate processing mode changes depending on the paper size mode that has been input. In other words, the number of passes is set such that the size of the print region is a size with which a margin of a predetermined width is formed at the upper and lower edges of a paper of the paper size mode that has been input. In the example shown in the diagrams, "first size" has been input as the paper size mode, so that the size of the paper in the carrying direction is 110·D. Thus, in order to print the paper leaving a border, the number of passes of the first intermediate processing mode is set to 17 passes, as mentioned above, so that the size in the carrying direction of the print region is 101·D.

As mentioned above, bordered printing is printing forming a margin at the upper edge and the lower edge of the paper. Thus, it is not necessary to print the upper edge and the lower edge using only the nozzles opposing the grooves 24a and 24b, so that printing is executed according to only the first intermediate processing mode, in which all of the nozzles #1 to #7 are used over the entire length in the carrying direction of the paper.

In the first intermediate processing mode, the dot formation operation of a single pass is performed in the interlaced mode between carrying operations, with each of which the paper is carried by 7·D. In the example shown in the diagrams, all of the nozzles #1 to #7 are used in all of the passes, from the first pass to the seventeenth pass, resulting in raster lines being formed over the region from the first raster line R1 to the 137th raster line R137.

However, the region R1 to R18 at the upper edge includes portions in which raster lines are not formed in any of the passes, such as R18, and thus the region R1 to R18 is an unprintable region and is excluded from the print region. Similarly, also the region R120 to R137 at the lower edge includes portions in which raster lines are not formed in any of the passes, such as R120, and thus this region R120 to R137 also is an unprintable region and is excluded from the print region. It should be noted that in the remaining region R19 to R119 all of the raster lines are formed through only the first intermediate processing mode, and thus this corresponds to an intermediate only region as described above.

Figure 23A:
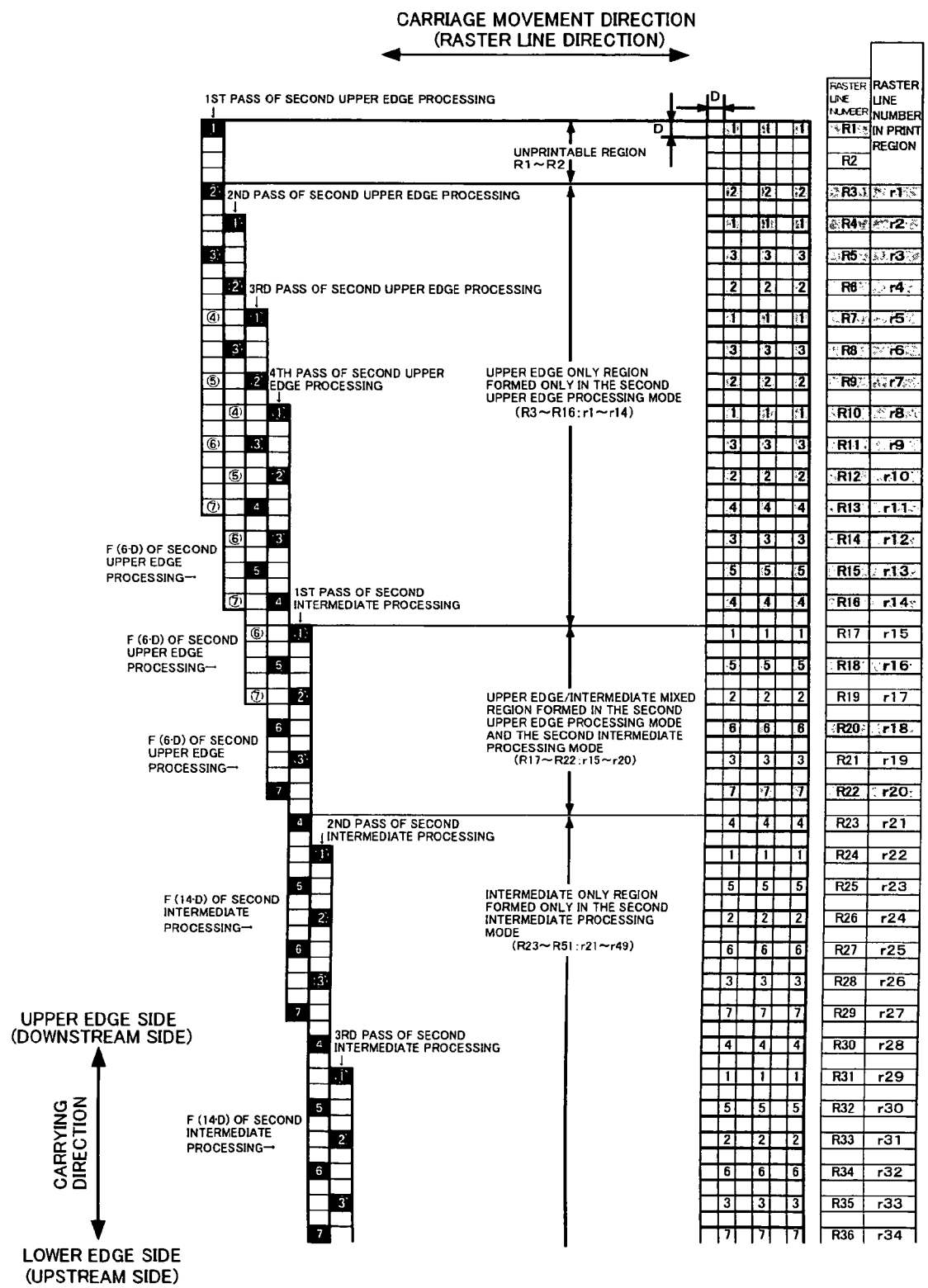
FIG. 23A is a diagram illustrating the various processing modes.
Figure 23B:
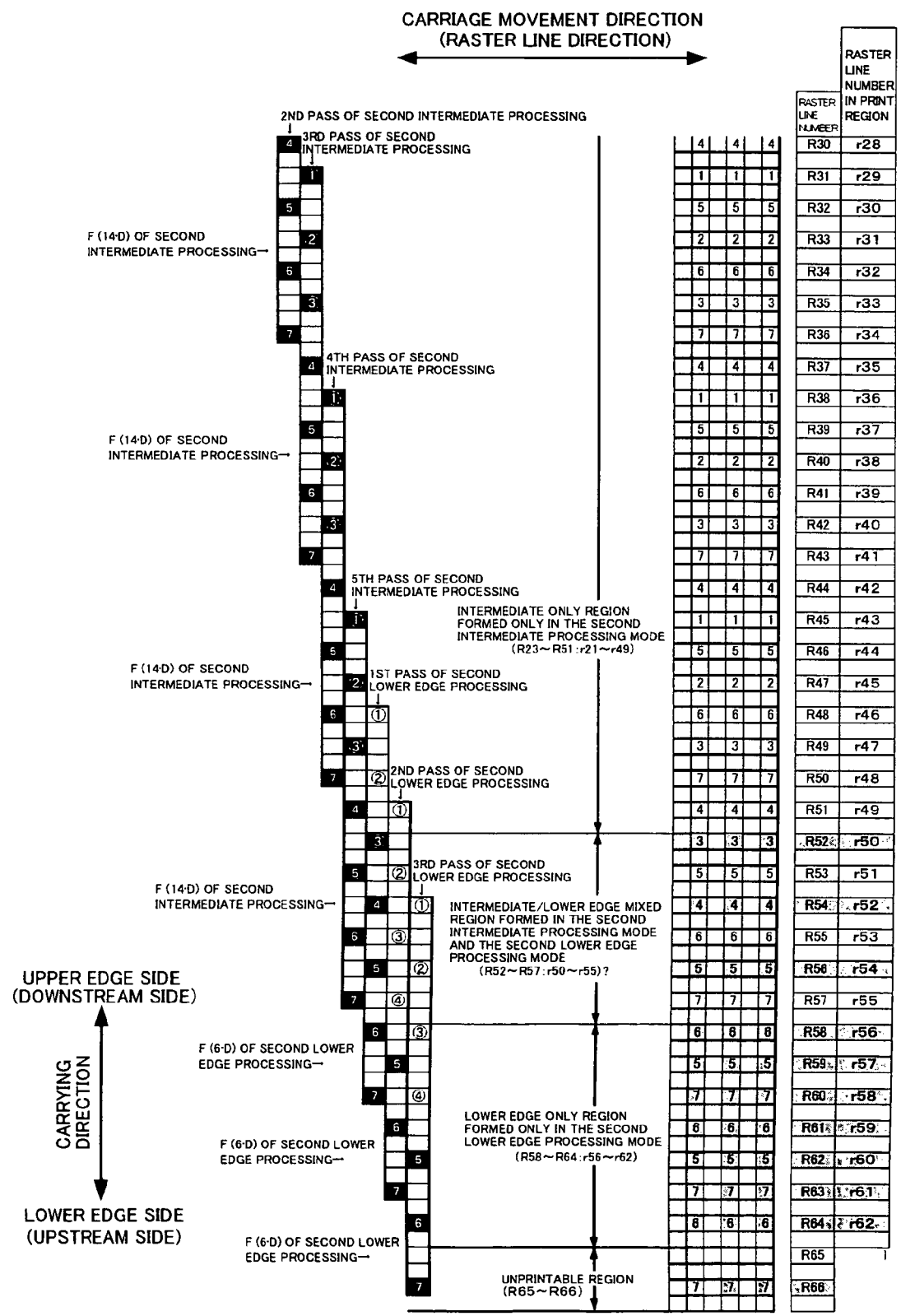
FIG. 23B is a diagram illustrating the various processing modes.

(3) Regarding the case that an image is printed using the second upper edge processing mode, the second intermediate processing mode, and the second lower edge processing mode This corresponds to the case that the third print mode shown in FIG. 19 and FIG. 20 has been set, that is, the case that "borderless" has been set as the margin format mode and "normal" has been set as the image quality mode. As shown in FIG. 23A and FIG. 23B, the printer 1 performs four passes in the second upper edge processing mode, five passes in the second intermediate processing mode, and three passes in the second lower edge processing mode. As a result, ink is ejected at a print resolution of 360×360 dpi to the region R3 to R64, which serves as the print region, borderlessly printing a paper of the "first size."

It should be noted that because the print resolution is 360× 360 dpi, only every other grid square shown in the right diagrams is covered by a dot. That is to say, the raster lines in the print region are formed only every other grid square.

As in case (1) above, the number of passes in the second upper edge processing mode and the second lower edge processing mode is fixed and does not change, but the number of passes in the second intermediate processing mode changes depending on the paper size mode. In other words, in order to reliably print borderlessly on a paper of any paper size mode, the number of passes of the second intermediate processing mode is set such that the size of the print region is 14·D larger than the size of the paper.

It should be noted that the value 14·D is determined so that the print start position becomes the fourth raster line from the uppermost edge of the print region toward the lower edge (the sixth raster line R6 in FIG. 23A), and that the print end position becomes the fourth raster line from the lowermost edge of the print region toward the upper edge (the 61st raster line R61 in FIG. 23B). In the example shown in the drawings, "first size" has been input and thus the size of the paper in the carrying direction is 110·D. Therefore the number of passes of the first intermediate processing mode is set to five passes such that the size in the carrying direction of the print region becomes 124·D (=110·D+14·D).

In the second upper edge processing mode, the dot formation operation of one pass is in principle executed in the interlaced mode between the carrying operations, each of which carries the paper by 6·D, as shown in the left diagram in FIG. 23A.

In the first two passes of the second upper edge processing mode, printing is performed using nozzles #1 to #3. In the latter two passes, printing is performed while increasing the number of the nozzles that are used by two each time the pass number advances, in the order of nozzle #4, nozzle #5, nozzle #6, and nozzle #7. It should be noted that the reason for successively increasing the number of nozzles that are used is the same as in the case (1) discussed above.

The result of printing through the second upper edge processing mode is that raster lines are formed over the region R1 to R22 shown in the right diagram (in the right diagram, the raster lines that are formed are shown shaded). However, the completed region in which all of the raster lines have been formed, which corresponds to the upper edge only region mentioned above, is only the region R3 to R16, and the region R1 to R2 and the region R17 to R22 are incomplete because they include some unformed raster lines. Of these, the former region R1 to R2 is an unprintable region because raster lines are not formed in the portion corresponding to the second raster line R2 in any pass number, and is excluded from the print region. On the other hand, the latter region R17 to R22 corresponds to the upper edge/intermediate mixed region, and the unformed raster lines in the region R17 to R22 are completed by being formed in a complementary manner in the second intermediate processing mode that is executed immediately thereafter.

In the second intermediate processing mode, the dot formation operation of a single pass is in principle executed in the interlaced mode between carrying operations, each of which carries the paper by 14·D, as shown in the left diagrams of FIG. 23A and FIG. 23B. All the nozzles #1 to #7 are used for printing in all of the passes, from the first pass to the fifth pass, and as a result, raster lines are formed over the region R17 to R57 shown in the right diagrams. More specifically, with regard to the upper edge/intermediate mixed region R17 to R22, the raster lines R17, R19, and R21, which were not yet formed in the second upper edge processing mode, are each formed in a complementary manner, thus completing them. The region R23 to R51 corresponds to the intermediate only region, and the region R23 to R51 is completed by forming all of the raster lines through only the dot formation operations of the second intermediate processing mode. Moreover, the region R52 to R57 corresponds to the intermediate/lower edge mixed region mentioned above and includes some raster lines that have not been formed, which are formed in a complementary manner through the second lower edge processing mode that is performed immediately thereafter, completing the region R52 to R57. It should be noted that in the right diagram, the raster lines that are formed through the second lower edge processing mode only are shown shaded.

In the second lower edge processing mode, the dot formation operations of a single pass are in principle executed in the interlaced mode between the carrying operations, each of which carries the paper by 6·D, as shown in FIG. 23B.

In the single pass of the latter half of the second lower edge processing mode, printing is performed using nozzles #7 to #9. Also, in the two passes in the first half of the second lower edge processing mode, printing is performed while the number of the nozzles that are used is reduced by two each time the pass number advances, in the order of nozzle #1, nozzle #2, nozzle #3, and nozzle #4. It should be noted that the reason for successively decreasing the number of nozzles that are used is the same as in the case (1) discussed above.

The result of executing the second lower edge processing mode is that raster lines are formed over the region R48 to R66 shown in the right diagram. More specifically, the intermediate/lower edge mixed region R52 to R57 is completed by forming each of the raster lines R52, R54, and R56 that were not yet formed in the second intermediate processing mode in a complementary manner. Also, the region R58 to R64 corresponds to the lower edge only region, and is completed by all the raster lines that are formed through only the dot formation operations of the second lower edge processing mode. The remaining region R65 to R66 is an unprintable region because raster lines are not formed in the portion corresponding to the 65th raster line R65 in any pass number, and thus it is excluded from the print region.

Figure 24A:
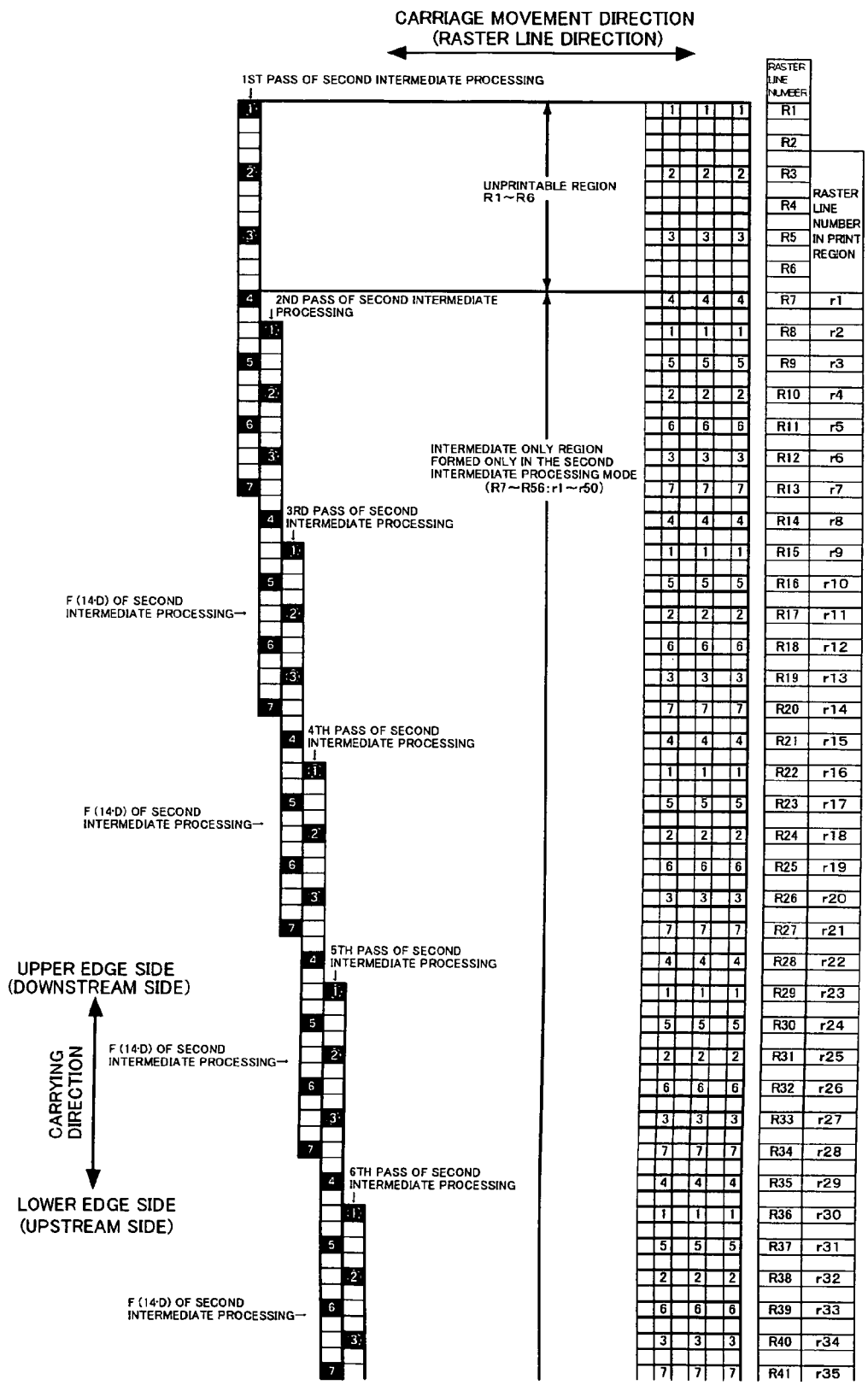
FIG. 24A is a diagram illustrating the various processing modes.
Figure 24B:
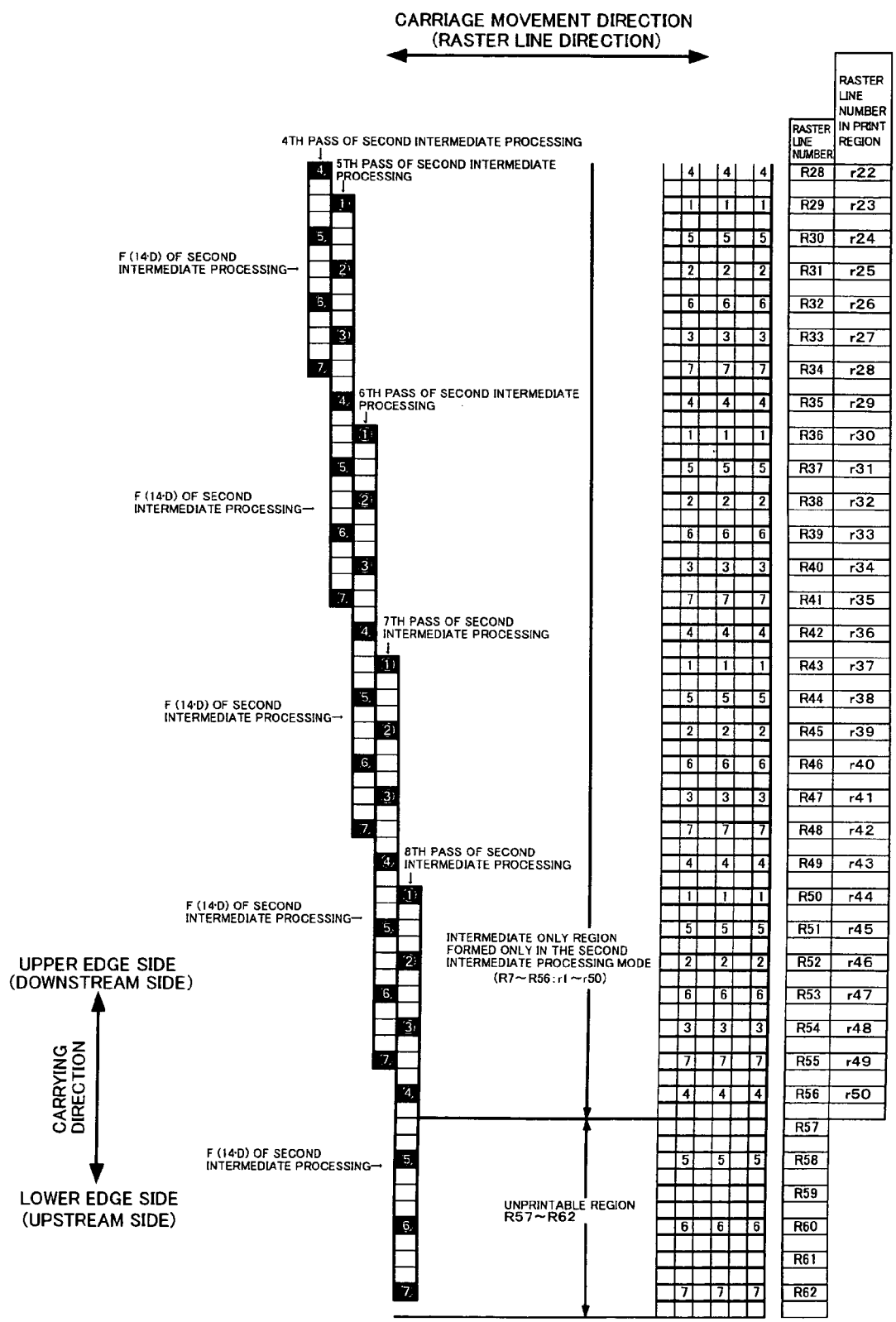
FIG. 24B is a diagram illustrating the various processing modes.

(4) Regarding the case that an image is printed using only the second intermediate processing mode This corresponds to the case that the fourth print mode shown in FIG. 19 and FIG. 20 has been set, that is, the case that "bordered" has been set as the margin format mode and "normal" has been set as the image quality mode. As shown in FIG. 24A and FIG. 24B, the printer 1 performs eight passes in the first intermediate processing mode. As a result, ink is ejected at a print resolution of 360×360 dpi to the region R7 to R56, which serves as the print region, printing with a border on a paper of the "first size."

As in case (2) mentioned above, the number of passes of the second intermediate processing mode changes depending on the paper size mode. In the example shown in the diagrams, "first size" has been input, so that in order to print on a paper whose size is 110·D while leaving a border, the number of passes of the second intermediate processing mode is set to the aforementioned eight passes, so that the size of the print region in the carrying direction becomes 100·D. It should be noted that in this bordered printing, the reason for printing in the second intermediate processing mode is the same as in the case (2) discussed above.

In the second intermediate processing mode, the dot formation operation of a single pass is performed in the interlaced mode between carrying operations, with each of which the paper is carried by 14·D. Then, in the example shown in the diagrams, all of the nozzles #1 to #7 are used in all of the passes, from the first pass to the eighth pass, resulting in raster lines being formed over the region spanning the region R1 to R62.

However, the region from R1 to R6 on the upper edge side includes portions in which raster lines are not formed in any of the passes, such as the portion R6, and thus the region R1 to R6 is an unprintable region and is excluded from the print region. Similarly, the region R57 to R62 on the lower edge side includes portions in which raster lines are not formed in any of the passes, such as R57, and thus this region R57 to R62 also is an unprintable region and is excluded from the print region. In the remaining region R7 to R56, all of the raster lines are formed through only the first intermediate processing mode, and thus this corresponds to the intermediate only region noted above.

Incidentally, the first upper edge processing mode, first intermediate processing mode, first lower edge processing mode, second upper edge processing mode, second intermediate processing mode, and second lower edge processing mode described above are all different processing modes, because they correspond to printing processes in which at least one of the dot formation operation and the carrying operation differs.

That is to say, printing processes with different carrying operations are printing processes in which, as noted above, the change pattern of the carry amount F (carry amount F of each pass) for each carrying operation differs. In the first intermediate processing mode, the change pattern is 7·D for all passes, in the second intermediate processing mode, the change pattern is 14·D for all passes, in the first upper edge processing mode and the first lower edge processing mode, the change pattern is 3·D for all passes, and in the first upper edge processing mode and the first lower edge processing mode, the change pattern is 6·D for all passes. Consequently, the first intermediate processing mode and the second intermediate processing mode are different from any of the other modes in terms of their change pattern for the carry amount F, and thus these processing modes are different from the other processing modes.

On the other hand, in both the first upper edge processing mode and the first lower edge processing mode, the change pattern for the carry amount F is 3·D for all of the passes, and thus they are not different from one another with respect to the print processing in the carrying operations. However, with regard the print processing of their dot formation operations, they are different from one another and thus they are different processing modes. That is to say, the change pattern of the nozzles that are used in the dot formation operations (passes) in the first upper edge processing mode is a pattern in which the nozzles #1 to #3 are used in the first through fourth passes, and the nozzles that are used in the fifth through eighth passes are increased by one at a time in the order of #4, #5, #6, and #7 each time the pass number increases. In contrast, the change pattern in the first lower edge processing mode is a pattern in which the nozzles are decreased by one at a time in the order of #1, #2, #3, and #4 in the first to fourth pass, and the nozzles #5 to #7 are used in the fifth to eighth pass. Consequently, the first upper edge processing mode and the first lower edge processing mode are different from one another in terms of the nozzle change pattern, that is, they are different from one another in terms of their print processing of the dot formation operations. Due to this, these processing modes are different from one another.

Likewise, the second upper edge processing mode and the second lower edge processing mode both have a carry amount change pattern of 6·D for all of the passes, and thus they are not different from one another in terms of the print processing of the carrying operations. However, as regards the print processing of their dot formation operations, they are different from one another and thus they are different processing modes. In other words, the change pattern in the nozzles that are used in the dot formation operations (passes) in the second upper edge processing mode is a pattern in which the nozzles #1 to #3 are used in the first and second passes, and the nozzles that are used are increased by two at a time in the order of #4, #5, #6, and #7 each time the pass number increases in the third and fourth passes. By contrast, the change pattern in the second lower edge processing mode is a pattern in which #3 to #7 are used in the first pass and the nozzles #5 to #7 are used in the third and fourth passes. Consequently, the second upper edge processing mode and the second lower edge processing mode are different from one another in terms of the nozzle change pattern, that is, they are different from one another in terms of their print processing of the dot formation operations. Due to this, these processing modes are different from one another.

The processing modes were described above using specific examples, and because the print region is the only region that contributes to image formation, the raster line numbers are reassigned for only the print region in the following description. That is to say, as shown in the right diagrams of FIG. 21A to FIG. 24C, the uppermost raster line in the print region is called the first raster line r1, and thereafter heading toward the lower end in the drawings the raster lines are the second raster line r2, the third raster line r3, and so on.

===(1) Regarding the Reason Why Darkness Non-uniformities Occur in the Image===

Darkness non-uniformities that occur in a multicolor image that is printed using CMYK inks are generally due to darkness non-uniformities that occur in each of those ink colors. For this reason, the method that is normally adopted is a method for inhibiting darkness non-uniformities in images printed in multiple colors by individually inhibiting darkness non-uniformities in each of the ink colors.

Figure 25:
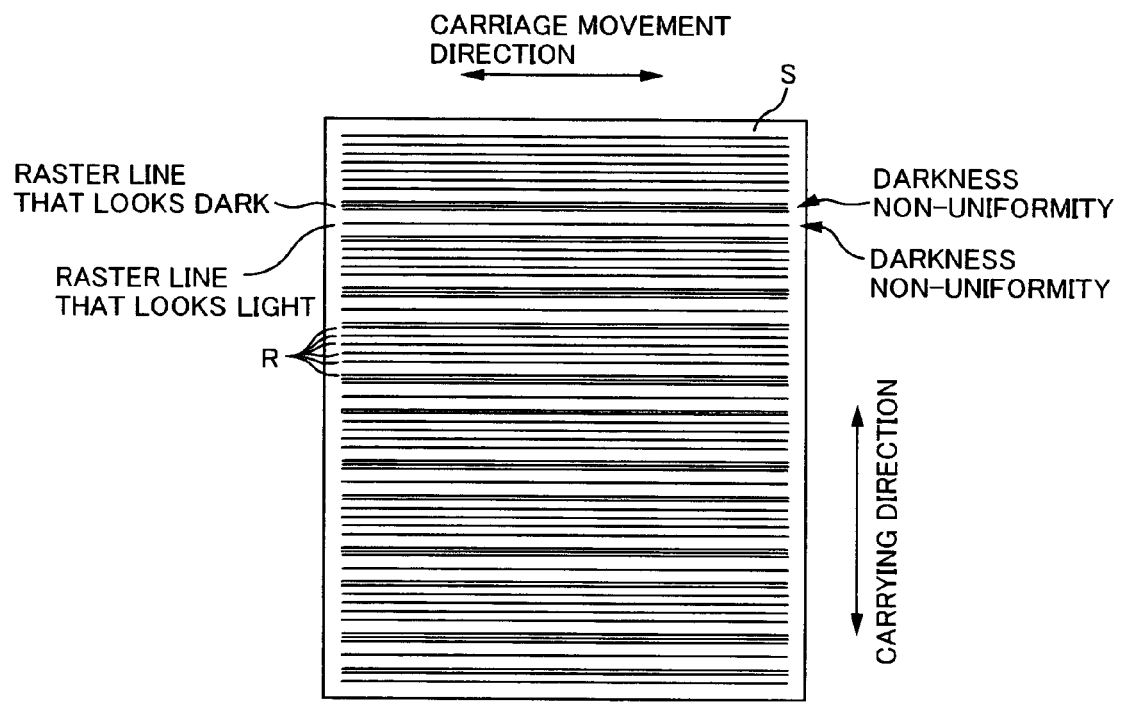

Accordingly, the following is a description of how darkness non-uniformities occur in images printed in a single color. FIG. 25 illustrates darkness non-uniformities in an image that has been printed in a single color, that is, an image that has been printed in one of the ink colors C, M, Y or K, for example with black ink.

As shown in this figure, what is referred to as darkness non-uniformities here can be seen as stripes that are parallel to the carriage movement direction. A main reason for darkness uniformities is, for example, that the dot formation position shifts in the carrying direction with respect to the target formation position due to poor manufacturing precision of the nozzles and tilts in the ink ejection direction. In such a case, also the formation positions of the raster lines R made of these dots are inevitably shifted in the carrying direction from the target formation positions, and thus the spacing between adjacent raster lines R in the carrying direction is periodically wide or narrow. Observed macroscopically, this will be apparent as striped non-uniformities. In other words, adjacent raster lines R with a wide spacing between them macroscopically appear light, whereas raster lines R with a narrow spacing between them macroscopically appear dark.

It should be noted that this cause of darkness non-uniformities also applies to the other ink colors as well. And even if one of the colors of CMYK has this tendency, darkness non-uniformities will appear in an image printed in multiple colors.

The method of a first reference example of inhibiting these darkness non-uniformities is the method of forming a correction pattern with a gradation value of predetermined darkness, determining a correction value for each nozzle by measuring the darkness of the raster lines formed by each nozzle from this correction pattern, and undertaking a correction for each nozzle in accordance with these correction values when actually printing an image. It should be noted that in the case of multi-color printing, a correction pattern is, of course, printed for each color of ink used for multi-color printing, such as C, M, Y and K, and a correction value is determined for each of these ink colors.

This method is described in detail in the following. First, for example the first intermediate processing mode is selected from the above-described six processing modes, and a correction pattern is printed by ejecting ink from the nozzles using this processing mode. This correction pattern is made of a multitude of raster lines that are formed at a predetermined pitch in the carrying direction, and each of these raster lines is made of a plurality of dots that are lined up in the carriage movement direction at the spots where the ink has landed on the paper. It should be noted that to print, ink is ejected by giving command values of the same gradation values for all pixels of the correction pattern.

Next, the darkness of this correction pattern is measured at each raster line, and based on these measurement values, a darkness correction value is determined for each raster line. Then, indexing the nozzles that have formed the raster lines, the correction values are stored in association with the corresponding nozzles.

Finally, actual printing of an image is performed using these correction values, and for this, ink is ejected while correcting the gradation values of the pixel data of the image data by these correction values, thereby inhibiting darkness non-uniformities. More precisely, for nozzles that form raster lines at which the measurement value has become small because the spacing between adjacent raster lines is wide, the ink amount is increased so that those raster lines appear darker, and conversely, for nozzles that form raster lines at which the measurement value has become large because the spacing between adjacent raster lines is narrow, the ink amount is decreased so that those raster lines appear lighter.

However, the spacing between adjacent raster lines in the carrying direction, which was described as a reason for darkness non-uniformities, depends on the combination of nozzles forming those adjacent raster lines. And those combinations depend on the processing mode.

Consequently, the correction values based on a correction pattern that was printed with the first intermediate processing mode are valid when actually printing in this first intermediate processing mode, but when performing actual printing with a different processing mode, the combination of nozzles forming the adjacent raster lines is different, so that those correction values are not appropriate. For example, in the case of borderless printing in the first print mode, the actual printing of an image is not only performed using the first intermediate processing mode, but also the first upper edge processing mode and the first lower edge processing mode, but the correction values of the first intermediate processing mode are not appropriate for the first upper edge processing mode and the first lower edge processing mode.

Explaining this in more detail with reference to the right diagram in FIG. 21A, when actually printing in the first intermediate processing mode, the order of the nozzles forming raster lines is, for example, repeated in cycles in the order of #2, #4, #6, #1, #3, #5, and #7 (see for example region r41 to r54). On the other hand, in the case of the first upper edge processing mode, the order of the nozzles forming raster lines is, for example, repeated in cycles in the order of #1, #2, #3 with respect to the carrying direction (see for example region r1 to r6).

Paying attention to for example the raster lines r44 and r4 that are formed by the nozzle #1 in the first intermediate processing mode and in the first upper edge processing mode, it can be seen that in the first intermediate processing mode, the raster line 45 that is immediately upstream from this raster line r44 is formed by the nozzle #3 and the raster line r43 that is immediately downstream is formed by the nozzle #6. Therefore, the macroscopic darkness of the raster line r44 formed by the nozzle #1 is given by the combination of the nozzles #3, #1 and #6. By contrast, in the first upper edge processing mode, the raster line r5 that is immediately upstream from the raster line r4 formed by the nozzle #1 is formed by the nozzle #2, and the raster line r3 that is immediately downstream is formed by the nozzle #3, so that the macroscopic darkness of the raster line r4 formed by the nozzle #1 is given by the combination of the nozzles #2, #1 and #3. Hence, the combination of the nozzles #2, #1 and #3 in the first upper edge processing mode is different from the combination of the nozzles #3, #1 and #6 in the first intermediate processing mode mentioned above, so that the macroscopic darkness of the raster line r4 formed by the nozzle #1 in the first upper edge processing mode is different from the macroscopic darkness of the raster line r44 that is formed by the nozzle #1 in the first intermediate processing mode. Consequently, the correction values of the first intermediate processing mode is not appropriate for the first upper edge processing mode.

To address this problem, the second reference example described in the following prints a correction pattern for each processing mode and determines correction values of the darkness of the raster lines for each processing mode. Then, when actually printing an image in a given processing mode, the darkness correction of the raster lines is performed using the correction values that have been determined based on the correction pattern printed in that processing mode, so that darkness non-uniformities are reliably inhibited.

===(1) Second Reference Example of Method for Printing an Image in which Darkness Non-uniformities are Inhibited===

Figure 26:
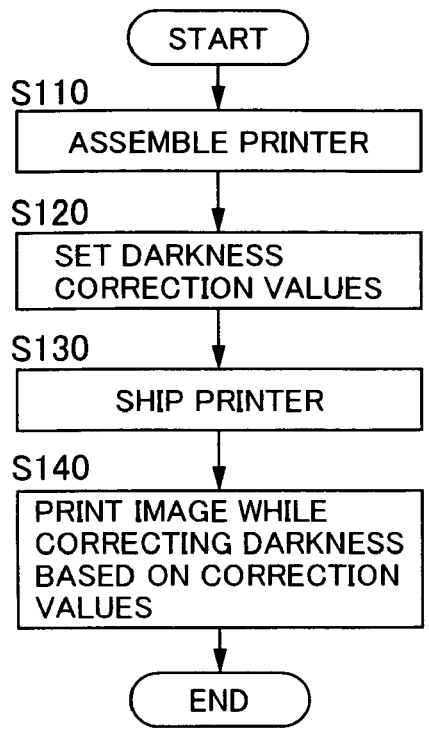

FIG. 26 is a flowchart showing for example the overall procedure of the method for printing an image according to this second reference example.

First, the printer 1 is assembled on a manufacturing line (S110), and then darkness correction values for inhibiting darkness non-uniformities are set by an operator of an inspection line in the printer 1 (S120), before shipping the printer 1 (S130). Then, a user who has purchased the printer 1 performs actual printing of an image, and at the time of this actual printing, the printer 1 prints an image on paper while performing darkness correction for each raster line based on the correction values (S140).

The following is an explanation of Step S120 and Step S140.

<Step S120: Setting the Darkness Correction Values for Inhibiting Darkness Non-Uniformities>

Figure 27:
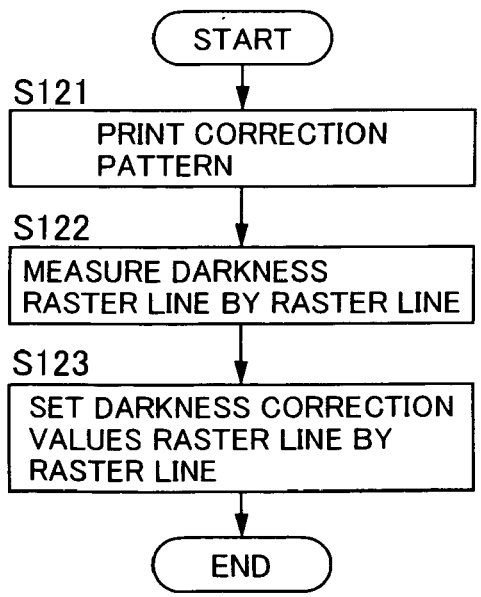

FIG. 27 is a flowchart showing the procedure of Step S120 in FIG. 26. First, the procedure for setting the darkness correction values is outlined below with reference to this flowchart.

Step S121: First, an operator of the inspection line connects the printer 1 to a computer 1100 on the inspection line and prints a correction pattern for determining correction values using the printer 1. It should be noted that the printer 1 printing this correction pattern is the printer 1 in which darkness non-uniformities are to be inhibited, that is, the setting of the correction values is performed for each printer individually. The correction pattern is subdivided for each ink color and for each processing mode and printed (see FIG. 28).

Step S122: Next, the darkness of all printed correction patterns is measured for each raster line, and these measurement values are recorded in recording tables in association with the raster line numbers. It should be noted that these recording tables are arranged for each ink color and for each processing mode in the memory of the computer 1100 of the inspection line (see FIG. 32).

Step S123: Next, the computer 1100 calculates a darkness correction value for each raster line, based on the measured darkness values recorded in the recording tables, and records these correction values in correction value tables in association with the raster line numbers. It should be noted that these correction value tables are arranged for each ink color and for each processing mode in the memory 63 of the computer 1 (see FIG. 34).

In the following, the Steps S121 to S123 are described in more detail.

(1) Step S121: Printing the Correction Pattern

First, the operator of the inspection line communicably connects the printer 1 whose correction values are to be set to the computer 1100 of the inspection line, establishing a printing system as illustrated in FIG. 1. Then, the printer 1 is instructed to print a correction pattern on paper based on the print data of the correction patterns stored in the memory of the computer 1100, and the printer 1 prints this correction pattern on the paper S based on the print data sent to it. The print data of this correction pattern has been created by performing halftone processing and rasterization with respect to CMYK image data made by directly specifying the gradation values of the various ink colors CMYK. The gradation values of the pixel data of the CMYK image data are set to the same value for all of the pixels of each correction pattern formed for each ink color, so that the correction patterns are each printed at a substantially uniform darkness across the entire region. The gradation value can be set to an appropriate value, but from the standpoint of actively inhibiting darkness non-uniformities in regions in which darkness non-uniformities occur easily, it is preferable to select a gradation value that results in so-called middle-tone regions for CMYK colors. More specifically, in the case of the above-noted 256 gradation values, the gradation value can be selected from the range of 77 to 128.

The print instruction given by the operator is performed through the user interface of the printer driver 1110. For this, the print mode and the paper size mode are set through the user interface, and the printer driver 1110 prints the correction pattern based on print data corresponding to these settings. That is to say, the print data of the correction pattern is prepared for each print mode and for each paper size. Note, however, that the print data of the "first print mode" and the "third print mode" is required, whereas the print data of the "second print mode" and the "fourth print mode" is not necessarily required. This is because the correction patterns of the "second print mode" and the "fourth print mode" are included within the correction patterns of the "first print mode" and the "third print mode", and can be used appropriately as described below.

Figure 28:
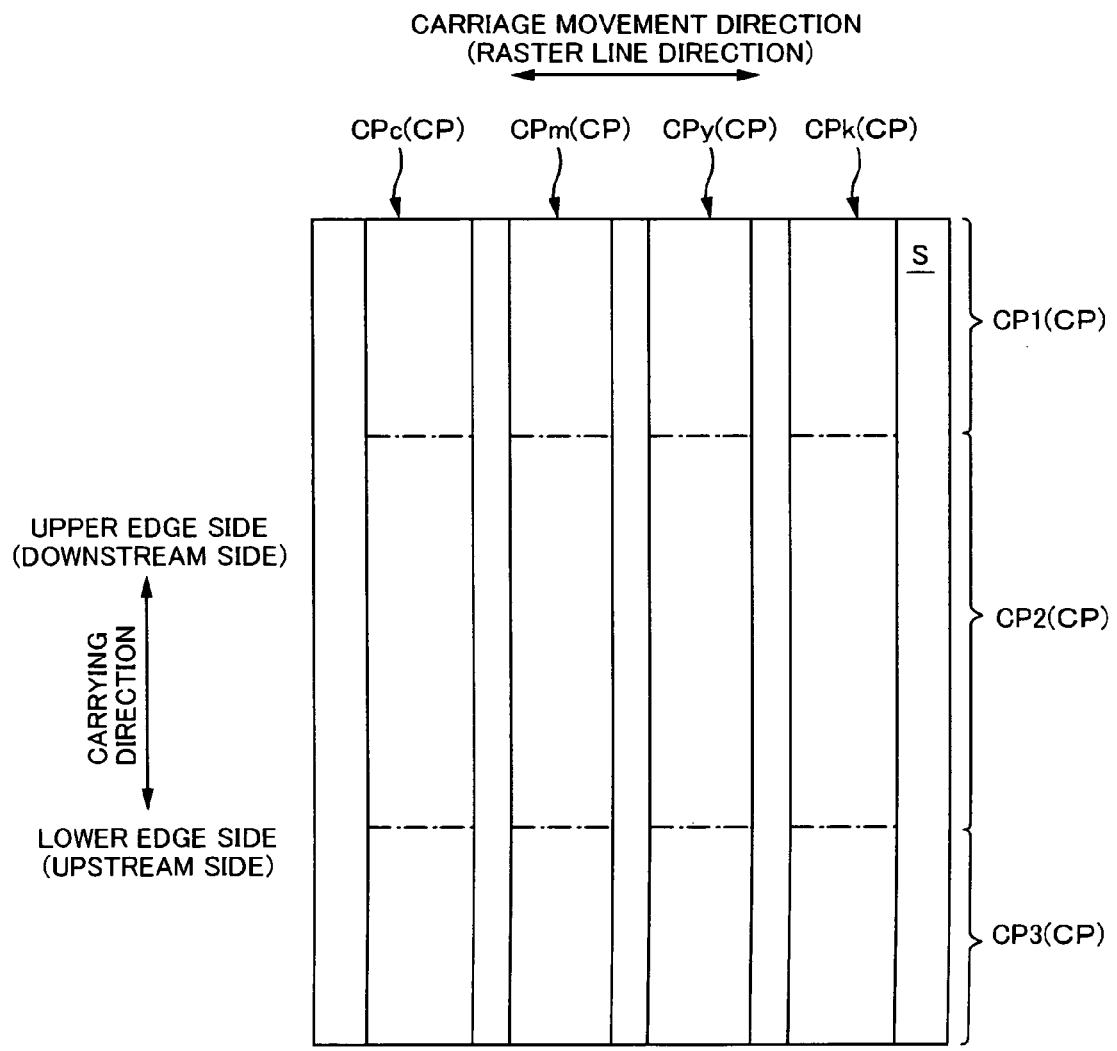

FIG. 28 shows a correction pattern printed on paper. This correction pattern CP is printed for each of the ink colors C, M, Y and K. In the example shown in the figure, correction patterns CPc, CPm, CPy and CPk of the various ink colors are lined up in the carriage movement direction on one sheet of paper S in the order cyan (C), magenta (M), yellow (Y), and black (K).

It should be noted that basically the only difference between these correction patterns is the ink color, so that in the following, the correction pattern CPk for black (K) is described as a representative one of these correction patterns CP.

Also, as mentioned above, darkness non-uniformities in multicolor prints are inhibited for each ink color that is used in that multicolor print, and the method that is used for inhibiting the darkness non-uniformities is the same. For this reason, black (K) shall serve as a representative example in the following explanation. In other words, some of the following description is given only for the single color black (K), but the same also applies for the other ink colors C, M, and Y as well.

The black (K) correction pattern CPk is printed in a band shape that is oblong in the carrying direction. The print region in the carrying direction extends over the entire region of the paper S.

The correction pattern CPk is printed for each processing mode, and in the example shown in the drawing, one of the correction patterns CP1, CP2, and CP3 for the different processing modes, is printed in each of the three or so regions into which the carrying direction is partitioned.

Here, it is preferable that the relationship corresponding which processing mode the correction pattern CP1, CP2, and CP3 is printed in which of these partitioned regions matches that corresponding relationship during actual printing. In this case, the same carrying operation and the same dot formation operation as during the actual printing can be accurately realized also during the printing of the correction patterns CP1, CP2 and CP3, so that the correction precision of the correction values obtained from these correction patterns CP1, CP2 and CP3 is improved, and darkness non-uniformities can be inhibited reliably.

For example, taking the first upper edge processing mode, the first intermediate processing mode and the first lower edge processing mode as an example, a correction pattern (in the following referred to as first upper edge correction pattern CP1) is printed in the first upper edge processing mode onto the region at the top of the paper S, a correction pattern (in the following referred to as first intermediate correction pattern CP2) is printed in the first intermediate processing mode onto the region in the middle of the paper S, and a correction pattern (in the following referred to as first lower edge correction pattern CP3) is printed in the first lower edge processing mode onto the region at the bottom of the paper S. This is because during actual printing, if the first print mode is selected, the upper edge of the paper S is printed in the first upper edge processing mode, the middle of the paper is printed in the first intermediate processing mode, and the bottom of the paper is printed in the first lower edge processing mode.

Here, the formation process of the correction patterns CP1, CP2 and CP3 is explained in detail for the example of the first upper edge, the first intermediate and the first lower edge correction patterns CP1, CP2 and CP3. Note that the following explanations also apply to the second upper edge processing mode, the second intermediate processing mode and the second lower edge processing mode, and since it is clear that the darkness corrections can be carried out in the same manner by executing basically the same basic flow, further explanations have been omitted.

Figure 29A:
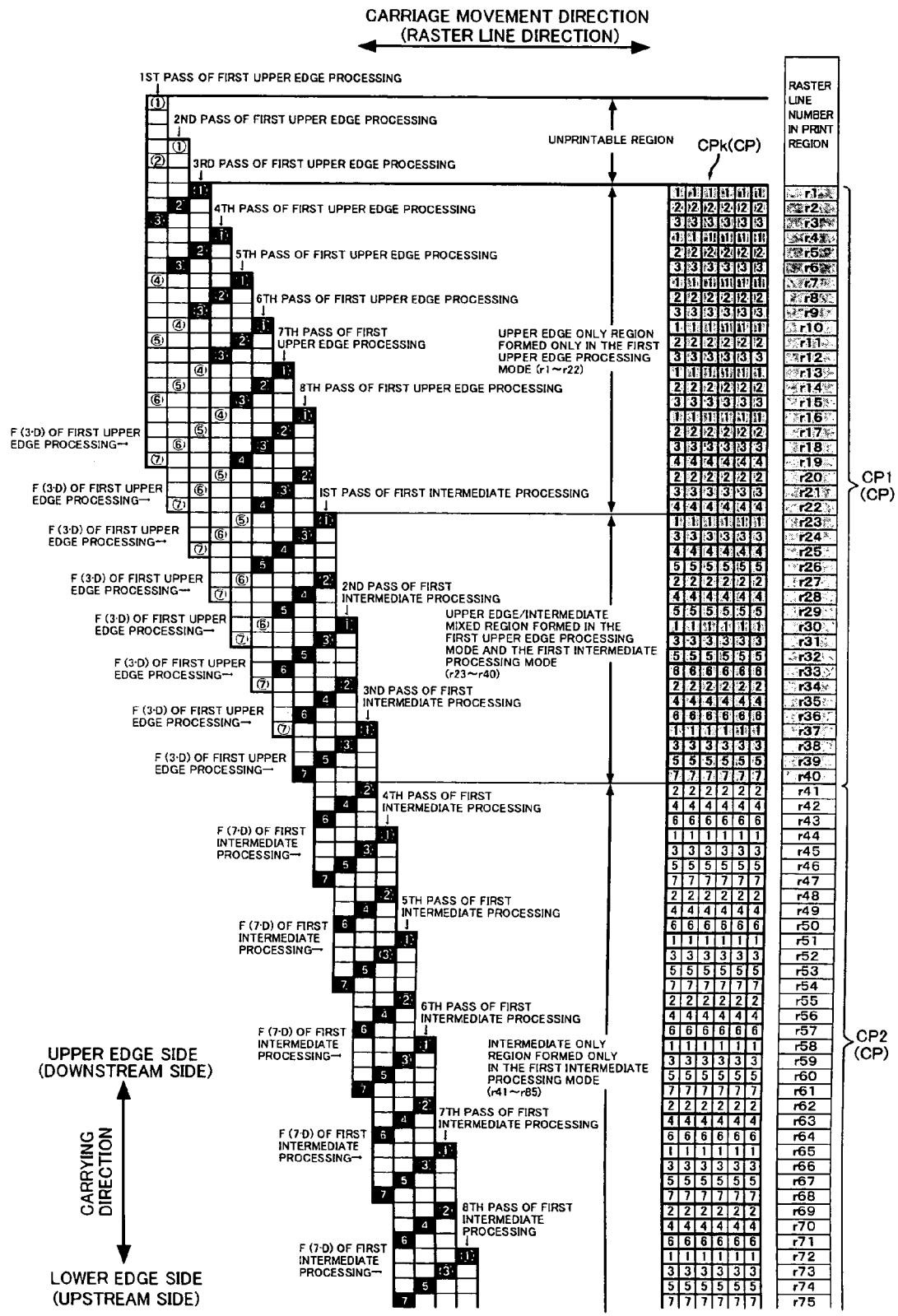
FIG. 29A is a diagram showing by which of the nozzles the raster lines constituting the correction pattern are formed.
Figure 29B:
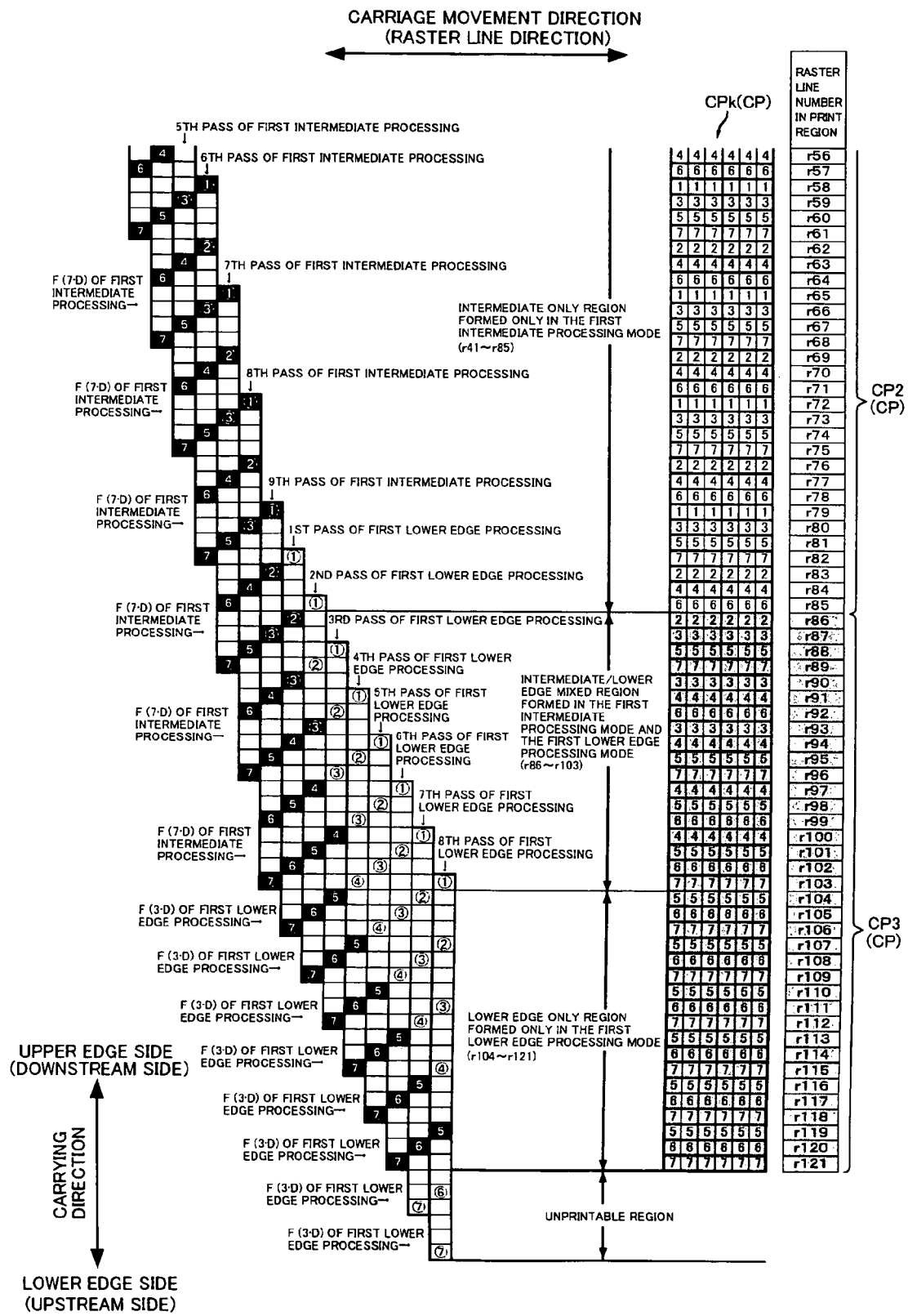
FIG. 29B is a diagram showing by which of the nozzles the raster lines constituting the correction pattern are formed.

FIG. 29A and FIG. 29B show by which nozzles the raster lines constituting the correction patterns CP1, CP2 and CP3 are formed. FIG. 29A shows this for the first upper edge correction pattern CP1 and the first intermediate correction pattern CP2, and FIG. 29B shows this for the first intermediate correction pattern CP2 and the first lower edge processing correction pattern CP3. It should be noted that FIG. 29A and FIG. 29B have the same format as FIG. 21A and FIG. 21B shown above.

In the example shown in the drawings, "first print mode" is set as the print mode, and "first size" is set as the paper size mode. The print data of the correction pattern corresponding to these settings is selected from the memory, and as shown in the right diagrams in FIG. 29A and FIG. 29B, the correction patterns CP1, CP2 and CP3 are printed in the processing modes used for actual printing on the regions at the upper edge portion, the middle portion and the lower edge portion of the paper S.

That is to say, as during the actual printing in FIG. 21A, raster lines are formed in the region r1 to r40 at the upper edge portion of the paper shown in FIG. 29A by eight passes in the first upper edge processing mode, and the raster lines formed in the region r1 to r40 constitute the first upper edge correction pattern CP1. As noted above, the upper edge/intermediate mixed region r23 to r40 within the region r1 to r40 is formed by both the first upper edge processing mode and the first intermediate processing mode, and some of the raster lines r24, r25, r26, r28, r29, r32, r33, r36 and r40 are formed by the first intermediate processing mode, but also these raster lines are treated as constituting the first upper edge correction pattern CP1. That is to say, as shown by the shading in the right diagram, the first upper edge correction pattern CP1 is constituted by raster lines of the upper edge only region r1 to r22 and of the upper edge/intermediate mixed region r23 to r40.

Moreover, as in the actual printing of FIG. 21A and FIG. 21B, the raster lines in the region r23 to r103 are formed by nine passes in the first intermediate processing mode in the middle of the paper shown in FIG. 29A and FIG. 29B. Note, however, that as mentioned above, the raster lines in the upper edge/intermediate mixed region r23 to r40 are treated as constituting the first upper edge correction pattern CP1, and the raster lines of the intermediate/lower edge mixed region r86 to r103 described below are treated as constituting the first lower edge correction pattern CP3. Therefore, the raster lines of the remaining intermediate only region r41 to r85 constitute the first intermediate correction pattern CP2. The right diagram shows the raster lines constituting the first intermediate correction pattern CP2 without shading.

Moreover, as during the actual printing in FIG. 21B, raster lines are formed in the region r86 to r121 at the lower edge portion of the paper shown in FIG. 29B by eight passes in the first lower edge processing mode, and the raster lines formed in this region r86 to r121 constitute the first lower edge correction pattern CP3. As mentioned above, the intermediate/lower edge mixed region r86 to r103 in the region r86 to r121 is formed by both the first lower edge processing mode and the first intermediate processing mode, and some of the raster lines r87, r88, r89, r91, r92, r95, r96, r99 and r103 are formed by the first intermediate processing mode, but also these raster lines are treated as constituting the first lower edge correction pattern CP1. That is to say, as shown by the shading in the right diagram, the first lower edge correction pattern CP3 is constituted by raster lines of the intermediate/lower edge mixed region r86 to r103 and of the lower edge only region r104 to r121.

Here, paying attention to the combinations of nozzles forming adjacent raster lines in these correction patterns CP1, CP2 and CP3, these combinations are obviously the same as the combinations during actual printing, as can be seen from comparing them with the right side in FIG. 21A and FIG. 21B, which show the combination of nozzles during actual printing. That is to say, the combination of nozzles forming adjacent raster lines in the regions r1 to r40 of the first upper edge correction pattern CP1 as shown on the right side in FIG. 29A and FIG. 29B is the same as the combination of nozzles in the region r1 to r40 printed in the first upper edge processing mode during actual printing, as shown on the right side in FIG. 21A. Similarly, the combination of nozzles in the intermediate only region r41 to r85 of the first intermediate correction pattern CP2 as shown on the right side in FIG. 29A and FIG. 29B is the same as the combination of nozzles in the intermediate only region r41 to r85 printed in only the first intermediate processing mode during actual printing, as shown on the right side in FIG. 21A and FIG. 21B. Likewise, the combination of nozzles in the region r86 to r121 of the first lower edge correction pattern CP3 as shown on the right side in FIG. 29B is the same as the combination of nozzles in the region r86 to r121 printed in the first lower edge processing during actual printing, as shown on the right side in FIG. 21B.

Consequently, it can be seen that it is possible to reliably inhibit darkness non-uniformities of the image during actual printing, by correcting the darkness of each of the raster lines individually based on the correction patterns CP1, CP2 and CP3 formed for each of the processing modes.

It should be noted that the paper size used for printing the correction patterns CP in this example has been taken to be the first size, that is, a size of 110·D in the carrying direction, in order to reproduce the same carrying operation and dot formation operation as during actual printing. Consequently, a portion at the uppermost edge and the lowermost edge of the print region r1 to r121 (mainly the portion that corresponds to the abandonment region) cannot be actually printed at this paper size, so that there are cases in which the correction patterns CP for this portion cannot be obtained.

In this case, a paper that is longer than, for example, 120·D should be used, such that all of the print region r1 to r121 can be covered with respect to the carrying direction. Then, the correction pattern printed on the paper of at least 120·D length is used as the correction patterns CP for the region that is abandoned, whereas the correction patterns CP printed on the paper of the first size can be used as the correction patterns CP for the portion outside the abandonment region.

(2) Step S122: Measuring the Darkness of the Correction Pattern for Each Raster Line The darkness of the correction patterns CP1, CP2 and CP3 shown in FIG. 29A and FIG. 29B is measured for each raster line by a darkness measurement device that optically measures this darkness. This darkness measurement device is capable of measuring the average darkness of a predetermined number of pixels in the raster line direction for each raster line individually. An example of such a device is a scanner as known in the art. It should be noted that the reason why the darkness of the raster lines is evaluated by the average darkness of a predetermined number of pixels is because even if the gradation values of all the pixels are equalized, the size of the dots that are formed in the pixels will differ from pixel to pixel due to the halftone processing. That is, one pixel will not necessarily be representative of the darkness of the entire raster line.

Figure 30A:
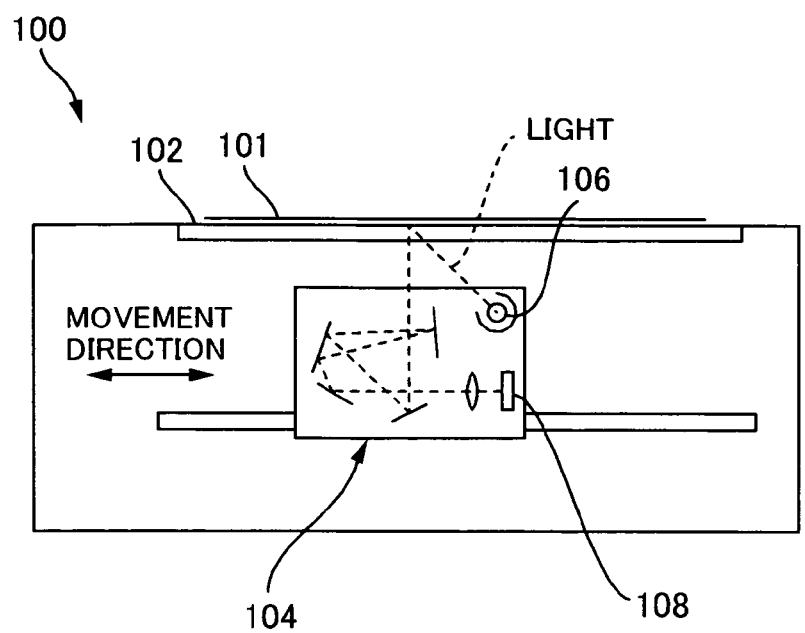
FIG. 30A is a cross-sectional view of a scanner.
Figure 30B:
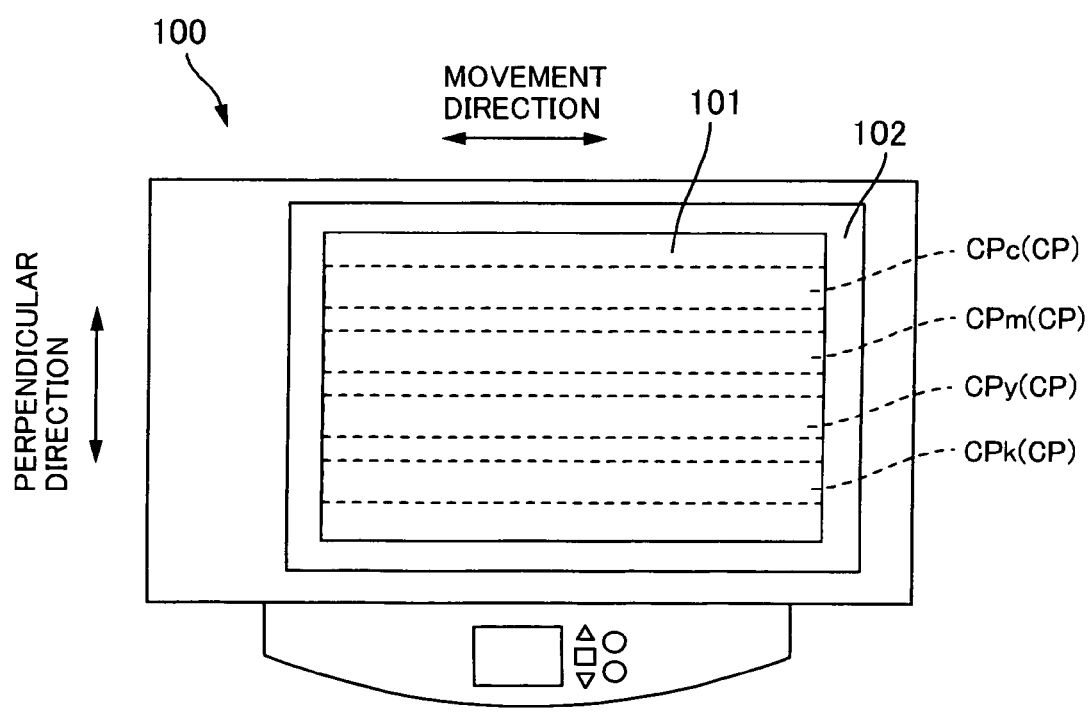
FIG. 30B is a top view thereof.

FIG. 30A and FIG. 30B show, respectively, a vertical cross-sectional view and a top view of the scanner. The scanner 100 includes a document glass 102 on which a document 101 is placed, and a reading carriage 104 that faces the document 101 via this document glass 102 and that moves in a predetermined movement direction. The reading carriage 104 is provided with an exposure lamp 106 that irradiates light onto the document 101 and a linear sensor 108 for receiving the light that is reflected by the original document 101 over a predetermined range in a direction that is perpendicular to the movement direction. An image is read from the document 101 at a predetermined read resolution, while moving the reading carriage 104 in the movement direction. It should be noted that the dashed line in FIG. 30A indicates the path of the light.

As shown in FIG. 30B, the paper serving as the document 101, on which the correction patterns CP have been printed, is placed on the document glass 102, aligning its raster lines with the perpendicular direction. Thus, the average darkness of a predetermined number of pixels in the raster line direction can be read for each raster line individually. It is preferable that the reading resolution in the movement direction of the reading carriage 104 is several integer multiples narrower than the pitch of the raster lines. Thus, it is easy to correlate the measured darkness values that have been read in with the raster lines.

Figure 31:
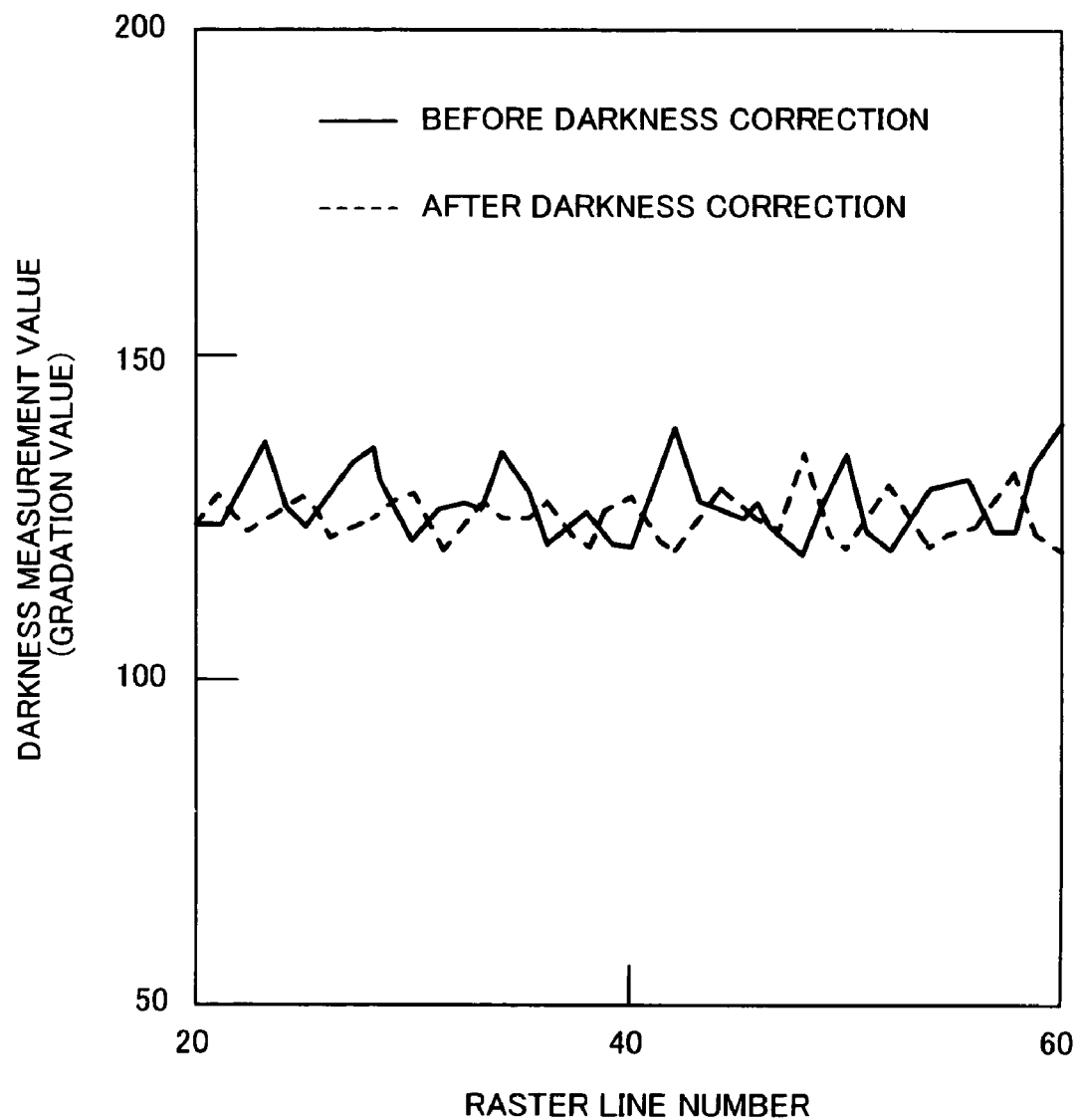

FIG. 31 shows an example of the measured darkness values of the correction pattern CPk. The horizontal axis of FIG. 31 denotes the raster line number and the vertical axis denotes the measured darkness value. The solid line in the figure denotes the measurement values, and, for reference, the measurement values after the darkness correction according to the second reference example are also indicated by the broken line.

Even though printing was performed at a gradation value of the same darkness across all raster lines constituting the correction pattern CPk, the measurement values indicated by the solid line vary greatly for each raster line. These are the darkness non-uniformities caused by the above-noted variations in the ink ejection direction. That is to say, the darkness of raster lines where the spacing of the adjacent raster lines is narrow is measured to be large, whereas the darkness of raster lines where this spacing is wide is measured to be low.

In this second reference example, by performing the later-described darkness correction during the actual printing, the raster lines corresponding to those raster lines where the measurement value is large are corrected so that their macroscopic darkness becomes smaller by making for example the dot creation ratio (corresponds to the above-noted level data) of the dots constituting the corresponding raster line smaller, whereas conversely the raster lines corresponding to those raster lines where the measurement value is small are corrected so that their macroscopic darkness becomes higher by making the dot creation ratio of the dots constituting those raster line higher. As a result, darkness non-uniformities in the image are inhibited. Incidentally, when the correction pattern CPk for black (K) is printed while performing the later-described darkness correction, then the measurement result of that darkness is that the variations among the raster lines have been inhibited to smaller measurement values, as shown by the dashed line in FIG. 31.

The scanner 100 is communicably connected to the printer 1. Moreover, the measurement values of the darkness of the correction pattern read with the scanner 100 are recorded in a recording table arranged in the memory of the computer 1100, in association with the raster line numbers. It should be noted that the darkness measurement values output from the scanner 100 are grey-scale values (that is, data not representing image information but only brightness) represented by 256 gradation values. Here, the reason for using this grey-scale is that if the measurement values include color information, then a further process for expressing the measurement values by gradation values of that ink color must be performed, so that the processing becomes more complicated.

FIG. 32 is a diagrammatic view of the recording tables, which are divided by ink color and processing mode. The measurement values of the correction patterns CP printed in each section are recorded in the corresponding recording table.

FIGS. 33A to 33C show the recording tables for the first upper edge processing mode, the first intermediate processing mode and the first lower edge processing mode, respectively, taking black (K) as a representative example. These recording tables each have records for recording the measurement values. A record number is given to each record, and the measurement values of the raster lines for low numbers in the corresponding correction patterns CP1, CP2, and CP3 are successively recorded starting with the records of low numbers. It should be noted that three asterisks "***" in FIGS. 33A to 33C denote a state in which a measurement value is recorded in the record, whereas a blank field denotes a state in which no record is made.

In the recording table for the first upper edge processing mode shown in FIG. 33A, the measurement values for the raster lines of the first upper edge correction pattern CP1 are recorded. It should be noted that, as mentioned before, this first upper edge correction pattern CP1 is constituted by the raster lines of the upper edge only region r1 to r22 and the upper edge/intermediate mixed region r23 to r40 shown in FIG. 29A, so that the measurement values of the raster lines of the upper edge only region and the intermediate mixed region are recorded in this recording table. Now, since there are 40 raster lines in these regions, the measurement values are recorded in the region from the first record to the 40th record in this recording table.

In the recording table for the first intermediate processing mode shown in FIG. 33B, the measurement values for the raster lines of the first intermediate correction pattern CP2 are recorded. As mentioned before, this first intermediate correction pattern CP2 is constituted by the raster lines of the intermediate only region r41 to r85 shown in FIG. 29A and FIG. 29B, so that the measurement values of the raster lines of the intermediate only region are recorded in this recording table. Now, since there are 45 raster lines in this region, the measurement values are recorded in the region from the first record to the 45th record in this recording table.

In the recording table for the first lower edge processing mode shown in FIG. 33C, the measurement values for the raster lines of the first lower edge correction pattern CP3 are recorded. As mentioned before, this first lower edge correction pattern CP3 is constituted by the raster lines of the intermediate/lower edge mixed region r86 to r103 and the lower edge only region r104 to r121 shown in FIG. 29B, so that the measurement values of the raster lines of the intermediate/lower edge mixed region and the lower edge only region are recorded in this recording table. Now, since there are 36 raster lines in these regions, the measurement values are recorded in the region from the first record to the 36th record in this recording table.

(3) Step S123: Setting the Darkness Correction Values for Each Raster Line

Figure 34:
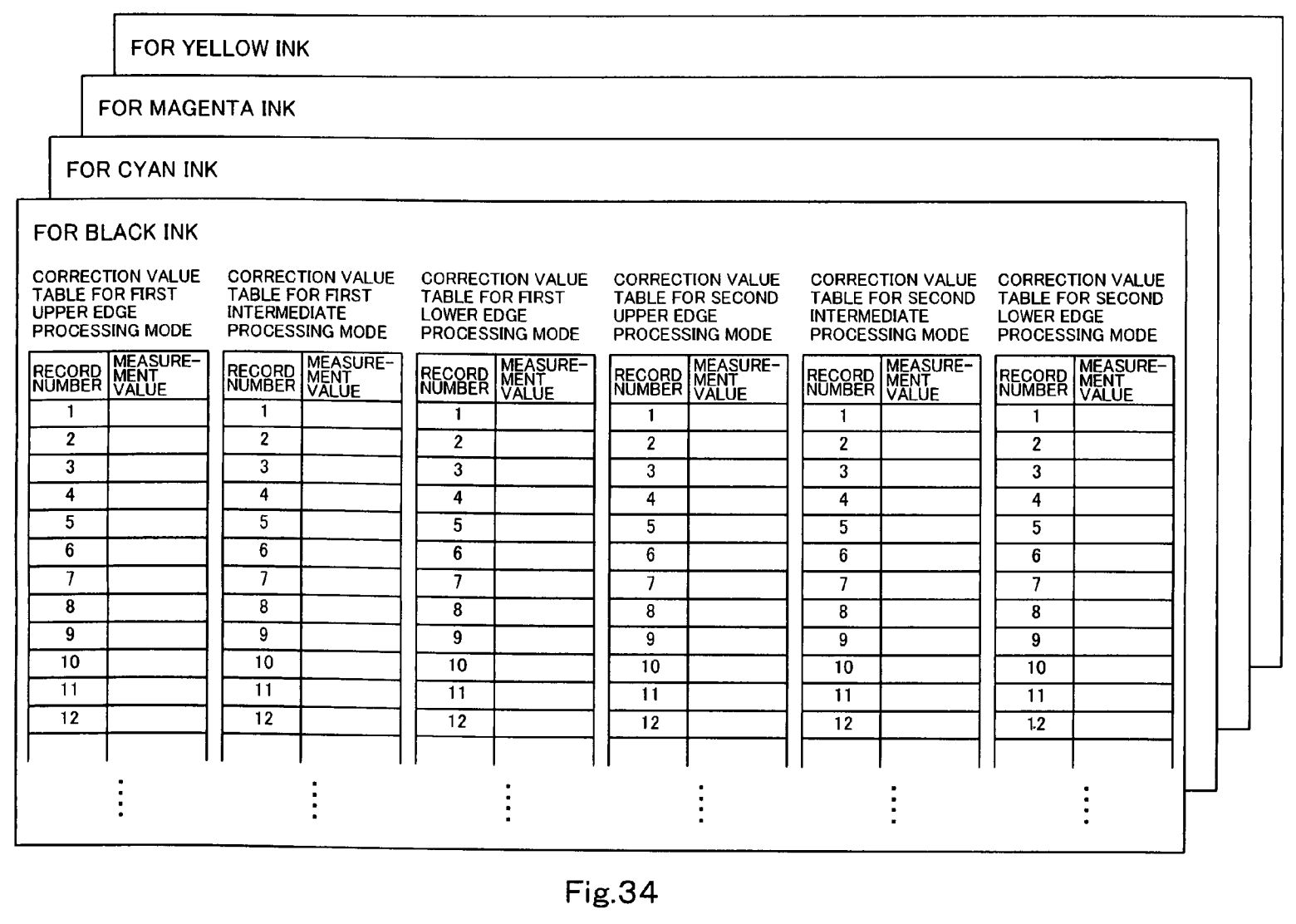

Next, the computer 1100 calculates the darkness correction values based on the measurement values that have been recorded in the records of the recording tables, and sets the correction values in the correction value tables in the memory 63 of the printer 1. FIG. 34 is a diagrammatic view of these correction value tables, which are divided by ink color and processing mode, just like the aforementioned recording tables.

FIGS. 35A to 35C show the correction value tables for the first upper edge processing mode, the first intermediate processing mode and the first lower edge processing mode for black (K), respectively, as representative examples of the correction value tables. These correction value tables each have records for recording the correction values. Each record is assigned a record number, and a correction value calculated based on the measurement values is recorded in the record having the same record number as the record for those measurement values.

For example, in the records from the first record to the 40th record of the correction value table for the first upper edge processing mode shown in FIG. 35A, the correction values calculated based on the measurement values recorded from the first record to the 40th record of the recording table for the first upper edge processing mode are recorded. That is to say, the correction values corresponding to the upper edge only region and the upper edge/intermediate mixed region are recorded in this correction value table.

Similarly, in the records from the first record to the 45th record of the correction value table for the first intermediate processing mode shown in FIG. 35B, the correction values calculated based on the measurement values recorded from the first record to the 45th record of the recording table for the first intermediate processing mode are recorded. That is to say, the correction values corresponding to the intermediate only region are recorded in this correction value table.

Furthermore, in the records from the first record to the 36th record of the correction value table for the first lower edge processing mode shown in FIG. 35C, the correction values calculated based on the measurement values recorded from the first record to the 36th record of the recording table for the first lower edge processing mode are recorded. That is to say, the correction values corresponding to the intermediate/lower edge mixed region and the lower edge only region are recorded in this correction value table.

These correction values are obtained in the format of a correction ratio indicating the ratio of correction with respect to the darkness gradation value. More specifically, they are calculated as follows. First, an average value M of the measurement values recorded in the recording tables is calculated for each of the recording tables, and the calculated average values are taken as a target value M of the darkness for each recording table. Then, for each measurement value C in the recording tables, the deviation $\Delta C$ (=M–C) between this target value M and the measurement value C is calculated, and the value obtained by dividing the deviation $\Delta C$ by the target value M is taken as the correction value H. That is to say, this correction value H can be expressed by the following mathematical equation 1:

$$\text{correction value } H = \Delta C / M \qquad \text{(Eq. 1)}$$
$$= (M - C)/M$$

Then, using this correction value H, it is possible to perform such a correction on the raster lines for which the measurement value C is higher than the target value M so that the darkness of those raster lines is reduced to the target value M. For example, if the measurement value C of a raster line is 105 and the target value M is 100, then the correction value H (=(100−105)/100) is −0.05, and the darkness of the printed raster line can be set closer to the target value M =100 by reducing the gradation value of the darkness of this raster line by a factor of 0.05 when printing. It is also possible to perform such a correction on the raster lines for which the measurement value C is lower than the target value M so that the darkness of those raster lines is increased to the target value M. For example, if the measurement value C of a raster line is 95 and the target value M is 100, then the correction value H (=(100−95)/100) is +0.05, and the darkness of the printed raster line can be set closer to the target value M=100 by increasing the gradation value of the darkness of this raster line by a factor of 0.05 when printing.

Thus, by using this correction value H to perform darkness correction, which is discussed later, variations in the darkness of each raster line can be made small for each ink color and processing mode, thus making it possible to inhibit darkness non-uniformities.

<Step S140: Actual Printing of the Image While Performing Darkness Correction for Each Raster Line>When the darkness correction values are set in this manner, the printer 1 can inhibit darkness non-uniformities when printing, by performing a darkness correction for each raster line at the time of printing, using the correction value tables arranged for each ink color and for each processing mode. It should be noted that this darkness correction for each raster line is achieved by correcting the pixel data based on the correction values when the printer driver 1110 converts the RGB image data into print data. That is to say, as noted above, the pixel data is ultimately turned into 2-bit pixel data indicating the size of the dots formed on the paper, and the macroscopic darkness of the raster lines printed based on this data is changed by changing this 2-bit pixel data.

(1) Darkness Correction Procedure

Figure 36:
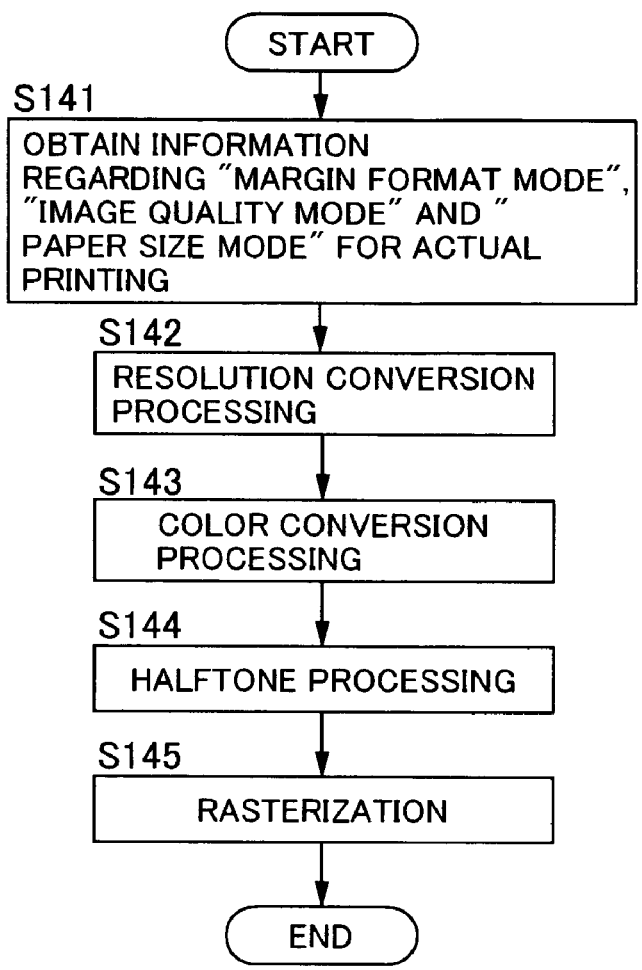

FIG. 36 is a flowchart showing the procedure for correcting the darkness of each raster line in Step S140 of FIG. 26. Hereinafter, the darkness correction procedure is described with reference to this flowchart.

Step S141: First, the user communicably connects the printer 1 that he has purchased to his computer 1100, establishing a printing system as illustrated in FIG. 1. The user then inputs the margin format mode, the image quality mode, and the paper size mode through the user interface screen of the printer driver 1110 in the computer 1100. With this input, the printer driver 1110 obtains information on these modes, for example. In the following explanations, it is assumed that "high" is input as the image quality mode, "borderless" is input as the margin format mode, and the above-noted "first size" is input as the paper size mode.

Step S142: Next, the printer driver 1110 subjects the RGB image data that has been output from the application program 1104 to a resolution conversion process. That is to say, the resolution of the RGB image data is converted to the print resolution corresponding to the image quality mode, and moreover, the number of pixels in the RGB image data is adjusted to be matched to the dot number of the print region corresponding to the paper size and the margin format mode by trimming the RGB image data as appropriate.

Figure 37:
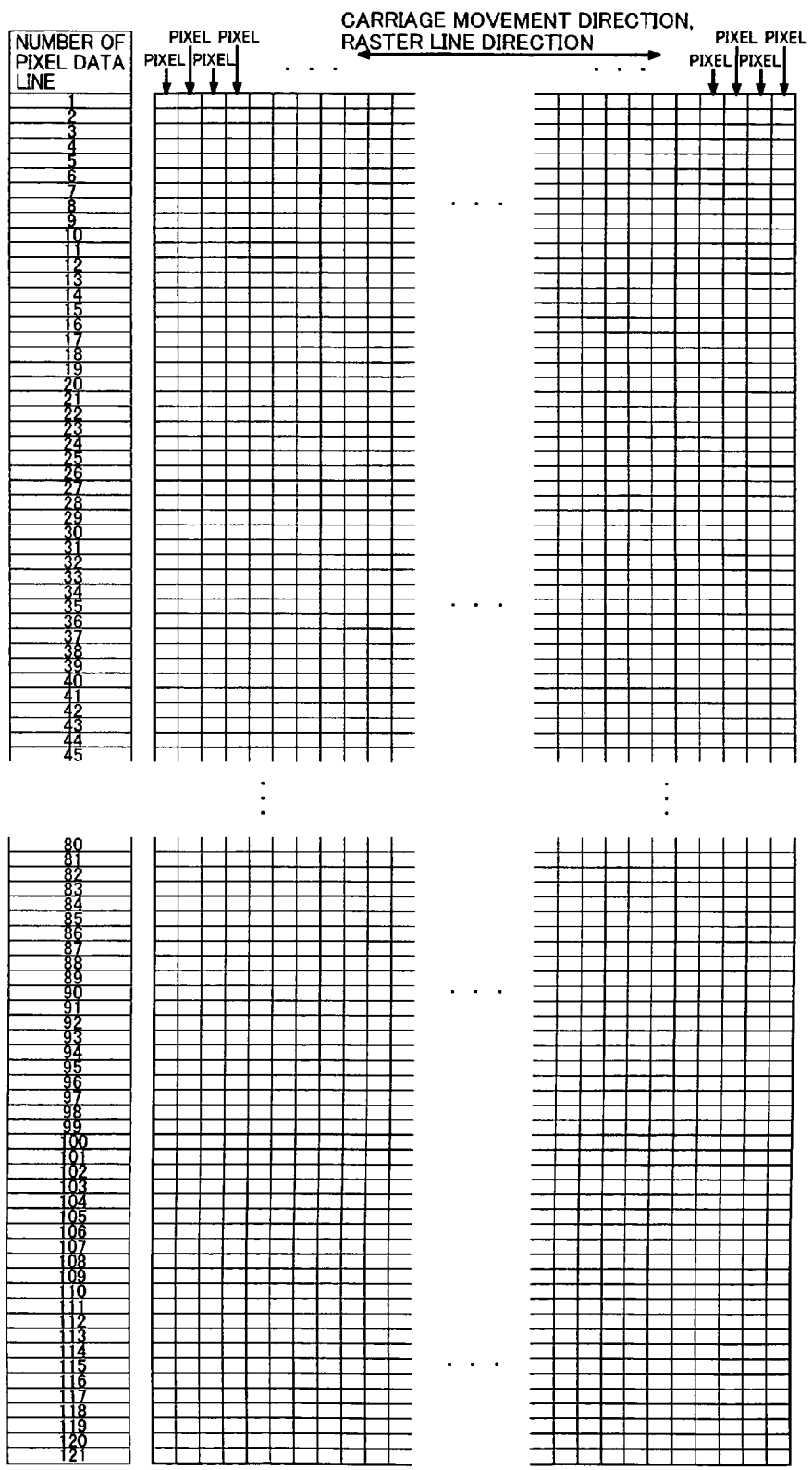

FIG. 37 is a diagrammatic view showing an array of pixel data according to the RGB image data after the resolution conversion process. Each of the squares in the figure represents a pixel of 720×720 dpi size, and each pixel has pixel data. Here, "high" has been input as the image quality mode, so that the resolution of the RGB image data is converted to 720×720 dpi. Also, "first size" has been input as the paper size mode and "borderless" has been input as the margin format mode, so that the size of the print region is 121·D in the carrying direction, and the RGB image data corresponding to this is processed to a pixel number of 121 pixels in the carrying direction. That is to say, the RGB image data is processed to a state in which there are 121 pixel data rows constituted by data for a plurality of pixels running in the direction of the raster lines.

It should be noted that the pixel data rows are data for forming the raster lines in the print region r1 to r121 of the image. That is to say, the first pixel data row is the data of the uppermost first raster line r1 of the print region r1 to r121, and the second pixel data row is the data of the second raster line r2. From there on, the pixel data rows correspond numerically to the raster lines, and the last, 121st pixel data row is the data of the lowermost, 121st raster line r121 of the print region r1 to r121.

Step S143: Next, the printer driver 1110 performs the above-described color conversion to convert the RGB image data into CMYK image data. As mentioned above, the CMYK image data includes C image data, M image data, Y image data, and K image data, and these C, M, Y, and K image data are each made of 121 rows of pixel data.

Step S144: Next, the printer driver 1110 performs halftone processing. Halftone processing is processing for converting the 256 gradation values given by the pixel data in the C, M, Y, and K image data into gradation values of four gradations. It should be noted that the pixel data of these four gradation values is 2-bit data indicating "no dot formation," "small dot formation," "medium dot formation," and "large dot formation."

Then, in this second reference example, the darkness correction is performed for each raster line during halftone processing. In other words, the conversion of the pixel data constituting the image data from 256 gradations to one of four gradations is performed while correcting the pixel data by an amount corresponding to the correction value. Darkness correction is performed for each of the C, M, Y, and K image data values based on the correction value table for each ink color, but here the K image data for black (K) is described as representative image data. Moreover, in the above-noted color conversion process, the array of the pixel data does not change, so that in the following explanations, FIG. 37 is used also as the figure representing the array of the pixel data of the K image data.

First, the printer driver 1110 references the first reference table (FIG. 19) using the margin format mode and the image quality mode as the key to obtain the corresponding print mode. The printer driver 1110 then references the second reference table (FIG. 20) using the print mode as the key to specify the processing mode to be used during actual printing of the image.

If a single processing mode is specified, then the correction value table for that processing mode is used to correct the pixel data rows in the K image data.

On the other hand, if a plurality of processing modes have been specified, then the regions that are to be printed by each processing mode are specified in accordance with the paper size mode. Then, the correction value table for each processing mode is used to correct the image data rows corresponding to the regions to be printed by that processing mode.

It should be noted that the information on the regions that are printed by the processing modes is recorded in a region determination table. The region determination table is stored in the memory in the computer 1100, and the printer driver 1110 references this region determination table to specify the region that is printed by each processing mode.

For example, as shown in FIG. 21A, the upper edge only region and the upper edge/intermediate mixed region that are printed by the first upper edge processing mode are formed in a fixed number of eight passes as discussed above, and thus it is known in advance that this region will have 40 raster lines from the uppermost edge of the print region downstream. Consequently, "region from uppermost edge of print region to the 40th raster line" is recorded in the region determination table in association with the first upper edge processing mode.

Similarly, as shown in FIG. 21B, the intermediate/lower edge mixed region and the lower edge only region printed through the first lower edge processing mode are formed in a fixed number of eight passes as discussed above, and thus it is known in advance that this region will have 36 raster lines from the lowermost edge of the print region upward. Consequently, "region from lowermost edge of the print region to the 36th raster line on upper edge side thereof" is recorded in the region determination table in association with the first lower edge processing mode.

Next, as shown in FIG. 21A and FIG. 21B, the intermediate only region that is printed through the first intermediate processing mode only is the region that continues toward the lower edge from the region that is printed by the first upper edge processing mode described above, and is also the region that continues toward the upper edge from the region that is printed by the first lower edge processing mode described above. Thus, the intermediate only region is known in advance to be the region that is sandwiched by the 41st raster line toward the lower edge from the uppermost edge of the print region and the 37th raster line toward the upper edge from the lowermost edge of the print region. Consequently, "region sandwiched by the 41st raster line toward the lower edge from the uppermost edge of the print region and the 37th raster line toward the upper edge from the lowermost edge of the print region" is recorded in the region determination table in association with the first intermediate processing mode.

In this example, the modes are "borderless" and "high," and thus the printer driver 1110 references the first and second reference tables shown in FIG. 19 and FIG. 20 and specifies "first print mode" as the print mode, and specifies the three corresponding processing modes of first upper edge processing mode, first intermediate processing mode, and first lower edge processing mode as the corresponding processing modes for the actual printing.

Also, because the paper size mode is "first size" the print region during the actual printing is 121·D in the carrying direction, and as discussed above, because three processing modes are specified, the regions that are printed by the respective processing modes are specified by referencing the region determination table, and the pixel data rows corresponding to the respective regions are corrected.

For example, the upper edge only region and the upper edge/intermediate mixed region that are printed through the first upper edge processing mode are specified from the region determination table as the region r1 to r40 within the print region r1 to r121. The data of the raster lines of the region r1 to r40 are the pixel data rows from the first row to the 40th row of the K image data. On the other hand, the correction values corresponding to the upper edge only region and the upper edge/intermediate mixed region are recorded in the first through 40th records in the correction value table for the first upper edge processing mode. Consequently, the pixel data making up each pixel data row are corrected while correlating the correction values of the first through 40th records of the correction value table for the first upper edge processing mode successively with the first through 40th pixel data rows.

Similarly, the intermediate/lower edge mixed region and the lower edge only region that are printed in the first lower edge processing mode are specified as the region r86 to r121 within the print region r1 to r121, based on the region determination table. The data of the raster lines of the region r86 to r121 are the pixel data rows from the 86th row to the 121st row of the K image data. On the other hand, the correction values corresponding to the intermediate/lower edge mixed region and the lower edge only region are recorded in the first through 36th records of the correction value table for the first lower edge processing mode. Consequently, the pixel data making up each pixel data row are corrected while correlating the correction values of the first through 36th records of the correction value table for the first lower edge processing mode successively with the first through 36th pixel data rows.

The intermediate only region, which is printed in the first intermediate processing mode only, is specified as the region r41 to r85 of the print region r1 to r121 based on the region determination table. The data of the raster lines of the region r41 to r85 are the pixel data rows of the 41st to 85th rows in the K image data. On the other hand, the correction values corresponding to the intermediate only region are recorded in the first through 45th records of the correction value table for the first intermediate processing mode. Consequently, the pixel data making up each pixel data row is corrected while correlating the correction values of the first through 45th records of the correction value table for the first intermediate processing mode successively with the 41st through 85th pixel data rows.

As mentioned above, the number of passes of the first intermediate processing mode is not fixed like that of the first upper edge processing mode, for example, but changes depending on the paper size mode that has been input. Therefore, the number of pixel data rows in the intermediate only region varies. The correction value table for the first intermediate processing mode includes correction values for only the fixed number of 45 records from the first record through the 45th record, creating a risk that the number of correction values may become insufficient in the latter half of corresponding them to a pixel data row.

This is dealt with by utilizing the periodicity of the combination of nozzles forming adjacent raster lines. In other words, as shown in the right diagrams of FIG. 21A and FIG. 21B, the order of the nozzles forming the raster lines in the intermediate only region r41 to r85, which is printed by only the first intermediate processing mode, in a single cycle is #2, #4, #6, #1, #3, #5, and #7, and this cycle is repeated. This cycle is increased by one cycle each time the pass number of the first intermediate processing mode increases by one pass. Consequently, it is possible to use the correction values of this one cycle for row numbers that do not have a corresponding correction value. That is, the correction values from the first record to the seventh records, for example, corresponding to the correction values of this one cycle can be used repeatedly for however many correction values are insufficient.

Incidentally, in the above explanation of Step S144, the method for correcting the pixel data based on the correction values has not been explained in detail, and will be discussed later.

Step S145: Next, the printer driver 1110 performs a rasterization process. The rasterized print data is output to the printer 1, and the printer 1 performs actual printing of the image on paper in accordance with the pixel data of the print data. It should be noted that as discussed above, the darkness of the pixel data has been corrected for each raster line individually, so that darkness non-uniformities in the image can be inhibited.

(2) Regarding the Method for Correcting the Pixel Data Based on the Correction Values Next, a method for correcting the pixel data based on the correction values is described in detail.

As mentioned above, pixel data having 256 gradation values are converted through halftone processing into pixel data having four gradation values representing "no dot formation," "small dot formation," "medium dot formation," and "large dot formation". During this conversion, the 256 gradations are first substituted with level data and then converted into four gradations values.

Accordingly, in the second reference example, at the time of this conversion, the level data are changed by an amount corresponding to the correction value so as to correct the pixel data of gradation values having four gradations, thus realizing a "correction of pixel data based on the correction values."

It should be noted that the halftone processing in this second reference example differs from the halftone processing that has been described using FIG. 3 with regard to steps S301, S303, and S305 for setting the level data, but otherwise the two are the same. Consequently, the following description focuses on this difference, and aspects that are the same are described only summarily. Also, the following description refers to the flowchart of FIG. 3 and the dot creation ratio table of FIG. 4.

First, as in ordinary halftone processing, the printer driver 1110 obtains the K image data in Step S300. It should be noted that at this time the C, M, and Y image data also are obtained, but because the following description can be applied to any of the C, M, and Y image data as well, the description is made with the K image data as representative image data.

Next, in Step S301, for each pixel data value, the level data LVL corresponding to the gradation value of that pixel data is read in from the large dot profile LD of the creation ratio table. However, in this second reference example, when reading the level data LVL, the gradation values are shifted by the correction value H corresponding to the pixel data row to which the pixel data belong.

For example, if the gradation value of the pixel data is gr and the pixel data row to which that pixel data belongs is the first row, then that pixel data row is correlated with the correction value H of the first record in the correction value table for first upper edge processing. Consequently, the level data LVL is read while shifting the gradation value gr by a value Δgr (=gr×H) that is obtained by multiplying the correction value H by the gradation value gr, obtaining a level data LVL of 11*d*.

In step S302, it is determined whether or not the level data LVL of this large dot is greater than the threshold value THL of the pixel block corresponding to that pixel data on the dither matrix. Here, the level data LVL has been changed by an amount corresponding to Δgr (=gr×H), in accordance with the correction value H. Consequently, the result of this size determination is changed by that amount of change, and thus the ease with which a large dot is formed also changes, thus achieving the "correction of pixel data in accordance with the correction value" mentioned above.

It should be noted that if in Step 302 the level data LVL is higher than the threshold value THL, then the procedure advances to Step S310 and a large dot is recorded in association with that pixel data. Otherwise the procedure advances to Step S303.

In Step S303, the level data LVM corresponding to the gradation value is read from the medium dot profile MD of the creation ratio table, and also at this time, as in Step S301, the level data LVM is read while shifting the gradation value by an amount corresponding to the correction value H.

For example, the level data LVM is read while shifting the gradation value gr by a value Δgr (=gr×H) that is obtained by multiplying the correction value H by the gradation value gr, obtaining a level data LVM of 12*d*. Then, in step S304, it is determined whether or not the level data LVM of this medium dot is greater than the threshold value THM of the pixel block corresponding to that pixel data on the dither matrix. Here, the level data LVM has been changed by an amount corresponding to Δgr, in accordance with the correction value H. Consequently, the result of this size determination is changed by that amount of change, and thus the ease with which a medium dot is formed also changes, thus achieving the "correction of pixel data in accordance with the correction value" mentioned above.

It should be noted that if in Step 304 the level data LVM is higher than the threshold value THM, then the procedure advances to Step S309 and a medium dot is recorded in association with that pixel data. Otherwise the procedure advances to Step S305.

In Step S305, the level data LVS corresponding to the gradation value is read from the small dot profile SD of the creation ratio table, and also at this time, as in Step S301, the level data LVS is read while shifting the gradation value by an amount corresponding to the correction value H.

For example, the level data LVS is read while shifting the gradation value gr by a value Δgr (=gr×H) that is obtained by multiplying the correction value H by the gradation value gr, obtaining a level data LVS of 13*d*. Then, in step S306, it is determined whether or not the level data LVS of this small dot is greater than the threshold value THS of the pixel block corresponding to that pixel data on the dither matrix. Here, the level data LVS has been changed by an amount corresponding to Δgr, in accordance with the correction value H. Therefore, the result of this size determination is changed by that amount of change, and thus the ease with which a small dot is formed also changes, thus achieving the "correction of pixel data in accordance with the correction value" mentioned above.

It should be noted that if in Step 306 the level data LVS is higher than the threshold value THS, then the procedure advances to Step S308, and a small dot is recorded in association with that pixel data. Otherwise the procedure advances to Step S307 and no dot is recorded corresponding to that pixel data.

(3) Regarding the "Darkness Correction Procedure" in the Case that the Second Print Mode has been Set In the explanation of "(1) Darkness Correction Procedure", an example was given of a case in which the first print mode was set, but here, the case that the second print mode is set is explained.

This corresponds to the case that the user has entered "bordered" as the margin format mode and "high" as the image quality mode in the interface of the printer driver 1110. Then, the printer 1 performs printing only in the first intermediate processing mode shown in FIG. 19, and prints a bordered image with a print resolution of 720×720 dpi on paper.

Step S141: First, the printer driver 1110 obtains "high" as the image quality mode, "borderless" as the margin format mode and "first size" as the paper size mode, through input from the user interface of the printer driver 1110.

Figure 38:
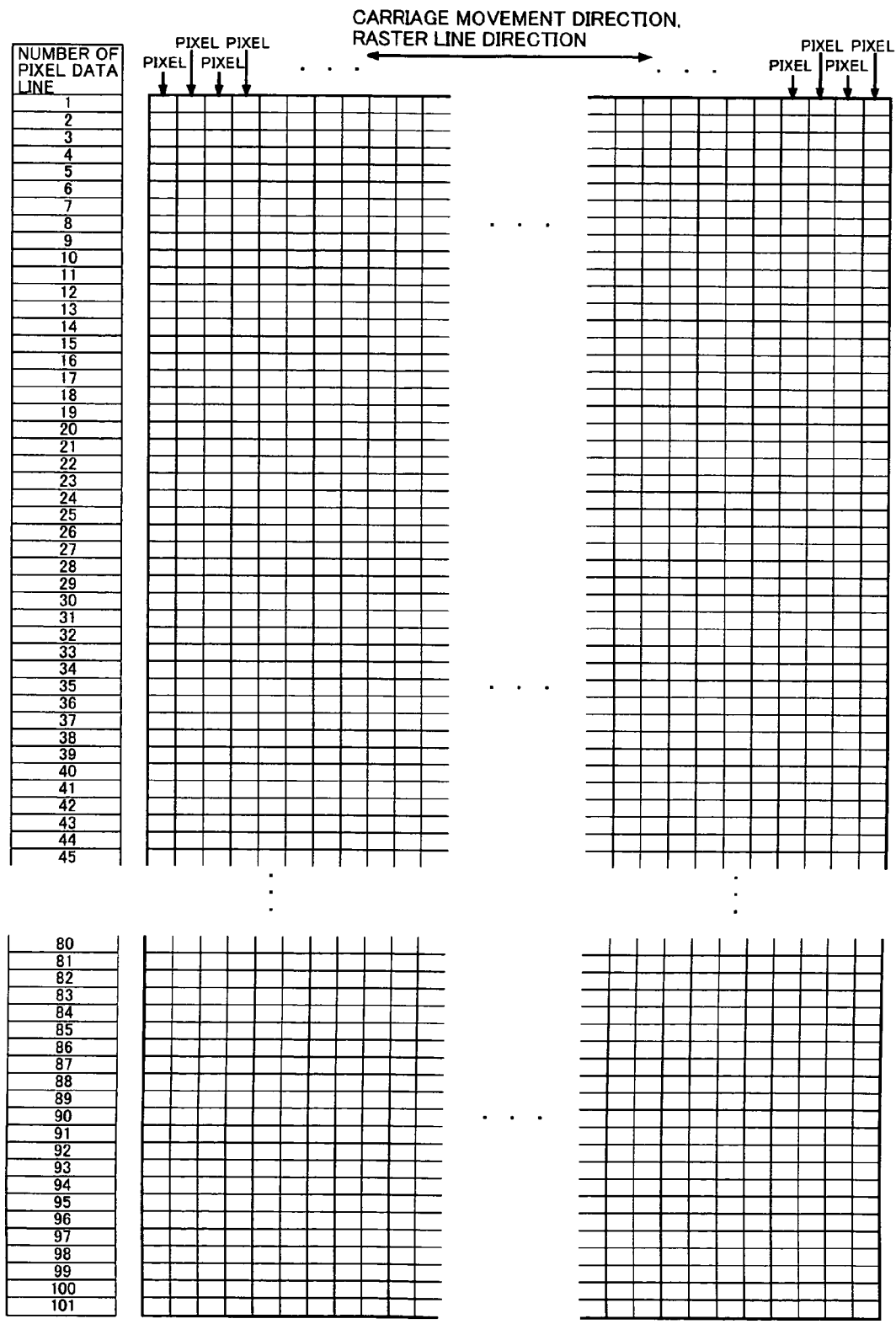

Step S142: Next, the printer driver 1110 performs a resolution conversion process. FIG. 38 is a diagrammatic view showing an array of pixel data according to the RGB image data after the resolution conversion process. In accordance with the "high" mode, the resolution of the RGB image data is converted to 720×720 dpi. Also, the "first size" and "bordered" print region r1 to r101 has the size 101·D in the carrying direction, and the RGB image data corresponding to this is processed to 101 pixel data rows.

Step S143: Next, the printer driver 1110 performs a color conversion to convert the RGB image data into CMYK image data. As above, the following is an explanation for the K image data as representative of CMYK image data. It should be noted that the K image data has 101 pixel data rows, just like the RGB image data.

Step S144: Next, the printer driver 1110 performs halftone processing. As in the previous examples, darkness correction is performed for each raster line individually during this halftone processing. The following explanation uses FIG. 38 as the figure representing the pixel array of the K image data.

First, the printer driver 1110 references the first reference table (FIG. 19) using "bordered" and "high" as the key to specify that the corresponding print mode is the second print mode. The printer driver 1110 then references the second reference table (FIG. 20) using this second print mode as the key to specify that only the first intermediate processing mode is to be used during actual printing of the image. That is to say, in this case, it is specified that the entire print region is the intermediate only region. Therefore, there is no need to specify the regions printed by processing mode through referring to the region determination table, and thus all pixel data rows of the K image data, which are the data of the entire print region, are corrected using the correction value table for the first intermediate processing mode that stores the correction values corresponding to the intermediate only region.

Here, as can be seen from the right diagrams in FIG. 22A and FIG. 22B, the order of the nozzles forming the raster lines in the print region r1 to 101 is the above-noted cycle, that is, #2, #4, #6, #1, #3, #5, #repeated in that order. Consequently, when correcting the pixel data rows in the K image data, the correction is performed using, in repetition, the correction values from the first record to the seventh record in the correction value table from the first pixel data row to the 101st pixel data row.

Step S145: Next, the printer driver 1110 performs a rasterization process. The rasterized print data is output to the printer 1, and the printer 1 performs actual printing of the image on paper in accordance with the pixel data of the print data. It should be noted that as discussed above, the darkness of the pixel data has been corrected for each raster line individually, so that darkness non-uniformities in the image can be inhibited.

===(1) Regarding the Problem of the "Method for Printing an Image in which Darkness Non-uniformities are Inhibited" of the Second Reference Example===

A problem of the "method for printing an image in which darkness non-uniformities are inhibited" of the second reference example discussed above is the issue of "setting the correction value of the darkness in order to inhibit the darkness non-uniformities." More specifically, it lies in the method for calculating the darkness correction value.

Here, the method for calculating this darkness correction value is explained in simple terms once again. As noted above, in this second reference example, the darkness correction value for each raster line is determined from the following Equation 1.

$$\text{correction value } H = \Delta C / M \quad \text{(Eq. 1)}$$
$$= (M - C)/M$$

Here, C is the measured darkness value of each raster line in the correction pattern. Furthermore, M is the average value of the measurement values across all raster lines.

Then, the pixel data of the image data is corrected using this correction value H, thus correcting the darkness of the raster lines. It should be noted that the gradation values of the pixel data correspond to the command values of the darkness.

More specifically, explaining this with an example for the case that the gradation value of the pixel data is M, the idea is that in the raster lines where the correction value H is $\Delta C/M$, the measurement value C of this darkness is changed through the correction by $\Delta C$ (=H×M) and becomes the target value M. In order for it to change in this way, when reading the level data corresponding to the gradation value M of the pixel data from the dot creation ratio table in FIG. 4, the correction amount $\Delta C$ is calculated by multiplying the gradation value M by the correction value H (=$\Delta C/M$), and the level data is read out while shifting it by this correction amount $\Delta C$ from the gradation value M. Then, the size of the dots to be formed is determined with the level data and the dither matrix (see FIG. 5). At this time, the measurement value C of the darkness of the raster line is corrected by changing the size of the formed dots by an amount corresponding to the change of the level data by $\Delta C$.

However, even if the gradation value M for reading out the level data has been changed by $\Delta C$, there is no guarantee that the darkness measurement value C of the raster line is reliably changed by $\Delta C$ and ultimately becomes the target value M. That is to say, with this correction value H, it is possible to let the measurement value C approach the target value M, but it is not possible to let it approach so much that the two substantially match.

Therefore, it used to be customary to repeat a series of operations of printing correction patterns while changing the correction value H and measuring the darkness thereof, in a manner of trial and error, until the measurement value C becomes the target value, thus finding the optimum correction value H. This operation required a lot of manpower.

Accordingly, in this embodiment, as explained in the following, correction patterns of at least two darknesses are printed with different darkness command values, and the darkness of these correction patterns is measured. The correction value H at which the measurement value C assumes the target value is calculated by linear interpolation using these two information pairs, where measurement value and command value are regarded as one pair. Thus, when calculating the correction value H, the correction value H can be found with one operation and without the above-described repeated trial-and-error operation.

===(1) "Method for Setting the Darkness Correction Values for Inhibiting Darkness Non-Uniformities" of the Present Embodiment===

The following is an explanation of a "method for setting darkness correction values for inhibiting darkness non-uniformities" according to the present embodiment, but for the most part, this method is the same as that of the above-described second reference example. Thus, the following explanations focus on the differences, and like portions are only explained where it is necessary to appreciate this embodiment. The following explanations refer to the flowchart in FIG. 27.

First, a broad overview is given.

Step S121: First, an operator of the inspection line connects the printer 1 to a computer 1100 or the like on the inspection line and, using the printer 1, prints the above-noted stripe-shaped correction pattern CP for each of the ink colors CMYK. However, at least two such correction patterns CP with different darkness command values are printed for each ink color (see FIG. 39).

Step S122: Next, the darkness of the printed correction patterns CP is measured for each raster line, and the measurement values are recorded in recording tables in association with the raster line numbers. It should be noted that this measurement is carried out independently for each of the at least two correction patterns CP of different darkness values. Moreover, this recording is performed while associating the measurement values Ca and Cb of the two correction patterns CP with one another, and associating the command values Sa and Sb with the measurement values Ca and Cb (see FIG. 40).

Step S123: Next, the computer 1100 calculates a darkness correction value H for each raster line, based on the measurement values Ca and Cb recorded in the recording tables, and records these correction values H in a correction value table in association with the raster line numbers. This correction value table is the same as the correction value table of the second reference example shown in FIG. 34. However, for this calculation, the command value So at which the measurement value C matches the later-described target value Ss1 is determined by performing a linear interpolation using the associated measurement values Ca and Cb and the command values Sa and Sb of these measurement values Ca and Cb. Then, the value obtained by dividing the deviation between the determined command value So and a later-described reference value Ss by this reference value Ss is recorded as the correction value H. In the present embodiment, the correction value H is calculated through such a linear interpolation, so that it is possible to determine the optimum correction value H through a single calculation operation, and thus without repeating a trial-and-error operation as in the second reference example.

The following is a detailed explanation of this method for setting the darkness correction values, with reference to two examples.

<First Example of the Method for Setting the Darkness Correction Values>

Figure 39:
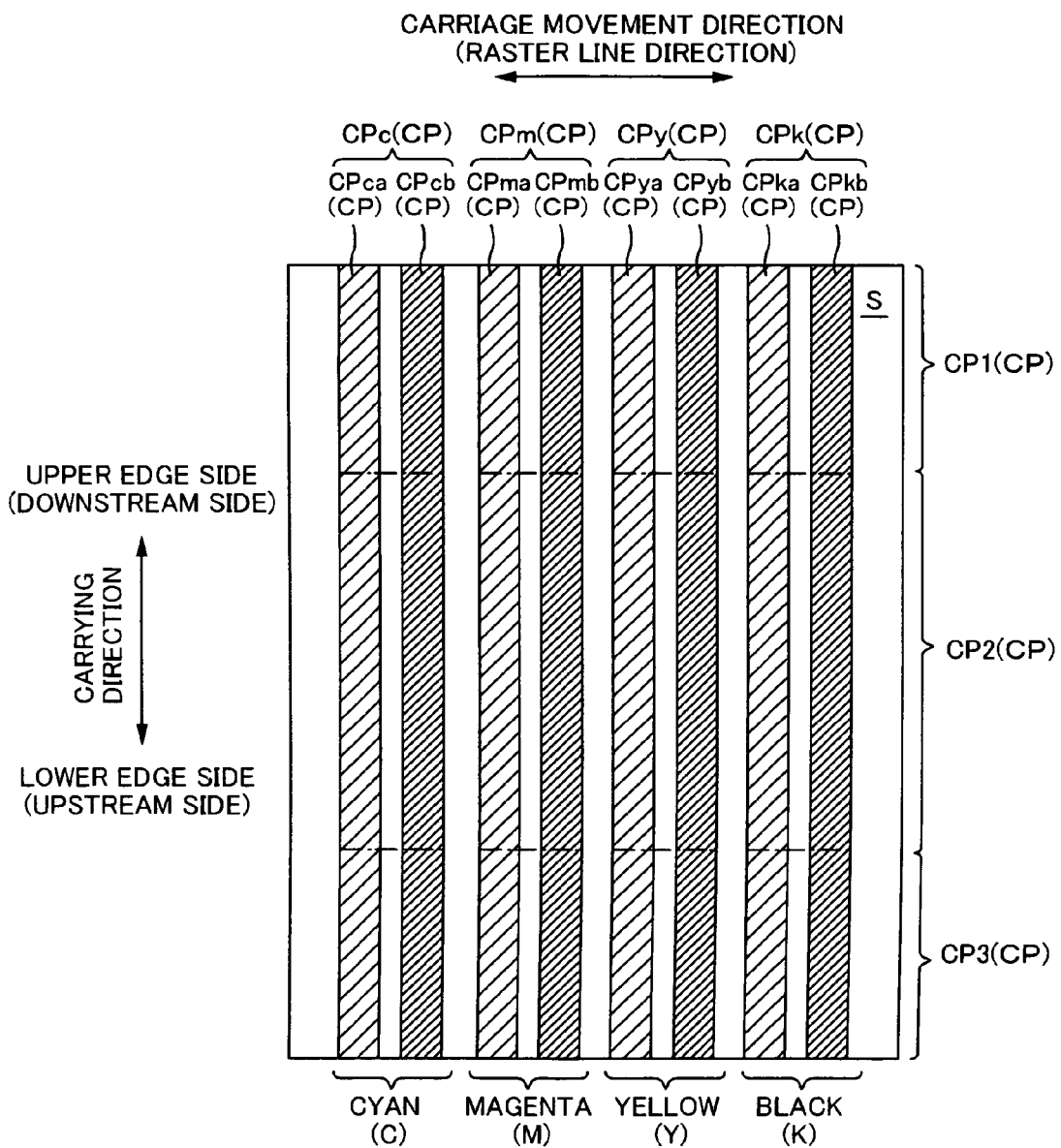

FIG. 39 shows a correction pattern CP according to a first example. In this first example, two correction patterns CP with different darkness values are printed for each CMYK ink color, as noted above.

(1) Step S121: Printing the Correction Pattern

First, the printer 1 whose correction values are to be set is connected in a communicable manner to the computer 1100 on the inspection line. Based on the print data of the correction pattern CP stored in the memory of the computer 1100, the printer 1 prints the correction pattern CP on a paper S. It should be noted that similar to the second reference example, it is assumed that "borderless" has been set as the margin format mode, "high" has been set as the image quality mode and "first size" has been set as the paper size mode.

As shown in FIG. 39, two stripe-shaped correction patterns CP are formed on the paper S for each of the CMYK ink colors. The following explanations refer to black (K) as a representative example of those ink colors, but the other ink colors are similar.

The two correction patterns CPka and CPkb of the correction pattern CPk for black (K) are printed with different darkness values.

It should be noted that the print data for printing these correction patterns CPka and CPkb are configured by directly specifying the gradation values of the CMYK ink colors, as explained for the above-described second reference example, and in this particular case are configured by specifying the gradation values of black (K). That is to say, the print data is set to different values, namely a gradation value Sa of pixel data corresponding to the correction pattern CPka and a gradation value Sb of pixel data corresponding to the correction pattern CPkb in the CMYK pixel data, and is generated for this CMYK image data through the above-described halftone process and rasterization process. It should be noted that the gradation values Sa and Sb correspond to the command values of the darkness for the correction patterns CPka and CPkb.

These gradation values Sa and Sb are set such that their median value becomes the reference value Ss, and are for example set to values of the reference value Ss±10%. It should be noted that the reference value Ss is a gradation value that is optimal for determining the correction value H, and is selected for example as a gradation value at which darkness non-uniformities tend to be conspicuous. As noted above, this gradation value at which darkness non-uniformities tend to be conspicuous is a gradation value that is in a so-called middle-tone region with respect to CMYK colors, and in the case of black (K), it corresponds to a gradation value in the range of 77 to 128, among the 256 gradation values.

Needless to say, these two correction patterns CPka and CPkb each include a first upper edge correction pattern CP1, a first intermediate correction pattern CP2 and a first lower edge correction pattern CP3, extending in the carrying direction.

(2) Step S122: Measuring the Darkness of the Correction Pattern for Each Raster Line The darkness of the two correction patterns CPka and CPkb shown in FIG. 39 is measured raster line by raster line with the scanner 100.

It should be noted that as in the above-described second reference example, the scanner 100 outputs the measurement values Ca and Cb in 256 grey-scale gradation values to the computer 1100. Then, the computer 1100 records the measurement values Ca and Cb represented by these grey-scale gradation values in a recording table provided in its memory.

Figure 40:
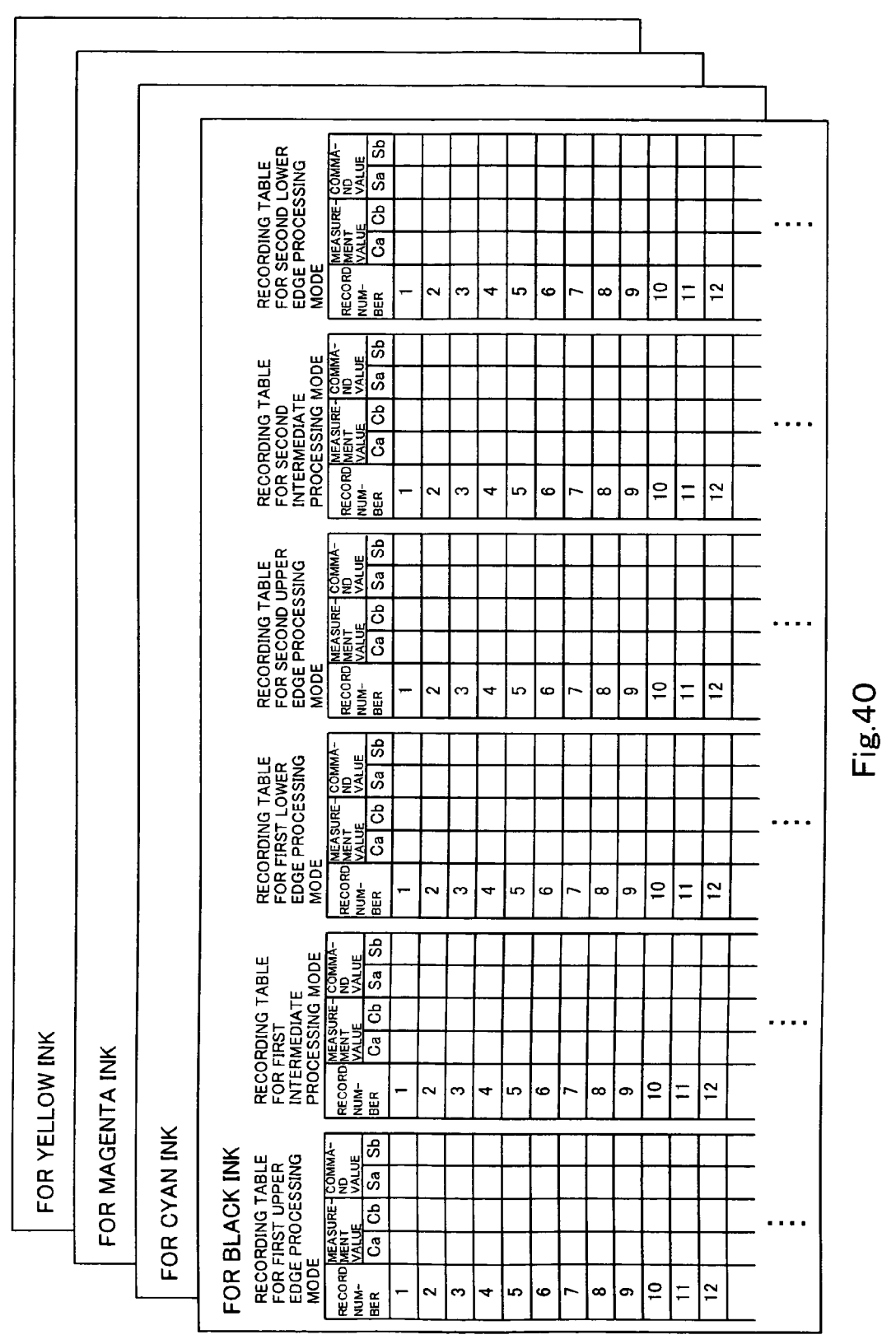

As shown in FIG. 40, the recording tables of the first example of this embodiment are each provided with four fields, such that they can store the measurement values Ca and Cb of the two correction patterns CPka and CPkb, and the command values Sa and Sb that are respectively associated with these measurement values Ca and Cb. In the records of the first field and the third field from the left of the table the measurement value Ca and its command value Sa for the correction pattern CPka with the lower darkness are recorded. In the records of the second field and the fourth field the measurement value Cb and its command value Sb for the correction pattern CPkb with the higher darkness are recorded. It should be noted that during this recording, the measurement values Ca and Cb and the command values Sa and Sb for the same raster line number of the two correction patterns CPka and CPkb are, of course, recorded in records of the same record number.

(3) Step S123: Setting the Darkness Correction Values for Each Raster Line

Next, as in the case of the above-described second reference example, the darkness correction value H is calculated from the measurement values Ca and Cb recorded in the records of the recording tables, and this correction value H is set in the correction value table.

However, in the first example of this embodiment, a linear interpolation is performed using two information pairs (Sa, Ca) and (Sb, Cb), the pairs being given by the command values Sa and Sb and the measurement values Ca and Cb recorded in the records of the same record numbers. Thus, it is possible to calculate the correction value in one operation without repeating the problematic calculation operation by trial and error explained above. It should be noted that the procedure of calculating the correction value H explained below is, of course, performed individually for each record number.

Figure 41:
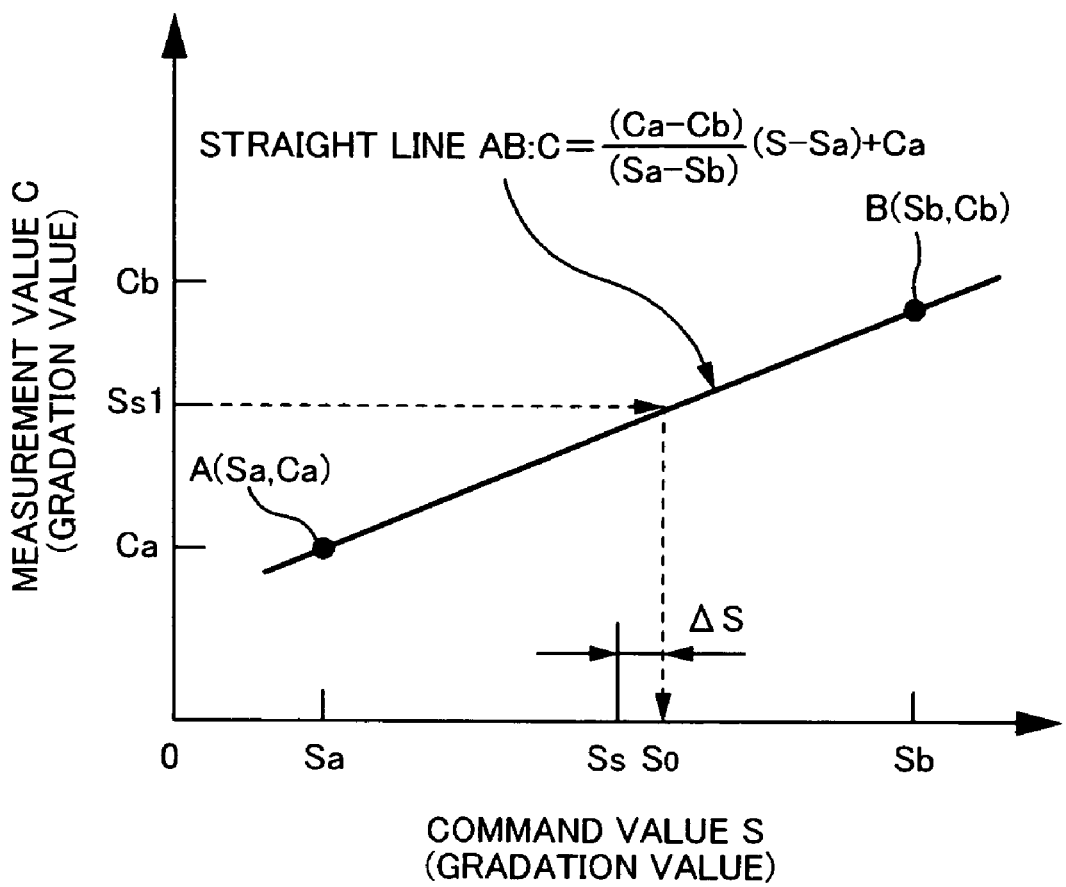

FIG. 41 is a graph illustrating the linear interpolation performed using these two information pairs (Sa, Ca) and (Sb, Cb). The horizontal axis of this graph corresponds to the gradation value of black (K) serving as the command value S, and the vertical axis corresponds to the gradation value of the grey-scale serving as the measurement value C. The coordinates of the points on the graph are indicated by (S,C) below.

As is well known, in a linear interpolation, a function value between two known values or outside thereof is determined as the point for which all three plotted points are located on the same straight line. In this first example, the known values are the two information pairs (Sa, Ca) and (Sb, Cb), and the function value to be determined is the command value S at which the measurement value C becomes the target value Ss1. Here, this target value Ss1 is the grey-scale gradation value that is output when reading a color sample (darkness sample) representing the darkness of the above-noted reference value Ss with the scanner 100. This color sample represents an absolute reference of the darkness, that is, if the measurement value C measured by the scanner 100 is represented by the target value Ss1, then the measured object appears at the darkness of this reference value Ss.

As shown in FIG. 41, the two information pairs (Sa, Ca) and (Sb, Cb) are respectively expressed on the graph by a point A having the coordinates (Sa, Ca) and a point B having the coordinates (Sb, Cb). The straight line AB connecting these points A and B indicates the relation between the change of the command value S and the change of the measurement value C. Consequently, if the value So of the command value S at which the measurement value C becomes the target value Ss1 is read from this straight line AB, then this value So represents the command value S at which the measurement value C of the darkness becomes the target value Ss1. Now, if the command value S would be set to the reference value Ss, then the target value Ss1 should be obtained as the measurement value C, but actually the measurement value C does not reach the target value Ss1 unless the command value S is set to So. Thus, this deviation So−Ss between So and Ss is the correction amount ΔS. It should be noted however, that the correction value H needs to be given in the format of a correction ratio, as noted above, so that the value obtained by dividing the correction amount ΔS by the reference value Ss becomes the correction value H (=ΔS/Ss).

Incidentally, the following is the correction value H mentioned above when expressed by an equation.

First, the straight line AB can be expressed by the following Equation 2.

$$C=[(Ca-Cb)/(Sa-Sb)]\cdot(S-Sa)+Ca \quad \text{(Equation 2)}$$

If Equation 2 is solved for the command value S and the target value Ss1 is substituted for the measurement value C, then the command value So at which the measurement value C becomes the target value Ss1 can be expressed by Equation 3 below.

$$So=(Ss1-Ca)/[(Ca-Cb)/(Sa-Sb)]+Sa \quad \text{(Equation 3)}$$

On the other hand, the correction amount ΔS of the command value S is expressed by Equation 4, and the correction value is expressed by Equation 5.

$$\Delta S = So-Ss \quad \text{(Equation 4)}$$

$$H=\Delta S/Ss=(So-Ss)/Ss \quad \text{(Equation 5)}$$

Consequently, Equations 3, and 5 are the equations for finding the correction value H, and by substituting concrete values for Ca, Cb, Sa, Sb, and Ss1 in these Equations 3 and 5, it is possible to find the correction value H.

It should be noted that a program for calculating Equation 3 and Equation 5 is stored in the memory of the computer 1100 of the inspection line according to the first example. The computer 1100 reads the two information pairs (Sa, Ca) and (Sb, Cb) from the same record of the recording table, substitutes them into Equations 3 to 5, and records the calculated correction value H in the record of the same record number in the correction value table.

It should be noted that with the above-described first example, it is possible to obtain first information (Sa, Ca) and second information (Sb, Cb) for each raster line. Then, the correction value H is calculated for each raster line from the first information (Sa, Ca) and second information (Sb, Cb). Then, when actually printing an image, the gradation value of the image data of each raster line is corrected based on the correction value H corresponding to that raster line. As a result, darkness non-uniformities are inhibited in an image constituted by a plurality of raster lines whose darkness has been corrected.

<Second Example of the Method for Setting the Darkness Correction Values>

Figure 42:
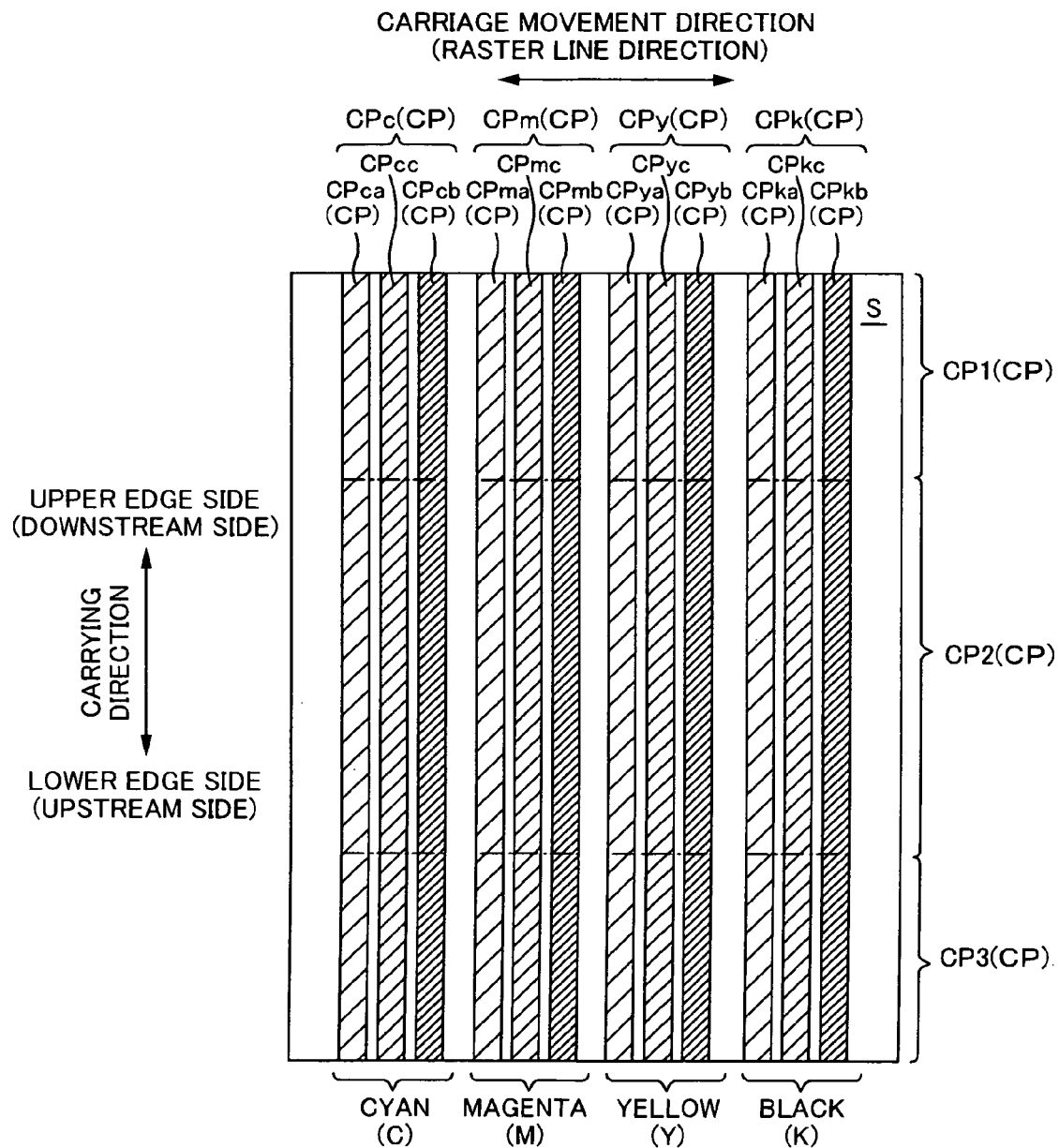

FIG. 42 shows a correction pattern according to a second example printed on a paper S.

In the above-described first example, two correction patterns CP with different darkness values were printed for each ink color, but the second example shown in FIG. 42 differs in that three correction patterns CP are printed for each of the CMYK ink colors, and a linear interpolation is carried out using the darkness measurement values Ca, Cb and Cc of these three correction patterns CP. Using these three measurement values Ca, Cb and Cc, it is possible to calculate the correction value H with even higher precision. It should be noted that other than this difference, the second example is similar to the above-described first example. Consequently, the following explanations focus on the differences, and content that is the same is explained only briefly. Furthermore, as for the first example, these explanations refer to the flowchart in FIG. 27.

(1) Step S121: Printing the Correction Pattern

As shown in FIG. 42, three stripe-shaped correction patterns CP are formed on the paper S for each of the CMYK ink colors. The respective correction patterns CP are printed such that their three darkness values differ. In the following explanations, black (K) is taken as a representative ink color.

As shown in FIG. 42, the two correction patterns CPka and CPkb of the three correction patterns are printed with the command values Sa and Sb of the same darkness as in the first example, whereas the remaining correction pattern CPkc is printed with a command value Sc that lies between these command values Sa and Sb. The reason why the correction patterns CPka, CPkb and CPkc are printed with command values for these three darkness values is that there is the possibility that the slope of the straight line AB differs between regions of high darkness and regions of low darkness, and in this case, this would lead to an interpolation error. This is explained further below.

(2) Step 122: Measuring the Darkness of the Correction Pattern for Each Raster Line As in the first example, the darkness values of the three correction patterns CPka, CPkb and CPkc shown in FIG. 42 are measured raster line by raster line with the scanner 100. Then, these measurement values Ca, Cb and Cc are recorded in the recording tables explained below.

Figure 43:
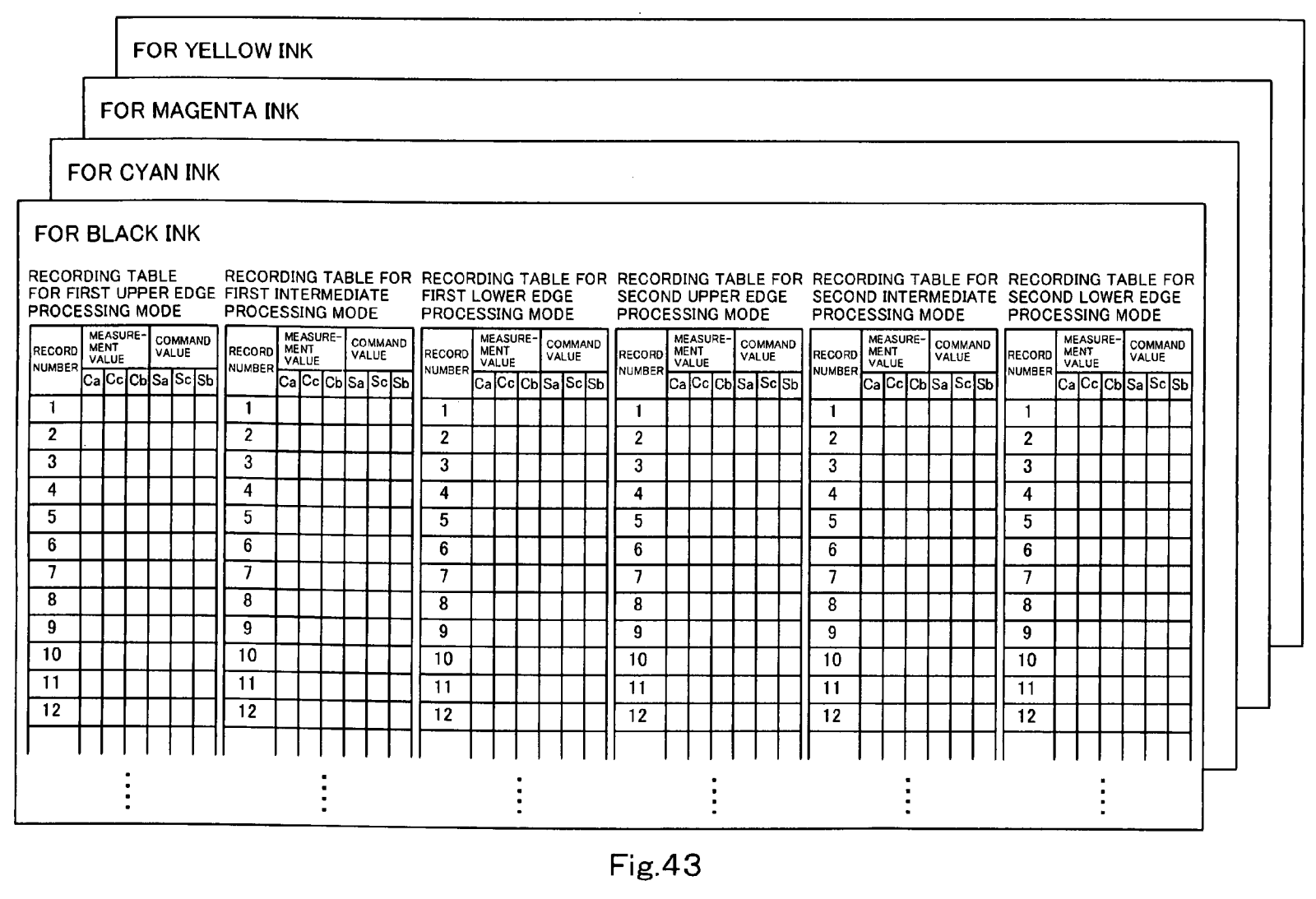

FIG. 43 shows the recording tables of the second example. In these recording tables, six fields are provided, so that the measurement values Ca, Cb and Cc of the three correction patterns CPka, CPkb and CPkc and the command values Sa, Sb and Sc corresponding to these measurement values can be recorded. In the records of the first field and the fourth field from the left of the tables, the measurement value Ca and its command value Sa for the correction pattern CPka with the lower darkness are recorded. In the records of the third field and the sixth field, the measurement value Cb and its command value Sb for the correction pattern CPkb with the higher darkness are recorded. And in the records of the second field and the fifth field from the left, the measurement value Cc, and its command value Sc, for the correction pattern CPkc with the intermediate darkness are recorded. It should be noted that during this recording, the measurement values Ca, Cb and Cc and the command values Sa, Sb and Sc for the same raster line number of these two correction patterns CPka, CPkb and CPkc are, of course, recorded in records of the same record number.

(3) Step 123: Setting the Darkness Correction Values for Each Raster Line

Next, just like in the first example described above, the correction value H is calculated by performing a linear interpolation using the three information pairs (Sa, Ca), (Sb, Cb), and (Sc, Cc) of the command values Sa, Sb and Sc and the measurement values Ca, Cb and Cc recorded in the records of the recording tables, and that correction value H is set in the correction value table.

It should be noted however, that in the linear interpolation of this second example, three information pairs (Sa, Ca), (Sb, Cb) and (Sc, Cc) are used, so that the correction value H can be calculated with even higher precision than with the first example. That is to say, ordinarily, the slope of the straight line AB used for the above-described linear interpolation may differ between region of high darkness and region of low darkness. In this case, as in the above-described first example, it is not possible to calculate a suitable correction value H with the method using one straight line regardless of the extent of the darkness.

With the second example on the other hand, the linear interpolation is carried out using the two information pairs (Sb, Cb) and (Sc, Cc) for the region of high darkness, whereas the linear interpolation is carried out using the two information pairs (Sa, Ca) and (Sc, Cc) for the region of low darkness.

Figure 44:
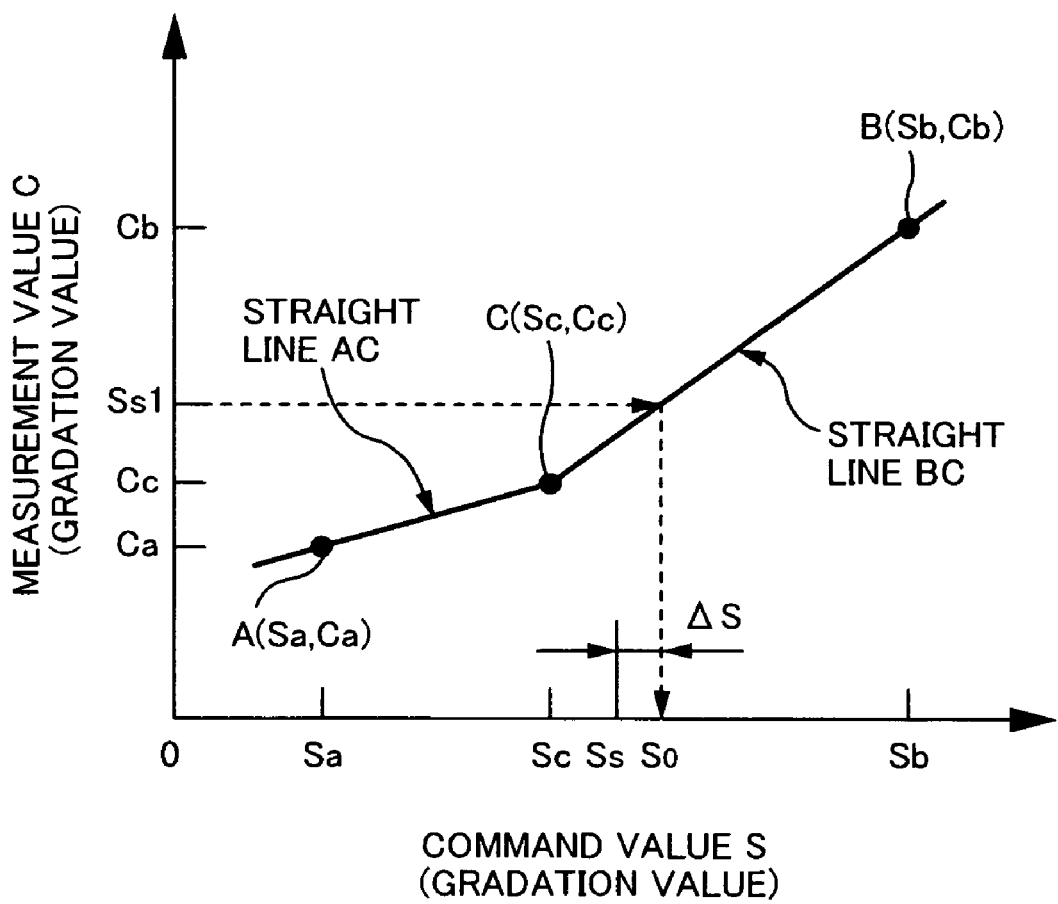

FIG. 44 is a graph illustrating the linear interpolation performed using these three information pairs (Sa, Ca), (Sb, Cb), and (Sb, Cb). It should be noted that FIG. 44 is given in the same format as FIG. 41.

As shown in FIG. 44, the three information pairs (Sa, Ca), (Sb, Cb), and (Sc, Cc) are each expressed on the graph by a point A having the coordinates (Sa, Ca), a point B having the coordinates (Sb, Cb), and a point C having the coordinates (Sc, Cc). The straight line BC connecting the two points B and C indicates the relationship between the change of the command value S and the change of the measurement value C in the range of high darkness, whereas the straight line AC connecting the two points A and C indicates the relationship between the change of the command value S and the change of the measurement value C in the range of low darkness.

Then, the value So of the command value S at which the measurement value C becomes the target value Ss1 is read from the graph constituted by these two lines AC and BC to determine the correction value H. For example, if the target value Ss1 is higher than the measurement value Cc of the point C as shown in the drawing, then a linear interpolation is carried out with the straight line BC, and the value So of the command value S at which the measurement value C becomes the target value Ss1 is determined. Conversely, if the target value Ss1 is smaller than the measurement value Cc of the point C, then a linear interpolation is carried out with the straight line AC, and the value So of the command value S at which the measurement value C becomes the target value Ss1 is determined. The deviation between the determined command value So and the reference value Ss is the correction amount ΔS, and the correction value H in the form of a correction ratio is calculated by dividing the correction amount ΔS by the reference value Ss. It should be noted that also the linear interpolation of this second example can be formalized in the same manner as the first example, and the formalized equations can be calculated by the program of the computer 1100 to calculate the correction value. Thus, further explanations thereof are omitted.

===(1) Other Examples Of The First Embodiment===

The above embodiment was written primarily with regard to a printer, but the above embodiment of course also includes the disclosure of a printing apparatus, a printing method, and a printing system, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes functional equivalents. In particular, the embodiments mentioned below are also encompassed by the invention.

<Regarding the Printer>

In the above embodiments a printer was described, however, there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also these methods and manufacturing methods are within the scope of application.

<Regarding the Ink>

Since the foregoing embodiment was an embodiment of a printer, a dye ink or a pigment ink was ejected from the nozzles. However, the ink that is ejected from the nozzles is not limited to such inks.

<Regarding the Nozzles>

In the foregoing embodiment, ink was ejected using piezoelectric elements. However, the mode for ejecting ink is not limited to this. Other methods, such as a method for generating bubbles in the nozzles through heat, may also be employed.

<Regarding the Print Modes>

The interlaced mode was described as an example of the print mode in the above embodiments, but the print mode is not limited to this, and it is also possible to use the so-called overlapping mode. With interlacing, a single raster line is formed by a single nozzle, whereas with the overlapping mode, a single raster line is formed by two or more nozzles. That is, with the overlapping mode, each time the paper S is carried by a fixed carry amount F in the carrying direction, the nozzles, which move in the carriage movement direction, intermittently eject ink droplets every several pixels, intermittently forming dots in the carriage direction. Then, in another pass, dots are formed such that the intermittent dots already formed by the other nozzle are completed in a complementary manner. Thus, a single raster line is completed by a plurality of nozzles.

<Regarding the Carriage Movement Direction in which Ink is Ejected>

The foregoing embodiment describes an example of single-direction printing in which ink is ejected only when the carriage is moving forward, but there is no limitation to this, and it is also possible to perform so-called bidirectional printing in which ink is ejected both when the carriage is moving forward and backward.

<Regarding the Ink Colors Used for Printing>

In the foregoing embodiments, examples of multicolor printing are described in which the four color inks cyan (C), magenta (M), yellow (Y), and black (K) are ejected onto the paper S to form dots, but the ink colors are not limited to these. For example, it is also possible to use other inks in addition to these, such as light cyan (LC) and light magenta (LM).

Alternatively, it is also possible to perform single-color printing using only one of these four colors.

<Other Considerations>

In the foregoing second reference example, the correction patterns CP were formed for all processing modes, namely the first upper edge processing mode, the first intermediate processing mode, the first lower edge processing mode, the second upper edge processing mode, the second intermediate processing mode, and the second lower edge processing mode, recording the correction values in the correction value table, but there is no limitation to this.

For example, it is also possible not to form a correction pattern CP for the second upper edge processing mode, the second intermediate processing mode, and the second lower edge processing mode, in which images are printed at a lower print resolution, that is, not to record correction values in the corresponding correction value tables. That is to say, in this case, since there are no corresponding correction values, the actual printing is carried out without the above-described darkness correction, so that the actual printing can be carried out faster, as this correction is not carried out.

In the first example, the reference value Ss is positioned between the two information pairs (Sa, Ca) and (Sb, Cb), and the command value So at which the measurement value C becomes the target value Ss1 is determined by interpolation, but there is no limitation to this. For example, it is also possible to position the reference value Ss outside the two information pairs (Sa, Ca) and (Sb, Cb) and to determine the command value So at which the measurement value C becomes the target value So1 by extrapolation. However, in this case, the precision is poorer than with interpolation.

In the first example, the command values Sa and Sb of the darkness of the correction patterns CPka and CPkb are set such that the reference value Ss becomes a value in the middle between the two, but it is also possible to set one of the command values Sa and Sb such that one of them becomes the reference value Ss. If this is done, then one of the measurement values Ca and Cb of the darkness of the correction patterns CPka and CPkb can be obtained as the value near the target value Ss1. Moreover, the command value So corresponding to the target value Ss1 is determined by performing a linear interpolation using the measurement value near this target value Ss1, so that the interpolation precision improves by the amount that the measurement value is closer to the target value Ss1. Thus, the precision of the determined command value So is improved. As a result, the precision of the correction value H that is determined by this linear interpolation increases.

In the second example described above, the command value Sc set to a value between the command value Sa and the command value Sb is set to a value different from the reference value Ss, but it may also be set to the same value as the reference value Ss. If this is done, then the measurement value Cc of the darkness of the correction patterns CPkc can be obtained as a value near the target value Ss1. Moreover, the command value So corresponding to the target value Ss1 is determined by performing a linear interpolation using the measurement value Cc near this target value Ss1, so that the interpolation precision improves by the amount that the measurement value Cc is closer to the target value Ss1. Thus, the precision of the determined command value So is improved. As a result, the precision of the correction value H that is determined by this linear interpolation increases.

In the second example described above, the measurement value of the darkness of a color sample of the reference value Ss was used as the value of the target value Ss1 for reading the command value So in the linear interpolation, but there is no limitation to this. For example, it is also possible to use the average value, across all raster lines, of the measurement value Cc, which is in the middle of the measurement values Ca, Cb, Cc of the three points, as the target value Ss1. If this is done, then it is possible to determine the correction value with even higher correction precision through linear interpolation.

In the foregoing embodiment, a scanner 100 that is separate from the printer 1 was used as the darkness measurement device, and after the printing of the correction pattern CP with the printer 1 is finished, the darkness measurement was performed with this scanner 100, but there is not limitation to this.

For example, it is also possible that sensors for measuring darkness optically are attached on the downstream side of the head 41 in the carrying direction of the paper S, and that the darkness of the printed correction pattern CP is measured with these sensors in parallel to performing the operation of printing the correction pattern CP.

2. Second Embodiment

===(2) Outline of the Disclosure of the Second Embodiment===

A printing apparatus including a plurality of ejection sections for forming dots on a medium by ejecting ink, the ejection sections being arranged along a predetermined direction, wherein image data to be printed indicates a gradation value of each dot formation unit formed on the medium, when printing the image, based on the gradation values, by ejecting ink while moving the plurality of ejection sections in a movement direction intersecting the predetermined direction, the image data is converted into printable print data while performing a correction for each dot formation region so as to inhibit darkness non-uniformities between dot row regions in which dot rows are formed along the movement direction by the ejection sections, wherein a correction pattern is printed based on the first gradation value, and the correction is carried out using a first correction information obtained using the measurement value of the darkness of the correction pattern and a second correction value corresponding to a second gradation value.

With this printing method, the image data is converted into print data while performing a correction for each dot formation region so as to inhibit darkness non-uniformities between dot row regions using at least two sets of correction information, namely first correction information based on a correction pattern and second correction information. Therefore, in the image printed based on the converted print data, the darkness non-uniformities in the carrying direction of the paper can be inhibited more effectively than in the case that printing is performed based on print data converted using one set of correction information. Thus, a more satisfactory image can be printed.

In the foregoing printing apparatus, it is preferable that the correction pattern is printed, based on a plurality of specified gradation values including a first gradation value and a second gradation value, for each of these specified gradation values.

With this printing apparatus, the correction pattern for obtaining the correction information used for the correction is printed with a plurality of specified gradation values, and the plurality of specified gradation values include the first gradation value, so that it is possible to perform a suitable correction by obtaining suitable first correction information based on the correction pattern printed with the first gradation value. Furthermore, the plurality of specified gradation values include also the second gradation value, so that also the second correction information can be obtained based on an actually printed correction pattern. Therefore, by using the first correction information and the second correction information obtained using an actually printed correction pattern, it is possible to perform an even more suitable correction.

In the foregoing printing apparatus, it is preferable that a new gradation value for printing based on image data indicating the first gradation value is determined by linear interpolation of at least two sets of measurement values associating measurement gradation values and corresponding specified gradation values, where the measurement gradation values are measurement values obtained by measuring, for each dot row region, the darkness of the correction pattern of the at least two specified gradation values including the first gradation value, the determined new gradation value is associated with the first gradation value and taken as first correction information, a new gradation value for printing based on image data indicating the second gradation value is determined by linear interpolation of at least two sets of measurement information correlating measurement gradation values and corresponding specified gradation values, where the measurement gradation values are measurement values obtained by measuring, for each dot row region, the correction pattern of the at least two specified gradation values including the second gradation value, the determined new gradation value is associated with the second gradation value and taken as second correction information.

With this printing apparatus, the first correction information and the second correction information used for the correction are based on measurement information obtained by reading the darkness of actually printed correction patterns, so that it is information adapted to the actual device, and it is possible to perform a correction that is suitable for the actual device by using this correction information. Furthermore, the measurement information for determining the first correction information and the second correction information is respectively obtained from correction patterns of at least two specified gradation values, so that its reliability is higher than that of correction information obtained from one set of measurement information. That is to say, the correction is performed based on two sets of correction information with higher reliability, so that a more suitable correction can be performed, and darkness non-uniformities can be inhibited more effectively.

It should be noted that, as is well known, in a linear interpolation, a function value between two known values or outside thereof is determined as the point for which all three plotted points are located on the same straight line.

In the foregoing printing apparatus, it is preferable that the correction patterns are respectively printed for each specified gradation value, based on the plurality of specified gradation values including the first gradation value, the new gradation value for printing based on the image data indicating the first gradation value is determined by linear interpolation of at least two sets of measurement information correlating measurement gradation values and corresponding specified gradation values, where the measurement gradation values are measurement values obtained by measuring, for each dot row region, the correction pattern of the at least two specified gradation values including the first gradation value, the determined new gradation value and the first gradation value are associated and taken as the first correction information, the second gradation value is the highest printable gradation value, and that highest value and the gradation value for printing that highest value are associated and taken as the second correction information.

With this printing apparatus, since the first correction information used for the correction is based on measurement information obtained by reading the darkness of the correction patterns of at least two specified gradation values, it is information adapted to the actual device, so that a correction suitable for the actual device can be performed by using this correction information. Furthermore, the second gradation value is the highest printable gradation value, so that it is possible to perform a correction up to the highest printable gradation value. Furthermore, the second gradation value is the highest printable gradation value, so that any determined new gradation value will not become higher than the largest printable gradation value. Therefore, the new gradation value is determined within a range that does not exceed the upper limit of the pintable gradation values, so that it is possible to perform a correction that is suitable for the printing apparatus.

In the foregoing printing apparatus, it is preferable that the correction patterns are respectively printed for each specified gradation value, based on the plurality of specified gradation values including the first gradation value, the new gradation value for printing based on the image data indicating the first gradation value is determined by linear interpolation of at least two sets of measurement information correlating measurement gradation values and corresponding specified gradation values, where the measurement gradation values are measurement values obtained by measuring, for each dot row region, the correction pattern of the at least two specified gradation values including the first gradation value, the determined new gradation value and the first gradation value are associated and taken as the first correction information, the second gradation value is the lowest printable gradation value, and that lowest value and the gradation value for printing that highest value are associated and taken as the second correction information.

With this printing apparatus, since the first correction information used for the correction is based on measurement information obtained by reading the darkness of the correction patterns of at least two specified gradation values, it is information adapted to the actual device, so that a correction suitable for the actual device can be performed by using this correction information. Furthermore, the second gradation value is the lowest printable gradation value, so that it is possible to perform a correction up to the lowest printable gradation value. Furthermore, the second gradation value is the lowest printable gradation value, so that any determined new gradation value will not become smaller than the lowest printable gradation value. Therefore, the new gradation value is determined within a range that does not exceed the lower limit of the pintable gradation values, so that it is possible to perform a correction that is suitable for the printing apparatus.

In the foregoing printing apparatus, it is preferable that to determine the new gradation value for printing an image of the first gradation value, three sets of measurement information corresponding respectively to the first gradation value, a specified gradation value higher than the first gradation value and a specified gradation value lower than the first gradation value are used, if the gradation value representing the darkness of the image to be printed based on the first gradation value is higher than the measurement gradation value of the measurement information corresponding to the first gradation value, then a linear interpolation is performed using the measurement information corresponding to the first gradation value and the measurement information corresponding to the specified gradation value higher than the first gradation value, whereas if the gradation value representing the darkness of the image to be printed based on the first gradation value is smaller than the measurement gradation value of the measurement information corresponding to the first gradation value, then a linear interpolation is performed using the measurement information corresponding to the first gradation value and the measurement information corresponding to the specified gradation value smaller than the first gradation value, to determine the new gradation value for printing an image of the second gradation value, three sets of measurement information corresponding respectively to the second gradation value, a specified gradation value higher than the second gradation value and a specified gradation value lower than the second gradation value are used, if the gradation value representing the darkness of the image to be printed based on the second gradation value is higher than the measurement gradation value of the measurement information corresponding to the second gradation value, then a linear interpolation is performed using the measurement information corresponding to the second gradation value and the measurement information corresponding to the specified gradation value higher than the second gradation value, whereas if the gradation value representing the darkness of the image to be printed based on the second gradation value is smaller than the measurement gradation value of the measurement information corresponding to the second gradation value, then a linear interpolation is performed using the measurement information corresponding to the second gradation value and the measurement information corresponding to the specified gradation value smaller than the second gradation value.

In order to determine the new gradation value for printing an image with the first gradation value, three sets of measurement information respectively corresponding to the first gradation value, a specified gradation value higher than the first gradation value and a specified gradation value lower than the first gradation value are used. Therefore, the gradation value representing the darkness of the image to be printed based on the first gradation value is between the measurement gradation value of the measurement information corresponding to the specified gradation value that is higher than the first gradation value and the measurement gradation value of the measurement information corresponding to the specified gradation value that is lower than the first gradation value. If the gradation value representing the darkness of the image to be printed based on the first gradation value is higher than the measurement gradation value of the measurement information corresponding to the first gradation value, then the linear interpolation is performed using the two sets of measurement information including the higher measurement gradation values of the three sets of measurement information, whereas if it is smaller, then the linear interpolation is performed using the two sets of measurement information including the smaller measurement gradation values of the three sets of measurement information, so that regardless whether the gradation value representing the darkness of the image to be printed based on the first gradation is large or small, it is possible to determine the new gradation value reliably.

Furthermore, in order to determine the new gradation value for printing an image with the second gradation value, three sets of measurement information respectively corresponding to the second gradation value, a specified gradation value higher than the second gradation value and a specified gradation value lower than the second gradation value are used. Therefore, the gradation value representing the darkness of the image to be printed based on the second gradation value is between the measurement gradation value of the measurement information corresponding to the specified gradation value that is higher than the second gradation value and the measurement gradation value of the measurement information corresponding to the specified gradation value that is lower than the second gradation value. If the gradation value representing the darkness of the image to be printed based on the second gradation value is higher than the measurement gradation value of the measurement information corresponding to the second gradation value, then the linear interpolation is performed using the two sets of measurement information including the higher measurement gradation values of the three sets of measurement information, whereas if it is smaller, then the linear interpolation is performed using the two sets of measurement information including the smaller measurement gradation values of the three sets of measurement information, so that regardless whether the gradation value representing the darkness of the image to be printed based on the second gradation is large or small, it is possible to determine the new gradation value reliably.

Furthermore, the change of the measurement value with respect to the change of the gradation value is not constant for the entire region of printable gradation values, so that performing a linear interpolation with two sets of measurement information when determining the new gradation value means that the new gradation value is determined based on the change of the measurement value with respect to the change of the gradation value in a limited range of gradation values. That is to say, the new gradation value for printing an image with the first gradation value and the second gradation value is determined with the measurement information of the specified gradation value that is near the first gradation value and the second gradation value. Therefore, a new gradation value that is suitable for the first gradation value and the second gradation value is determined, and it is possible to perform a more suitable correction with the determined new gradation value.

In the foregoing printing apparatus, it is preferable that the gradation value representing the darkness of the image to be printed based on the first gradation value is an average value of the measurement gradation values of the measurement information corresponding to the first gradation value for each of the dot row regions, and that the gradation value representing the darkness of the image to be printed based on the second gradation value is an average value of the measurement gradation values of the measurement information corresponding to the second gradation value for each of the dot row regions.

The gradation value representing the darkness of the image to be printed based on the first gradation value used when obtaining the correction information is an average value of the measurement gradation values of the measurement information corresponding to the first gradation value for each of the dot row regions, and the correction is carried out taking this average value as a reference. Moreover, the gradation value representing the darkness of the image to be printed based on the second gradation value used when obtaining the correction information is an average value of the measurement gradation values of the measurement information corresponding to the second gradation value for each of the dot row regions, and the correction is carried out taking this average value as a reference. Therefore, due to this correction, it is possible to inhibit darkness non-uniformities while printing an image with a darkness that is adapted to the actual device.

In the foregoing printing apparatus, it is preferable that the gradation value representing the darkness of the image to be printed based on the first gradation value is a measurement gradation value of a darkness sample of the same darkness as an image having a darkness of the first gradation value that is actually supposed to be printed, and that the gradation value representing the darkness of the image to be printed based on the second gradation value is a measurement gradation value of a darkness sample of the same darkness as an image having a darkness of the second gradation value that is actually supposed to be printed.

The gradation value representing the darkness of an image to be printed based on the first gradation value used for obtaining the correction information is the measurement gradation value of a darkness sample of the same darkness as an image having a darkness of the first gradation value that is actually supposed to be printed and the correction is carried out using the measurement gradation value of this darkness sample as a reference. Moreover, the gradation value representing the darkness of an image to be printed based on the second gradation value used for obtaining the correction information is the measurement gradation value of a darkness sample of the same darkness as an image having a darkness of the second gradation value that is actually supposed to be printed and the correction is carried out using the measurement gradation value of this darkness sample as a reference. Therefore, it is possible to perform such a correction that the image printed with the new gradation values becomes an image having the darkness that is actually supposed to be printed.

In the foregoing printing apparatus, it is preferable that the correction is performed on the image data to be printed.

With this printing apparatus, a plurality of image processes, such as color conversion processing or halftone processing, is carried out when converting the image data into print data, and by subjecting the image data to the correction for inhibiting the darkness non-uniformities, it is possible to perform the correction easily without a complicated image processing algorithm, because it is the original image data that is corrected.

In the foregoing printing apparatus, it is preferable that the new gradation value for printing with a gradation value other than the first gradation value and the second gradation value is determined by linear interpolation of the first correction information and the second correction information.

With this printing apparatus, also the new gradation value for printing with a gradation value other than the first gradation value and the second gradation value is determined by linear interpolation of two sets of correction information, namely the first correction information and the second correction information. Therefore, regardless of the gradation value used for printing, the new gradation value corresponding to this gradation value becomes a gradation value with high reliability obtained from two sets of correction information, so that it is possible to suitably correct any gradation value and to print a favorable image.

In the foregoing printing apparatus, it is preferable that the ejection sections can form dots of a plurality of sizes by ejecting ink based on gradation values represented by the image data, the darkness of the image is expressed by changing a dot creation ratio indicating a proportion at which the dots of the plurality of sizes are respectively formed within a predetermined region, a creation ratio data table is provided for associating, respectively, the first correction information with the dot creation ratios, and the second correction information with the dot creation ratios, and the correction is performed on the creation ratio data table.

With this printing apparatus, a creation ratio data table for associating, respectively, the first correction information with the dot creation ratios, and the second correction information with the dot creation ratios is used for the halftone processing when converting the image data into print data, and by subjecting the creation ratio data table to the correction for inhibiting the darkness non-uniformities, it is possible to perform a correction without affecting the algorithm of the image processing other than the halftone processing. Therefore, it is easy to perform a correction without making the algorithm for image processing complicated.

In the foregoing printing apparatus, it is preferable that the dot creation ratios corresponding to the gradation ratios other than the first gradation value and the second gradation value are determined by linear interpolation of first generation information in which the first correction information is associated with the dot creation ratios, and second generation information in which the second correction information is associated with the dot creation ratios.

With this printing apparatus, the dot creation ratios corresponding to the gradation values other than the first gradation value and the second gradation value are determined by linear interpolation of first generation information and second generation information. Therefore, when printing with any gradation value, the dot creation ratio corresponding to this gradation value becomes a dot creation ratio with high reliability obtained from two sets of creation information, so that it is possible to perform a suitable correction for any gradation value and to print a favorable image.

In the foregoing printing apparatus, it is preferable that the plurality of ejection sections arranged along the predetermined direction are provided for each color of ink, that the correction pattern is printed for each color, and that the correction is carried out for each color.

With this printing apparatus, the ejection sections are provided for each color of ink, so that it is possible to carry out multi-color printing. Moreover, the correction is carried out for each color, so that it is possible to advantageously inhibit darkness non-uniformities in images printed by multi-color printing.

It is also possible to realize a computer program for realizing, on a printing apparatus including a plurality of ejection sections for forming dots on a medium by ejecting ink, the ejection sections being arranged along a predetermined direction, wherein image data to be printed indicates a gradation value of each dot formation unit formed on the medium, when printing the image, based on the gradation values, by ejecting ink while moving the plurality of ejection sections in a movement direction intersecting the predetermined direction, the image data is converted into printable print data while performing a correction for each dot formation region so as to inhibit darkness non-uniformities between dot row regions in which dot rows are formed along the movement direction by the ejection section, a function of printing a correction pattern based on the first gradation value, and carrying out the correction using first correction information obtained using the measurement value of the darkness of the correction pattern and second correction information corresponding to a second gradation value.

Furthermore, it is also possible to realize a printing system including a computer and a plurality of ejection sections for forming dots on a medium by ejecting ink, the ejection sections being connected to the computer and arranged along a predetermined direction, wherein image data to be printed indicates a gradation value of each dot formation unit formed on the medium, when printing the image, based on the gradation values, by ejecting ink while moving the plurality of ejection sections in a movement direction intersecting the predetermined direction, the image data is converted into printable print data while performing a correction for each dot formation region so as to inhibit darkness non-uniformities between dot row regions in which dot rows are formed along the movement direction by the ejection section, wherein a correction pattern is printed based on the first gradation value, and the correction is carried out using first correction information obtained using the measurement value of the darkness of the correction pattern, and second correction information corresponding to a second gradation value.

Furthermore, it is possible to realize a printing method including a step of printing, based on a first gradation value, a correction pattern for obtaining correction information for performing a correction to inhibit darkness non-uniformities between dot row regions in which dot rows are formed by a plurality of ejection sections for forming dots on a medium by ejecting ink, the ejection sections being arranged along a predetermined direction and the dot rows extending along a movement direction intersecting with the predetermined direction; a step, performed when printing the image, based on the gradation values of image data to be printed indicating the gradation values of dot formation units formed on the medium, by ejecting ink while moving the plurality of ejection sections in a movement direction intersecting the predetermined direction, of converting the image data into printable print data while performing a correction for each dot formation region so as to inhibit darkness non-uniformities between dot row regions in which dot rows are formed along the movement direction by the ejection sections, using first correction information obtained using a measurement value of a darkness of the correction pattern printed using a first gradation value and second correction information corresponding to a second gradation value; and a step of printing based on the converted printing data.

===(2) Configuration of the Printing System===

An embodiment of the printing system is described next with reference to the drawings.

Figure 45:
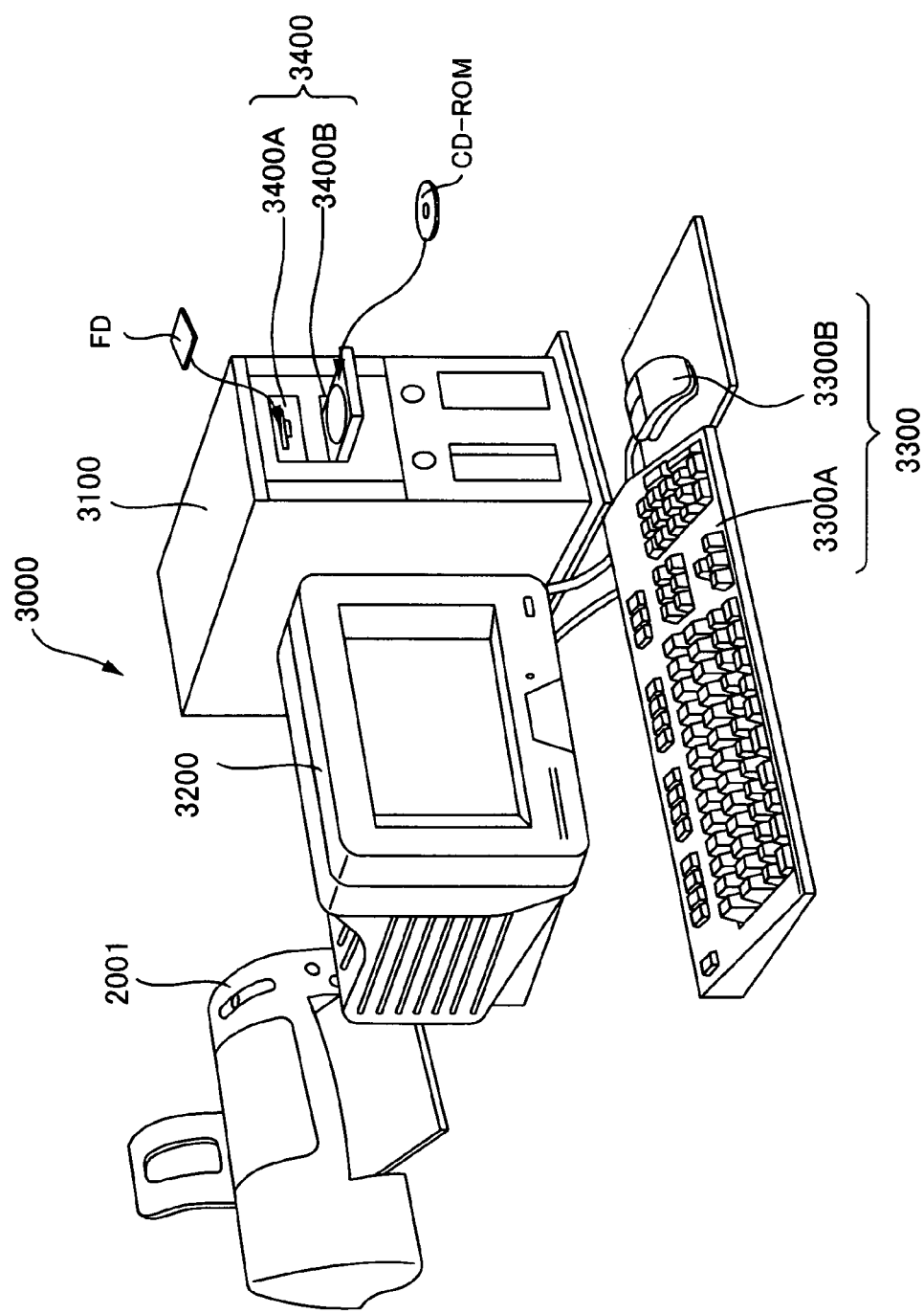

FIG. 45 is an explanatory diagram showing the external structure of the printing system. This printing system is provided with an inkjet printer 2001 (hereinafter, referred to simply as "printer 2001"), a computer 3100, a display device 3200, input devices 3300, and recording/reproducing devices 3400. The printer 2001 is a printing apparatus for printing images on a medium such as paper, cloth, or film. It should be noted that the following description is made for paper S (see FIG. 47), which is a representative medium, as an example.

The computer 3100, which is communicably connected to the printer 2001, has an application program or printer driver 3110 (see FIG. 52) installed on it, and outputs print data corresponding to an image to be printed to the printer 2001 in order to print the image with the printer 2001. The input devices 3300, which are for example a keyboard 3300A and a mouse 3300B, are used to input operating instructions for the application program or settings of the printer driver 3110 or the like. For example, a flexible disk drive device 3400A and a CD-ROM drive device 3400B are employed as the recording/reproducing devices 3400.

The printer driver 3110 is a program for achieving the function of displaying such as a screen for setting such as the printing conditions on the display device 3200, and the function of converting image data that has been output from the application program into print data. The printer driver 3110 is recorded on a recording medium (computer-readable recording medium) such as a flexible disk FD or a CD-ROM. The printer driver 3110 may also be downloaded onto the computer 3100 via the Internet. This program is made of code for achieving various functions.

It should be noted that "printing apparatus" in a narrow sense means the printer 2001, but in a broader sense it means the system constituted by the printer 2001 and the computer 3100.

===(2) Configuration of the Printer===

<Configuration of the Printer>

Figure 46:
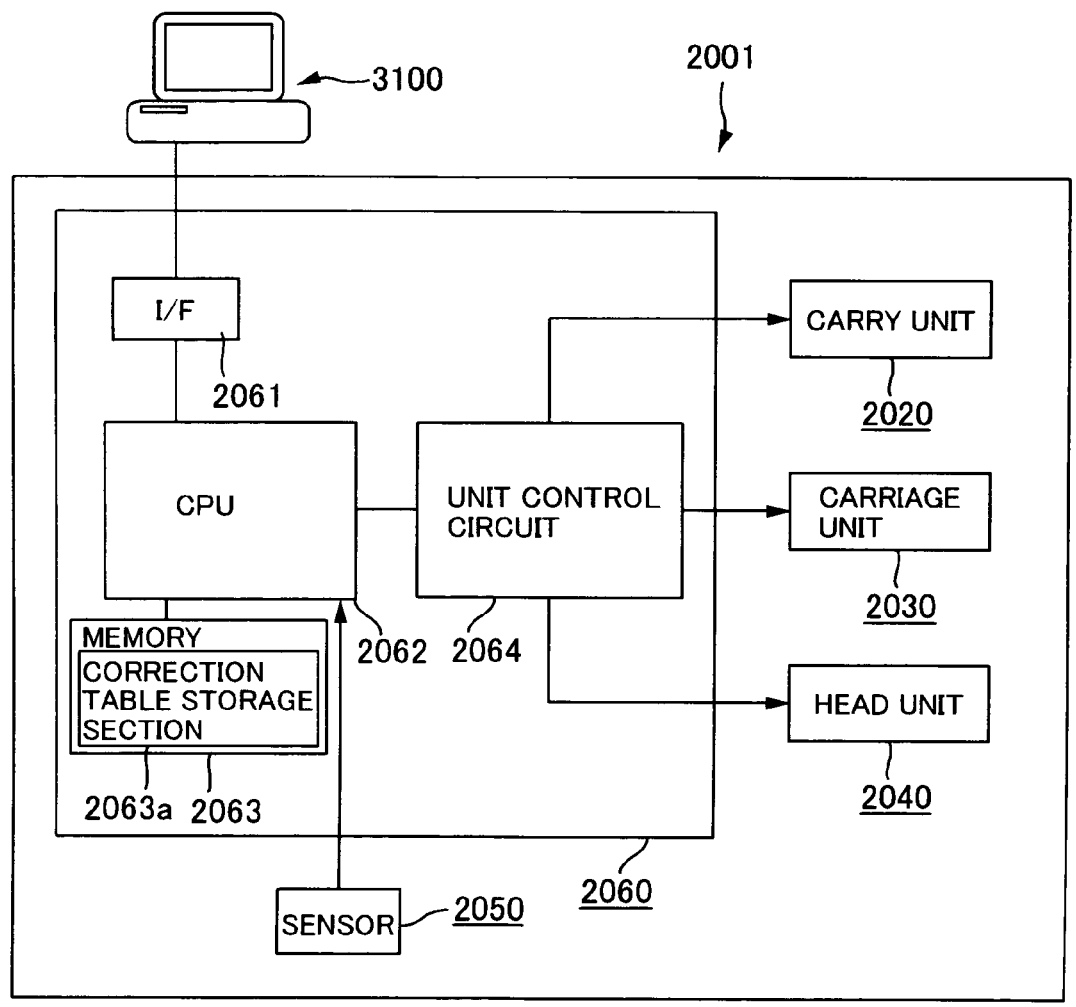
Figure 48:
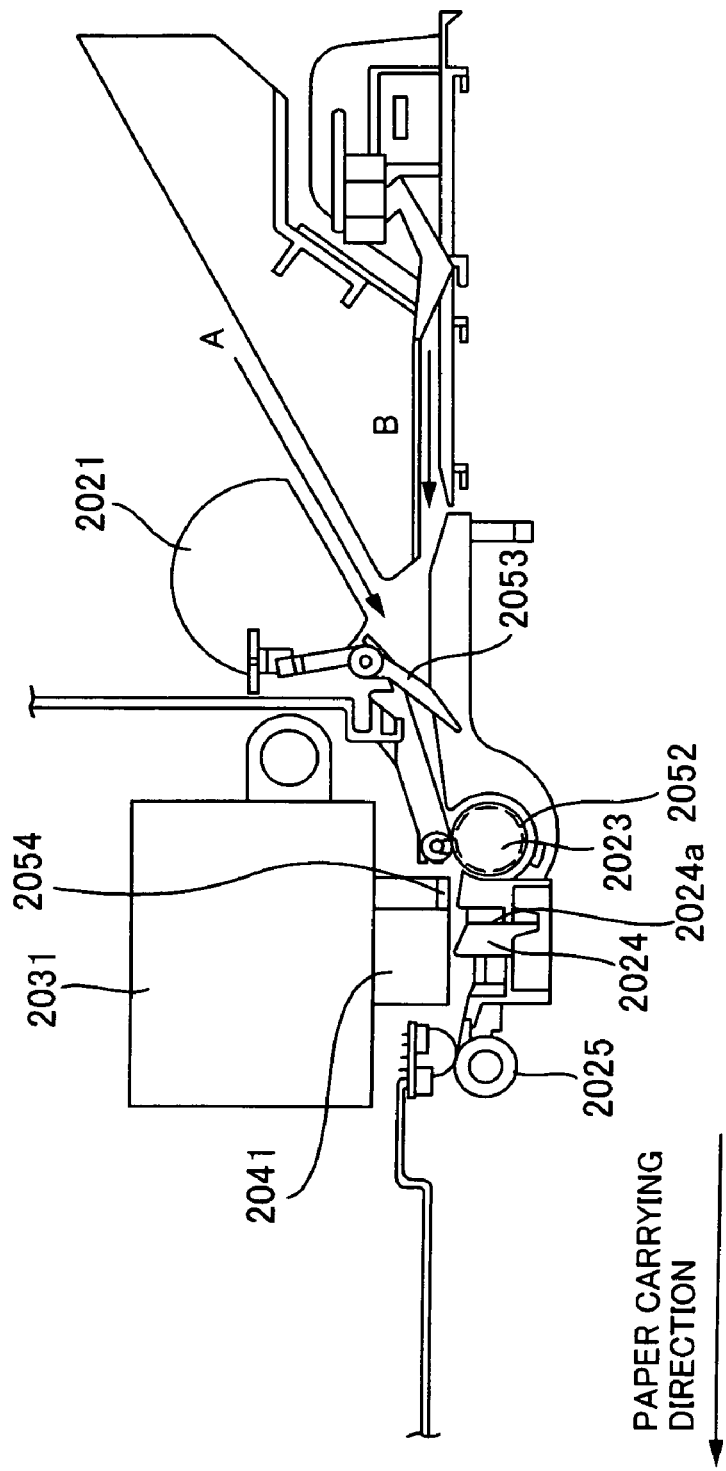

FIG. 46 is a block diagram of the overall configuration of the printer 2001 of this embodiment. FIG. 47 is a schematic diagram of the overall configuration of the printer 2001 of this embodiment. FIG. 48 is a lateral cross-sectional diagram of the overall configuration of the printer 2001 of this embodiment. FIG. 49 is an explanatory diagram showing the arrangement of the nozzles in the lower surface of the head 2041. The basic structure of the printer 2001 according to the present embodiment is described below using these diagrams.

The inkjet printer 2001 of this embodiment has a carry unit 2020, a carriage unit 2030, a head unit 2040, a sensor 2050, and a controller 2060. The printer 2001, which receives print data from the computer 3100, which is an external device, controls the various units (the carry unit 2020, the carriage unit 2030, and the head unit 2040) using the controller 2060. The controller 2060 controls the units in accordance with the print data that is received from the computer 3100, and prints an image on the paper S. The sensor 2050 monitors the conditions within the printer 2001, and outputs the results of this detection to the controller 2060. The controller 2060 controls each unit in accordance with the detection result that is output from the sensor 2050.

The carry unit 2020, which functions as a carrying mechanism for carrying the paper S, carries the paper S to a printable position, and also carries the paper S by a predetermined carry amount in a predetermined direction (hereinafter, referred to as the "carrying direction") during printing.

The carry unit 2020 includes a paper supply roller 2021, a carry motor 2022 (also referred to as "PF motor" below), a carry roller 2023, a platen 2024, and a paper discharge roller 2025. The paper supply roller 2021 is a roller for feeding the paper S that has been inserted into a paper insert opening into the printer 2001. The paper supply roller 2021 has a cross-section that is shaped like the letter D, and the length of its circumferential portion is set longer than the carry distance up to the carry roller 2023. Therefore, by letting the paper supply roller rotate for one turn from a state in which its circumferential portion is removed from the paper surface, it is possible to carry the paper S for the length of the circumferential portion and let the front edge of the paper S reach the carry roller 2023. The carry motor 2022 is a motor for carrying paper in the carrying direction, and is constituted by a DC motor, for example. The carry roller 2023 is a roller for carrying the paper S that has been supplied by the paper supply roller 2021 up to a printable region, and is driven by the carry motor 2022. The platen 2024 supports the paper S during printing from the rear surface side of the paper S. The paper discharge roller 2025 is a roller for carrying the paper S in the carrying direction, on the downstream side of the platen 2024 in the carrying direction. The paper discharge roller 2025 is rotated in synchronization with the carry roller 2023.

The carriage unit 2030 is provided with a carriage 2031 and a carriage motor 2032 (hereinafter, also referred to as "CR motor"). The carriage motor 2032 is a motor for moving the carriage 2031 back and forth in a predetermined direction (hereinafter, this is also referred to as the "carriage movement direction"), and is constituted by a DC motor, for example. The carriage 2031 holds removable ink cartridges 2090 containing ink. A head 2041 for ejecting ink from the nozzles serving as ejection sections is attached to the carriage 2031. Thus, by moving the carriage 2031 back and forth, the head 2041 and the nozzles also move back and forth in the carriage movement direction.

The head unit 2040 is for ejecting ink onto the paper S. The head unit 2040 has a head 2041. The head 2041 has a plurality of nozzles, and ejects ink intermittently from each of the nozzles. Dot rows extending in the carriage movement direction are formed on the paper S by intermittently ejecting ink from the nozzles while the head 2041 moves in the carriage movement direction. Moreover, the region where the dot rows extending in the carriage movement direction are formed can be determined virtually on the paper as rows of pixels extending in the carriage movement direction, and the virtually determined regions are referred to as "dot row regions." Here, "pixels" are virtually defined square boxes on the paper that define the positions where dots are formed on the paper by ejecting ink from the nozzles serving as the ejection sections. In other words, pixels are regions on the medium on which dots can be formed, and can be expressed as "dot formation units." The arrangement of the nozzles, the configuration of the head 2041, the drive circuit for driving the head 2041, and the method for driving the head 2041 are described further below.

The sensor 2050 includes a linear encoder 2051, a rotary encoder 2052, a paper detection sensor 2053, and a paper width sensor 2054, for example. The linear encoder 2051 is for detecting the position in the carriage movement direction, and has a belt-shaped slit plate provided extending in the carriage movement direction, and a photo interrupter that is attached to the carriage 2031 and detects the slits formed in the slit plate. The rotary encoder 2052 is for detecting the amount of rotation of the carry roller 2023, and has a disk-shaped slit plate that rotates in conjunction with rotation of the carry roller 2023, and a photo interrupter for detecting the slits formed in the slit plate.

The paper detection sensor 2053 is for detecting the position of the front edge of the paper S to be printed. The paper detection sensor 2053 is provided at a position where it can detect the front edge position of the paper S as the paper S is being carried toward the carry roller 2023 by the paper supply roller 2021. It should be noted that the paper detection sensor 2053 is a mechanical sensor that detects the front edge of the paper S through a mechanical mechanism. More specifically, the paper detection sensor 2053 has a lever that can be rotated in the paper carrying direction, and this lever is disposed so that it protrudes into the path over which the paper S is carried. Also, as the paper S is carried, the front edge of the paper comes into contact with the lever and the lever is rotated. Thus, the paper detection sensor 2053 detects the front edge of the paper S and whether or not the paper S is present by detecting the movement of this lever with the photo interrupter, for example.

The paper width sensor 2054 is attached to the carriage 2031. In the present embodiment, as shown in FIG. 49, it is attached at substantially the same position as the most upstream side nozzle, with respect to its position in the carrying direction. The paper width sensor 2054 is a reflective optical sensor, and receives, with a light-receiving section, the reflection light of the light that has been irradiated onto the paper S from a light-emitting section, and based on the intensity of the light that is received by the light-receiving section, detects whether or not the paper S is present. The paper width sensor 2054 detects the positions of the edges of the paper S while being moved by the carriage 2031, so as to detect the width of the paper S. The paper width sensor 2054 also can detect the front edge of the paper S depending on the conditions.

The controller 2060 is a control unit for carrying out control of the printer 2001. The controller 2060 has an interface section (I/F) 2061, a CPU 2062, a memory 2063, and a unit control circuit 2064. The interface section 2061 is for exchanging data between the computer 3100, which is an external device, and the printer 2001. The CPU 2062 is a computer processing device for carrying out overall control of the printer. The memory 2063 is for ensuring a working region and a region for storing the programs for the CPU 2062, for instance, and includes storage means such as a RAM, an EEPROM, or a ROM. The CPU 2062 controls the various units 2020, 2030, and 2040 via the unit control circuit 2064 in accordance with programs stored in the memory 2063. In this embodiment, a partial region of the memory 2063 is used as a correction table storage section 2063a for storing correction tables, which are described later.

<Regarding the Arrangement of the Nozzles and the Configuration of the Head>

As shown in FIG. 49, a black ink nozzle row Nk, a cyan ink nozzle row Nc, a magenta ink nozzle row Nm, and a yellow ink nozzle row Ny are formed in the lower surface of the head 2041. Each nozzle row is provided with n (for example, n=180) nozzles, which are ejection openings for ejecting the inks of various colors. The plurality of nozzles of the nozzle rows are arranged in a row at a constant spacing (nozzle pitch: k·D) in the direction intersecting the movement direction of the carriage 2031, that is, in the carrying direction of the paper S. Here, D is the minimum dot pitch in the carrying direction, that is, the spacing of the dots formed on the paper S at the highest resolution. Also, k is an integer of 1 or more. For example, if the nozzle pitch is 180 dpi (1/180 inch) and the dot pitch in the carrying direction is 720 dpi (1/720), then k=4. It should be noted that in the example illustrated here, the nozzles of the nozzle rows are assigned numbers that become smaller toward the nozzles on the downstream side (#1 to #n). That is, the nozzle #1 is positioned more downstream in the carrying direction than the nozzle #n. When these nozzles rows are provided in the head 2041, the region in which dots are formed by a single dot formation operation is broadened, allowing the printing time to be reduced. Also, these nozzle rows are provided for each color of ink, and thus by suitably ejecting ink from these nozzle rows, it is possible to perform multi-color printing.

Furthermore, each nozzle has an ink channel that is in communication with an ink cartridge 2090 in which ink is stored, and is provided with a pressure chamber (not shown in the drawings) midway in the ink channel. The pressure chambers are configured such that their volume is contracted and expanded by a driving element, for example a piezo-element (not shown in the drawings) that is provided in order to eject ink droplets from the nozzles.

<Regarding the Driving of the Head>

Figure 50:
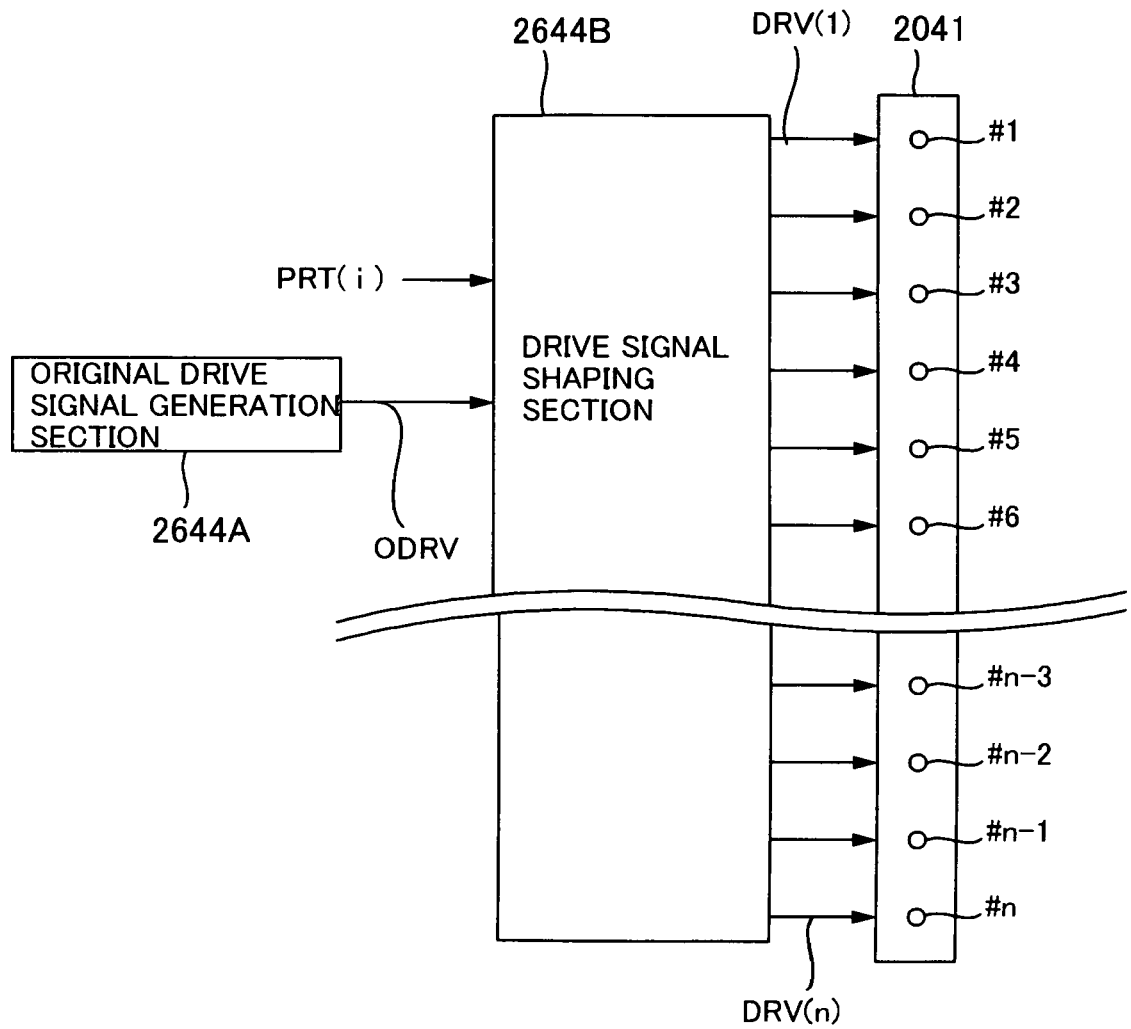

FIG. 50 is an explanatory diagram of the drive circuit of the head 2041. This drive circuit is provided within the unit control circuit 2064 mentioned above. As shown in the diagram, the drive circuit is provided with an original drive signal generation section 2644A and a drive signal shaping section 2644B. In this embodiment, a drive circuit is provided for each nozzle row, that is, for each nozzle row of the colors black (K), cyan (C), magenta (M), and yellow (Y), such that the piezo elements are driven individually for each nozzle row. The number in parentheses at the end of the name of each of the signals in the diagram indicates the number of the nozzle to which that signal is supplied.

The piezo elements mentioned above are deformed each time a drive pulse W1 or W2 (see FIG. 51) is supplied thereto, changing the pressure on the ink within the pressure chamber. In other words, when a voltage of a predetermined time duration is applied between electrodes provided at both ends of the piezo elements, the piezo elements become deformed for the time duration of voltage application and deform an elastic membrane (lateral wall) partitioning a portion of the pressure chamber. The volume of the pressure chamber changes in accordance with this deformation of the piezo element, and due to this change in pressure chamber volume, the pressure on the ink within the pressure chamber is altered. Due to this change in pressure on the ink, an ink droplet is ejected from the corresponding nozzles #1 to #n.

The original drive signal generation section 2644A generates an original drive signal ODRV that is used in common by the nozzles #1 to #n. The original drive signal ODRV of the present embodiment is a signal in which two kinds of drive pulses W1 and W2 are output during the time in which the carriage 2031 moves for a distance corresponding to one pixel, in accordance with the print resolution.

The drive signal shaping section 2644B receives an original drive signal ODRV from the original drive signal generation section together with a print signal PRT(i). The print signal PRT(i) is a signal whose level changes in accordance with the above-noted two-bit print data. The drive signal shaping section 2644B shapes the original drive signal ODRV in correspondence with the level of the print signal PRT(i) and outputs it to the piezo elements of the nozzles #1 to #n as a drive signal DRV(i). The piezo elements of the nozzles #1 to #n are driven in accordance with the drive signal DRV from the drive signal shaping section 2644B.

<Regarding the Drive Signals of the Head>

Figure 51:
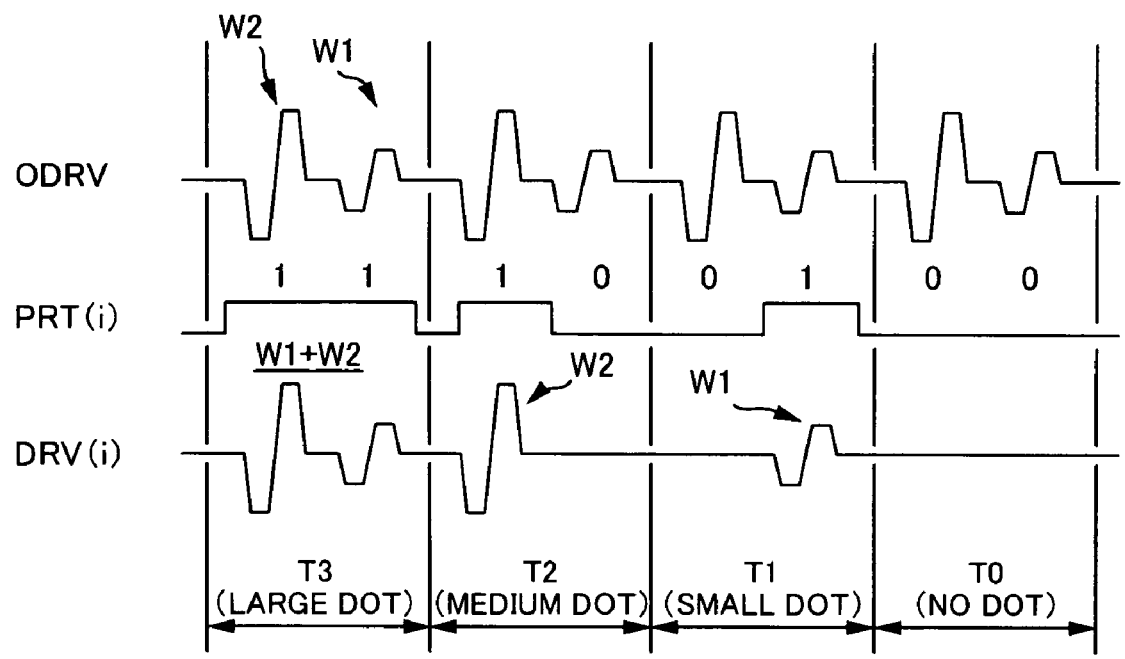

FIG. 51 is a timing chart illustrating the various signals. That is, this drawing shows a timing chart for the various signals, namely the original drive signal ODRV, the print signal PRT(i), and the drive signal DRV(i).

The original drive signal ODRV is a signal used in common for the nozzles #1 to #n, and is output from the original drive signal generation section 2644A to the drive signal shaping section 2644B. The original drive signal ODRV of the present embodiment includes two pulses, namely a first pulse W1 and a second pulse W2, within the time in which the carriage 2031 moves for a distance corresponding to one pixel (referred to as "single pixel period" below), in accordance with the print resolution. The first pulse W1 is a drive pulse for causing an ink droplet of small size (hereinafter referred to as "small ink droplet") to be ejected from the nozzle. The second pulse W2 is a drive pulse for causing an ink droplet of medium size (hereinafter referred to as "medium ink droplet") to be ejected from the nozzle. In other words, by supplying the first pulse W1 to the piezo element, a small ink droplet is ejected from the nozzle. When this small ink droplet lands on the paper S, a dot of small size (small dot) is formed. Likewise, by supplying the second pulse W2 to the piezo element, a medium ink droplet is ejected from the nozzle. When this medium ink droplet lands on the paper S, a dot of medium size (medium dot) is formed.

The print signal PRT(i) is a signal corresponding to the data of each pixel allocated to the pixels in the print data that is transferred from the computer or the like. That is, the print signal PRT(i) is a signal corresponding to the pixel data included in the print data. In this embodiment, the print signal PRT(i) is a signal having two bits of information per pixel. It should be noted that the drive signal shaping section 2644B shapes the original drive signal ODRV in accordance with the level of the print signal PRT(i), and outputs a drive signal DRV(i).

The drive signal DRV is obtained by blocking the original drive signal ODRV in accordance with the level of the print signal PRT. That is, when the print data is "1", then the print signal PRT becomes high level, and the drive signal shaping section 2644B allows the drive pulse for the original drive signal ODRV to pass unchanged and sets it as the drive signal DRV(i). On the other hand, when the print data is "0," then the print signal PRT becomes low level, and the drive signal shaping section 2644B blocks the drive pulse of the original drive signal ODRV. Then, the drive signal DRV(i) from the drive signal shaping section 2644B is individually supplied to the corresponding piezo element. The piezo elements are driven in accordance with the drive signals DRV(i) which are supplied to them.

When the print signal PRT(i) corresponds to the two bits of data "01", then only the first pulse W1 is output in the first half of the single pixel period. Accordingly, a small ink droplet is ejected from the nozzle, forming a small dot on the paper S. When the print signal PRT(i) corresponds to the two bits of data "10" then only the second pulse W2 is output in the second half of a single pixel period. Accordingly, a medium ink droplet is output from the nozzle, forming a medium dot on the paper S. When the print signal PRT(i) corresponds to the two bits of data "11" then both the first pulse W1 and the second pulse W2 are output during a single pixel period. Accordingly, a small ink droplet and a medium ink droplet are successively ejected from the nozzle, forming a dot of large size (large dot) on the paper S. Thus, the printer 2001 is able to form dots of a plurality of sizes (here, three kinds). When the print signal PRT(i) corresponds to the two bits of data "00" then neither the first pulse W1 nor the second pulse W2 are output during the pixel period. In this case, no ink droplet of any size is ejected from the nozzle, and no dot is formed on the paper S.

As described above, the drive signal DRV(i) in a single pixel period is shaped so that it may have four different waveforms corresponding to the four different values of the print signal PRT(i).

===(2) Printer Driver===

<Regarding the Printer Driver>

Figure 52:
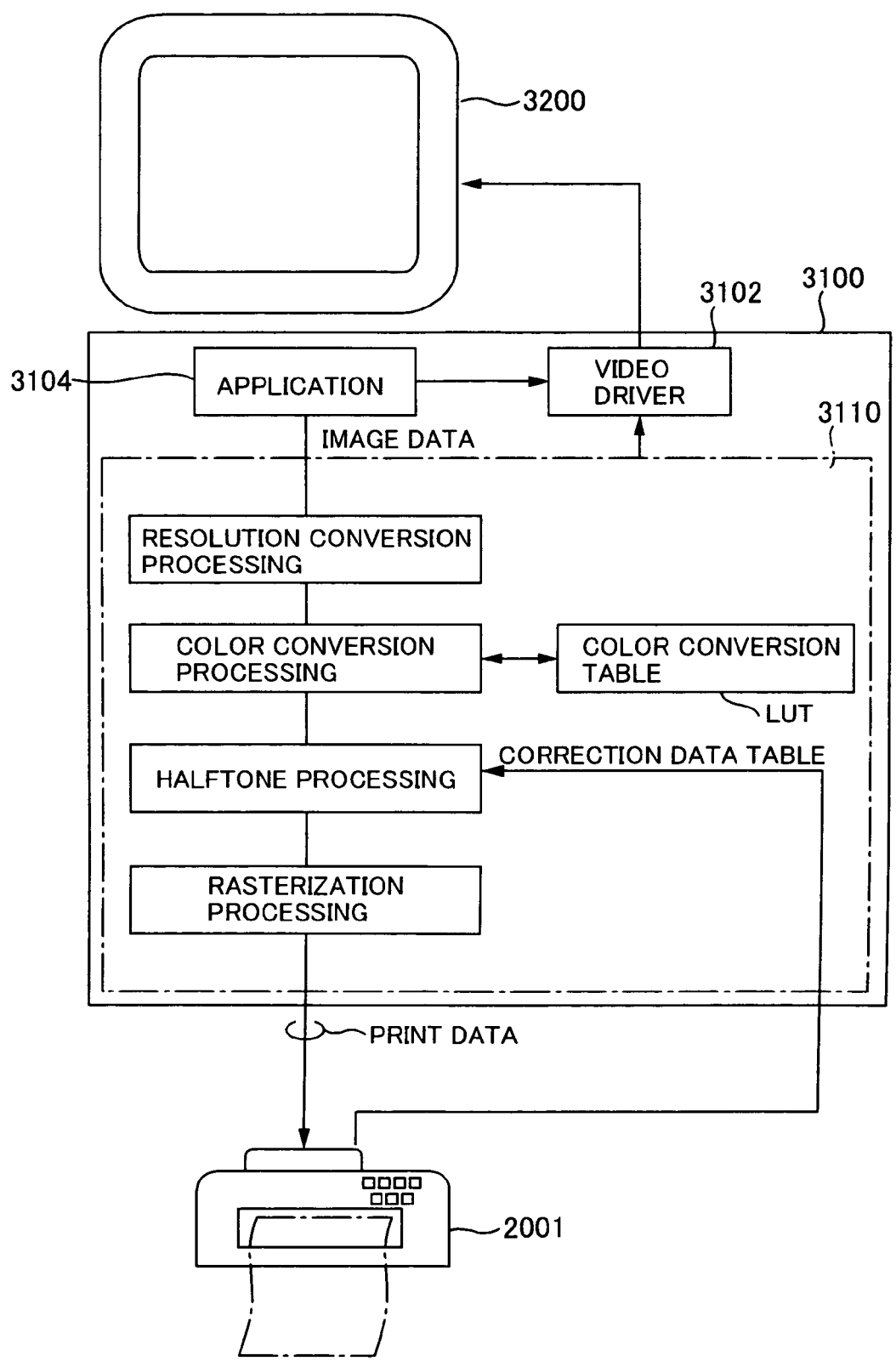

FIG. 52 is a schematic explanatory diagram of the basic processes carried out by the printer driver 3110. It should be noted that structural elements that have already been described are assigned identical reference numerals and are not further explained.

On the computer 3100, computer programs such as a video driver 3102, an application program 1104, and the printer driver 3110 operate under an operating system installed on the computer 3100. The video driver 3102 has the function of displaying a predetermined screen on the display device 3200 in accordance with display commands from the application program 1104 and the printer driver 3110.

The application program 1104 has, for example, a function for image editing or the like and creates data related to an image (image data). A user can give an instruction to print an image edited by the application program 1104 via the user interface of the application program 1104. Upon receiving the print instruction, the application program 1104 outputs the image data to the printer driver 3110.

The printer driver 3110 receives the image data from the application program 1104, converts the received image data into print data that can be printed, and outputs the converted print data to the printer 2001. The image data has pixel data as the data for the pixels of the image to be printed. The pixel data is expressed by the gradation values of each of the RGB or CMYK colors. The gradation values are converted in accordance with the later-described processing stages, and are ultimately converted at the print data stage into print data corresponding to the dots to be formed on the paper (data such as the color and the size of the dots).

Print data is data in a format that can be interpreted by the printer 2001, and includes the pixel data and various command data. Here, "command data" refers to data for instructing the printer 2001 to carry out a specific operation, and is data indicating the carry amount, for example.

In order to convert the image data that is output from the application program 1104 into print data, the printer driver 3110 carries out such processes as resolution conversion, color conversion, halftoning, and rasterization. The various processes carried out by the printer driver 3110 are described below.

Resolution conversion is a process for converting image data (text data, image data, etc.) output from the application program 1104 to the resolution (the spacing between dots when printing; also referred to as "print resolution") for printing the image on the paper S. For example, when the print resolution has been specified as 720×720 dpi, then the image data obtained from the application program 1104 is converted into image data having a resolution of 720×720 dpi.

Pixel data interpolation and thinning out are examples of this conversion method. For example, if the resolution of the image data is lower than the print resolution that has been specified, then linear interpolation or the like is performed to create new pixel data between adjacent pixel data. On the other hand, if the resolution of the image data is higher than the print resolution, then the pixel data is thinned out, for example, at a set ratio to set the resolution of the image data to a uniform print resolution.

Also, in this resolution conversion processing, a size adjustment is performed by adapting the image data to the size of the print region (the region onto which ink is ejected in practice).

It should be noted that the pixel data in the image data output by the application program 1104 represents gradation values of many levels (for example, 256 levels) expressed in RGB color space. The pixel data representing such RGB gradation values is hereinafter referred to as "RGB pixel data," and the image data made of this RGB pixel data is referred to as "RGB image data."

Color conversion processing is processing for converting the RGB pixel data of the RGB image data into data representing gradation values of many levels (for example, 256 levels) expressed in CMYK color space. Here, C, M, Y and K are the ink colors of the printer 2001. That is, C stands for cyan, M stands for magenta, Y for yellow, and K for black. Hereinafter, the pixel data representing CMYK gradation values is referred to as CMYK pixel data, and the image data composed of this CMYK pixel data is referred to as CMYK image data. Color conversion processing is carried out by the printer driver 3110, with reference to a table that correlates RGB gradation values and CMYK gradation values (color conversion lookup table LUT).

Halftone processing is processing for converting CMYK pixel data having many gradation values into CMYK pixel data having few gradation values, which can be expressed by the printer 2001. For example, through halftone processing, CMYK pixel data representing 256 gradation values is converted into 2-bit CMYK pixel data representing four gradation values. The 2-bit CMYK pixel data is data that indicates, for each color, "no dot formation" (binary value "00"), "small dot formation" (binary value "01"), "medium dot formation" (binary value "10"), and "large dot formation" (binary value "11").

Dithering or the like is used for such a halftone processing to create 2-bit CMYK pixel data with which the printer 2001 can form dispersed dots. It should be noted that halftone processing through dithering is described later. Also, the method used for halftone processing is not limited to dithering, and it is also possible to use γ-correction or error diffusion. It should be noted that in the halftone processing of the present embodiment, a later-described darkness correction, that is, a correction for each of the dot row regions is carried out in order to inhibit darkness non-uniformities between the dot row regions.

Rasterization is processing for changing the CMYK image data that has been subjected to halftone processing into the data order in which it is to be transferred to the printer 2001. Data that has been rasterized is output to the printer 2001 as print data.

<Halftone Processing Through Dithering>

Figure 53:
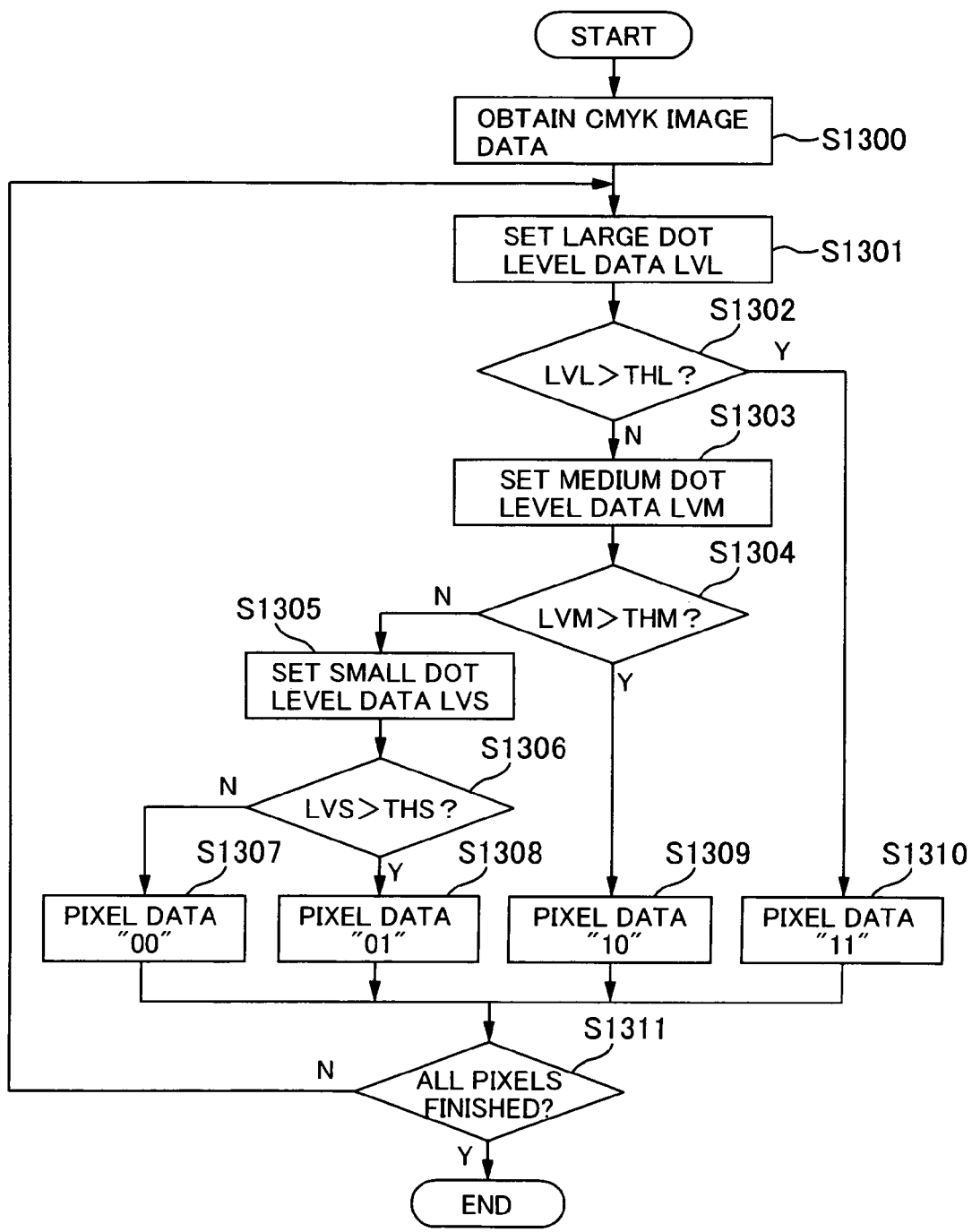

Here, halftone processing through dithering is described in more detail. FIG. 53 is a flowchart of halftoning using dithering. The printer driver 3110 performs the following steps in accordance with this flowchart.

First, in Step S1300, the printer driver 3110 obtains the CMYK image data. The CMYK image data is made of image data expressed by 256 gradation values for each ink color C, M, Y, and K. In other words, the CMYK image data include C image data for cyan (C), M image data for magenta (M), Y image data for yellow (Y), and K image data for black (K). This C, M, Y, and K image data is respectively made of C, M, Y, and K pixel data indicating the gradation values of that ink color. It should be noted that the following description can be applied to any of the C, M, Y, and K image data, although only the K image data is described as representative image data.

The printer driver 3110 performs the processing of steps S1301 to S1311 for all of the K pixel data in the K image data while successively changing the K image data to be processed. Through this processing, the K image data is converted into 2-bit data representing gradation values of the four gradations mentioned above for each K pixel data.

This conversion process is described in detail here. First, in Step S1301, the large dot level LVL is set in accordance with the gradation value of the K pixel data to be processed. This setting is performed through the following procedure, using for example a creation ratio table. Here, level data means values associating the dot creation ratios 0 to 100% with the 256 gradation values 0 to 255. Here, the "dot creation ratio" means the proportion of pixels in which dots are formed among all the pixels in a uniform region reproduced with a constant gradation value. For example, let us assume that the dot creation ratio for a particular gradation value is large dot 65%, medium dot 25%, and small dot 10%, and at this dot creation ratio, a region of 100 pixels made of 10 pixels in the horizontal direction by 10 pixels in the vertical direction is printed. In this case, of the 100 pixels, 65 of the pixels are formed by large dots, 25 of the pixels are formed by medium dots, and 10 of the pixels are formed by small dots.

Figure 54:
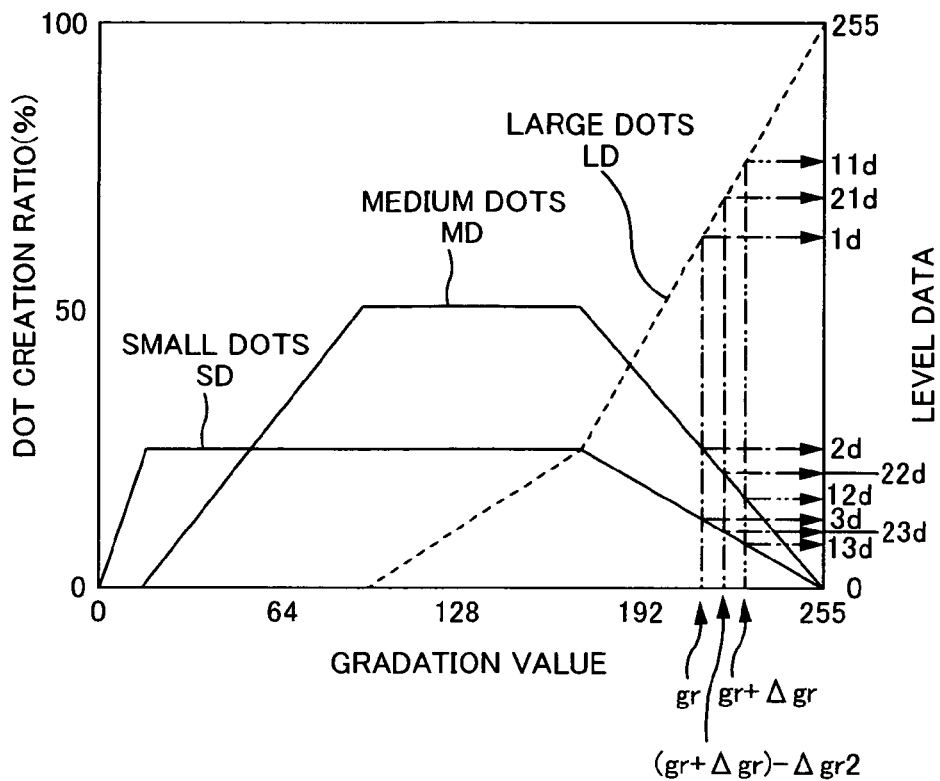

FIG. 54 is a diagram showing a creation ratio table that is used for setting the level data for large, medium, and small dots. In this diagram, the horizontal axis marks the gradation values (0-255), the vertical axis on the left marks the dot creation ratio (%), and the vertical axis on right marks the level data (0-255). The profile SD represented by the thin solid line in FIG. 54 indicates the dot creation ratio (level data) for the small dots. Also, the profile MD represented by the thick solid line indicates the dot creation ratio (level data) of the medium dots, and the profile LD represented by the dotted line indicates the creation ratio (level data) of the large dots.

In Step S1301, the level data LVL corresponding to the gradation value is read from the profile LD for large dots. For example, as shown in FIG. 54, if the gradation value of the K pixel data to be processed is gr, then the level data LVL of the large dots is determined to be id from the point of intersection with the profile LD. In practice, the profile LD is stored in form of a one-dimensional table in a memory (not shown) such as a ROM within the computer 3100, and the printer driver 3110 determines the level data by referencing this table.

In Step S1302, it is determined whether or not the level data LVL that has been set as described above is higher than the threshold value THL. Here, determination of whether the dots are on or off is performed using dithering. The threshold value THL is set to a different value for each pixel block of a so-called dither matrix. This embodiment uses a dither matrix in which the values from 0 to 254 are expressed by the pixel blocks of a 16×16 square.

Figure 55:
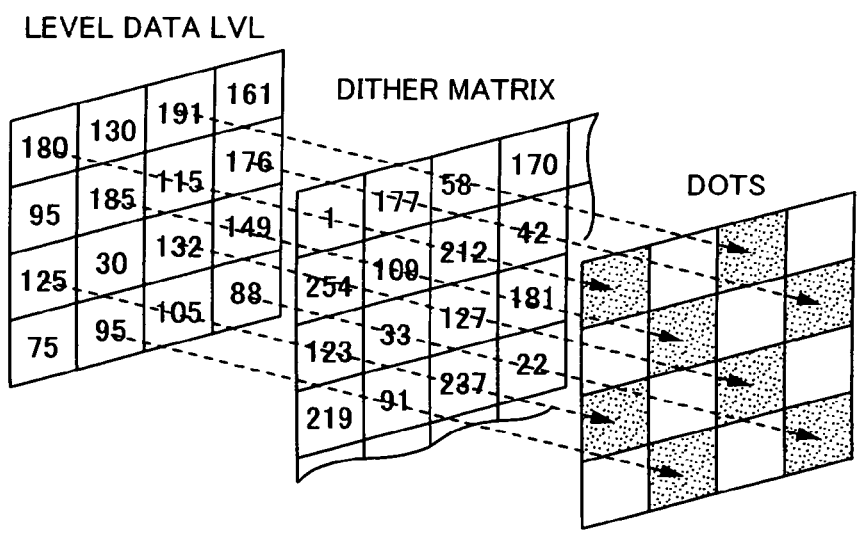

FIG. 55 is a diagram illustrating how dots are determined to be on or off through dithering. For the sake of illustration, FIG. 55 shows only some of the K pixel data. First, the level data LVL of the K pixel data is compared with the threshold value THL of the pixel block in the dither matrix that corresponds to that K pixel data. Then, if the level data LVL is higher than the threshold value THL, the dot is set to on, and if the level data LVL is smaller, the dot is set to off. In this diagram, the pixel data of the shaded regions in the dot matrix are the K pixel data in which the dots are set to on (that is, dots are formed). In other words, in Step S1302, if the level data LVL is higher than the threshold value THL, then the procedure advances to Step S1310, and otherwise the procedure advances to Step S1303. Here, if the procedure advances to step S1310, then the printer driver 3110 stores the K pixel data being processed, assigning a value of "11" to indicate that the pixel data (2-bit data) represent a large dot, and then the procedure advances to step S1311. Then, in Step S1311, it is determined whether or not all of the K pixel data has been processed. If the processing is finished, then the halftone processing is ended, and if processing is not finished, then the processing shifts to the K pixel data that has not yet been processed, and the procedure returns to Step S1301.

On the other hand, if the procedure advances to Step S1303, then the printer driver 3110 sets the level data LVM for medium dots. The level data LVM for medium dots is set by the creation ratio table noted above, based on the gradation value. The setting method is the same as that for setting the large dot level data LVL. That is, in the example shown in FIG. 54, the level data LVM corresponding to the gradation value gr is determined to be 2d, which is indicated by the intersection with the profile MD, which indicates the creation ratio for medium dots.

Next, in step S1304, the medium dot level data LVM is compared with the threshold value THM to determine whether or not the medium dot is on or off. The method by which dots are determined to be either on or off is the same that as that for large dots. However, when determining whether medium dots are on or off, the threshold values THM used for this determination are set to values that are different from the threshold values THL for large dots. That is, if the dots are determined to be on or off using the same dither matrix for the large dots and the medium dots, then the pixel blocks where the dots are likely to be on will be the same in both cases. That is, there is a high possibility that when a large dot is off, the medium dot will also be off. As a result, there is a risk that the creation ratio of medium dots will be lower than the desired creation ratio. In order to prevent this phenomenon, in the present embodiment there are different dither matrices for large dots and medium dots. That is, by changing the pixel blocks that are likely to be on for the large dots and the medium dots, those dots are formed appropriately.

Figure 56A:
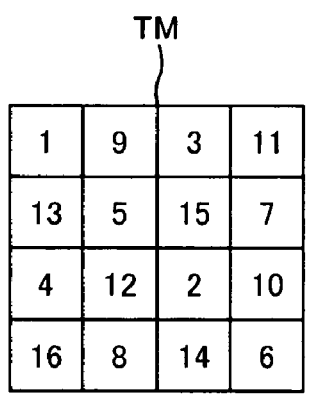
FIG. 56A is a diagram illustrating a first dither matrix.
Figure 56B:
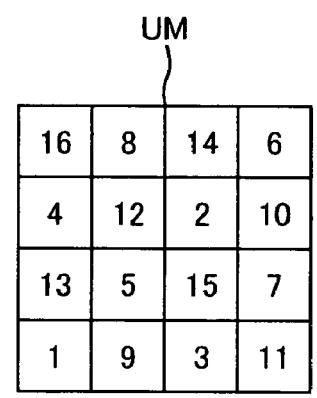
FIG. 56B is a diagram illustrating a second dither matrix.

FIG. 56A and FIG. 56B show the relationship between the dither matrix that is used for assessing large dots and the dither matrix that is used for assessing medium dots. In this embodiment, the first dither matrix TM of FIG. 56A is used for the large dots. The second dither matrix UM in FIG. 56B is used for the medium dots. The second dither matrix UM is obtained by mirroring the threshold values in the first dither matrix TM at the center in the carrying direction (the vertical direction in these diagrams). As explained previously, the present embodiment uses a 16×16 matrix, but for convenience of illustration, FIGS. 56A and 12B show a 4×4 matrix. It should be noted that it is also possible to use completely different dither matrices for the large dots and medium dots.

Then, in Step S1304, if the medium dot level data LVM is higher than the medium dot threshold value THM, then it is determined that the medium dot should be on, and the procedure advances to Step S1309, and otherwise the procedure advances to Step S1305. Here, if the procedure advances to Step S1309, then the printer driver 3110 assigns a value of "10" to the K pixel data being processed, storing it as pixel data indicating a medium dot, and then the procedure advances to Step S1311. Then, in Step S1311, it is determined whether or not all of the K pixel data has been processed. If the processing is finished, then the halftone processing is ended, and if processing is not finished, then the processing shifts to the K pixel data that has not yet been processed, and the procedure returns to Step S1301.

On the other hand, if the procedure advances to Step S1305, then the small dot level data LVS is set in the same way that the level data of the large dots and the medium dots is set. It should be noted that the dither matrix for the small dots is preferably different from those for the medium dots and the large dots, in order to prevent a drop in the creation ratio of small dots as discussed above.

Then, in Step S1306, the printer driver 3110 compares the level data LVS and the small dot threshold values THS, and if the small dot level data LVS is higher than the small dot threshold value THS, then the procedure advances to Step S1308. Otherwise the procedure advances to Step S1307. Here, when the procedure advances to Step S1308, then a value of "01" for pixel data that indicates a small dot is assigned to the K pixel data being processed and the data is stored, and then the procedure advances to Step S1311. In Step S1311, it is determined whether or not all of the K pixel data has been processed. If processing is not finished, then the processing shifts to the K pixel data that has not yet been processed, and the procedure returns to Step S1301. On the other hand, if processing is finished, then halftone processing for the K image data is ended, and halftone processing is performed in the same manner for the image data of the other colors.

On the other hand, if the procedure advances to step S1307, then the printer driver 3110 assigns a value of "00" to the K pixel data being processed and stores it as pixel data indicating the absence of a dot, and then the procedure advances to step S1311. In Step S1311, it is determined whether or not all of the K pixel data has been processed. If processing is not finished, then the processing shifts to the K pixel data that has not yet been processed, and the procedure returns to Step S1301. On the other hand, if processing is finished, then halftone processing for the K image data is ended, and halftone processing is performed in the same way for the image data of the other colors.

===(2) Regarding the Printing Operation===

Figure 57:
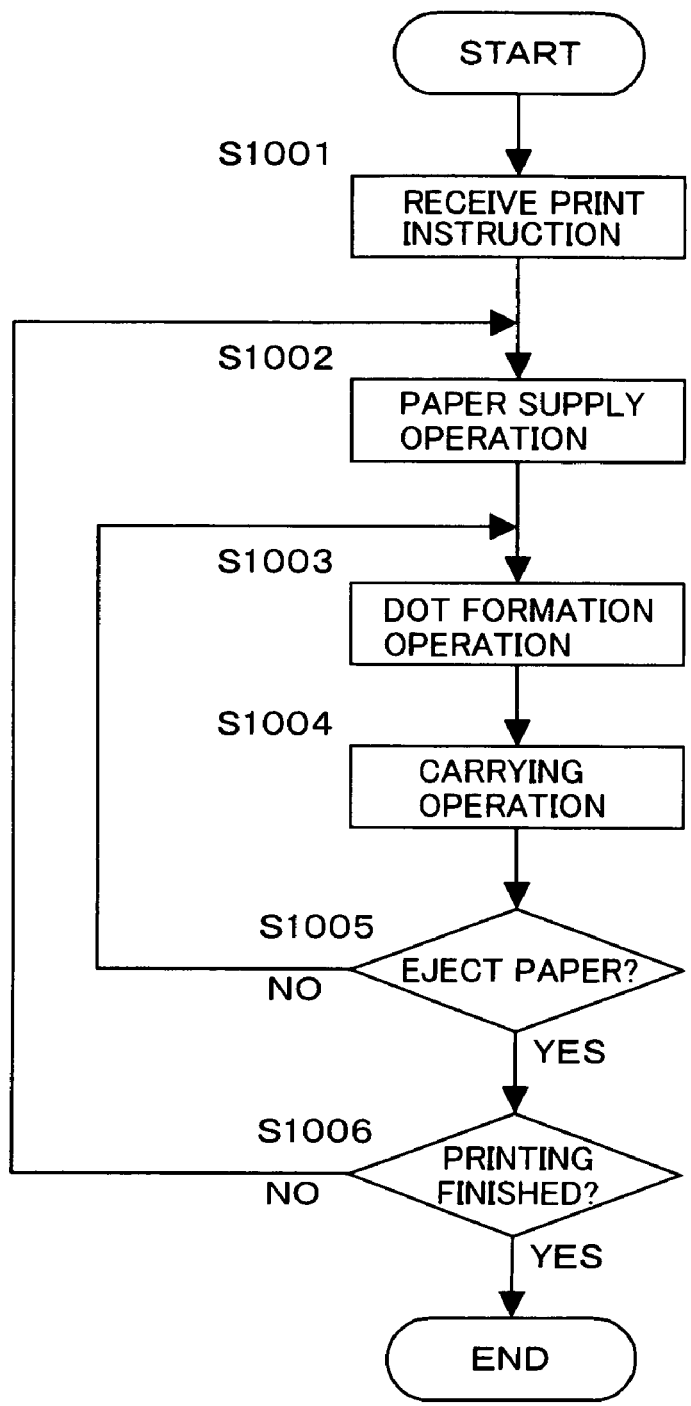

FIG. 57 is a flowchart of the processing during printing. The various operations that are described below are achieved by the controller 2060 controlling the various units in accordance with a program stored in the memory. This program includes code for executing the various processes.

Receive Print Command (S1001): The controller 2060 receives a print command via the interface section 2061 from the computer 3100. This print command is included in the header of the print data transmitted from the computer 3100. The controller 2060 then analyzes the content of the various commands included in the print data that is received and uses the various units to perform the following paper supply operation, carrying operation, and dot formation operation, for example.

Paper Supply Operation (S1002): Next, the controller 2060 performs the paper supply operation. The paper supply operation is a process for moving the paper S, which is to be printed, and positioning it at a print start position (the so-called indexing position). In other words, the controller 2060 rotates the paper supply roller 2021 to supply the paper S to be printed up to the carry roller 2023. Next, the controller 2060 rotates the carry roller 2023 to position the paper S, that has been fed from the paper supply roller 2021, at the print start position. It should be noted that when the paper S has been positioned at the print start position, at least some of the nozzles of the head 2041 are in opposition to the paper S.

Dot Formation Operation (S1003): The controller 2060 performs the dot formation operation. The dot formation operation is an operation for intermittently ejecting ink from the head 2041 moving in the carriage movement direction, so as to form dots on the paper S. The controller 2060 drives the carriage motor 2032 to move the carriage 2031 in the carriage movement direction. Also, the controller 2060 causes ink to be ejected from the head 2041 in accordance with the print data during the period that the carriage 2031 is moving. Then, as mentioned above, if ink that is ejected from the head 2041 lands on the paper S, dots are formed on the paper S. In this situation, when ink is ejected from the nozzles while moving the carriage 2031, a dot row extending in the movement direction (also referred to as "raster line" below) is formed on the paper S.

Carrying Operation (S1004): Next, the controller 2060 performs the carrying operation. The carrying operation is a process for moving the paper S relative to the head 2041 in the carrying direction. The controller 2060 drives the carry motor 2022 to rotate the carry roller 2023 and thereby carry the paper S in the carrying direction. Through this carrying operation, the head 2041 becomes able to form dots at positions that are different from the positions of the dots formed in the above-described dot formation operation.

Paper Discharge Judgment (S1005): Next, the controller 2060 determines whether or not to discharge the paper S that is being printed. In this determination, the paper is not discharged if there remains data to be printed on the paper S that is being printed. In this case, the controller 2060 repeats in alternation the dot formation operation and the carrying operation until there is no longer any data to be printed, gradually printing an image made of dots on the paper S. When there is no longer any data for printing to the paper S that is being printed, the controller 2060 discharges that paper S. That is, the controller 2060 discharges the printed paper S to the outside by rotating the paper discharge roller 2025. It should be noted that whether or not to discharge the paper can also be determined based on a paper discharge command that is included in the print data.

Judgment Whether Printing is Finished (S1006): Next, the controller 2060 determines whether or not to continue printing. If there is a following paper S to be printed, then a new paper is supplied by a paper supply operation (S1002) and printing is continued. If there is no following paper S to be printed, then the printing operation is terminated.

===(2) Regarding the Reason Why Darkness Non-uniformities Occur in the Image===

Darkness non-uniformities that occur in a multicolor image that is printed using CMYK inks are generally due to darkness non-uniformities that occur in each of those ink colors. For this reason, the method that is normally adopted is a method for inhibiting darkness non-uniformities in images printed in multiple colors by individually inhibiting darkness non-uniformities in each of the ink colors.

Figure 58:
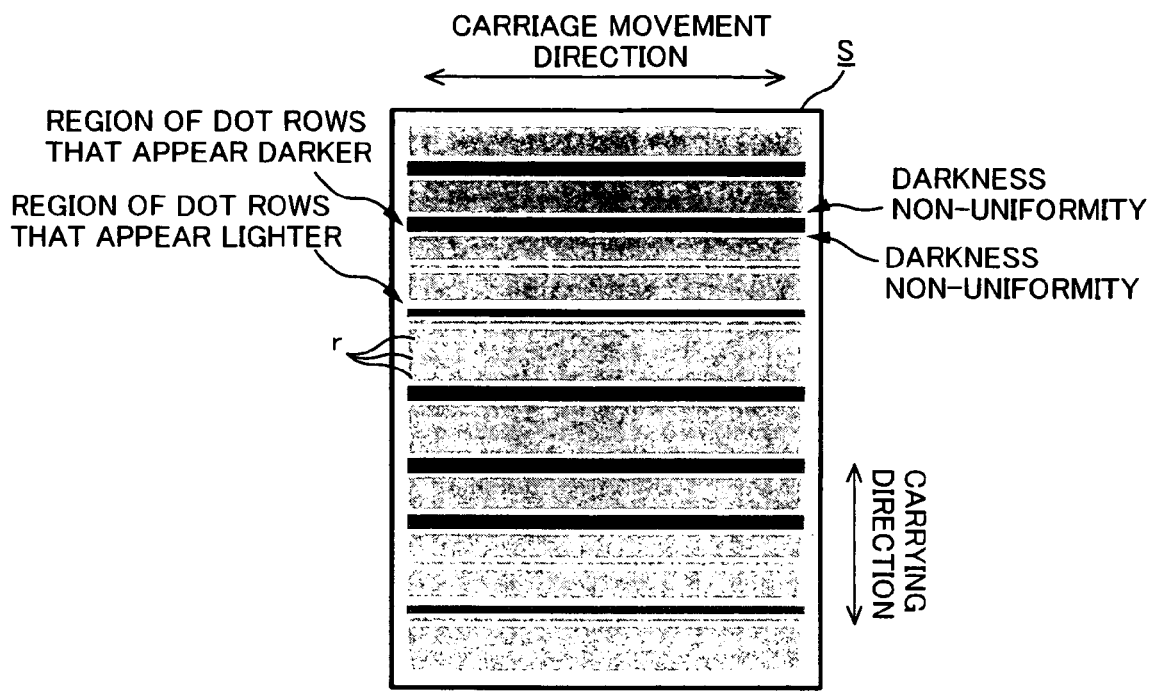

Accordingly, the following is an explanation of why darkness non-uniformities occur in images printed in a single color. FIG. 58 is a diagram illustrating the darkness non-uniformities that occur in a monochrome printed image in the carrying direction of the paper S.

The darkness non-uniformities in the carrying direction that are illustrated in FIG. 58 appear as bands parallel to the carriage movement direction (for convenience, these are also referred to as "horizontal bands"). These darkness non-uniformities of horizontal bands occur for example due to discrepancies in the ink ejection amount between nozzles, but they can also occur due to discrepancies in the processing precision of the nozzles. That is, variations in the direction of travel of the ink that is ejected from the nozzles may occur due to discrepancies in the processing precision of the nozzles. Due to this variation in the travel direction, the positions of the dots that are formed by the ink that lands on the paper S may deviate in the carrying direction from the target formation positions. In this case, also the formation position of raster lines r constituted by these dots automatically shifts relative to the carrying direction away from the target formation positions. For this reason, the spacing between adjacent raster lines r in the carrying direction becomes periodically wider or narrower. When viewed macroscopically, these appear as darkness non-uniformities of horizontal bands. That is to say, due to the spacing between adjacent raster lines r becoming wider or narrower, dot row regions in which more dots or dot portions are formed than should be formed appear macroscopically darker, whereas dot row regions in which fewer dots or dot portions are formed than should be formed appear macroscopically lighter. Here, the raster lines r are dot rows that are formed extending in the carriage movement direction by intermittently ejecting ink while moving the carriage 2031.

It should be noted that the causes for darkness non-uniformities also apply to the other ink colors. As long as any of the colors CMYK has this tendency, darkness non-uniformities will appear in an image printed in multiple colors.

===(2) Method for Printing an Image of the Present Embodiment===

Figure 59:
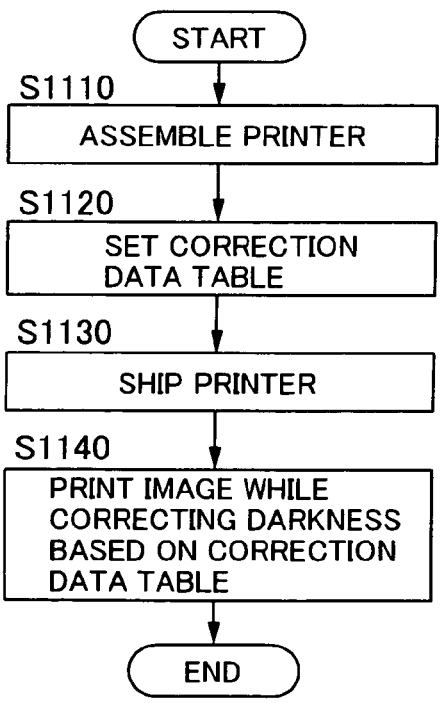

FIG. 59 is a flowchart showing the flow of the processing in the method for printing an image according to the present embodiment. An outline of each step is described below with reference to this flowchart. First, the printer 2001 is assembled on the manufacturing line (S1110). Next, an operator in charge of inspection sets a correction table for correcting the darkness in the printer 2001 (S1120). The correction table set at this time is different from the correction table that is set by the values that are corrected during the darkness correction. For example, if the values that are corrected are the image data representing the gradation value of each pixel (dot formation unit), then it is an image data correction table for correcting the gradation value corresponding to each pixel supplied as the data of the image to be printed. And if the value to be corrected are the level data (dot creation ratio) that are used for the halftone processing when converting the image data into print data, then a creation ratio table for converting the gradation values corresponding to each pixel into level data is set. Here, the correction table representing the values for correcting the image data or the dot creation ratios and converting them into new data is stored in the memory of the printer 2001, or more precisely in a correction table storage section 2063a (see FIG. 46).

Next, the printer 2001 is shipped (S1130). Then, a user that has purchased the printer 2001 performs actual printing of an image, and at the time of this actual printing, the printer 2001 performs a darkness correction for each raster line based on the correction table that is stored in the correction table storage section 2063a, printing an image on the paper S (S1140).

Here, "actual printing" refers to the user printing a predetermined image, such as a natural image, as opposed to the printing of a predetermined test pattern, such as a correction pattern or the like. The method of printing an image according to the present embodiment is achieved by the correction value setting process (Step S1120) and the actual printing of the image (Step S1140). Accordingly, Step S1120 and Step S1140 are described below.

<Step S1120: Setting the Correction Table for Inhibiting Darkness Non-Uniformities>

Figure 60:
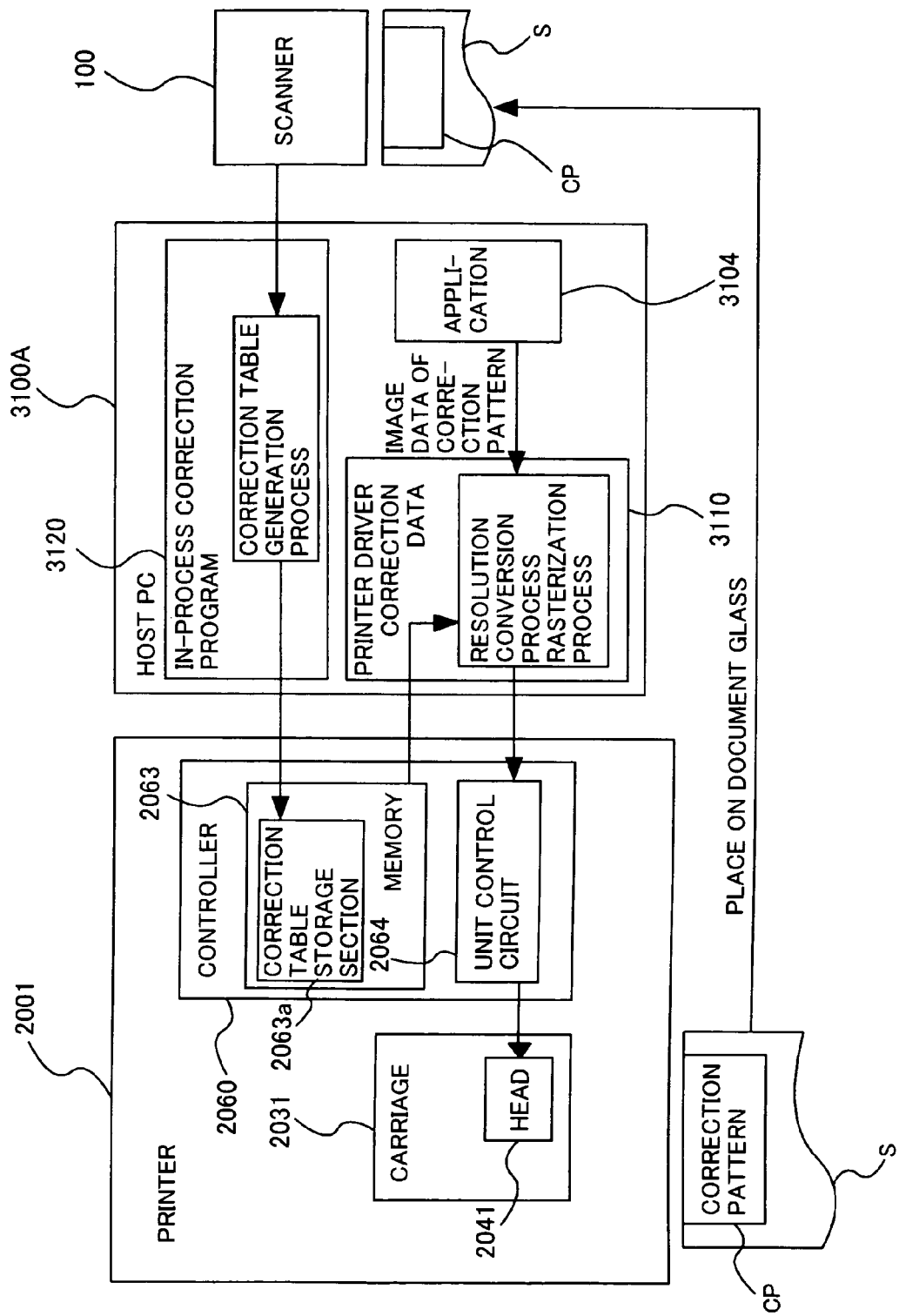

FIG. 60 is a block diagram illustrating the device used in setting the correction table. It should be noted that structural elements that have already been described are assigned identical reference numerals and are not further explained. In FIG. 60, computer 3100A, which is arranged on an inspection line, runs an in-process correction program. This in-process correction program can perform a correction table generation process. With this correction table generation process, a correction table for a targeted dot row region is generated based on a data group (for example, grey-scale data of 256 gradations of a predetermined resolution) obtained by reading a correction pattern that has been printed on a paper S with a scanner 100. It should be noted that the correction table generation process is described in greater detail later. Also, an application run by the computer 3100A outputs print data for printing a correction pattern CP of specified gradation values to the printer 2001.

FIG. 61 is a schematic diagram of recording tables that are provided in the memory of the computer 3100A. A recording table is prepared for each ink color. The measurement values of the correction pattern CP printed for each color are recorded in the corresponding recording table.

The recording tables record the measured gradation values C obtained by measuring a plurality of correction patterns CP (explained below) that have been printed with a plurality of gradation values (referred to as "specified gradation values" below) representing a plurality of different darkness values. The recording tables further record the specified gradation values S of each correction pattern in association with the measured gradation values C. In the present embodiment, eight correction patterns are printed in accordance with eight specified gradation values for each color, and the darkness of each correction pattern is measured.

In each recording table, two fields are prepared for each darkness. That is to say, in the recording tables, eight sets of measurement information corresponding to the measured gradation values C and the specified gradation values S are stored for each dot row region. More specifically, in the leftmost field and the ninth field from the left in the drawing, the measurement information based on the correction pattern printed in accordance with the lowest specified gradation value of the eight specified gradation values is recorded. That is to say, in the left-most field, the measured gradation value Ca of the correction pattern CPa is recorded, and in the ninth field from the left, the specified gradation value Sa of the correction pattern CPa is recorded. In the second field from the left and in the tenth field from the left, the measured gradation value Cb of the correction pattern CPb with the second-lowest specified gradation value of the eight specified gradation values and the specified gradation value Sb of the correction pattern CPb are recorded, respectively. Thus, the measured gradation value C and the specified gradation value S of a series of darkness values are recorded in the individual fields. In the eighth field from the left, the measured gradation value Ch of the correction pattern CPh of the highest specified gradation value of the eight specified gradation values is recorded, and in the right-most field, the highest specified gradation value Sh of the eight specified gradation values is recorded.

Each record is given a record number. The number of records corresponds to the number of dot row regions that are anticipated for the length in the carrying direction of the printable region of the paper. The measured gradation values Ca, Cb, ..., Ch and the specified gradation values Sa, Sb, ..., Sh for the same dot row region of the correction patterns CPa, CPb, ..., CPh of each darkness are all recorded in records with the same record number.

Figure 62:
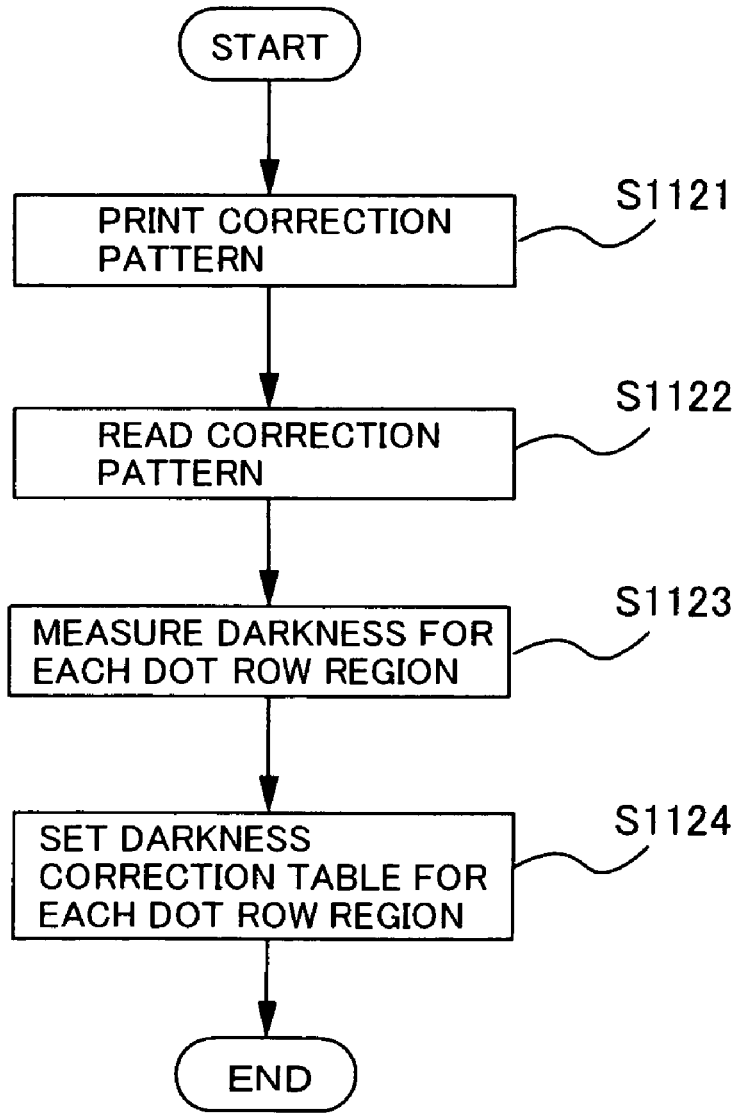

FIG. 62 is a flowchart showing the procedure of Step S1120 in FIG. 59. The procedure for setting the correction tables is described below with reference to this flowchart.

This setting procedure includes a step of printing a correction pattern CP (S1121), a step of reading the correction pattern CP (S1122), a step of measuring the pixel darkness of each dot row region (S1123), and a step of setting a correction table in accordance with the measured gradation value of the darkness in each dot row region (S1124). These steps are described in detail below. In the present embodiment, the specified gradation values printed in the correction pattern are the eight gradation values corresponding to darkness values of 10%, 20%, 30%, 40%, 50%, 60%, 70% and 80%, for example. The printable darkness region ranges from a darkness of 0 to a darkness of 100%, and the gradation value corresponding to a darkness of 0 is the lowest value "0", whereas the gradation value corresponding to a darkness of 100% is the highest value "255".

(1) Regarding Printing of the Correction Pattern CP (S1121):

First, in Step S1121, a correction pattern CP is printed for each ink color on the paper S. Here, an operator on the inspection line communicably connects the printer 2001 to a computer 3100A on the inspection line and prints the correction patterns CP using the printer 2001. In other words, the operator performs an operation to print the correction patterns CP through a user interface of the computer 3100A. Through this operation, the computer 3100A reads the print data of the correction patterns CP that is stored in the memory, and outputs this print data to the printer 2001. The printer 2001 prints the correction patterns CP on the paper S, in accordance with the print data. It should be noted that the printer 2001 that prints the correction patterns CP is the printer 2001 for which the correction tables are to be set. In other words, the correction tables are set for each printer 2001 individually.

Figure 63:
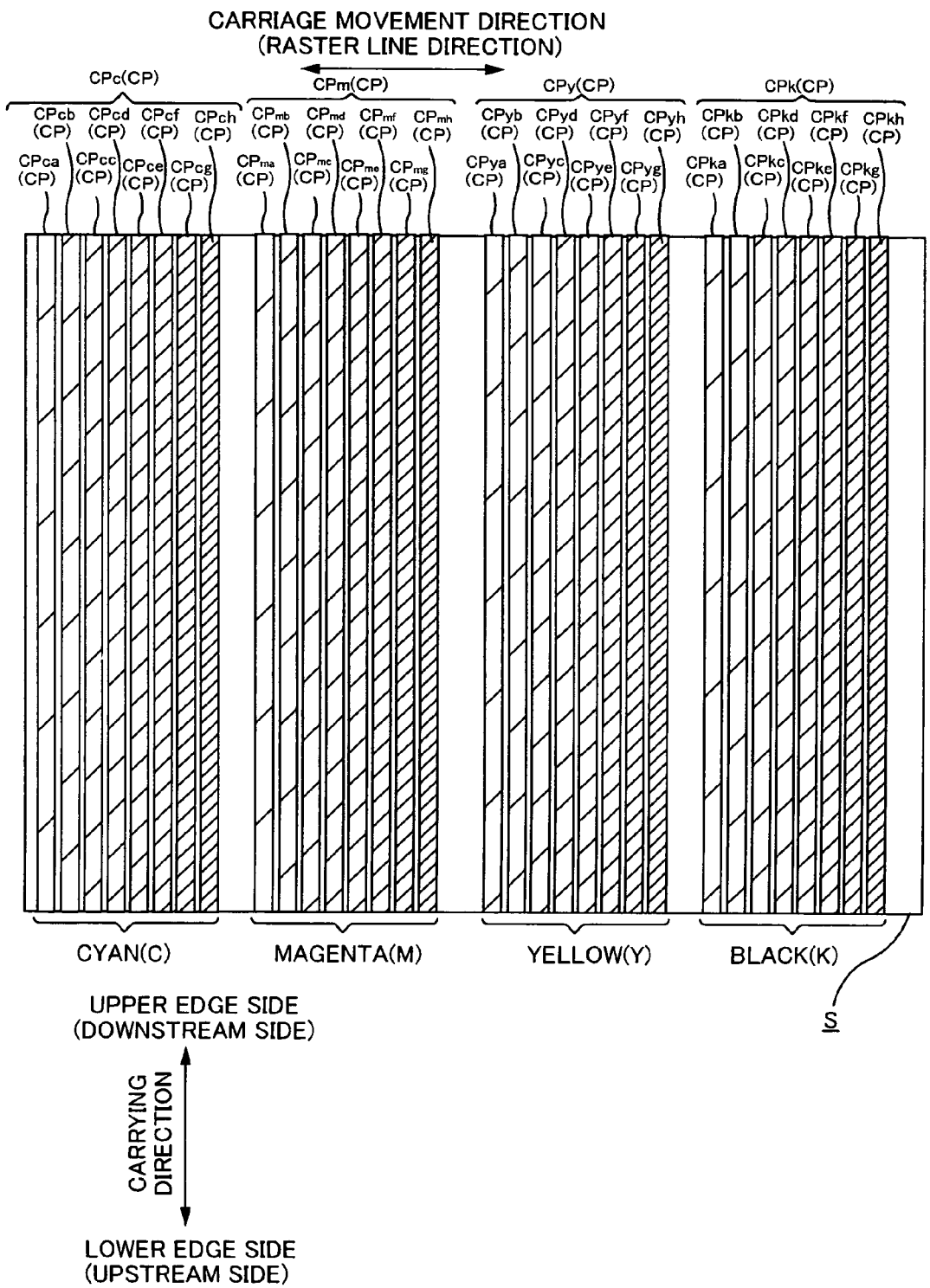

FIG. 63 is a diagram illustrating an example of the correction patterns CP that are printed. As shown in the figure, the correction patterns CP of the present embodiment that are printed are partitioned by ink color and by darkness. In this example, correction patterns CP are printed in accordance with the above-noted eight specified gradation values for each ink color. The eight darkness values are 10%, 20%, 30%, ... , 80%, and the printing is performed in accordance with the specified gradation values corresponding to these darkness values. The print data of the correction patterns CP is the print data that would be generated if CMYK image data obtained by assigning to all pixels a specified gradation value corresponding to the respective darkness were subjected to halftone processing and rasterization processing by the printer driver. Therefore, the print data of the correction patterns CP that is stored in the memory is set such that, when the band-shaped correction patterns CP are printed with an ideal printing apparatus in accordance with gradation values indicating the respective darkness values, then they are each printed with uniform darkness. That is to say, each correction pattern CP that is printed by an ideal printing apparatus is printed at substantially the same darkness over the entire region in the carrying direction. Here, "ideal printing apparatus" means a printing apparatus that is processed and fabricated as designed, and means a printing apparatus with which dots are formed at the target positions by ink droplets ejected from the nozzles.

The difference between the groups of correction patterns made up of eight correction patterns CP for each of the ink colors is basically only that the ink colors are different. For this reason, hereinafter the correction pattern group made of the eight correction patterns CPk for black (K) is described as a representative correction pattern group. Also, as mentioned above, darkness non-uniformities in multicolor printing are inhibited for each ink color that is used in that multicolor printing, but the method that is used for inhibiting the darkness non-uniformities is the same. Therefore, some of the following explanations are given only for the color black (K) as a representative example, but the same explanations also apply for the other ink colors C, M, and Y as well.

As the correction pattern CPk of black (K), long bands with eight degrees of darkness are printed in the carrying direction, in accordance with eight specified gradation values. The print region in the carrying direction extends over the entire region in the carrying direction of the paper S. In other words, it is formed continuously from the upper edge to the lower edge of the paper S. Also, the eight bands of the correction pattern CPk are formed parallel to each other in the carriage movement direction.

The correction pattern CPk is printed with a paper carry amount and an ink ejection timing of the nozzles that is in accordance with the print mode, that is, in accordance with whether it is printed in the interlaced mode or the band feed mode. The raster lines of images printed with the interlaced mode or the band feed mode, and the nozzles forming those raster lines differ depending on the print mode, so that preferably a correction pattern for inhibiting darkness non-uniformities at each dot row region that is to be formed by those raster lines should be printed with the paper carry amount and the ink ejecting timing of the nozzles that are actually used for the actually printing, that is, it should be printed for each print mode and for each print processing mode. For example, in the band feed mode, the paper is carried for a distance corresponding to the length of the nozzle row, and printing is performed in a print processing mode in which raster lines are formed with the same pitch as the nozzle pitch. In the interlaced mode, printing is carried out with a processing mode in which, at the front edge and the rear edge of the paper, the paper is carried only by a small amount and printed by a small number of predetermined nozzles. And in the portion besides the front edge and the rear edge, printing is carried out with a print processing mode in which raster lines are formed by using as many nozzles as possible while carrying the paper by a fixed amount. Furthermore, in the case of so-called borderless printing in which the paper is printed without a margin, at the front edge and the rear edge of the paper, printing is carried out only with the nozzles opposite to the groove 2024*a* provided in the platen 2024 (see FIG. 48), and in the portion besides the front edge and the rear edge, printing is carried out with a print processing mode in which raster lines are formed by using as many nozzles as possible while carrying the paper by a fixed amount. By printing the various correction patterns with the same paper carry amount and ink ejecting timing of the nozzles as for the actual printing, it is possible to increase the precision of the darkness correction using the correction tables obtained based on these correction patterns and to reliably inhibit darkness non-uniformities.

In the present embodiment, an example using correction patterns printed based on eight different gradation values for each color was explained, but the number of gradation values for each color is not limited to eight. However, when the number of gradation values becomes large, even though a more suitable darkness correction can be carried out, the time that is needed for the process of printing the correction patterns, the process of reading the correction patterns and setting the correction tables and the correction process increases. On the other hand, when the number of gradation values is too small, there is the risk that a suitable correction cannot be carried out.

(2) Reading of the Correction Patterns CP (Step S1122):

The darkness of each of the correction patterns CPka, CPkb, . . . , CPkh shown in FIG. 63 is measured for each dot row region by a darkness measurement device, which measures the corresponding darkness optically. This darkness measurement apparatus is an apparatus that can measure for each dot row region the average darkness of a predetermined number of pixels in the carriage movement direction, that is, in the direction along which the dot row regions extend. An example of the darkness measurement apparatus is a scanner as known in the art. It should be noted that the reason why the darkness of each dot row region is evaluated by the average darkness of a predetermined number of pixels is because even if printing is performed based on image data in which each pixel is set to the same gradation value, due to the halftone processing, the size of the dots (including unformed dots) that are formed in the pixels will still differ from pixel to pixel. That is, one pixel will not be representative of the darkness of the dot row region of the entire row.

It should be noted that in the present embodiment, "measurement of the darkness of the dot row region" is equivalent to "measurement of the darkness of the raster line" in the foregoing embodiment.

Figure 64A:
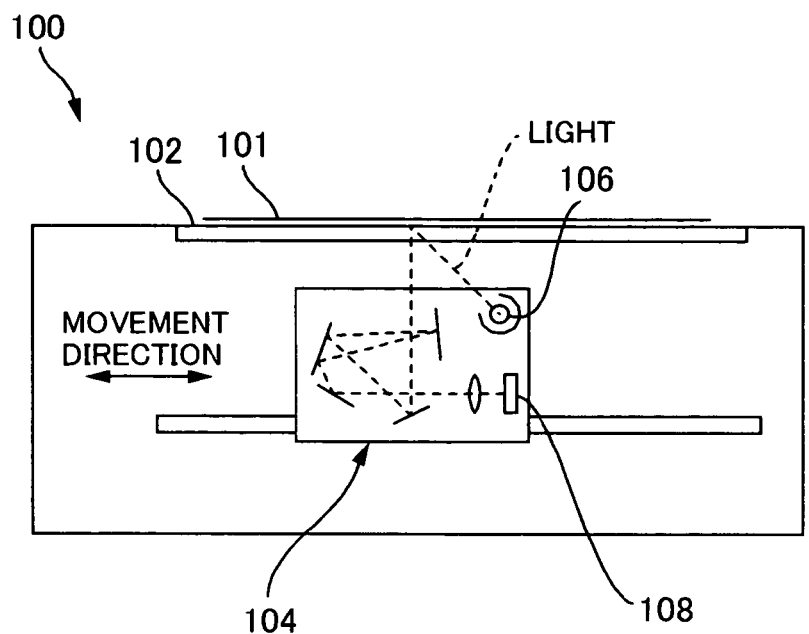
FIG. 64A is a longitudinal sectional view of a scanner.
Figure 64B:
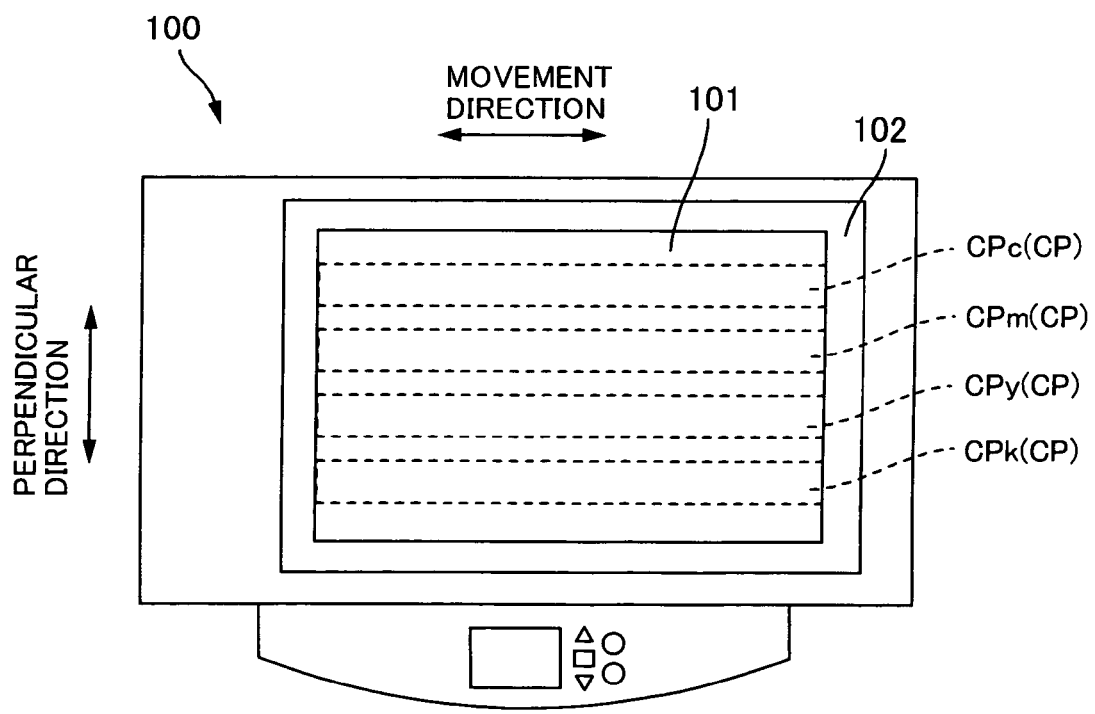
FIG. 64B is a top view of the scanner.

FIG. 64A and FIG. 64B show, respectively, a longitudinal sectional view and a top view of the scanner. The scanner 100 includes a document glass 102 on which a document 101 is placed, and a reading carriage 104 that faces the document 101 via this document glass 102 and that moves in a predetermined reading movement direction. The reading carriage 104 is provided with an exposure lamp 106 that irradiates light onto the document 101 and a linear sensor 108 for receiving the light that is reflected by the document 101 over a predetermined range in a direction that is perpendicular to the reading movement direction. An image is read from the document 101 at a predetermined reading resolution, while moving the reading carriage 104 in the reading movement direction. It should be noted that the dashed line in FIG. 64A indicates the path of the light.

As shown in FIG. 64B, the paper serving as the document 101, on which the correction patterns CP have been printed, is placed on the document glass 102, aligning its dot row regions with the perpendicular direction. Thus, the average darkness of a predetermined number of pixels in the direction of the dot row regions can be read for each dot row region individually. It is preferable that the reading resolution in the reading movement direction of the reading carriage 104 is several integer multiples narrower than the pitch of the dot row regions. Thus, it is easy to correlate the measured darkness gradation values that have been read in with the dot row regions.

Figure 65:
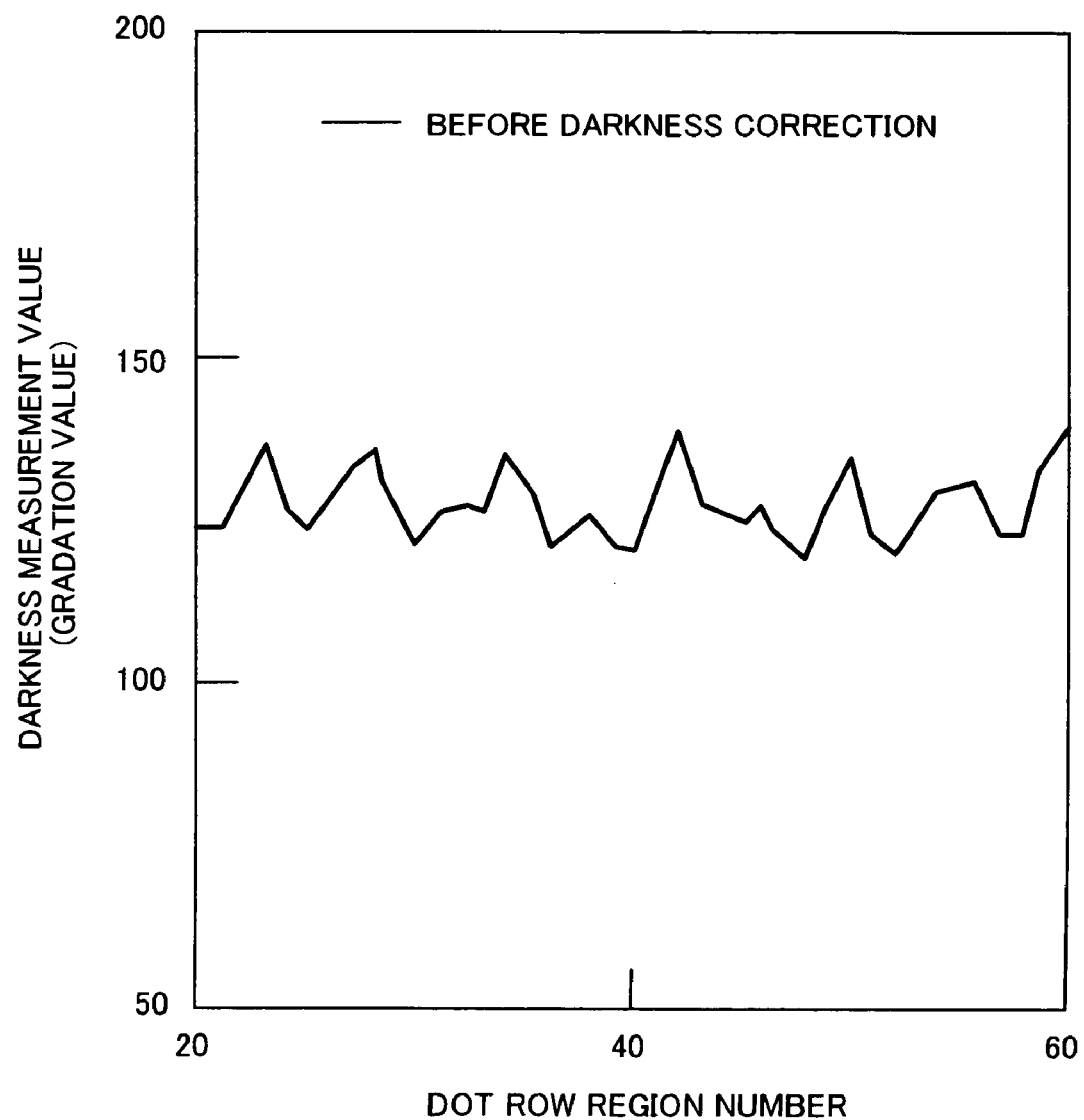

FIG. 65 shows an example of the measured gradation values of the darkness of the correction pattern CPk. The horizontal axis of FIG. 65 denotes the dot row region number and the vertical axis denotes the measured gradation value of the darkness. Here, the dot row region number is the number that is assigned virtually on the paper to each dot row region starting with the front edge side of the paper.

Even when printing is performed in accordance with image data representing the same darkness gradation value for all dot row regions constituting the correction pattern CPk, the measured gradation values shown in FIG. 65 vary considerably in size among the dot row regions. These variations are darkness non-uniformities that are caused by the above-mentioned variations in the ink ejection directions. That is to say, the measured gradation values are measured for each dot row region, so that if the spacing between adjacent raster lines is narrow, then also a portion of the adjacent raster line is read in within that dot region, and thus a higher darkness is measured, whereas if the spacing is wider, then a portion of the raster line that should actually be read in is outside of the dot row region, so that a smaller darkness is measured.

Now, the scanner 100 is communicably connected to the computer 3100. Moreover, the measurement values of the darkness of the correction pattern read with the scanner 100 are recorded in recording tables arranged in the memory of the computer 3100, in association with the dot row region numbers. It should be noted that the measured darkness gradation values output from the scanner 100 are grey-scale values (that is, data not representing color information but only brightness) represented by 256 gradation values. Here, the reason for using this grey-scale is that if the measured gradation values include color information, then a further process for expressing those measured gradation values by gradation values of that ink color must be performed, so that the processing becomes more complicated.

The darkness values of the correction patterns CPka, CPkb, . . . , CPkh printed in accordance with the eight gradation values are measured in each dot row region by the scanner 100, and the measured gradation values Ca, Cb, . . . , Ch are recorded in the recording table shown in FIG. 61.

(3) Step S1123: Setting the Correction Table for Each Dot Row Region

To perform a darkness correction for inhibiting darkness non-uniformities in the carrying direction, it is conceivable to correct all image data in accordance with one set of correction information, for example with one pair of correction information given by the gradation value indicated by the printed image data and the corrected new gradation value. In the present embodiment, darkness non-uniformities are inhibited more appropriately and more efficiently by correcting them in accordance with a plurality of sets of correction information corresponding to different darkness values. Therefore, a plurality of sets of correction information are obtained, and the image data correction tables or creation ratio tables are set using the obtained plurality of sets of correction information.

<The Case of Setting Image Data Correction Tables>

Figure 66:
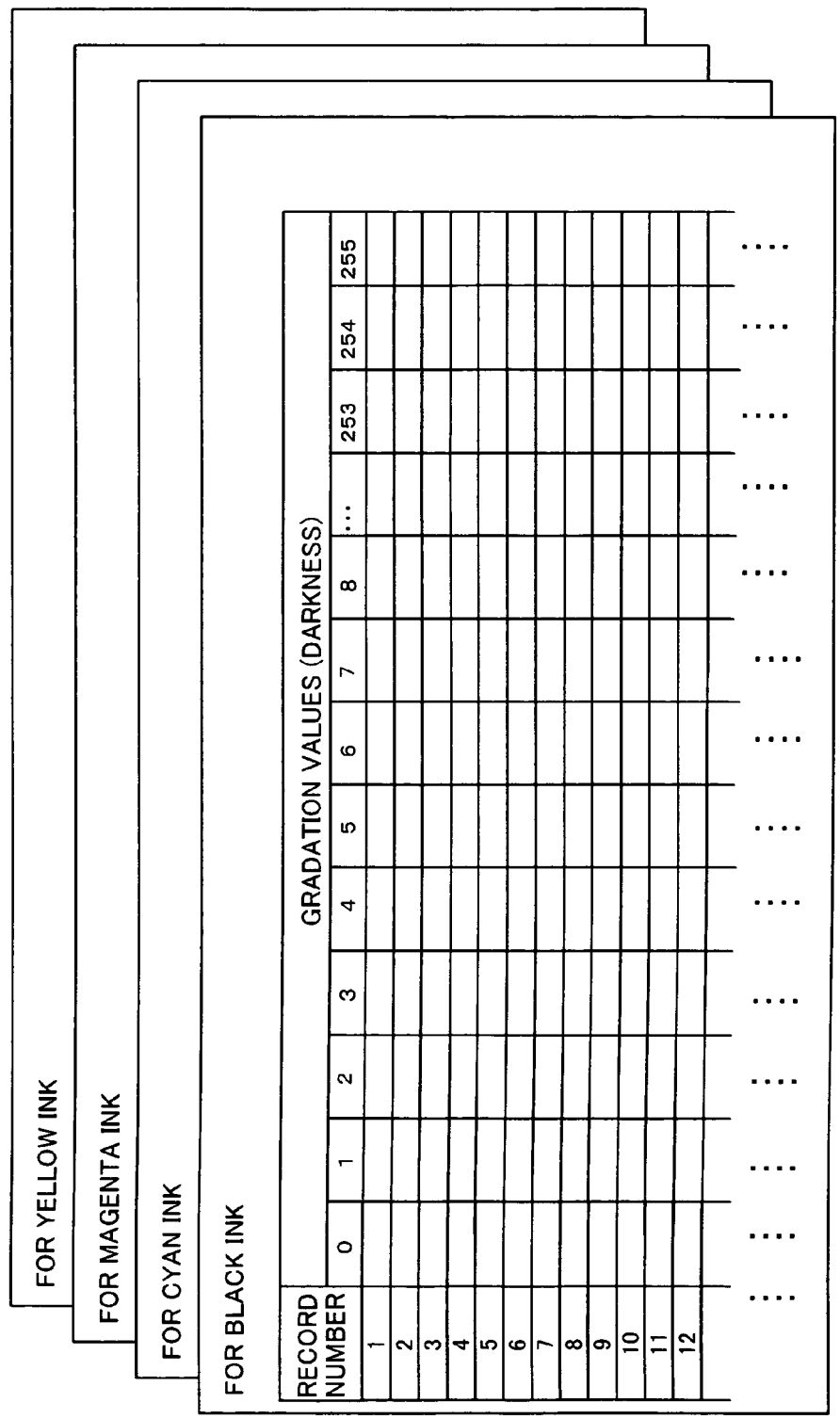

FIG. 66 is a diagrammatic view of image data correction tables that are stored in the correction table storage section 2063a provided in the memory 2063 of the printer 2001.

The image data correction tables shown in FIG. 66 are stored in the correction table storage section 2063a in case that it is the image data that is subjected to correction. An image data correction table is prepared for each ink color, and includes records for recording new gradation values that have been corrected. Each record is assigned a record number, and a corrected new gradation value calculated based on the measured gradation values is recorded in the record having the same record number as the record for those measured gradation values. The number of those records is equal to the number of dot row regions corresponding to the length in the carrying direction of the printable region on the paper.

First, a plurality of sets of correction information are obtained using the eight pairs of measurement information (Sa, Ca), (Sb, Cb), . . . , (Sh, Ch), where pairs are formed by the specified gradation values Sa, Sb, . . . , Sh and the measured gradation values Ca, Cb, . . . , Ch recorded by the above-described method in the records of the recording tables. In the case of setting the image data correction tables, the correction information is information pairs, where pairs are given for each dot row region (record) by the gradation value representing a predetermined darkness and the corrected new gradation value of that darkness.

The correction information for each gradation value is determined as follows. First, a given set of correction information is obtained using three of the eight sets of measurement information. Similarly, a total of, for example, four sets of correction information is obtained. Next, a linear interpolation is performed using the obtained four sets of correction information and the two sets of correction information for the highest gradation value and the lowest gradation value, and the corrected new gradation values corresponding to the other gradation values are calculated. The corrected new gradation values that have been calculated and the gradation values indicating their respective darkness are associated with one another and taken as sets of correction information, and stored in the fields corresponding to the predetermined darkness of the image data correction table. For example, to obtain the correction information corresponding to a darkness of 30%, the darkness is measured in the correction pattern for 10%, darkness the correction pattern for 30% darkness, and the correction pattern for 50% darkness, and a linear interpolation is performed using these three sets of measured information. Further, to obtain the correction information corresponding to a darkness of 50%, the darkness is measured in the correction pattern for 30%, the correction pattern for 50% darkness, and the correction pattern for 70%, and a linear interpolation is performed using these three sets of measured information. Thus, the corrected new gradation values are calculated using the three sets of measurement information obtained from the correction pattern of the darkness for which a new gradation value is to be determined and the correction pattern of that darkness ±20%, for example.

Figure 67:
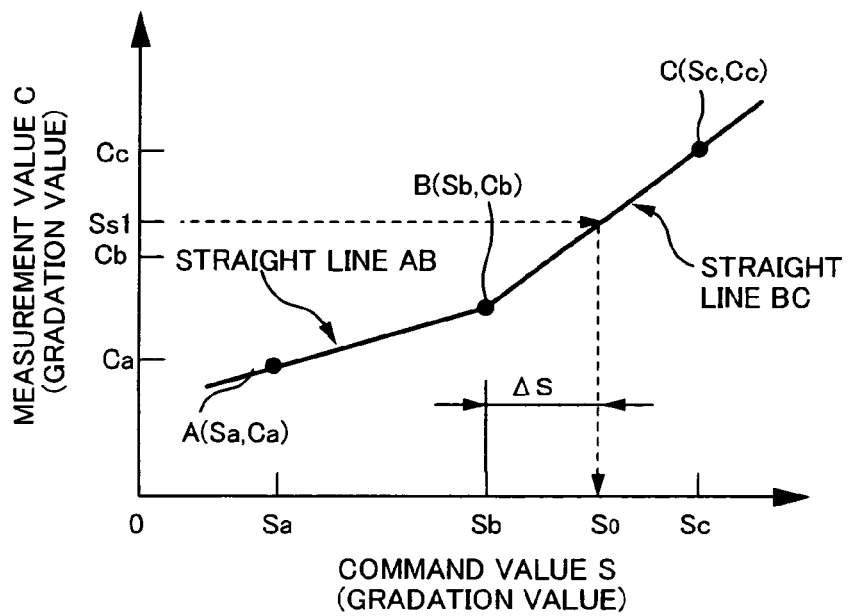

FIG. 67 is a graph for describing linear interpolation, which is performed using three sets of correction information. The horizontal axis of this graph denotes the gradation value (referred to below as "data gradation value") S of black (K) given by the image data. The vertical axis of the graph indicates the grey-scale gradation value (referred to below as "measured gradation value") of the measurement value C. The coordinates of the points on the graph are indicated by (S,C).

As is well known, in a linear interpolation, a function value between two known values or outside thereof is determined as the point for which all three plotted points are located on the same straight line. In the present embodiment, the known values are the three pairs of measurement information (Sa, Ca), (Sb, Cb) and (Sc, Cc), and the value to be determined is the data gradation value S at which the measured gradation value C becomes the target value Ss1. It should be noted that in the present embodiment, the target value Ss1 is a gradation value representing the darkness of the image that is to be printed based on a predetermined gradation value, and is the measured gradation value of a color sample (darkness sample) of the same darkness as an image having the darkness of the predetermined gradation value that is actually supposed to be printed. Here, the target value is the grey-scale measured gradation value that is output when reading with the scanner 100 a color sample (darkness sample) of the same darkness as the darkness that is actually supposed to be expressed by the gradation value of the measured information that is in the middle of the three sets of gradation information. This color sample represents an absolute reference of the darkness, that is, if the measured gradation value C measured by the scanner 100 is represented by the target value Ss1, then this shows that the measured object appears at the darkness of this middle value Sb. That is to say, the darkness that is to be printed with the darkness of the target value Ss1 corresponds to the target darkness. This target darkness does not necessarily have to be taken as the darkness of the color sample, and it is for example also possible to take the average value of the measured darkness values measured for each dot row region. If a color sample is used, it is not only possible to inhibit darkness non-uniformities, but also to correct the darkness of the printed image taking the darkness of the color sample as a reference. Furthermore, if the average value of the measured gradation values is used, then the task of measuring the color sample becomes unnecessary, and it is possible to inhibit darkness non-uniformities while obtaining the correction information faster.

As shown in FIG. 67, for example three pairs of measurement information (Sa, Ca), (Sb, Cb), and (Sc, Cc) of the eight pairs of measurement information are respectively expressed on the graph by a point A having the coordinates (Sa, Ca), a point B having the coordinates (Sb, Cb), and a point C having the coordinates (Sc, Cc). The straight line BC connecting the points B and C shows the relationship between the change in the data gradation value S and the change in the measured gradation value C in a range where the darkness is high. The straight line AB connecting the points A and B shows the relationship between the change in the data gradation value S and the change in the measured gradation value C in a range where the darkness is low.

Moreover, the value So of the data gradation value S where the measured gradation value C becomes the target value Ss1 is read from the graph constituted by the two lines AB and BC, and taken as the corrected new gradation value So of the darkness of the measurement information of the middle value Sb of the three sets of measurement information. For example, if the target value Ss1 is higher than the measured gradation value Cb of the point B as shown in the drawing, then a linear interpolation is carried out with the straight line BC, and the data gradation value S at which the measured gradation value C becomes the target value Ss1 is taken as the corrected new gradation value So. Conversely, if the target value Ss1 is smaller than the measured gradation value Cb of the point B, then a linear interpolation is carried out with the straight line AB, and the data gradation value S at which the measured gradation value C becomes the target value Ss1 is taken as the corrected new gradation value So.

Thus, for example, correction information corresponding to 30% is obtained from the correction patterns for 10% darkness, 30% darkness and 50% darkness, correction information corresponding to 40% is obtained from the correction patterns for 20% darkness, 40% darkness and 60% darkness, correction information corresponding to 50% is obtained from the correction patterns for 30% darkness, 50% darkness and 70% darkness, and correction information corresponding to 60% is obtained from the correction patterns for 40% darkness, 60% darkness and 80% darkness.

Figure 68:
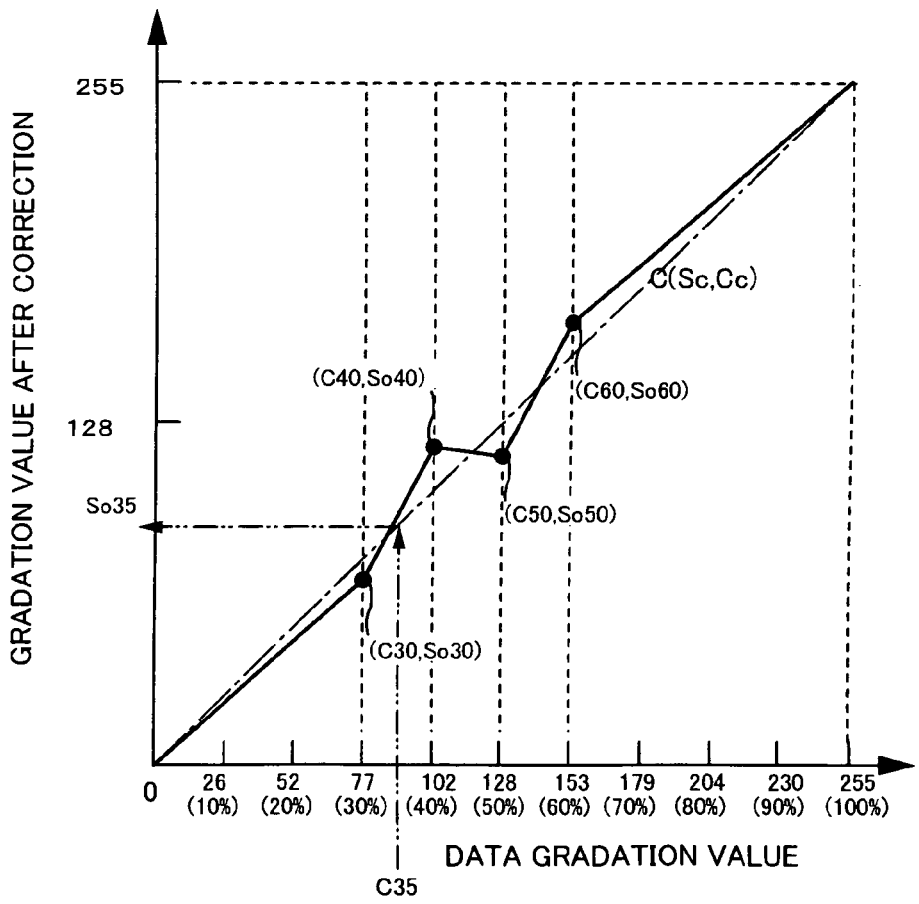

FIG. 68 is a graph illustrating the image data correction table associating the data gradation values given to the supplied image data with the corrected new gradation values.

In the graph of FIG. 68, the horizontal axis denotes the data gradation values S for black (K) indicated by the image data, and the vertical axis denotes the corrected new gradation values. The corrected new gradation values that have been obtained are plotted as the data for the data gradation value corresponding to 30% (for example 77), the data gradation value corresponding to 40% (for example 102), the data gradation value corresponding to 50% (for example 128), and the data gradation value corresponding to 60% (for example 153), and the sets of correction information are connected by straight lines. Thus, if two sets of correction information are connected by a straight line, one of those connected sets of correction information is a first correction information, and the other is a second correction information. In this situation, in the region in-which the gradation value "0" corresponding to the lowest darkness that can be expressed in a printed image (that is, to the darkness 0) and the gradation value So "0" corresponding to the darkness 0 are connected by a straight line with the correction information corresponding to a darkness of 30%, the correction information for the darkness of 30% is the first correction information, whereas the gradation value "0" corresponding to the darkness 0 and the gradation value So "0" for the darkness 0 is the second correction information. Further, in the region in which the gradation value "255" corresponding to the highest darkness (that is the darkness of 100%) and the gradation value So "255" for the darkness of 100% are connected by a straight line with the correction information for a darkness of 60%, the correction information corresponding to the darkness of 60% is the first correction information, and the gradation value "255" corresponding to the darkness of 100% and the gradation value So "255" for the darkness of 100% is the second correction information.

The image data correction table is set in accordance with this graph. In the present embodiment, corrected new gradation values obtained from the fields corresponding to the darkness values of 0, 30%, 40%, 50% and 60% are stored. Then, for the corrected new gradation values of, for example, the darkness values between the darkness of 30% and the darkness of 40%, that is, the darkness values except for the darkness of 30% and the darkness of 40%, the new gradation values for printing all dot row regions with the same darkness are determined by taking the gradation value for 30% darkness as the first gradation value and the gradation value for 40% darkness as the second gradation value, and performing a linear interpolation with the first correction information (C30, So30) associated with 30% darkness and the second correction information (C40, So40) associated with 40% darkness, and those new darkness values are stored in the corresponding fields of the image data correction table.

For example, if the gradation value C35 representing a darkness of 35% is given as the image data, then it is converted into So35 as the corrected new gradation value, in accordance with the graph of FIG. 68. The way in which the corrected new gradation values corresponding to the data gradation values are determined can be expressed by the following equation.

The line connecting the first correction information associated with 30% darkness and the second correction information associated with 40% darkness can be expressed by the following Equation 1:

$$Sox=[(So30-So40)/(C30-C40)] \cdot (Cx-C30)+So30 \qquad \text{(Eq. 1)}$$

When C35 is substituted for the arbitrary data gradation value Cx in Equation 1, then the corrected new gradation value Sox for image data with 35% darkness can be determined.

A program for executing the computations for determining the corrected new gradation values is stored in a memory provided in the computer 3100A on the inspection line mentioned above.

The corrected new gradation values for each of the darkness values obtained by calculation are stored in corresponding fields of the image data correction tables shown in FIG. 66 (S1124b). That is to say, the computer 3100A first obtains one set of correction information by reading out three sets of measurement information (Sa, Ca), (Sb, Cb) and (Sc, Cc) from the same records of the recording tables. Similarly, a total of four sets of correction information is obtained from these three sets of measurement information. By inserting into Equation 1 two sets of correction information from the obtained four sets of correction information and the above-noted sets of correction information of the lowest darkness and the highest darkness, a corrected new gradation value that is between the two darkness values corresponding to those two sets of correction information is calculated, and this calculated corrected new gradation value is recorded in the record of the same record number in the image data correction table.

Then, after each of the pixel data of the color-converted CMYK image data has been converted in the halftoning process to a corrected new gradation value in accordance with the image data correction table, the pixel data is processed by the above-described dithering, whereafter a rasterization process is performed, converting the pixel data into print data. The printer performs printing based on the converted print data, so that a favorable image in which darkness non-uniformities in the carrying direction of the paper are inhibited can be printed.

<The Case of Setting Creation Ratio Tables>

Figure 69:
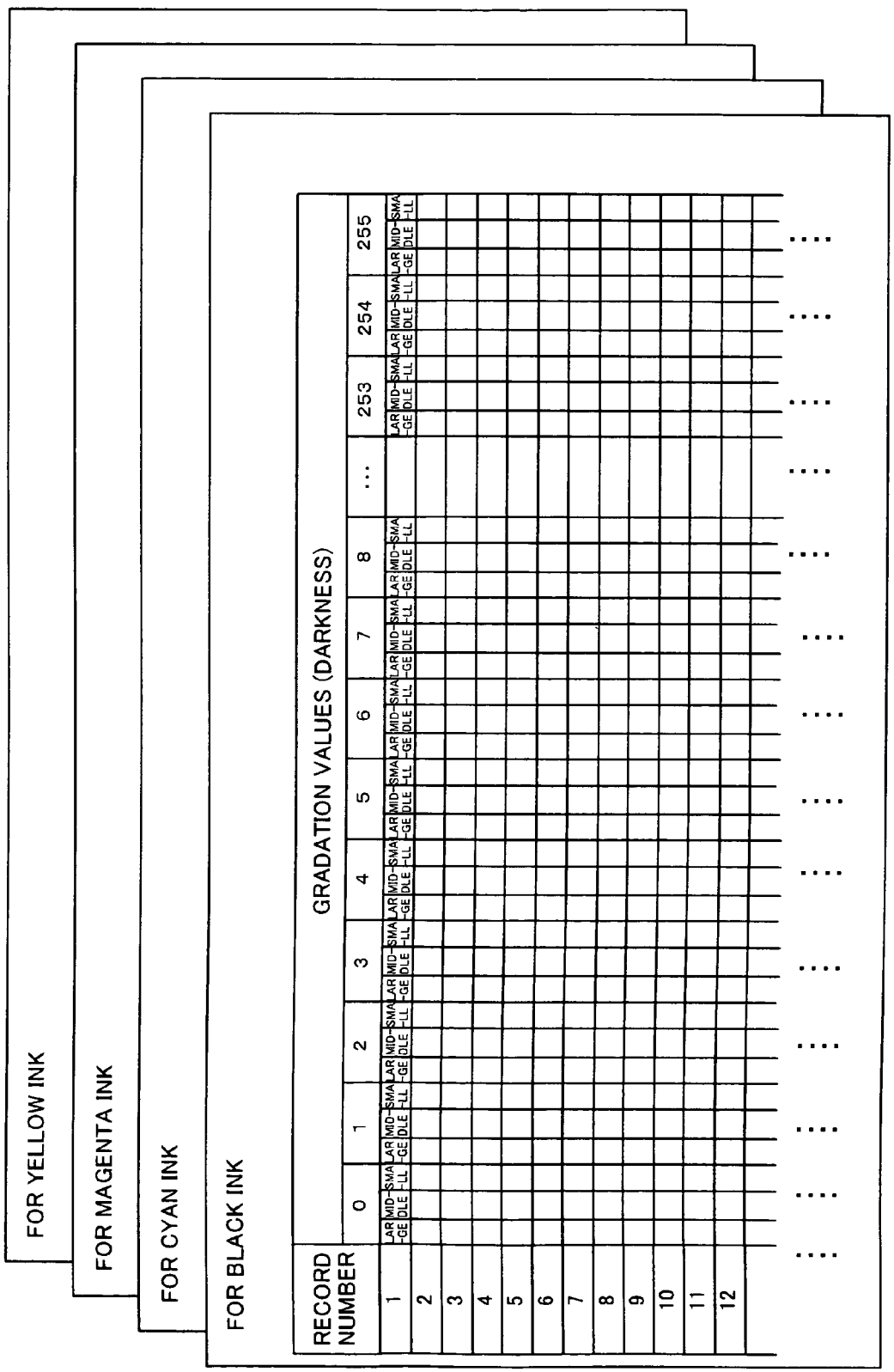

FIG. 69 is a diagrammatic view of creation ratio tables that are stored in the correction table storage section 2063a provided in the memory 2063 of the printer 2001.

If the level data (dot creation ratios) are subject to correction, then the creation ratio tables shown in FIG. 69 are stored in the correction table storage section 2063a and prepared for each ink color individually, just like the recording tables. The correction tables have records for recording values to be corrected. Each record is assigned a record number, and a correction value calculated based on measured gradation values is recorded in the record having the same record number as the record of that measured gradation value. The number of those records is equal to the number of dot row regions corresponding to the length in carrying direction of the printable region on the paper.

First, four sets of correction information are obtained using the eight pairs of measurement information (Sa, Ca), (Sb, Cb), . . . , (Sh, Ch), where pairs are given by the specified gradation values Sa, Sb, . . . , Sh and the measured gradation values Ca, Cb, . . . , Ch recorded by the above-described method in the records of the recording tables. In the case of setting the dot creation table, four pairs of creation information are obtained, where pairs are given by the four sets of correction information obtained from the eight sets of measurement information, and the corrected level data corresponding to the specified gradation value of each correction information.

The method for calculating corrected new gradation values based on the measurement information for predetermined darkness values, in accordance with the principle shown in FIG. 67, from eight sets of measurement information in order to obtain four sets of correction information is the same as in the case of setting the image data correction tables explained above, so that further explanations have been omitted.

Moreover, the value So of the data gradation value S where the measured gradation value C becomes the target value Ss1 is read from the graph constituted by the two lines AB and BC in FIG. 67, and taken as the corrected new gradation value So corresponding to the darkness of the measurement information of the middle value Sb of the three sets of measurement information.

The deviation between this corrected new gradation value So and the specified gradation value Sb of the measurement information that is in the middle of the three sets of measurement information is the correction amount $\Delta S$. A correction ratio H is calculated by dividing this correction amount $\Delta S$ by the specified gradation value Sb of the measurement information that is in the middle of the three sets of measurement information (correction ratio $H = \Delta S/Sb$).

Incidentally, the following is the correction ratio H when expressed by an equation.

First, when the straight line AB is the straight line connecting the information of 10% darkness with the information of 30% darkness in FIG. 67, then this straight line AB can be expressed by the following Equation 2:

$$C = [(Ca-Cb)/(Sa-Sb)] \cdot (S-Sa) + Ca \quad \text{(Equation 2)}$$

If Equation 2 is solved for the data gradation value S and the target value Ss1 is substituted for the measured gradation value C, then the corrected new gradation value So at which the measured gradation value C becomes the target value Ss1 can be expressed by Equation 3 below.

$$So = (Ss1-Ca)/[(Ca-Cb)/(Sa-Sb)] + Sa \quad \text{(Equation 3)}$$

Similarly, when the straight line connecting the information of 30% darkness and the information of 50% darkness is the straight line BC, then that straight line BC can be expressed by the following Equation 4:

$$C = [(Cb-Cc)/(Sb-Sc)] \cdot (S-Sb) + Cb \quad \text{(Equation 4)}$$

If this Equation 4 is solved for the data gradation value S and the target value Ss1 is substituted for the measurement value C, then the corrected new gradation value So at which the measured gradation value C becomes the target value Ss1 can be expressed by Equation 5 below.

$$So = (Ss1-Cb)/[(Cb-Cc)/(Sb-Sc)] + Sb \quad \text{(Equation 5)}$$

On the other hand, the correction amount $\Delta S$ of the data gradation value S is expressed by Equation 6, and the correction ratio H is expressed by Equation 7.

$$\Delta S = So - Sb \quad \text{(Equation 6)}$$

$$H = \Delta S/Sb = (So-Sb)/Sb \quad \text{(Equation 7)}$$

Consequently, Equations 3, 5, and 7 are the equations for finding the correction ratio H, and by substituting concrete values for Ca, Cb, Cc, Sa, Sb, Sc, and Ss1 in these equations, it is possible to determine the correction ratio H for a predetermined darkness.

A program for executing the computations of these equations is stored in a memory provided in the computer 3100A on the inspection line. Furthermore, the correction ratios H determined by these computations are stored in the memory provided in the computer 3100A. In other words, the computer 3100A reads the three information pairs (Sa, Ca), (Sb, Cb), and (Sc, Cc) from the same record of the recording table and substitutes these into Equation 3, Equation 5, and Equation 7 to calculate the correction ratio H, and then records the calculated correction value in the memory.

The level data of the dot creation ratio table is corrected in accordance with the correction ratios H for the darkness values corresponding to the specified gradation values determined in Step 124, that is, 30% darkness, 40% darkness, 50% darkness and 60% darkness. For example, let us assume that when the gradation value representing 30% darkness is "77", the correction ratio H for 30% darkness is "1+0.1", the level data LVM for medium dots corresponding to the gradation value "77", of the dot creation ratio table stored already in the memory is "45" in the profile MD for medium dots and the level data LVS for small dots is "20" in the profile SD for small dots. In this situation, the level data LVM for medium dots and the level data LVS for small dots is corrected by "+0.1" each, so that the level data LVM for medium dots is changed to "50" and the level data for small dots is changed to "22". The level data LVL for large dots, which corresponds to the gradation value "77" of the dot creation ratio table is "0" in the profile LD for large dots, so that it is not corrected. Thus, the level data of the large dots, medium and small dots corresponding to the specified darkness is corrected As a result, four sets of creation information (S, L) in which a specified gradation value S is associated with corrected level data L for large dots, medium dots, and small dots are created. Here, the four sets of creation information for large dots are, in order from the smallest darkness, (SL1, LL1), (SL2, LL2), (SL3, LL3) and (SL4, LL4), the four sets of creation information for medium dots are (SM1, LM1), (SM2, LM2), (SM3, LM3) and (SM4, LM4), and the four sets of creation information for small dots are (SS1, LS1), (SS2, LS2), (SS3, LS3) and (SS4, LS4).

Figure 70:
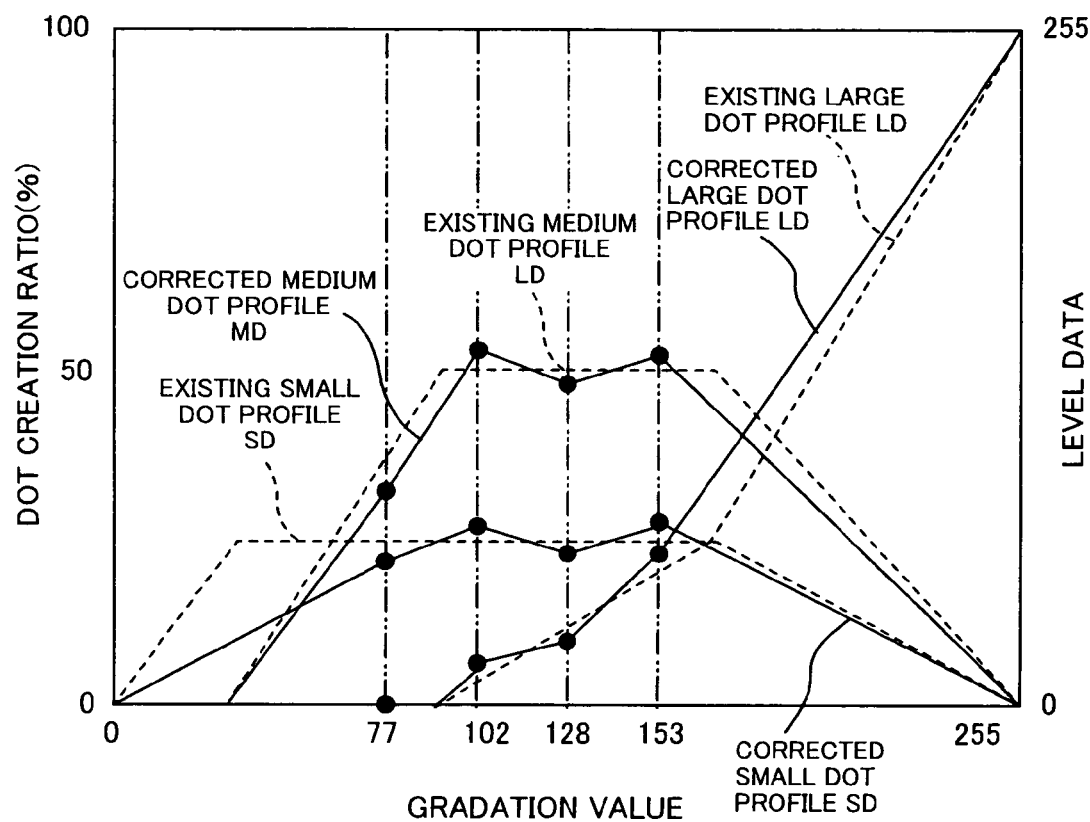

FIG. 70 is a graph illustrating the creation ratio table associating the data gradation values given to the supplied image data with the corrected level data L.

As in the uncorrected creation ratio table shown in FIG. 54, the horizontal axis of the graph in FIG. 70 denotes the data gradation values (0-255) of black (K) that are indicated by the image data, the vertical axis on the left side denotes the dot creation ratio (%), and the vertical axis on the right side denotes the level data (0-255). In FIG. 70, the existing creation ratio table is indicated by dotted lines for the sake of illustration. Then, the corrected level data L that have been obtained are plotted as the data for the data gradation value corresponding to 30% darkness (for example 77), the data gradation value corresponding to 40% darkness (for example 102), the data gradation value corresponding to 50% darkness (for example 128), and the data gradation value corresponding to 60% darkness (for example 153), and the sets of correction information are connected by straight lines. In this situation, setting the gradation value "0", which corresponds to the lowest darkness that can be expressed on a printed image, that is, 0% darkness, and the corrected level data L for a darkness of 0 to "0", and setting the gradation value "255", which corresponds to the highest darkness, that is, 100% darkness, and the corrected level data L for 100% darkness to "255", the correction information corresponding to 30% darkness and the correction information corresponding to 60% darkness are respectively connected thereto by straight lines. Thus, if two sets of creation information are connected by a straight line, one of those connected sets of creation information is a first creation information, and the other is a second creation information. In this situation, in the region in which the lowest darkness that can be expressed in a printed image, that is, the gradation value "0" corresponding to the darkness 0, and the level data "0" corresponding to the darkness 0, are connected by a straight line with the creation information for a darkness of 30%, the creation information for the darkness of 30% is the first correction information, and the gradation value "0" corresponding to the darkness 0 and the level data "0" for the darkness 0 is the second creation information. In the region in which the gradation value "255" corresponding to the highest darkness, that is 100% darkness, and the level data "255" for 100% darkness are connected by a straight line with the creation information for a darkness of 60%, the creation information for the darkness of 60% is the first correction information, and the gradation value "255" corresponding to the darkness of 100% and the level data "255" for the darkness of 100% is the second creation information.

The creation ratio table is set in accordance with this graph. In the present embodiment, corrected level data obtained from the fields corresponding to the darkness values of 0, 30%, 40%, 50% and 60% are stored in association with the profiles for large dots, medium dots and small dots. Then, for the corrected level data of, for example, the darkness values between the darkness of 30% and the darkness of 40%, that is, the darkness values except for the darkness of 30% and the darkness of 40%, the first creation information (C30, L30) associated with 30% darkness and the second creation information (C40, L40) associated with 40% darkness is determined by linear interpolation, taking the gradation value representing 30% darkness as the first gradation value and the gradation value representing 40% darkness as the second gradation value, the level data L for printing all dot row regions with the same darkness is determined, and stored in the corresponding fields of the creation ratio table.

For example, if the gradation value C35 representing a darkness of 35% is given as the image data, then it is converted into L35 as the corrected level data, in accordance with the graph of FIG. 70.

The way that the corrected level data corresponding to the data gradation values is determined can be expressed by the following equation. For example, the line connecting the first creation information associated with 30% darkness and the second creation information associated with 40% darkness can be expressed by the following Equation 8:

$$Lx=[(L30-L40)/(C30-C40)] \cdot (Cx-C30)+L30 \qquad \text{(Eq. 8)}$$

When C35 is inserted for the arbitrary data gradation value Cx in Equation 7, then the corrected level data Lx for image data with 35% darkness can be determined.

A program for executing the computations for determining the corrected level data L is stored in a memory provided in the computer 3100A on the inspection line mentioned above.

Incidentally, to determine the level data of the darkness region between 0 darkness and 30% darkness, the level data of 0 darkness is taken as "0", and to determine the level data of the darkness region between 60% darkness and 100% darkness, the level data of 100% darkness is taken as the MAX value of "255", and a linear interpolation is carried out. Thus, by setting the level data of 0 darkness to "0", and the level data of 100% darkness to "255", the corrected level data will not become lower than the minimal value of "0" and will not become higher than the maximal value of "255", and it is possible to set appropriate correction amounts. In this situation, it is also possible to determine the level data L of the darkness region between 0 darkness and 30% darkness by extending the graph of the darkness region between 30% darkness and 40% darkness, which is the adjacent darkness region, and to determine the level data of the darkness region between 60% darkness and 100% darkness by extending the graph of the darkness region between 50% darkness and 60% darkness. However, in this case, there is the possibility that the corrected level data exceeds the maximum value "255", or undercuts the minimum value "0" that can be set by the printer, so that the above-described approach to determining the correction values is more suitable.

Thus, the level data for all darkness values from 0 darkness to 100% darkness are determined. Based on the determined level data, all of the data of the dot creation table stored in the memory is replaced, and the new dot creation table is created and stored in the correction table storage section 2063a.

The corrected level data for the darkness values obtained by calculation is stored in the fields corresponding to the creation ratio table shown in FIG. 69. That is to say, the computer 3100A first obtains the correction information and the correction ratio H by reading out three sets of measurement information (Sa, Ca), (Sb, Cb) and (Sc, Cc) from the same records of the recording tables. A total of four sets of correction information and four correction ratios H is obtained in a similar manner. The corrected level data is determined from the obtained four sets of correction information and correction ratios H, and four sets of creation information are obtained. Then, two sets of creation information of those four sets of creation information, the creation information of the lowest gradation value and the creation information of the highest gradation value are substituted in Equation 8 to calculate the corrected level data between the two gradation values corresponding to those two sets of creation information, and the calculated corrected level data is recorded in the records with the same record numbers in the creation ratio table.

Then, after the image data supplied from the application has been subjected to the resolution conversion process and the color conversion process, the image data is converted into print data by executing the rasterization process after it has been converted into corrected level data based on the corrected creation ratio table when performing the halftone process. The darkness non-uniformities in the carrying direction are effectively corrected in the direction of being suppressed by letting the printer perform the actual printing in accordance with the converted print data. Therefore, it becomes possible to reduce variations of the darkness in each dot row region for every ink color and ever processing mode, and thus it is possible to suppress darkness non-uniformities.

===(2) Other Examples of the Second Embodiment===

The above embodiment was written primarily with regard to the printer 2001, but the above embodiment of course also includes the disclosure of a printing device, a printing method, and a printing system, for example.

A printer 2001, for example, was described as one embodiment, but the foregoing embodiment is for the purpose of elucidating the present invention and is not to be interpreted as limiting the present invention. The invention can of course be altered and improved without departing from the gist thereof and includes functional equivalents. In particular, the embodiments mentioned below are also included in the invention.

Furthermore, in this embodiment, a printer and a printing method that correct darkness non-uniformities occurring in the paper carrying direction were explained, but it is also possible to apply this correction method to stripe-shaped darkness non-uniformities extending along the carrying direction, caused by mechanisms constituting the printer 2001, such as oscillations when moving the carriage to which the head is mounted, for example.

<Regarding the Printer>

In the above embodiments a printer 2001 was described, however, there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, these methods and manufacturing methods are within the scope of application.

<Regarding the Ink>

The above embodiment was of the printer 2001, and thus a dye ink or a pigment ink was ejected from the nozzles. However, the ink that is ejected from the nozzles is not limited to such inks.

<Regarding the Nozzles>

In the foregoing embodiment, ink was ejected using piezoelectric elements. However, the mode for ejecting ink is not limited to this. Other methods, such as a method for generating bubbles in the nozzles through heat, may also be employed.

<Regarding the Object of the Darkness Correction>

In the foregoing embodiment, the CMYK data and the level data converted by the halftone process were subjected to the correction, but there is no limitation to this. For example, it is also possible to perform a darkness correction on the RGB image data obtained in the resolution conversion process. Furthermore, in the foregoing embodiment, a method was explained in which the correction tables are stored in a memory, but there is no limitation to this, and it is also possible to store in the memory a calculation program for calculating the plurality of sets of correction information corresponding to the predetermined darkness values for the corrected gradation values and the corrected level data, and to perform the calculation when converting the image data into print data. In this case, the calculation process is performed for each of the image data, so that there is the risk that the throughput of the printer is decreased, so that a better effect is displayed by the above-described embodiment.

<Regarding the Carriage Movement Direction in which Ink is Ejected>

The foregoing embodiment describes an example of single-direction printing in which ink is ejected only when the carriage 2031 is moving forward, but this is not a limitation, and it is also possible to perform so-called bidirectional printing in which ink is ejected both when the carriage 2031 is moving forward and backward.

<Regarding the Color Inks Used for Printing>In the foregoing embodiments, examples of multicolor printing are described in which the four color inks cyan (C), magenta (M), yellow (Y), and black (K) are ejected onto the paper S to form dots, but the ink colors are not limited to these. For example, it is also possible to use other inks in addition to these, such as light cyan (LC) and light magenta (LM).

Alternatively, it is also possible to perform single-color printing using only one of these four colors.

The invention claimed is:

1. A method for obtaining a correction value that is for correcting and printing an image constituted by a plurality of dot lines, comprising:
   printing a correction pattern based on a first gradation value by ejecting ink from a plurality of nozzles moving in a predetermined movement direction and forming a plurality of dot lines in an intersecting direction that intersects the movement direction;

obtaining, for each dot line, first information corresponding to the first gradation value by measuring a darkness of the correction pattern dot line by dot line; and obtaining the correction value for each dot line in accordance with the first information and second information corresponding to a second gradation value that is different from the first gradation value, wherein a correction pattern based on the second gradation value is printed; and the second information corresponding to the second gradation value is obtained for each dot line by measuring a darkness of the correction pattern dot line by dot line.

2. The method according to claim 1, wherein the darkness of the correction pattern based on the first gradation value and the darkness of the correction pattern based on the second gradation value are measured dot line by dot line, and the correction value is determined from the measurement value of each dot line.

3. The method according to claim 1, wherein a gradation value at which the darkness becomes a target value is determined by performing a linear interpolation using two information pairs, the two information pairs being a pair made up of the gradation value and the measurement value of one of the two correction patterns and a pair made up of the gradation value and the measurement value of the other of the two correction patterns; and a value obtained by dividing a deviation between the determined gradation value and a reference gradation value corresponding to the target value by that reference gradation value is taken as the correction value.

4. The method according to claim 3, wherein the gradation value of one of the two information pairs is higher than the reference value and the gradation value of the other is smaller than the reference value.

5. The method according to claim 3, wherein the gradation value of one of the two information pairs is the same value as the reference value.

6. The method according to claim 3, wherein the target value is a darkness measurement value of a darkness sample representing the darkness of the reference value.

7. The method according to claim 3, wherein the reference value is selected from a darkness range of a middle-tone region.

8. The method according to claim 1, wherein a plurality of the nozzles are provided for each color of the ink; and the correction value is calculated for each color by printing the correction pattern in each color, the correction value of each color being for correcting the darkness of the image for each color.

9. The method according to claim 1, wherein the darkness measurement value is a grey-scale measurement value.

10. The method according to claim 1, wherein the darkness of the correction pattern is measured using a darkness measuring device that measures darkness optically.

11. The method according to claim 1, wherein correction patterns are printed based respectively on specified gradation values including the first gradation value and the second gradation value, for each of the specified gradation values.

12. The method according to claim 11, wherein the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information is obtained by determining a new gradation value for forming a darkness corresponding to the second gradation value by performing a linear interpolation using information in which the second gradation value and a measurement value of the correction pattern based on the second gradation value are associated and information in which a specified gradation value that is different from the second gradation value and a measurement value of the correction pattern based on that specified gradation value are associated, and associating the determined new gradation value and the second gradation value.

13. The method according to claim 12, wherein the information in which the first gradation value and the measurement value of the correction pattern based on the first gradation value are associated, information in which a specified gradation value that is higher than the first gradation value and a measurement value of the correction pattern based on this specified gradation value are associated, and information in which a specified gradation value that is lower than the first gradation value and a measurement value of the correction pattern based on this specified gradation value are associated are obtained;

if the darkness corresponding to the first gradation value is higher than the measurement value of the correction pattern based on the first gradation value, then a linear interpolation is performed using the information in which the first gradation value and the measurement value of the correction pattern based on the first gradation value are associated, and the information in which the specified gradation value that is higher than the first gradation value and the measurement value of the correction pattern based on this specified gradation value are associated;

if the darkness corresponding to the first gradation value is smaller than the measurement value of the correction pattern based on the first gradation value, then a linear interpolation is performed using the information in which the first gradation value and the measurement value of the correction pattern based on the first gradation value are associated, and the information in which the specified gradation value that is lower than the first gradation value and the measurement value of the correction pattern based on this specified gradation value are associated; and a new gradation value for forming the darkness corresponding to the first gradation value is determined.

14. The method according to claim 13, wherein an average value of the darkness of each dot line constituting the correction pattern based on the first gradation value is taken as the darkness corresponding to the first gradation value.

15. The method according to claim 13,
wherein a darkness measurement value of a darkness sample is taken as the darkness corresponding to the first gradation value.

16. The method according to claim 1,
wherein the image data for printing the image includes a gradation value for each dot formation unit formed on the medium; and
the darkness of each of the dot lines is corrected by correcting the gradation value of each of the formation units.

17. The method according to claim 1,
wherein the correction value is for correcting a dot creation ratio for a gradation value.

18. The method according to claim 1,
wherein a plurality of the nozzles are provided for each color of the ink;
the first information is obtained for each color by printing the correction pattern based on the first information in each color; and
each dot line is corrected, color by color, in accordance with the first information and the second information.

19. A method for obtaining a correction value that is for correcting and printing an image constituted by a plurality of dot lines, comprising:
printing a correction pattern based on a first gradation value by ejecting ink from a plurality of nozzles moving in a predetermined movement direction and forming the plurality of dot lines in an intersecting direction that intersects the movement directions;
obtaining, for each dot line, first information corresponding to the first gradation value by measuring a darkness of the correction pattern dot line by dot line; and
obtaining the correction value for each dot line in accordance with the first information and second information corresponding to a second gradation value that is different from the first gradation value,
wherein three information pairs are obtained, the three information pairs being a pair made up of the gradation value and a measurement value of one of three correction patterns that are each based on a different gradation value, a pair made up of the gradation value and a measurement value of another one of the three correction patterns, and a pair made up of the gradation value and a measurement value of yet another one of the three correction patterns;
if a darkness target value is higher than the second largest measurement value of the three information pairs, then a gradation value at which the darkness becomes the target value is determined by linear interpolation using the information including this second largest measurement value and the information including the measurement value higher than the second largest measurement value;
if the darkness target value is smaller than the second largest measurement value of the three information pairs, then the gradation value at which the darkness becomes the target value is determined by linear interpolation using the information including this second largest measurement value and the information including the measurement value smaller than the second largest measurement value; and
a value obtained by dividing a deviation between the determined gradation value and a reference gradation value corresponding to the target value by that reference gradation value is taken as the correction value.

20. The method according to claim 19,
wherein the second largest gradation value is the same value as the reference value.

21. The method according to claim 19,
wherein the target value is an average value of darkness measurement values of all dot lines in the correction pattern based on the second gradation value of the three gradation values.

22. A method for obtaining a correction value that is for correcting and printing an image constituted by a plurality of dot lines, comprising:
printing a correction pattern based on a first gradation value by ejecting ink from a plurality of nozzles moving in a predetermined movement direction and forming the plurality of dot lines in an intersecting direction that intersects the movement direction;
obtaining, for each dot line, first information corresponding to the first gradation value by measuring a darkness of the correction pattern dot line by dot line; and
obtaining the correction value for each dot line in accordance with The first information and second information corresponding to a second gradation value that is different from the first gradation value,
wherein correction patterns are printed based respectively on specified gradation values including the first gradation value, for each of the specified gradation values;
the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and
the second information corresponds to the second gradation value at which the printable gradation value becomes highest.

23. A method for obtaining a correction value that is for correcting and printing an image constituted by a plurality of dot lines, comprising:
printing a correction pattern based on a first gradation value by ejecting ink from a plurality of nozzles moving in a predetermined movement direction and forming the plurality of dot lines in an intersecting direction that intersects the movement direction;
obtaining, for each dot line, first information corresponding to the first gradation value by measuring a darkness of the correction pattern dot line by dot line; and
obtaining the correction value for each dot line in accordance with the first information and second information corresponding to a second gradation value that is different from the first gradation value,
wherein correction patterns are printed based respectively on specified gradation values including the first gradation value, for each of the specified gradation values;
the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information corresponds to the second gradation value at which the printable gradation value becomes lowest.

24. A printing method for printing an image on a medium, comprising:

printing a correction pattern based on a first gradation value by ejecting ink from a plurality of nozzles moving in a predetermined movement direction and forming a plurality of dot lines in an intersecting direction that intersects the movement direction;

obtaining, for each dot line, first information corresponding to the first gradation value by measuring a darkness of the correction pattern dot line by dot line; and printing an image constituted by a plurality of corrected dot lines on the medium by correcting line in accordance with the first information and second information corresponding to a second gradation value that is different from the first gradation value, wherein a correction value is calculated for each dot line based on the first information and the second information; and an image that is constituted by a plurality of the dot lines that have been corrected respectively in accordance with the correction value is printed on the medium, wherein the image data for printing the image includes a gradation value for each dot formation unit formed on the medium;

if no correction value is associated with these formation units, then:
based on a creation ratio table associating the gradation values with the dot creation ratios, the creation ratio corresponding to the gradation value of the formation unit is read out; and
dots are formed in each formation unit on the medium in accordance with the creation ratio that has been read out; and if the correction value is associated with these formation units, then:
when reading the creation ratio corresponding to a gradation value from the creation ratio table, the creation ratio corresponding to a value obtained by changing the gradation value by the correction value is read out; and
dots are formed in each formation unit on the medium in accordance with the creation ratio that has been read out.

25. A printing method according to claim 24, wherein the dot creation ratio indicates a proportion of a number of dots formed within a region that has a uniform gradation value and that is made of a predetermined number of the formation units, to that predetermined number.

26. A printing method according to claim 24, wherein the nozzle can form dots of a plurality of sizes; and in the creation ratio table, a relation between the creation ratios and the gradation values is set for each size of dots.

27. A method for obtaining a correction value that is for correcting and printing an image constituted by a plurality of dot lines, comprising:

printing a correction pattern based on a first gradation value by ejecting ink from a plurality of nozzles moving in a predetermined movement direction and forming the plurality of dot lines in an intersecting direction that intersects the movement direction;

obtaining, for each dot line, first information corresponding to the first gradation value by measuring a darkness of the correction pattern dot line by dot line; and obtaining the correction value for each lot line in accordance with the first information and second information corresponding to a second gradation value that is different from the first gradation value, wherein a new gradation value for forming a darkness corresponding to a gradation value other than the first gradation value and the second gradation value is determined by linear interpolation of the first information and the second information.

28. A method for obtaining a correction value that is for correcting and printing an image constituted by a plurality of dot lines, comprising:

printing a correction pattern based on a first gradation value by electing ink from a plurality of nozzles moving in a predetermined movement direction and forming the plurality of dot lines in an intersecting direction that intersects the movement direction;

obtaining, for each dot line, first information corresponding to the first gradation by measuring a darkness of the correction pattern dot line by dot line; and obtaining the correction value for each dot line in accordance with the first information and second information corresponding to a second gradation value that is different from the first gradation value, wherein the correction value is for correcting a dot creation ratio for a gradation value, and, wherein a dot creation ratio for a gradation value other than the first gradation value and the second gradation value is determined by linear interpolation of a dot creation ratio of the first gradation value and a dot creation ratio of the second gradation value.

29. A printing method for printing an image on a medium, comprising the following steps:

printing a correction pattern based on a first gradation value and a correction pattern based on a second gradation value different from the first gradation value by ejecting ink from a plurality of nozzles moving in a predetermined movement direction and forming a plurality of dot lines in an intersecting direction that intersects the movement direction;

obtaining, for each dot line, first information corresponding to the first gradation value and second information corresponding to the second gradation value by measuring a darkness of the correction pattern dot line by dot line;

wherein a correction value is calculated for each dot line based on the first information and the second information; and an image that is constituted by a plurality of the dot lines that have been corrected respectively in accordance with the correction value is printed on the medium;

wherein:
a plurality of the dot lines are formed in the intersecting direction through alternate repetition of a dot formation operation of forming dots on the medium by ejecting ink from the plurality of nozzles moving in the movement direction and a carrying operation of carrying the medium in the intersecting direction intersecting the movement direction;
a plurality of the nozzles are provided for each color of the ink;

the correction value is calculated for each color by printing the correction pattern in each color; and the darkness of the image is corrected for each color in accordance with the correction value of each color;

three information pairs are obtained, the three information pairs being a pair made up of the gradation value and a measurement value of one of three correction patterns that are each based on a different gradation value, a pair made up of the gradation value and a measurement value of another one of the three correction patterns, and a pair made up of the gradation value and a measurement value of yet another one of the three correction patterns;

if a darkness target value is higher than the second largest measurement value of the three information pairs, then a gradation value at which the darkness becomes the target value is determined by linear interpolation using the information including this second largest measurement value and the information including the measurement value higher than the second largest measurement value;

if the darkness target value is smaller than the second largest measurement value of the three information pairs, then the gradation value at which the darkness becomes the target value is determined by linear interpolation using the information including this second largest measurement value and the information including the measurement value smaller than the second largest measurement value; and a value obtained by dividing a deviation between the determined gradation value and a reference gradation value corresponding to the target value by that reference gradation value is taken as the correction value;

the second largest gradation value is the same value as the reference value;

the target value is an average value of darkness measurement values of all dot lines in the correction pattern based on the second gradation value of the three gradation values;

the target value is a darkness measurement value of a darkness sample representing the darkness of the reference value;

the reference value is selected from a darkness range of a middle-tone region;

the darkness measurement value is a grey-scale measurement value;

the image data for printing the image includes a gradation value for each dot formation unit formed on the medium;

if no correction value is associated with these formation units, then:

based on a creation ratio table associating the gradation values with the dot creation ratios, the creation ratio corresponding to the gradation value of the formation unit is read out; and dots are formed in each formation unit on the medium in accordance with the creation ratio that has been read out; and if the correction value is associated with these formation units, then:

when reading the creation ratio corresponding to a gradation value from the creation ratio table, the creation ratio corresponding to a value obtained by changing the gradation value by the correction value is read out; and dots are formed in each formation unit on the medium in accordance with the creation ratio that has been read out;

the dot creation ratio indicates a proportion of a number of dots formed within a region that has a uniform gradation value and that is made of a predetermined number of the formation units, to that predetermined number;

the nozzle can form dots of a plurality of sizes; and in the creation ratio table, a relation between the creation ratios and the gradation values is set for each size of dots; and the darkness of the correction pattern is measured using a darkness measuring device that measures darkness optically.

30. A printing method for printing an image on a medium, comprising the following steps:

printing a correction pattern based on a first gradation value by ejecting ink from a plurality of nozzles moving in a predetermined movement direction and forming a plurality of dot lines in an intersecting direction that intersects the movement direction;

obtaining, for each dot line, first information corresponding to the first gradation value by measuring a darkness of the correction pattern dot line by dot line; and printing an image constituted by a plurality of corrected dot lines on the medium by correcting each dot line in accordance with the first information and second information corresponding to a second gradation value that is different from the first gradation value;

wherein:

correction patterns are printed based respectively on specified gradation values including the first gradation value, for each of the specified gradation values;

the first information is obtained by determining a new gradation value for forming a darkness corresponding to the first gradation value by performing a linear interpolation using information in which the first gradation value and the measurement value of the correction pattern based on the first gradation value are associated and information in which a specified gradation value that is different from the first gradation value and a measurement value of the correction pattern based on that specified gradation value are associated, and associating the determined new gradation value and the first gradation value; and the second information corresponds to the second gradation value at which the printable gradation value becomes highest or lowest;

the information in which the first gradation value and the measurement value of the correction pattern based on the first gradation value are associated, information in which a specified gradation value that is higher than the first gradation value and a measurement value of the correction pattern based on this specified gradation value are associated, and information in which a specified gradation value that is lower than the first gradation value and a measurement value of the correction pattern based on this specified gradation value are associated are obtained;

if the darkness corresponding to the first gradation value is higher than the measurement value of the correction pattern based on the first gradation value, then a linear interpolation is performed using the information in which the first gradation value and the measurement value of the correction pattern based on the first gradation value are associated, and the information in which the specified gradation value that is higher than the first gradation value and the measurement value of the correction pattern based on this specified gradation value are associated;

if the darkness corresponding to the first gradation value is smaller than the measurement value of the correction pattern based on the first gradation value, then a linear interpolation is performed using the information in which the first gradation value and the measurement value of the correction pattern based on the first gradation value are associated, and the information in which the specified gradation value that is lower than the first gradation value and the measurement value of the correction pattern based on this specified gradation value are associated, and a new gradation value for forming the darkness corresponding to the first gradation value is determined;

an average value of the darkness of each dot line constituting the correction pattern based on the first gradation value is taken as the darkness corresponding to the first gradation value;

the image data for printing the image includes a gradation value for each dot formation unit formed on the medium; and the darkness of each of the dot lines is corrected by correcting the gradation value of each of the formation units;

a new gradation value for forming a darkness corresponding to a gradation value other than the first gradation value and the second gradation value is determined by linear interpolation of the first information and the second information;

a dot creation ratio for a gradation value is corrected based on the first information and the second information;

a dot creation ratio for a gradation value other than the first gradation value and the second gradation value is determined by linear interpolation of a dot creation ratio of the first gradation value and a dot creation ratio of the second gradation value;

a plurality of the nozzles are provided for each color of the ink;

the first information is obtained for each color by printing the correction pattern based on the first information in each color; and each dot line is corrected, color by color, in accordance with the first information and the second information.

\* \* \* \* \*